(12) United States Patent
Togashi

(10) Patent No.: US 7,433,172 B2
(45) Date of Patent: *Oct. 7, 2008

(54) MULTILAYER CAPACITOR

(75) Inventor: Masaaki Togashi, Nikaho (JP)

(73) Assignee: TDK Corporation, Tokyo (JP)

(*) Notice: Subject to any disclaimer, the term of this patent is extended or adjusted under 35 U.S.C. 154(b) by 312 days.

This patent is subject to a terminal disclaimer.

(21) Appl. No.: 11/366,774

(22) Filed: Mar. 3, 2006

(65) Prior Publication Data

US 2006/0203422 A1  Sep. 14, 2006

(30) Foreign Application Priority Data

Mar. 10, 2005  (JP) ............................. P2005-068139
Jul. 20, 2005  (JP) ............................. P2005-210263

(51) Int. Cl.
*H01G 4/228* (2006.01)
*H01G 4/005* (2006.01)

(52) U.S. Cl. .................................. 361/306.1; 361/303

(58) Field of Classification Search ................ 361/303, 361/306.1, 306.3, 307, 309, 311
See application file for complete search history.

(56) References Cited

U.S. PATENT DOCUMENTS 7,149,071 B2 * 12/2006 Mosley .................... 361/306.3
7,283,348 B2 * 10/2007 Togashi et al. ........... 361/321.2

FOREIGN PATENT DOCUMENTS

JP  A 2004-47983  2/2004
JP  A-2006-203168  8/2006

* cited by examiner

*Primary Examiner*—Eric Thomas
(74) *Attorney, Agent, or Firm*—Oliff & Berridge, PLC

(57) ABSTRACT

A multilayer capacitor includes a multilayer body with a plurality of dielectric layers, a plurality of first and second inner electrodes alternately laminated, and a plurality of terminal conductors formed on the multilayer body. The plurality of first and second inner electrodes is electrically connected to each other through the connecting conductors. In the plurality of first and second inner electrodes, at least one first inner electrode and one second inner electrode whose number is smaller than the total number of first and second inner electrodes by at least 1 is electrically connected to the first and second terminal conductors through a lead conductor, respectively. The equivalent series resistance of the multilayer capacitor is set to a desirable value by adjusting the number of at least one first inner electrode and one second inner electrode electrically connected to the first and second terminal conductor through the lead conductor, respectively.

62 Claims, 49 Drawing Sheets

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising a multilayer body in which a plurality of dielectric layers and a plurality of inner electrodes are alternately laminated, and a plurality of terminal conductors formed on the multilayer body.

Power supplies for central processing units (CPUs) mounted in digital electronic devices have been increasing their load current while lowering their voltage. Therefore, it has become very difficult to suppress the fluctuation in power supply voltage under a tolerable level in response to a drastic change in load current, whereby a multilayer capacitor known as decoupling capacitor has come into connection with a power supply. At the time when the load current fluctuates transiently, the multilayer capacitor supplies a current to the CPU, thereby suppressing the fluctuation of the power supply voltage.

In recent years, as the CPUs have further been raising their operating frequencies, the load current has been becoming faster and greater, whereby the multilayer capacitor used in the decoupling capacitor is demanded to increase its capacity and equivalent series resistance (ESR). Therefore, a multilayer capacitor whose terminal conductor has a multilayer structure including an inner resistance layer, so as to increase the equivalent series resistance has been under consideration.

SUMMARY OF THE INVENTION

However, the following problem exists when adjusting the equivalent series resistance of a multilayer capacitor comprising a terminal conductor having a multilayer structure including an inner resistance layer to a desirable value. Namely, for adjusting the equivalent series resistance of a multilayer capacitor comprising a terminal conductor having a multilayer structure including an inner resistance layer to a desirable value, the thickness of the inner resistance layer included in the terminal conductor and the material composition of the inner resistance layer must be regulated, which makes it very difficult to control the equivalent series resistance.

It is an object of the present invention to provide a multilayer capacitor which can regulate the equivalent series resistance easily with a high precision.

In a typical multilayer capacitor, all the inner electrodes are connected to their corresponding terminal conductors through lead conductors. Consequently, the lead conductors exist by the number of inner electrodes, thereby lowering the equivalent series resistance. As the number of layers of the dielectric layers and inner electrodes is made greater in order to increase the capacity of the multilayer capacitor, the number of lead conductors becomes greater. Since resistance components of lead conductors are connected to the terminal conductors in parallel, the equivalent series resistance of the multilayer capacitor further decreases as the number of lead conductors increases. Thus, the demand for increasing the capacity of the capacitor and the demand for increasing the equivalent series resistance contradict each other.

Therefore, the inventor diligently conducted studies about multilayer capacitors which can satisfy both of the demands for increasing the capacity and equivalent series resistance. As a result, the inventor have found a new fact that, even when the number of dielectric layers and the number of laminated inner electrodes are the same, the equivalent series resistance can be adjusted to a desirable value if the inner electrodes are connected to each other with a connecting conductor formed on a surface of the multilayer body while changing the number of lead conductors. The inventor have also found a new fact that the equivalent series resistance can be adjusted to a desirable value if the inner electrodes are connected to each other with a connecting conductor formed on a surface of the multilayer body while making it possible to change positions of lead conductors in the laminating direction of the multilayer body. When the number of lead conductors is made smaller than that of inner electrodes in particular, the adjustment can be made such as to increase the equivalent series resistance.

In view of such results of studies, in one aspect, the present invention provides a multilayer capacitor comprising a multilayer body in which a plurality of dielectric layers and a plurality of inner electrodes are alternately laminated, and a plurality of terminal conductors formed on the multilayer body; wherein the plurality of inner electrodes include a plurality of first inner electrodes and a plurality of second inner electrodes alternately arranged; wherein the plurality of terminal conductors include first and second terminal conductors electrically insulated from each other; wherein the plurality of first inner electrodes are electrically connected to each other through a connecting conductor formed on a surface of the multilayer body; wherein the plurality of second inner electrodes are electrically connected to each other through a connecting conductor formed on the surface of the multilayer body; wherein, in the plurality of first inner electrodes, at least one first inner electrode whose number is smaller than the total number of first inner electrodes by at least 1 is electrically connected to the first terminal conductor through a lead conductor; wherein, in the plurality of second inner electrodes, at least one second inner electrode whose number is smaller than the total number of second inner electrodes by at least 1 is electrically connected to the second terminal conductor through a lead conductor; and wherein an equivalent series resistance is set to a desirable value by adjusting at least one of the number of first inner electrodes electrically connected to the first terminal conductor through the lead conductor and the number of second inner electrodes electrically connected to the second terminal conductor through the lead conductor.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of terminal conductors formed on the multilayer body; wherein the plurality of inner electrodes include a plurality of first inner electrodes and a plurality of second inner electrodes alternately arranged; wherein the plurality of terminal conductors include first and second terminal conductors electrically insulated from each other; the method comprising the steps of electrically connecting the plurality of first inner electrodes to each other through a connecting conductor formed on a surface of the multilayer body; electrically connecting the plurality of second inner electrodes to each other through a connecting conductor formed on the surface of the multilayer body; electrically connecting, in the plurality of first inner electrodes, at least one first inner electrode whose number is smaller than the total number of first inner electrodes by at least 1 to the first terminal conductor through a lead conductor; electrically connecting, in the plurality of second inner electrodes, at least one second inner electrode whose number is smaller than the total number of second inner electrodes by at least 1 to the second terminal conductor through a lead conductor; and setting the equivalent series resistance to a desirable value by adjusting at least one of the number of first inner electrodes electrically connected to the first terminal conductor through the lead conductor and the number of second inner electrodes electrically connected to the second terminal conductor through the lead conductor.

By adjusting at least one of the number of first inner electrodes electrically connected to the first terminal conductor through the lead conductor and the number of second inner electrodes electrically connected to the second terminal conductor through the lead conductor, each of the multilayer capacitor in accordance with the present invention and method of adjusting an equivalent series resistance mentioned above sets the equivalent series resistance to a desirable value and thus can regulate the equivalent series resistance easily with a high precision.

In another aspect, the present invention provides a multilayer capacitor comprising a multilayer body in which a plurality of dielectric layers and a plurality of inner electrodes are alternately laminated, and a plurality of terminal conductors formed on the multilayer body; wherein the plurality of inner electrodes include a plurality of first inner electrodes and a plurality of second inner electrodes alternately arranged; wherein the plurality of terminal conductors include first and second terminal conductors electrically insulated from each other; wherein the plurality of first inner electrodes are electrically connected to each other through a connecting conductor formed on a surface of the multilayer body; wherein the plurality of second inner electrodes are electrically connected to each other through a connecting conductor formed on the surface of the multilayer body; wherein, in the plurality of first inner electrodes, at least one first inner electrode whose number is smaller than the total number of first inner electrodes by at least 1 is electrically connected to the first terminal conductor through a lead conductor; wherein, in the plurality of second inner electrodes, at least one second inner electrode whose number is smaller than the total number of second inner electrodes by at least 1 is electrically connected to the second terminal conductor through a lead conductor; and wherein an equivalent series resistance is set to a desirable value by adjusting at least one of a position of the first inner electrode electrically connected to the first terminal conductor through the lead conductor in the laminating direction of the multilayer body and a position of the second inner electrode electrically connected to the second terminal conductor through the lead conductor in the laminating direction of the multilayer body.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of terminal conductors formed on the multilayer body; wherein the plurality of inner electrodes include a plurality of first inner electrodes and a plurality of second inner electrodes alternately arranged; wherein the plurality of terminal conductors include first and second terminal conductors electrically insulated from each other; the method comprising the steps of electrically connecting the plurality of first inner electrodes to each other through a connecting conductor formed on a surface of the multilayer body; electrically connecting the plurality of second inner electrodes to each other through a connecting conductor formed on the surface of the multilayer body; electrically connecting, in the plurality of first inner electrodes, at least one first inner electrode whose number is smaller than the total number of first inner electrodes by at least 1 to the first terminal conductor through a lead conductor; electrically connecting, in the plurality of second inner electrodes, at least one second inner electrode whose number is smaller than the total number of second inner electrodes by at least 1 to the second terminal conductor through a lead conductor; and setting the equivalent series resistance to a desirable value by adjusting at least one of a position of the first inner electrode electrically connected to the first terminal conductor through the lead conductor in the laminating direction of the multilayer body and a position of the second inner electrode electrically connected to the second terminal conductor through the lead conductor in the laminating direction of the multilayer body.

By adjusting at least one of a position of the first inner electrode electrically connected to the first terminal conductor through the lead conductor in the laminating direction of the multilayer body and the position of the second inner electrode electrically connected to the second terminal conductor through the lead conductor in the laminating direction of the multilayer body, each of the multilayer capacitor in accordance with the present invention and method of adjusting an equivalent series resistance mentioned above sets the equivalent series resistance to a desirable value and thus can regulate the equivalent series resistance easily with a high precision.

In still another aspect, the present invention provides a multilayer capacitor comprising a multilayer body in which a plurality of dielectric layers and a plurality of inner electrodes are alternately laminated, and a plurality of terminal conductors formed on the multilayer body; wherein the plurality of inner electrodes include a plurality of first inner electrodes and a plurality of second inner electrodes alternately arranged; wherein the plurality of terminal conductors include at least three terminal conductors; wherein the plurality of first inner electrodes are electrically connected to each other through a connecting conductor formed on a surface of the multilayer body; wherein the plurality of second inner electrodes are electrically connected to each other through a connecting conductor formed on the surface of the multilayer body; wherein at least two first inner electrodes in the plurality of first inner electrodes are electrically connected to at least two respective terminal conductors whose number is smaller than the total number of terminal conductors by at least 1 in the at least three terminal conductors through a lead conductor; wherein at least one second inner electrode in the plurality of second inner electrodes is electrically connected to the rest of terminal conductors other than the terminal conductors electrically connected to the first inner electrodes through the lead conductor through a lead conductor; and wherein an equivalent series resistance is set to a desirable value by adjusting the number of at least one species of the first and second inner electrodes electrically connected to the terminal conductors through the lead conductor.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of terminal conductors formed on the multilayer body; wherein the plurality of inner electrodes include a plurality of first inner electrodes and a plurality of second inner electrodes alternately arranged; wherein the plurality of terminal conductors include at least three terminal conductors; the method comprising the steps of electrically connecting the plurality of first inner electrodes to each other through a connecting conductor formed on a surface of the multilayer body; electrically connecting the plurality of second inner electrodes to each other through a connecting conductor formed on the surface of the multilayer body; electrically connecting at least two first inner electrodes in the plurality of first inner electrodes to at least two respective terminal conductors whose number is smaller than the total number of terminal conductors by at least 1 in the at least three terminal conductors through a lead conductor; electrically connecting at least one second inner electrode in the plurality of second inner electrodes to the rest of terminal conductors other than the terminal conductors electrically connected to the first inner electrodes through the lead conductor through a lead conductor; and setting an equivalent series resistance to a desirable value by adjusting the number of at least one species of the first and second inner electrodes electrically connected to the terminal conductors through the lead conductor.

By adjusting the number of at least one species of the first and second inner electrodes electrically connected to the terminal conductors through the lead conductor, each of the multilayer capacitor in accordance with the present invention and method of adjusting an equivalent series resistance mentioned above sets the equivalent series resistance to a desirable value and thus can regulate the equivalent series resistance easily with a high precision.

In still another aspect, the present invention provides a multilayer capacitor comprising a multilayer body in which a plurality of dielectric layers and a plurality of inner electrodes are alternately laminated, and a plurality of terminal conductors formed on the multilayer body; wherein the plurality of inner electrodes include a plurality of first inner electrodes and a plurality of second inner electrodes alternately arranged; wherein the plurality of terminal conductors include at least three terminal conductors; wherein the plurality of first inner electrodes are electrically connected to each other through a connecting conductor formed on a surface of the multilayer body; wherein the plurality of second inner electrodes are electrically connected to each other through a connecting conductor formed on the surface of the multilayer body; wherein at least two first inner electrodes in the plurality of first inner electrodes are electrically connected to at least two respective terminal conductors whose number is smaller than the total number of terminal conductors by at least 1 in the at least three terminal conductors through a lead conductor; wherein at least one second inner electrode in the plurality of second inner electrodes is electrically connected to the rest of terminal conductors other than the terminal conductors electrically connected to the first inner electrodes through the lead conductor through a lead conductor; and wherein an equivalent series resistance is set to a desirable value by adjusting a position of at least one species of the first and second inner electrodes electrically connected to the terminal conductors through the lead conductor in the laminating direction of the multilayer body.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of terminal conductors formed on the multilayer body; wherein the plurality of inner electrodes include a plurality of first inner electrodes and a plurality of second inner electrodes alternately arranged; wherein the plurality of terminal conductors include at least three terminal conductors; the method comprising the steps of electrically connecting the plurality of first inner electrodes to each other through a connecting conductor formed on a surface of the multilayer body; electrically connecting the plurality of second inner electrodes to each other through a connecting conductor formed on the surface of the multilayer body; electrically connecting at least two first inner electrodes in the plurality of first inner electrodes to at least two respective terminal conductors whose number is smaller than the total number of terminal conductors by at least 1 in the at least three terminal conductors through a lead conductor; electrically connecting at least one second inner electrode in the plurality of second inner electrodes to the rest of terminal conductors other than the terminal conductors electrically connected to the first inner electrodes through the lead conductor through a lead conductor; and setting an equivalent series resistance to a desirable value by adjusting a position of at least one species of the first and second inner electrodes electrically connected to the terminal conductors through the lead conductor in the laminating direction of the multilayer body.

By adjusting the position of at least one species of the first and second inner electrodes electrically connected to the terminal conductors through the lead conductor in the laminating direction of the multilayer body, each of the multilayer capacitor in accordance with the present invention and method of adjusting an equivalent series resistance mentioned above sets the equivalent series resistance to a desirable value and thus can regulate the equivalent series resistance easily with a high precision.

In still another aspect, the present invention provides a multilayer capacitor comprising a multilayer body in which a plurality of dielectric layers and a plurality of inner electrodes are alternately laminated, and a plurality of terminal conductors formed on the multilayer body; wherein the plurality of inner electrodes include a plurality of first inner electrodes and a plurality of second inner electrodes alternately arranged; wherein the plurality of terminal conductors include at least three terminal conductors; wherein the plurality of first inner electrodes are electrically connected to each other through a connecting conductor formed on a surface of the multilayer body; wherein the plurality of second inner electrodes are electrically connected to each other through a connecting conductor formed on the surface of the multilayer body; wherein at least one first inner electrode in the plurality of first inner electrodes is electrically connected to at least two terminal conductors whose number is smaller than the total number of terminal conductors by at least 1 in the at least three terminal conductors through respective lead conductors; wherein at least one second inner electrode in the plurality of second inner electrodes is electrically connected to the rest of terminal conductors other than the terminal conductors electrically connected to the first inner electrodes through the lead conductors through a lead conductor; and wherein an equivalent series resistance is set to a desirable value by adjusting the number of at least one species of the first and second inner electrodes electrically connected to the terminal conductors through the lead conductors.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of terminal conductors formed on the multilayer body; wherein the plurality of inner electrodes include a plurality of first inner electrodes and a plurality of second inner electrodes alternately arranged; wherein the plurality of terminal conductors include at least three terminal conductors; the method comprising the steps of electrically connecting the plurality of first inner electrodes to each other through a connecting conductor formed on a surface of the multilayer body; electrically connecting the plurality of second inner electrodes to each other through a connecting conductor formed on the surface of the multilayer body; electrically connecting at least one inner electrodes in the plurality of first inner electrodes to at least two terminal conductors whose number is smaller than the total number of terminal conductors by at least 1 in the at least three terminal conductors through respective lead conductors; electrically connecting at least one second inner electrode in the plurality of second inner electrodes to the rest of terminal conductors other than the terminal conductors electrically connected to the first inner electrodes through the lead conductors through a lead conductor; and setting an equivalent series resistance to a desirable value by adjusting the number of at least one species of the first and second inner electrodes electrically connected to the terminal conductors through the lead conductors.

By adjusting the number of at least one species of the first and second inner electrodes electrically connected to the terminal conductors through the lead conductors, each of the multilayer capacitor in accordance with the present invention and method of adjusting an equivalent series resistance mentioned above sets the equivalent series resistance to a desirable value and thus can regulate the equivalent series resistance easily with a high precision.

In still another aspect, the present invention provides a multilayer capacitor comprising a multilayer body in which a plurality of dielectric layers and a plurality of inner electrodes are alternately laminated, and a plurality of terminal conductors formed on the multilayer body; wherein the plurality of inner electrodes include a plurality of first inner electrodes and a plurality of second inner electrodes alternately arranged; wherein the plurality of terminal conductors include at least three terminal conductors; wherein the plurality of first inner electrodes are electrically connected to each other through a connecting conductor formed on a surface of the multilayer body; wherein the plurality of second inner electrodes are electrically connected to each other through a connecting conductor formed on the surface of the multilayer body; wherein at least one first inner electrode in the plurality of first inner electrodes is electrically connected to at least two terminal conductors whose number is smaller than the total number of terminal conductors by at least 1 in the at least three terminal conductors through respective lead conductors; wherein at least one second inner electrode in the plurality of second inner electrodes is electrically connected to the rest of terminal conductors other than the terminal conductors electrically connected to the first inner electrodes through the lead conductors through a lead conductor; and wherein an equivalent series resistance is set to a desirable value by adjusting a position of at least one species of the first and second inner electrodes electrically connected to the terminal conductors through the lead conductors in the laminating direction of the multilayer body.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of terminal conductors formed on the multilayer body; wherein the plurality of inner electrodes include a plurality of first inner electrodes and a plurality of second inner electrodes alternately arranged; wherein the plurality of terminal conductors include at least three terminal conductors; the method comprising the steps of electrically connecting the plurality of first inner electrodes to each other through a connecting conductor formed on a surface of the multilayer body; electrically connecting the plurality of second inner electrodes to each other through a connecting conductor formed on the surface of the multilayer body; electrically connecting at least one inner electrodes in the plurality of first inner electrodes to at least two terminal conductors whose number is smaller than the total number of terminal conductors by at least 1 in the at least three terminal conductors through respective lead conductors; electrically connecting at least one second inner electrode in the plurality of second inner electrodes to the rest of terminal conductors other than the terminal conductors electrically connected to the first inner electrodes through the lead conductors through a lead conductor; and setting an equivalent series resistance to a desirable value by adjusting a position of at least one species of the first and second inner electrodes electrically connected to the terminal conductors through the lead conductors in the laminating direction of the multilayer body.

By adjusting the position of at least one species of the first and second inner electrodes electrically connected to the terminal conductors through the lead conductors in the laminating direction of the multilayer body, each of the multilayer capacitor in accordance with the present invention and method of adjusting an equivalent series resistance mentioned above sets the equivalent series resistance to a desirable value and thus can regulate the equivalent series resistance easily with a high precision.

Preferably, the plurality of terminal conductors include at least two first terminal conductors and at least two second terminal conductors, the plurality of first inner electrodes are electrically connected to at least two first terminal conductors through the lead and connecting conductors, and the plurality of the second inner electrodes are electrically connected to at least two second terminal conductors through the lead and connecting conductors.

Preferably, the equivalent series resistance is set to a desirable value by further adjusting the number of connecting conductors electrically connecting the plurality of first inner electrodes to each other and the number of connecting conductors electrically connecting the plurality of second inner electrodes to each other. This can regulate the equivalent series resistance with a higher precision.

Preferably, the plurality of first inner electrodes are connected in parallel, and the plurality of second inner electrodes are connected in parallel. In this case, even when the resistance value fluctuates among the first inner electrodes or second inner electrodes, its influence is less in the equivalent series resistance of the multilayer capacitor as a whole, whereby the equivalent series resistance control can be restrained from lowering its precision.

Preferably, at least a part of the plurality of first and second inner electrodes is formed with a slit, whereas the slit is formed such that a current flows in respective directions opposite from each other in regions opposing each other across the slit in each of the first and second inner electrodes formed with the slit. In this case, magnetic fields caused by the currents cancel each other out, whereby the equivalent series inductance can be reduced.

In still another aspect, the present invention provides a multilayer capacitor comprising a multilayer body in which a plurality of dielectric layers and a plurality of inner electrodes are alternately laminated, and a plurality of terminal conductors formed on the multilayer body; the multilayer capacitor having a capacitor portion including a first number of first inner electrodes and a second number of second inner electrodes alternately arranged as the plurality of inner electrodes; wherein the plurality of terminal conductors include first and second terminal conductors electrically insulated from each other; wherein the first number of first inner electrodes are electrically connected to each other through a connecting conductor formed on a surface of the multilayer body; wherein the second number of second inner electrodes are electrically connected to each other through a connecting conductor formed on the surface of the multilayer body; wherein at least one first inner electrode whose number is smaller than the first number by at least 1 in the first number of first inner electrodes is electrically connected to the first terminal conductor through a lead conductor; wherein at least one second inner electrode whose number is smaller than the second number by at least 1 in the second number of second inner electrodes is electrically connected to the second terminal conductor through a lead conductor; and wherein an equivalent series resistance is set to a desirable value by adjusting at least one of the number of first inner electrodes electrically connected to the first terminal conductor through the lead conductor and the number of second inner electrodes electrically connected to the second terminal conductor through the lead conductor.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of terminal conductors formed on the multilayer body; the multilayer capacitor having a capacitor portion including a first number of first inner electrodes and a second number of second inner electrodes alternately arranged as the plurality of inner electrodes; wherein the plurality of terminal conductors include first and second terminal conductors electrically insulated from each other; the method comprising the steps of electrically connecting the first number of first inner electrodes to each other through a connecting conductor formed on a surface of the multilayer body; electrically connecting the second number of second inner electrodes to each other through a connecting conductor formed on the surface of the multilayer body; electrically connecting at least one first inner electrode whose number is smaller than the first number by at least 1 in the first number of first inner electrodes to the first terminal conductor through a lead conductor; electrically connecting at least one second inner electrode whose number is smaller than the second number by at least 1 in the second number of second inner electrodes to the second terminal conductor through a lead conductor; and setting an equivalent series resistance to a desirable value by adjusting at least one of the number of first inner electrodes electrically connected to the first terminal conductor through the lead conductor and the number of second inner electrodes electrically connected to the second terminal conductor through the lead conductor.

By adjusting at least one of the number of first inner electrodes electrically connected to the first terminal conductor through the lead conductor and the number of second inner electrodes electrically connected to the second terminal conductor through the lead conductor, each of the multilayer capacitor in accordance with the present invention and method of adjusting an equivalent series resistance mentioned above sets the equivalent series resistance to a desirable value and thus can regulate the equivalent series resistance easily with a high precision.

In still another aspect, the present invention provides a multilayer capacitor comprising a multilayer body in which a plurality of dielectric layers and a plurality of inner electrodes are alternately laminated, and a plurality of terminal conductors formed on the multilayer body; the multilayer capacitor having a capacitor portion including a first number of first inner electrodes and a second number of second inner electrodes alternately arranged as the plurality of inner electrodes; wherein the plurality of terminal conductors include first and second terminal conductors electrically insulated from each other; wherein the first number of first inner electrodes are electrically connected to each other through a connecting conductor formed on a surface of the multilayer body; wherein the second number of second inner electrodes are electrically connected to each other through a connecting conductor formed on the surface of the multilayer body; wherein at least one first inner electrode whose number is smaller than the first number by at least 1 in the first number of first inner electrodes is electrically connected to the first terminal conductor through a lead conductor; wherein at least one second inner electrode whose number is smaller than the second number by at least 1 in the second number of second inner electrodes is electrically connected to the second terminal conductor through a lead conductor; and wherein an equivalent series resistance is set to a desirable value by adjusting at least one of a position of the first inner electrode electrically connected to the first terminal conductor through the lead conductor in the laminating direction of the multilayer body and a position of the second inner electrode electrically connected to the second terminal conductor through the lead conductor in the laminating direction of the multilayer body.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of terminal conductors formed on the multilayer body; the multilayer capacitor having a capacitor portion including a first number of first inner electrodes and a second number of second inner electrodes alternately arranged as the plurality of inner electrodes; wherein the plurality of terminal conductors include first and second terminal conductors electrically insulated from each other; the method comprising the steps of electrically connecting the first number of first inner electrodes to each other through a connecting conductor formed on a surface of the multilayer body; electrically connecting the second number of second inner electrodes to each other through a connecting conductor formed on the surface of the multilayer body; electrically connecting at least one first inner electrode whose number is smaller than the first number by at least 1 in the first number of first inner electrodes to the first terminal conductor through a lead conductor; electrically connecting at least one second inner electrode whose number is smaller than the second number by at least 1 in the second number of second inner electrodes to the second terminal conductor through a lead conductor; and setting an equivalent series resistance to a desirable value by adjusting at least one of a position of the first inner electrode electrically connected to the first terminal conductor through the lead conductor in the laminating direction of the multilayer body and a position of the second inner electrode electrically connected to the second terminal conductor through the lead conductor in the laminating direction of the multilayer body.

By adjusting at least one of a position of the first inner electrode electrically connected to the first terminal conductor through the lead conductor in the laminating direction of the multilayer body and a position of the second inner electrode electrically connected to the second terminal conductor through the lead conductor in the laminating direction of the multilayer body, each of the multilayer capacitor in accordance with the present invention and method of adjusting an equivalent series resistance mentioned above sets the equivalent series resistance to a desirable value and thus can regulate the equivalent series resistance easily with a high precision.

In still another aspect, the present invention provides a multilayer capacitor comprising a multilayer body in which a plurality of dielectric layers and a plurality of inner electrodes are alternately laminated, and a plurality of terminal conductors formed on the multilayer body; the multilayer capacitor having a capacitor portion including a first number of first inner electrodes and a second number of second inner electrodes alternately arranged as the plurality of inner electrodes; wherein the first number of first inner electrodes are electrically connected to each other through a connecting conductor formed on a surface of the multilayer body; wherein the second number of second inner electrodes are electrically connected to each other through a connecting conductor formed on the surface of the multilayer body; wherein at least one first inner electrode whose number is smaller than the first number by at least 1 in the first number of first inner electrodes is electrically connected to the respective terminal conductor through a lead conductor; wherein at least one second inner electrode whose number is smaller than the second number by at least 1 in the second number of second inner electrodes is electrically connected to the respective terminal conductor in the rest of terminal conductors other than the terminal conductor electrically connected to the first inner electrode through the lead conductor through a lead conductor; and wherein an equivalent series resistance is set to a desirable value by adjusting the number of at least one species of the first and second inner electrodes electrically connected to the terminal conductors through the lead conductors.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of terminal conductors formed on the multilayer body; the multilayer capacitor having a capacitor portion including a first number of first inner electrodes and a second number of second inner electrodes alternately arranged as the plurality of inner electrodes; the method comprising the steps of electrically connecting the first number of first inner electrodes to each other through a connecting conductor formed on a surface of the multilayer body; electrically connecting the second number of second inner electrodes to each other through a connecting conductor formed on the surface of the multilayer body; electrically connecting at least one first inner electrode whose number is smaller than the first number by at least 1 in the first number of first inner electrodes to the respective terminal conductor in the plurality of terminal conductors through a lead conductor; electrically connecting at least one second inner electrode whose number is smaller than the second number by at least 1 in the second number of second inner electrodes to the respective terminal conductor in the rest of terminal conductors other than the terminal conductor electrically connected to the first inner electrode through the lead conductor through a lead conductor; and setting an equivalent series resistance to a desirable value by adjusting the number of at least one species of the first and second inner electrodes electrically connected to the terminal conductors through the lead conductors.

By adjusting the number of at least one species of the first and second inner electrodes electrically connected to the terminal conductors through the lead conductors, each of the multilayer capacitor in accordance with the present invention and method of adjusting an equivalent series resistance mentioned above sets the equivalent series resistance to a desirable value and thus can regulate the equivalent series resistance easily with a high precision.

In still another aspect, the present invention provides a multilayer capacitor comprising a multilayer body in which a plurality of dielectric layers and a plurality of inner electrodes are alternately laminated, and a plurality of terminal conductors formed on the multilayer body; the multilayer capacitor having a capacitor portion including a first number of first inner electrodes and a second number of second inner electrodes alternately arranged as the plurality of inner electrodes; wherein the first number of first inner electrodes are electrically connected to each other through a connecting conductor formed on a surface of the multilayer body; wherein the second number of second inner electrodes are electrically connected to each other through a connecting conductor formed on the surface of the multilayer body; wherein at least one first inner electrode whose number is smaller than the first number by at least 1 in the first number of first inner electrodes is electrically connected to the respective terminal conductor through a lead conductor; wherein at least one second inner electrode whose number is smaller than the second number by at least 1 in the second number of second inner electrodes is electrically connected to the respective terminal conductor in the rest of terminal conductors other than the terminal conductor electrically connected to the first inner electrode through the lead conductor through a lead conductor; and wherein an equivalent series resistance is set to a desirable value by adjusting a position of at least one species of the first and second inner electrodes electrically connected to the terminal conductors through the lead conductors in the laminating direction of the multilayer body.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of terminal conductors formed on the multilayer body; the multilayer capacitor having a capacitor portion including a first number of first inner electrodes and a second number of second inner electrodes alternately arranged as the plurality of inner electrodes; the method comprising the steps of electrically connecting the first number of first inner electrodes to each other through a connecting conductor formed on a surface of the multilayer body; electrically connecting the second number of second inner electrodes to each other through a connecting conductor formed on the surface of the multilayer body; electrically connecting at least one first inner electrode whose number is smaller than the first number by at least 1 in the first number of first inner electrodes to the respective terminal conductor in the plurality of terminal conductors through a lead conductor; electrically connecting at least one second inner electrode whose number is smaller than the second number by at least 1 in the second number of second inner electrodes to the respective terminal conductor in the rest of terminal conductors other than the terminal conductor electrically connected to the first inner electrode through the lead conductor through a lead conductor; and setting an equivalent series resistance to a desirable value by adjusting a position of at least one species of the first and second inner electrodes electrically connected to the terminal conductors through the lead conductors in the laminating direction of the multilayer body.

By adjusting the position of at least one species of the first and second inner electrodes electrically connected to the terminal conductors through the lead conductors in the laminating direction of the multilayer body, each of the multilayer capacitor in accordance with the present invention and method of adjusting an equivalent series resistance mentioned above sets the equivalent series resistance to a desirable value and thus can regulate the equivalent series resistance easily with a high precision.

In still another aspect, the present invention provides a multilayer capacitor comprising a multilayer body in which a plurality of dielectric layers and a plurality of inner electrodes are alternately laminated, and a plurality of terminal conductors formed on the multilayer body; the multilayer capacitor having a capacitor portion including a first number of first inner electrodes and a second number of second inner electrodes alternately arranged as the plurality of inner electrodes; wherein the first number of first inner electrodes are electrically connected to each other through a connecting conductor formed on a surface of the multilayer body; wherein the second number of second inner electrodes are electrically connected to each other through a connecting conductor formed on the surface of the multilayer body; wherein at least one first inner electrode whose number is smaller than the first number by at least 1 in the first number of first inner electrodes is electrically connected to at least one terminal conductor in the plurality of terminal conductors through a respective lead conductor; wherein at least one second inner electrode whose number is smaller than the second number by at least 1 is electrically connected to at least one terminal conductor in the rest of terminal conductors other than the terminal conductor electrically connected to the first inner electrode through the lead conductor through a respective terminal conductor; and wherein an equivalent series resistance is set to a desirable value by adjusting the number of at least one species of the first and second inner electrodes electrically connected to the terminal conductors through the lead conductors.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of terminal conductors formed on the multilayer body; the multilayer capacitor having a capacitor portion including a first number of first inner electrodes and a second number of second inner electrodes alternately arranged as the plurality of inner electrodes; the method comprising the steps of electrically connecting the first number of first inner electrodes to each other through a connecting conductor formed on a surface of the multilayer body; electrically connecting the second number of second inner electrodes to each other through a connecting conductor formed on the surface of the multilayer body; electrically connecting at least one first inner electrode whose number is smaller than the first number by at least 1 in the first number of first inner electrodes to at least one terminal conductor in the plurality of terminal conductors through a respective lead conductor; electrically connecting at least one second inner electrode whose number is smaller than the second number by at least 1 to at least one terminal conductor in the rest of terminal conductors other than the terminal conductor electrically connected to the first inner electrode through the lead conductor through a respective terminal conductor; and setting an equivalent series resistance to a desirable value by adjusting the number of at least one species of the first and second inner electrodes electrically connected to the terminal conductors through the lead conductors.

By adjusting the number of at least one species of the first and second inner electrodes electrically connected to the terminal conductors through the lead conductors, each of the multilayer capacitor in accordance with the present invention and method of adjusting an equivalent series resistance mentioned above sets the equivalent series resistance to a desirable value and thus can regulate the equivalent series resistance easily with a high precision.

In still another aspect, the present invention provides a multilayer capacitor comprising a multilayer body in which a plurality of dielectric layers and a plurality of inner electrodes are alternately laminated, and a plurality of terminal conductors formed on the multilayer body; the multilayer capacitor having a capacitor portion including a first number of first inner electrodes and a second number of second inner electrodes alternately arranged as the plurality of inner electrodes; wherein the first number of first inner electrodes are electrically connected to each other through a connecting conductor formed on a surface of the multilayer body; wherein the second number of second inner electrodes are electrically connected to each other through a connecting conductor formed on the surface of the multilayer body; wherein at least one first inner electrode whose number is smaller than the first number by at least 1 in the first number of first inner electrodes is electrically connected to at least one terminal conductor in the plurality of terminal conductors through a respective lead conductor; wherein at least one second inner electrode whose number is smaller than the second number by at least 1 is electrically connected to at least one terminal conductor in the rest of terminal conductors other than the terminal conductor electrically connected to the first inner electrode through the lead conductor through a respective terminal conductor; and wherein an equivalent series resistance is set to a desirable value by adjusting a position of at least one species of the first and second inner electrodes electrically connected to the terminal conductors through the lead conductors in the laminating direction of the multilayer body.

On the other hand, as a method of adjusting an equivalent series resistance of a multilayer capacitor, there is a method of adjusting an equivalent series resistance of a multilayer capacitor comprising a multilayer body in which a plurality of dielectric layers and a plurality of inner electrodes are alternately laminated, and a plurality of terminal conductors formed on the multilayer body; the multilayer capacitor having a capacitor portion including a first number of first inner electrodes and a second number of second inner electrodes alternately arranged as the plurality of inner electrodes; the method comprising the steps of electrically connecting the first number of first inner electrodes to each other through a connecting conductor formed on a surface of the multilayer body; electrically connecting the second number of second inner electrodes to each other through a connecting conductor formed on the surface of the multilayer body; electrically connecting at least one first inner electrode whose number is smaller than the first number by at least 1 in the first number of first inner electrodes to at least one terminal conductor in the plurality of terminal conductors through a respective lead conductor; electrically connecting at least one second inner electrode whose number is smaller than the second number by at least 1 to at least one terminal conductor in the rest of terminal conductors other than the terminal conductor electrically connected to the first inner electrode through the lead conductor through a respective terminal conductor; and setting an equivalent series resistance to a desirable value by adjusting a position of at least one species of the first and second inner electrodes electrically connected to the terminal conductors through the lead conductors in the laminating direction of the multilayer body.

By adjusting the position of at least one species of the first and second inner electrodes electrically connected to the terminal conductors through the lead conductors in the laminating direction of the multilayer body, each of the multilayer capacitor in accordance with the present invention and method of adjusting an equivalent series resistance mentioned above sets the equivalent series resistance to a desirable value and thus can regulate the equivalent series resistance easily with a high precision.

Preferably, the equivalent series resistance is set to a desirable value by further adjusting the number of connecting conductors electrically connecting the plurality of first inner electrodes to each other and the number of connecting conductors electrically connecting the plurality of second inner electrodes to each other. This can regulate the equivalent series resistance with a higher precision.

Preferably, the plurality of first inner electrodes are connected in parallel, and the plurality of second inner electrodes are connected in parallel. In this case, even when the resistance value fluctuates among the first inner electrodes or second inner electrodes, its influence is less in the equivalent series resistance of the multilayer capacitor as a whole, whereby the equivalent series resistance control can be restrained from lowering its precision.

Preferably, at least a part of the plurality of first and second inner electrodes is formed with a slit, whereas the slit is formed such that a current flows in respective directions opposite from each other in regions opposing each other across the slit in each of the first and second inner electrodes formed with the slit. In this case, magnetic fields caused by the currents cancel each other out, whereby the equivalent series inductance can be reduced.

In view of the above-mentioned results of studies, in still another aspect, the present invention provides a multilayer capacitor comprising a multilayer body in which a plurality of dielectric layers and a plurality of inner electrodes are alternately laminated, and a plurality of outer conductors formed on the multilayer body; wherein the plurality of inner electrodes include a plurality of first inner electrodes and a plurality of second inner electrodes alternately arranged; wherein the plurality of outer conductors have a first outer conductor group including a plurality of first terminal conductors and an even number of first connecting conductors, and a second outer conductor group including a plurality of second terminal conductors and an even number of second connecting conductors; wherein the plurality of first and second terminal conductors are electrically insulated from each other; wherein the even number of first and second connecting conductors are electrically insulated from each other; wherein the plurality of first inner electrodes are electrically connected to each other through the even number of first connecting conductors formed on the multilayer body; wherein the plurality of second electrodes are electrically connected to each other through the even number of second connecting conductors formed on the multilayer body; wherein, in the plurality of first inner electrodes, the first inner electrodes whose number is at least the total number of the plurality of first terminal conductors but smaller than the total number of first inner electrodes by at least 1 are electrically connected respectively through lead conductors to the plurality of first terminal conductors, while the plurality of first terminal conductors are electrically connected respectively to at least one of the first inner electrodes electrically connected respectively through lead conductors to the first terminal conductors; wherein, in the plurality of second inner electrodes, the second inner electrodes whose number is at least the total number of the plurality of second terminal conductors but smaller than the total number of second inner electrodes by at least 1 are electrically connected respectively through lead conductors to the plurality of second terminal conductors, while the plurality of second terminal conductors are electrically connected respectively to at least one of the second inner electrodes electrically connected respectively through lead conductors to the second terminal conductors; wherein the conductors included in the first outer conductor group and the conductors included in the second outer conductor group are arranged adjacent to each other in a direction circulating along a side face of the multilayer body; and wherein an equivalent series resistance is set to a desirable value by adjusting at least one of the number of first inner electrodes electrically connected to the first terminal conductors through the lead conductors and the number of second inner electrodes electrically connected to the second terminal conductors through the lead conductors.

The above-mentioned multilayer capacitor sets the equivalent series resistance to a desirable value by adjusting at least one of the number of first inner electrodes electrically connected to the first terminal conductor through the lead conductors and the number of second inner electrodes electrically connected to the second terminal conductor through the lead conductors, whereby the equivalent series resistance can be regulated easily with a high precision. When the polarity of the first outer conductor group is made opposite from that of the second outer conductor group in the arrangement of outer conductors such as the one in the above-mentioned multilayer capacitor, the respective conductors connected to opposite polarities are arranged adjacent to each other in a direction circulating along the side face of the multilayer body. Therefore, magnetic fields caused by currents flowing between the terminal conductors or connecting conductor and the inner electrodes cancel each other out. As a result, this multilayer capacitor reduces its equivalent series inductance. Further, since the number of each species of connecting conductors is an even number, the equivalent series inductance will also decrease if connecting conductors are further added to the configuration in which the first and second terminal conductors are arranged so as to reduce the equivalent series inductance.

In still another aspect, the present invention provides a multilayer capacitor comprising a multilayer body in which a plurality of dielectric layers and a plurality of inner electrodes are alternately laminated, and a plurality of outer conductors formed on the multilayer body; wherein the plurality of inner electrodes include a plurality of first inner electrodes and a plurality of second inner electrodes alternately arranged; wherein the plurality of outer conductors have a first outer conductor group including a plurality of first terminal conductors and an even number of first connecting conductors, and a second outer conductor group including a plurality of second terminal conductors and an even number of second connecting conductors; wherein the plurality of first and second terminal conductors are electrically insulated from each other; wherein the even number of first and second connecting conductors are electrically insulated from each other; wherein the plurality of first inner electrodes are electrically connected to each other through the even number of first connecting conductors formed on the multilayer body; wherein the plurality of second electrodes are electrically connected to each other through the even number of second connecting conductors formed on the multilayer body; wherein, in the plurality of first inner electrodes, the first inner electrodes whose number is at least the total number of the plurality of first terminal conductors but smaller than the total number of first inner electrodes by at least 1 are electrically connected respectively through lead conductors to the plurality of first terminal conductors, while the plurality of first terminal conductors are electrically connected respectively to at least one of the first inner electrodes electrically connected respectively through lead conductors to the first terminal conductors; wherein, in the plurality of second inner electrodes, the second inner electrodes whose number is at least the total number of the plurality of second terminal conductors but smaller than the total number of second inner electrodes by at least 1 are electrically connected respectively through lead conductors to the plurality of second terminal conductors, while the plurality of second terminal conductors are electrically connected respectively to at least one of the second inner electrodes electrically connected respectively through lead conductors to the second terminal conductors; wherein the conductors included in the first outer conductor group and the conductors included in the second outer conductor group are arranged adjacent to each other in a direction circulating along a side face of the multilayer body;

and wherein an equivalent series resistance is set to a desirable value by adjusting at least one of a position of the first inner electrodes electrically connected to the first terminal conductors through the lead conductors in the laminating direction of the multilayer body and a position of the second inner electrodes electrically connected to the second terminal conductors through the lead conductors in the laminating direction of the multilayer body.

The above-mentioned multilayer capacitor sets the equivalent series resistance to a desirable value by adjusting at least one of the position of the first inner electrodes electrically connected to the first terminal conductors through the lead conductors in the laminating direction of the multilayer body and the position of the second inner electrodes electrically connected to the second terminal conductors through the lead conductors in the laminating direction of the multilayer body, whereby the equivalent series resistance can be regulated easily with a high precision. When the polarity of the first outer conductor group is made opposite from that of the second outer conductor group in the arrangement of outer conductors such as the one in the above-mentioned multilayer capacitor, the respective conductors connected to opposite polarities are arranged adjacent to each other in a direction circulating along the side face of the multilayer body. Therefore, magnetic fields caused by currents flowing between the terminal conductors or connecting conductor and the inner electrodes cancel each other out. As a result, this multilayer capacitor reduces its equivalent series inductance. Further, since the number of each species of connecting conductors is an even number, the equivalent series inductance will also decrease if connecting conductors are further added to the configuration in which the first and second terminal conductors are arranged so as to reduce the equivalent series inductance.

For example, a part of the even number of first connecting conductors and a part of the even number of second connecting conductors are formed on a first side face in side faces parallel to the laminating direction of the multilayer body; the rest of first connecting conductors other than the first connecting conductors formed on the first side face and the rest of second connecting conductors other than the second connecting conductors formed on the first side face are formed on a second side face, parallel to the laminating direction of the multilayer body, opposing the first side face; and each of the sum of the first and second connecting conductors formed on the first side face and the sum of the first and second connecting conductors formed on the second side face is an even number.

For example, the even number of first connecting conductors is 2, one being formed on the first side face, the other being formed on the second side face, the two first connecting conductors being formed at respective positions symmetrical to each other about a center axis of the multilayer body in the laminating direction thereof; whereas the even number of second connecting conductors is 2, one being formed on the first side face, the other being formed on the second side face, the two second connecting conductors being formed at respective positions symmetrical to each other about the center axis of the multilayer body in the laminating direction thereof.

Preferably, the plurality of first and second terminal conductors are formed on a side face different from a side face formed with the first or second connecting conductors in side faces parallel to the laminating direction of the multilayer body. Forming the terminal and connecting conductors on respective side faces different from each other as such can restrain a short circuit from occurring between the first terminal conductor and second connecting conductor and between the second terminal conductor and first connecting conductor.

In this case, the sum of the plurality of first and second terminal conductors formed on a side face different from the side face formed with the first or second connecting conductors in the side faces parallel to the laminating direction of the multilayer body may be an even number, for example.

The present invention can provide a multilayer capacitor which can easily regulate the equivalent series resistance with a high precision.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals identical to each other without repeating their overlapping descriptions. Words "upper" and "lower" used in the explanation conform to the vertical direction in each drawing. The multilayer capacitor in accordance with each embodiment is described so as to include a method of adjusting an equivalent series resistance of a multilayer capacitor.

First Embodiment

Figure 1:
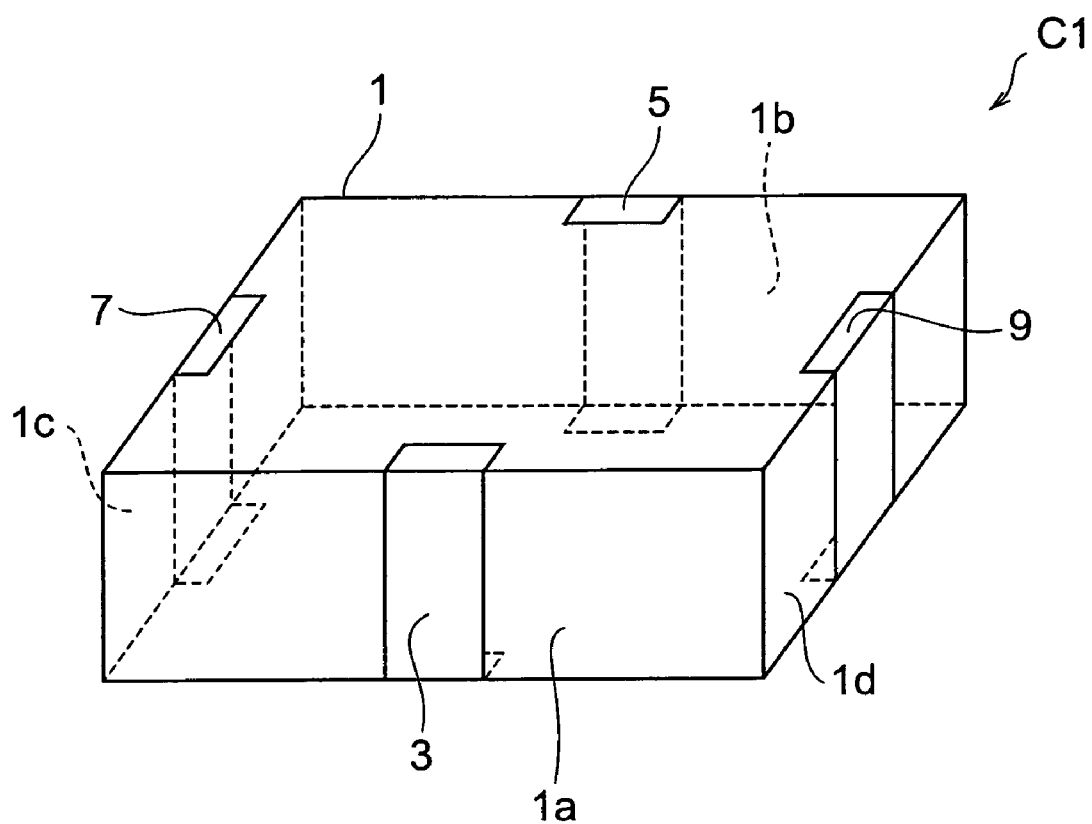
FIG. 1 is a perspective view of the multilayer capacitor in accordance with a first embodiment.
Figure 2:
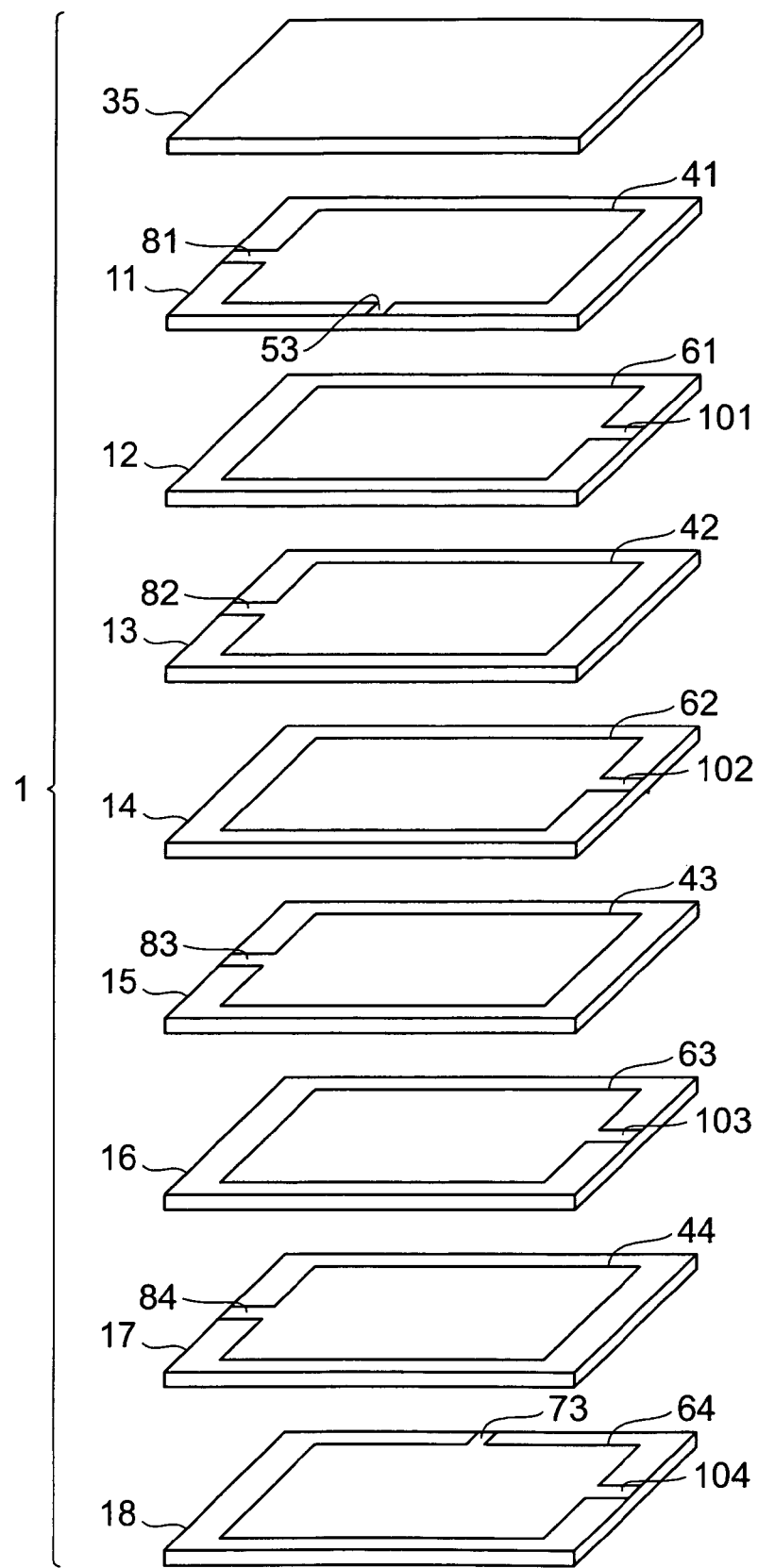
FIG. 2 is an exploded perspective view of the multilayer body included in the multilayer capacitor in accordance with the first embodiment.

With reference to FIGS. 1 and 2, the structure of the multilayer capacitor C1 in accordance with a first embodiment will be explained. FIG. 1 is a perspective view of the multilayer capacitor in accordance with the first embodiment. FIG. 2 is an exploded perspective view of the multilayer body included in the multilayer capacitor in accordance with the first embodiment.

As shown in FIG. 1, the multilayer capacitor C1 comprises a multilayer body 1, first and second terminal conductors 3, 5 formed on the multilayer body 1, and first and second connecting conductors 7, 9.

The first terminal electrode (first terminal conductor) 3 is formed on a side face 1a of the multilayer body 1. The second terminal electrode (second terminal conductor) 5 is formed on a side face 1b of the multilayer body 1. The first terminal electrode 3 and second terminal electrode 5 are electrically insulated from each other.

The first connecting conductor 7 is formed on the surface of the multilayer body 1 so as to be positioned on a side face 1c of the multilayer body 1. The second connecting conductor 7 is formed on the surface of the multilayer body 1 so as to be positioned on a side face Id of the multilayer body 1. The first connecting conductor 7 and second connecting conductor 9 are electrically insulated from each other.

As is also shown in FIG. 2, the multilayer body 1 is constructed by alternately laminating a plurality of (9 in this embodiment) dielectric layers 11 to 18, 35 and a plurality of (4 each in this embodiment) first and second inner electrodes 41 to 44, 61 to 64. In the actual multilayer capacitor C1, the dielectric layers 11 to 18, 35 are integrated to such an extent that no boundaries are discernible therebetween.

Each of the first inner electrodes 41 to 44 has a substantially rectangular form. The first inner electrodes 41 to 44 are formed at respective positions separated by a predetermined distance from a side face parallel to the laminating direction of the dielectric layers 11 to 18, 35 in the multilayer body 1 (hereinafter simply referred to as "laminating direction"). The first inner electrodes 41 to 44 are formed with respective lead conductors 81 to 84 extending so as to reach the side face 1c of the multilayer body 1.

The lead conductor 81 is integrally formed with the first inner electrode 41, and extends therefrom so as to reach the side face 1c of the multilayer body 1. The lead conductor 82 is integrally formed with the first inner electrode 42, and extends therefrom so as to reach the side face 1c of the multilayer body 1. The lead conductor 83 is integrally formed with the first inner electrode 43, and extends therefrom so as to reach the side face 1c of the multilayer body 1. The lead conductor 84 is integrally formed with the first inner electrode 44, and extends therefrom so as to reach the side face 1c of the multilayer body 1.

The first inner electrodes 41 to 44 are electrically connected to the first connecting conductor 7 through their respective lead conductors 81 to 84. As a consequence, the first inner electrodes 41 to 44 are electrically connected to each other through the first connecting conductor 7.

A lead conductor 53 is integrally formed with the first inner electrode 41, and extends therefrom so as to reach the side face 1a of the multilayer body 1. The first inner electrode 41 is electrically connected to the first terminal electrode 3 through the lead conductor 53. Since the first inner electrodes 41 to 44 are electrically connected to each other through the first connecting conductor 7, the first inner electrodes 42 to 44 are also electrically connected to the first terminal electrode 3 through the first connecting conductor 7, whereby the first inner electrodes 41 to 44 are connected in parallel.

Each of the second inner electrodes 61 to 64 has a substantially rectangular form. The second inner electrodes 61 to 64 are formed at respective positions separated by a predetermined distance from a side face parallel to the laminating direction of the multilayer body 1. The second inner electrodes 61 to 64 are formed with respective lead conductors 101 to 104 extending so as to reach the side face 1d of the multilayer body 1.

The lead conductor 101 is integrally formed with the second inner electrode 61, and extends therefrom so as to reach the side face 1d of the multilayer body 1. The lead conductor 102 is integrally formed with the second inner electrode 62, and extends therefrom so as to reach the side face 1d of the multilayer body 1. The lead conductor 103 is integrally formed with the second inner electrode 63, and extends therefrom so as to reach the side face 1d of the multilayer body 1. The lead conductor 104 is integrally formed with the second inner electrode 64, and extends therefrom so as to reach the side face 1d of the multilayer body 1.

The second inner electrodes 61 to 64 are electrically connected to the second connecting conductor 9 through their respective lead conductors 101 to 104. As a consequence, the second inner electrodes 61 to 64 are electrically connected to each other through the second connecting conductor 9.

A lead conductor 73 is integrally formed with the second inner electrode 64, and extends therefrom so as to reach the side face 1b of the multilayer body 1. The second inner electrode 64 is electrically connected to the second terminal electrode 5 through the lead conductor 73. Since the second inner electrodes 61 to 64 are electrically connected to each other through the second connecting conductor 9, the second inner electrodes 61 to 63 are also electrically connected to the second terminal electrode 5 through the second connecting conductor 9, whereby the second inner electrodes 61 to 64 are connected in parallel.

In the multilayer capacitor C1, the number of first inner electrode 41 connected to the first terminal electrode 3 through the lead conductor 53 is 1, which is smaller than the total number (4 in this embodiment) of first inner electrodes 41 to 44. The number of second inner electrode 64 connected to the second terminal electrode 5 through the lead conductor 73 is 1, which is smaller than the total number (4 in this embodiment) of second inner electrodes 61 to 64. When the first terminal electrode 3 is concerned, the resistance component of the first connecting conductor 7 is connected in series to the first terminal electrode 3. When the second terminal electrode 5 is concerned, the resistance component of the second connecting conductor 9 is connected in series to the second terminal electrode 5. These make the multilayer capacitor C1 attain an equivalent series resistance greater than that of a conventional multilayer capacitor in which all the inner electrodes are connected to their corresponding terminal electrodes through lead conductors. Also, an increase in equivalent series resistance can prevent impedance from dropping drastically at a resonance frequency, whereby a wider band can be obtained.

By adjusting each of the number of first inner electrode 41 electrically connected to the first terminal electrode 3 through the lead conductor 53 and the number of second inner electrode 64 electrically connected to the second terminal electrode 5 through the lead conductor 73 as in the foregoing, this embodiment sets the equivalent series resistance of the multilayer capacitor C1 to a desirable value and thus can regulate the equivalent series resistance easily with a high precision.

In this embodiment, the first inner electrodes 41 to 44 are connected in parallel, and the second inner electrodes 61 to 64 are connected in parallel. As a consequence, even when the resistance value fluctuates among the first inner electrodes 41 to 44 or second inner electrodes 61 to 64, its influence is less in the equivalent series resistance of the multilayer capacitor C1 as a whole, whereby the equivalent series resistance control can be restrained from lowering its precision.

Second Embodiment

Figure 3:
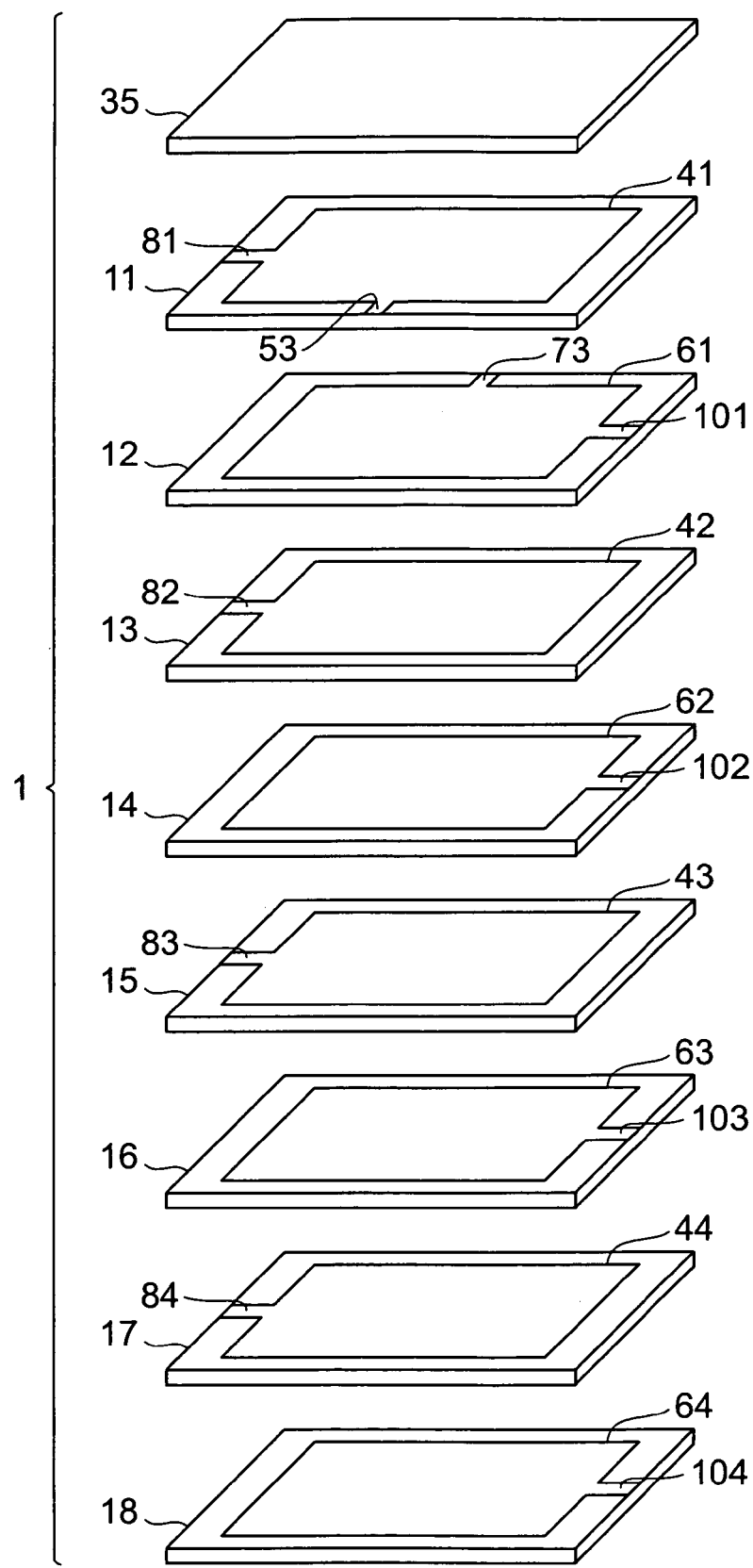
FIG. 3 is an exploded perspective view of the multilayer body included in the multilayer capacitor in accordance with a second embodiment.

With reference to FIG. 3, the structure of the multilayer capacitor in accordance with a second embodiment will be explained. The multilayer capacitor in accordance with the second embodiment differs from the multilayer capacitor C1 in accordance with the first embodiment in terms of the position of a second inner electrode 61 connected to a second terminal electrode 5 through a lead conductor 73. FIG. 3 is an exploded perspective view of the multilayer body included in the multilayer capacitor in accordance with the second embodiment.

As with the multilayer capacitor C1 in accordance with the first embodiment, the multilayer capacitor in accordance with the second embodiment comprises a multilayer body 1, a first terminal electrode 3 formed on the multilayer body 1, the second terminal electrode 5 similarly formed on the multilayer body 1, and first and second connecting conductors 7, 9, which are not depicted.

In the multilayer capacitor in accordance with the second embodiment, as shown in FIG. 3, the uppermost second inner electrode 61 in four second inner electrodes 61 to 64 is electrically connected to the second terminal electrode 5 through the lead conductor 73. As a consequence, the second inner electrodes 62 to 64 are also electrically connected to the second terminal electrode 5, whereby the second inner electrodes 61 to 64 are connected in parallel. The lead conductor 73 is integrally formed with the second inner electrode 61, and extends therefrom so as to reach a side face 1b of the multilayer body 1.

In the multilayer capacitor in accordance with the second embodiment, the number of first inner electrode 41 connected to the first terminal electrode 3 through the lead conductor 53 is 1, which is smaller than the total number (4 in this embodiment) of first inner electrodes 41 to 44. The number of second inner electrode 61 connected to the second terminal electrode 5 through the lead conductor 73 is 1, which is smaller than the total number (4 in this embodiment) of second inner electrodes 61 to 64. These make the multilayer capacitor in accordance with the second embodiment attain an equivalent series resistance greater than that of a conventional multilayer capacitor in which all the inner electrodes are connected to their corresponding terminal electrodes through lead conductors.

When the first terminal electrode 3 is concerned, the resistance component of the first connecting conductor 7 is connected in series to the first terminal electrode 3. When the second terminal electrode 5 is concerned, at the second inner electrode 61 as a boundary, the resistance component of the second connecting conductor 9 is divided into the resistance component of the second connecting conductor 9 positioned on one side of the second inner electrode 61 in the laminating direction and the resistance component of the second connecting conductor 9 positioned on the other side of the second inner electrode 61 in the laminating direction. These resistance components are connected in parallel to the second terminal electrode 5.

Therefore, because of the difference in resistance component of the second connecting conductor 9, the multilayer capacitor in accordance with the second embodiment yields an equivalent series resistance smaller than that of the multilayer capacitor C1 in accordance with the first embodiment.

By adjusting the position of the second inner electrode 61 electrically connected to the second terminal electrode 5 through the lead conductor 73 in the laminating direction as in the foregoing, this embodiment sets the equivalent series resistance of the multilayer capacitor to a desirable value and thus can regulate the equivalent series resistance easily with a high precision.

Third Embodiment

Figure 4:
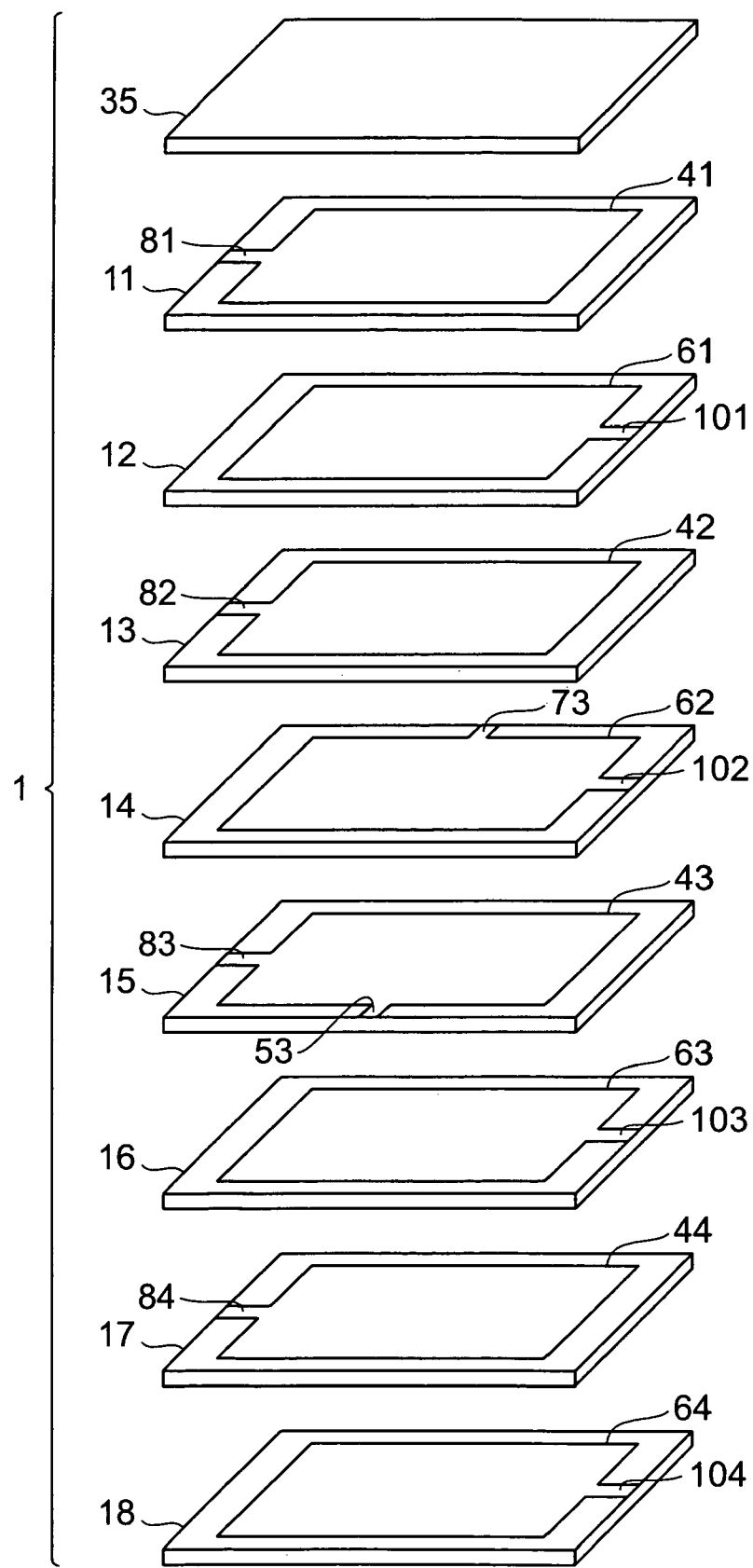
FIG. 4 is an exploded perspective view of the multilayer body included in the multilayer capacitor in accordance with a third embodiment.

With reference to FIG. 4, the structure of the multilayer capacitor C3 in accordance with a third embodiment will be explained. The multilayer capacitor in accordance with the third embodiment differs from the multilayer capacitor C1 in accordance with the first embodiment in terms of positions of first and second inner electrodes 43, 62 connected to terminal electrodes 3, 5 through lead conductors 53, 73. FIG. 4 is an exploded perspective view of the multilayer body included in the multilayer capacitor in accordance with the third embodiment.

As with the multilayer capacitor C1 in accordance with the first embodiment, the multilayer capacitor in accordance with the third embodiment comprises a multilayer body 1, the first terminal electrode 3 formed on the multilayer body 1, the second terminal electrode 5 similarly formed on the multilayer body 1, and first and second connecting conductors 7, 9, which are not depicted.

In the multilayer capacitor in accordance with the third embodiment, the first inner electrode 43, which is the third one counted downward from a first inner electrode 41 among four first inner electrodes 41 to 44, is electrically connected to the first terminal electrode 3 through the lead conductor 53 as shown in FIG. 4. Since the first inner electrodes 41 to 44 are electrically connected to each other through the first connecting conductor 7, the first inner electrodes 41, 42, 44 are also electrically connected to the first terminal electrode 3 through the first connecting conductor 7, whereby the first inner electrodes 41 to 44 are connected in parallel. The lead conductor 53 is integrally formed with the first inner electrode 43, and extends therefrom so as to reach a side face 1a of the multilayer body 1.

The second inner electrode 62, which is the second one counted downward from a second inner electrode 61 among four second inner electrodes 61 to 64, is electrically connected to the second terminal electrode 5 through the lead conductor 73. Since the second inner electrodes 61 to 64 are electrically connected to each other through the second connecting conductor 9, the second inner electrodes 61, 63, 64 are also electrically connected to the second terminal electrode 5 through the second connecting conductor 9, whereby the second inner electrodes 61 to 64 are connected in parallel. The lead conductor 73 is integrally formed with the second inner electrode 62, and extends therefrom so as to reach a side face 1b of the multilayer body 1.

In the multilayer capacitor in accordance with the third embodiment, the number of first inner electrode 43 connected to the first terminal electrode 3 through the lead conductor 53 is 1, which is smaller than the total number (4 in this embodiment) of first inner electrodes 41 to 44. The number of second inner electrode 62 connected to the second terminal electrode 5 through the lead conductor 73 is 1, which is smaller than the total number (4 in this embodiment) of second inner electrodes 61 to 64. These make the multilayer capacitor in accordance with the third embodiment attain an equivalent series resistance greater than that of a conventional multilayer capacitor in which all the inner electrodes are connected to their corresponding terminal electrodes through lead conductors.

When the first terminal electrode 3 is concerned, at the first inner electrode 43 as a boundary, the resistance component of the first connecting conductor 7 is divided into the resistance component of the first connecting conductor 7 positioned on one side of the first inner electrode 43 in the laminating direction and the resistance component of the first connecting conductor 7 positioned on the other side of the first inner electrode 43 in the laminating direction. These resistance components are connected in parallel to the first terminal electrode 3. When the second terminal electrode 5 is concerned, at the second inner electrode 62 as a boundary, the resistance component of the second connecting conductor 9 is divided into the resistance component of the second connecting conductor 9 positioned on one side of the second inner electrode 62 in the laminating direction and the resistance component of the second connecting conductor 9 positioned on the other side of the second inner electrode 62 in the laminating direction. These resistance components are connected in parallel to the second terminal electrode 5.

Therefore, because of differences in resistance components of the first connecting conductor 7 and second connecting conductor 9, the multilayer capacitor in accordance with the third embodiment yields an equivalent series resistance smaller than that of the multilayer capacitor C1 in accordance with the first embodiment.

By adjusting each of the position of the first inner electrode 43 electrically connected to the first terminal electrode 3 through the lead conductor 53 in the laminating direction and the position of the second inner electrode 62 electrically connected to the second terminal electrode 5 through the lead conductor 73 in the laminating direction, the multilayer capacitor in accordance with the third embodiment sets its equivalent series resistance to a desirable value and thus can regulate the equivalent series resistance easily with a high precision.

Fourth Embodiment

Figure 5:
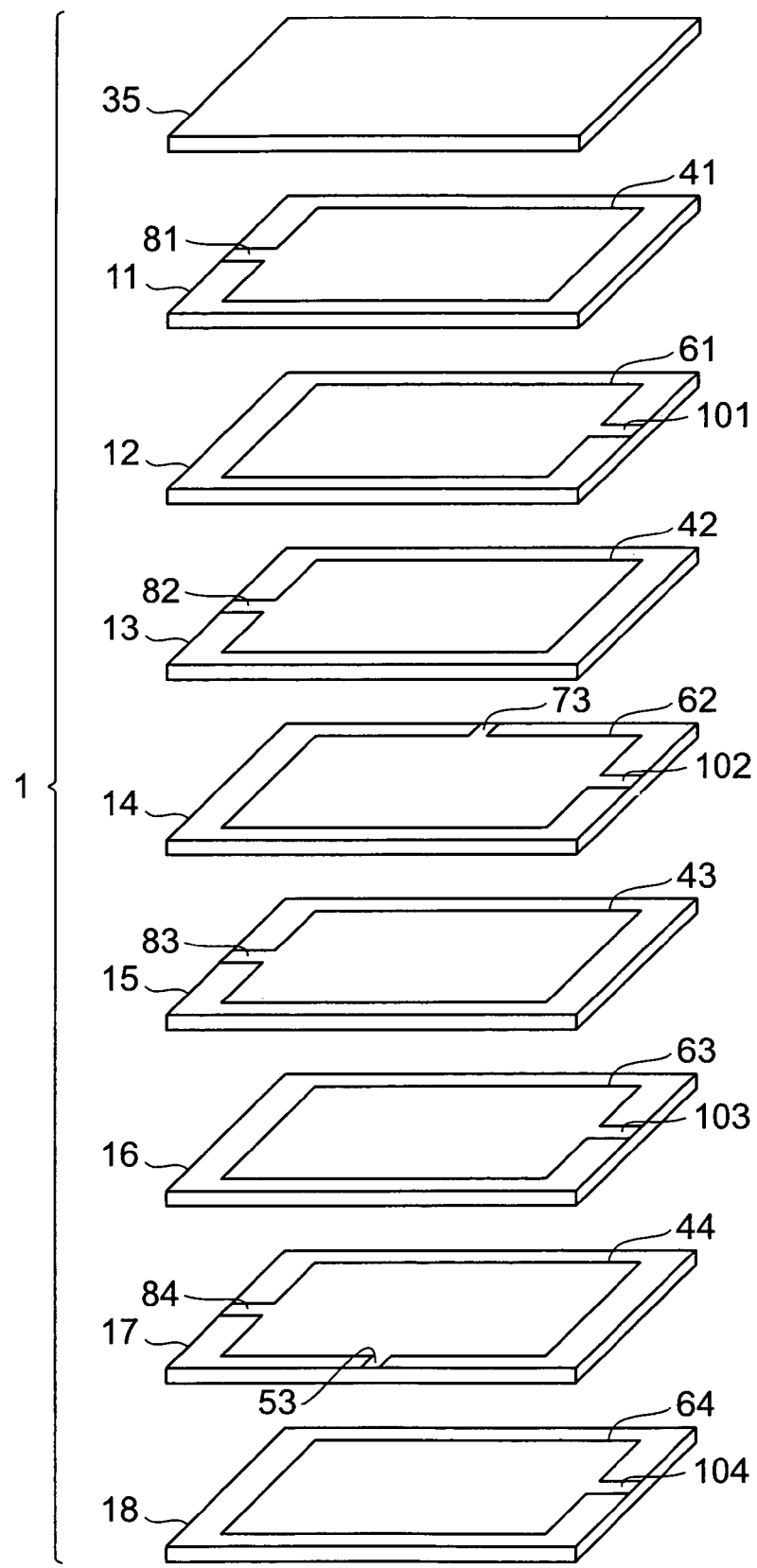
FIG. 5 is an exploded perspective view of the multilayer body included in the multilayer capacitor in accordance with a fourth embodiment.

With reference to FIG. 5, the structure of the multilayer capacitor in accordance with a fourth embodiment will be explained. The multilayer capacitor in accordance with the fourth embodiment differs from the multilayer capacitor C1 in accordance with the first embodiment in terms of positions of first and second inner electrodes 44, 62 connected to terminal electrodes 3, 5 through lead conductors 53, 73. FIG. 5 is an exploded perspective view of the multilayer body included in the multilayer capacitor in accordance with the fourth embodiment.

As with the multilayer capacitor C1 in accordance with the first embodiment, the multilayer capacitor in accordance with the fourth embodiment comprises a multilayer body 1, the first terminal electrode 3 formed on the multilayer body 1, the second terminal electrode 5 similarly formed on the multilayer body 1, and first and second connecting conductors 7, 9, which are not depicted.

In the multilayer capacitor in accordance with the fourth embodiment, the first inner electrode 44, which is the fourth one counted downward from a first inner electrode 41 among four first inner electrodes 41 to 44, is electrically connected to the first terminal electrode 3 through the lead conductor 53 as shown in FIG. 5. Since the first inner electrodes 41 to 44 are electrically connected to each other through the first connecting conductor 7, the first inner electrodes 41 to 43 are also electrically connected to the first terminal electrode 3 through the first connecting conductor 7, whereby the first inner electrodes 41 to 44 are connected in parallel. The lead conductor 53 is integrally formed with the first inner electrode 44, and extends therefrom so as to reach a side face 1a of the multilayer body 1.

The second inner electrode 62, which is the second one counted downward from a second inner electrode 61 among four second inner electrodes 61 to 64, is electrically connected to the second terminal electrode 5 through the lead conductor 73. Since the second inner electrodes 61 to 64 are electrically connected to each other through the second connecting conductor 9, the second inner electrodes 61, 63, 64 are also electrically connected to the second terminal electrode 5 through the second connecting conductor 9, whereby the second inner electrodes 61 to 64 are connected in parallel. The lead conductor 73 is integrally formed with the second inner electrode 62, and extends therefrom so as to reach a side face 1b of the multilayer body 1.

In the multilayer capacitor in accordance with the fourth embodiment, the number of first inner electrode 44 connected to the first terminal electrode 3 through the lead conductor 53 is 1, which is smaller than the total number (4 in this embodiment) of first inner electrodes 41 to 44. The number of second inner electrode 62 connected to the second terminal electrode 5 through the lead conductor 73 is 1, which is smaller than the total number (4 in this embodiment) of second inner electrodes 61 to 64. These make the multilayer capacitor in accordance with the fourth embodiment attain an equivalent series resistance greater than that of a conventional multilayer capacitor in which all the inner electrodes are connected to their corresponding terminal electrodes through lead conductors.

When the first terminal electrode 3 is concerned, at the first inner electrode 44 as a boundary, the resistance component of the first connecting conductor 7 is divided into the resistance component of the first connecting conductor 7 positioned on one side of the first inner electrode 44 in the laminating direction and the resistance component of the first connecting conductor 7 positioned on the other side of the first inner electrode 44 in the laminating direction. These resistance components are connected in parallel to the first terminal electrode 3. When the second terminal electrode 5 is concerned, at the second inner electrode 62 as a boundary, the resistance component of the second connecting conductor 9 is divided into the resistance component of the second connecting conductor 9 positioned on one side of the second inner electrode 62 in the laminating direction and the resistance component of the second connecting conductor 9 positioned on the other side of the second inner electrode 62 in the laminating direction. These resistance components are connected in parallel to the second terminal electrode 5.

Therefore, because of differences in resistance components of the first connecting conductor 7 and second connecting conductor 9, the multilayer capacitor in accordance with the fourth embodiment yields an equivalent series resistance smaller than that of the multilayer capacitor C1 in accordance with the first embodiment.

By adjusting each of the position of the first inner electrode 44 electrically connected to the first terminal electrode 3 through the lead conductor 53 in the laminating direction and the position of the second inner electrode 62 electrically connected to the second terminal electrode 5 through the lead conductor 73 in the laminating direction, the multilayer capacitor in accordance with the fourth embodiment sets its equivalent series resistance to a desirable value and thus can regulate the equivalent series resistance easily with a high precision.

Fifth Embodiment

Figure 6:
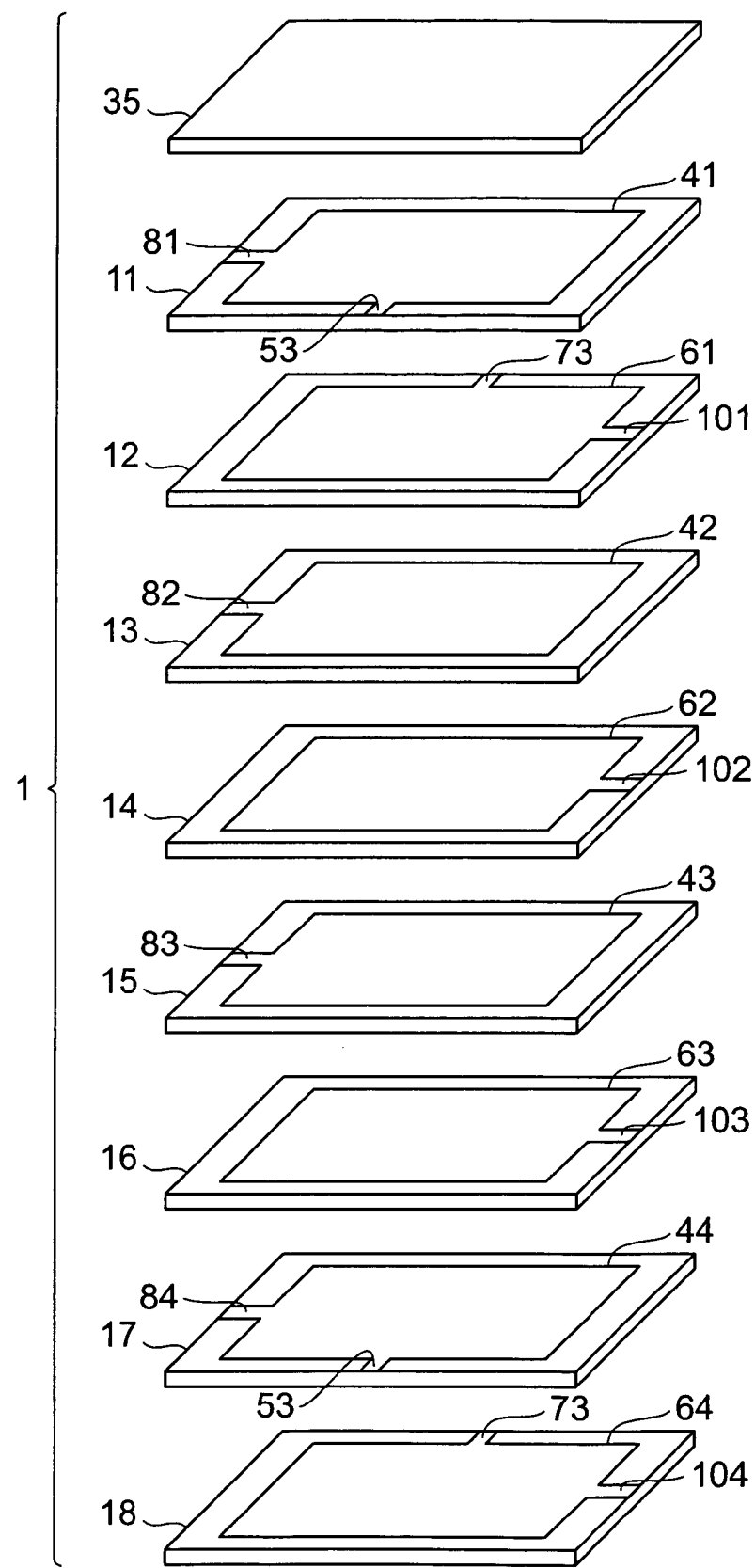
FIG. 6 is an exploded perspective view of the multilayer body included in the multilayer capacitor in accordance with a fifth embodiment.

With reference to FIG. 6, the structure of the multilayer capacitor in accordance with a fifth embodiment will be explained. The multilayer capacitor in accordance with the fifth embodiment differs from the multilayer capacitor C1 in accordance with the first embodiment in terms of the number of first and second inner electrodes 41, 44, 61, 64 connected to terminal electrodes 3, 5 through lead conductors 53, 73. FIG. 6 is an exploded perspective view of the multilayer body included in the multilayer capacitor in accordance with the fifth embodiment.

As with the multilayer capacitor C1 in accordance with the first embodiment, the multilayer capacitor in accordance with the fifth embodiment comprises a multilayer body 1, the first terminal electrode 3 formed on the multilayer body 1, the second terminal electrode 5 similarly formed on the multilayer body 1, and first and second connecting conductors 7, 9, which are not depicted.

In the multilayer capacitor in accordance with the fifth embodiment, as shown in FIG. 6, two first inner electrodes 41, 44 among four first inner electrodes 41 to 44 are electrically connected to the first terminal electrode 3 through the lead conductors 53. Since the first inner electrodes 41 to 44 are electrically connected to each other through the first connecting conductor 7, the first inner electrodes 42, 43 are also electrically connected to the first terminal electrode 3 through the first connecting conductor 7, whereby the first inner electrodes 41 to 44 are connected in parallel. The lead conductors 53 are integrally formed with their corresponding first inner electrodes 41, 44, and extend therefrom so as to reach a side face 1a of the multilayer body 1.

Two second inner electrodes 61, 64 among four second inner electrodes 61 to 64 are electrically connected to the second terminal electrode 5 through the lead conductors 73. Since the second inner electrodes 61 to 64 are electrically connected to each other through the second connecting conductor 9, the second inner electrodes 62, 63 are also electrically connected to the second terminal electrode 5 through the second connecting conductor 9, whereby the second inner electrodes 61 to 64 are connected in parallel. The lead conductors 73 are integrally formed with their corresponding second inner electrodes 61, 64, and extend therefrom so as to reach a side face 1b of the multilayer body 1.

In the multilayer capacitor in accordance with the fifth embodiment, the number of first inner electrodes 41, 44 connected to the first terminal electrode 3 through the lead conductors 53 is 2, which is smaller than the total number of first inner electrodes 41 to 44. Also, the number of second inner electrodes 61, 64 connected to the second terminal electrode 5 through the lead conductors 73 is 2, which is smaller than the total number of second inner electrodes 61 to 64. These make the multilayer capacitor in accordance with the fifth embodiment yield an equivalent series resistance greater than that of a conventional multilayer capacitor in which all the inner electrodes are connected to their corresponding terminal electrodes through lead conductors.

In the multilayer body in accordance with the fifth embodiment, the number of first inner electrodes 41, 44 connected to the first terminal electrode 3 through the lead conductors 53 is greater than that in the multilayer capacitor C1, whereas the lead conductors 53 are connected in parallel to the first terminal electrode 3. Also, the number of second inner electrodes 61, 64 connected to the second terminal electrode 5 through the lead conductors 73 is greater, whereas the lead conductors 73 are connected in parallel to the second terminal electrode 5. These make the multilayer capacitor in accordance with the fifth embodiment yield an equivalent series resistance smaller than that of the multilayer capacitor C1.

By adjusting each of the number of first inner electrodes 41, 44 electrically connected to the first terminal electrode 3 through the lead conductors 53 and the number of second inner electrodes 61, 64 electrically connected to the second terminal electrode 5 through the lead conductors 73 as in the foregoing, the fifth embodiment sets the equivalent series resistance of the multilayer capacitor to a desirable value and thus can regulate the equivalent series resistance easily with a high precision.

Sixth Embodiment

Figure 7:
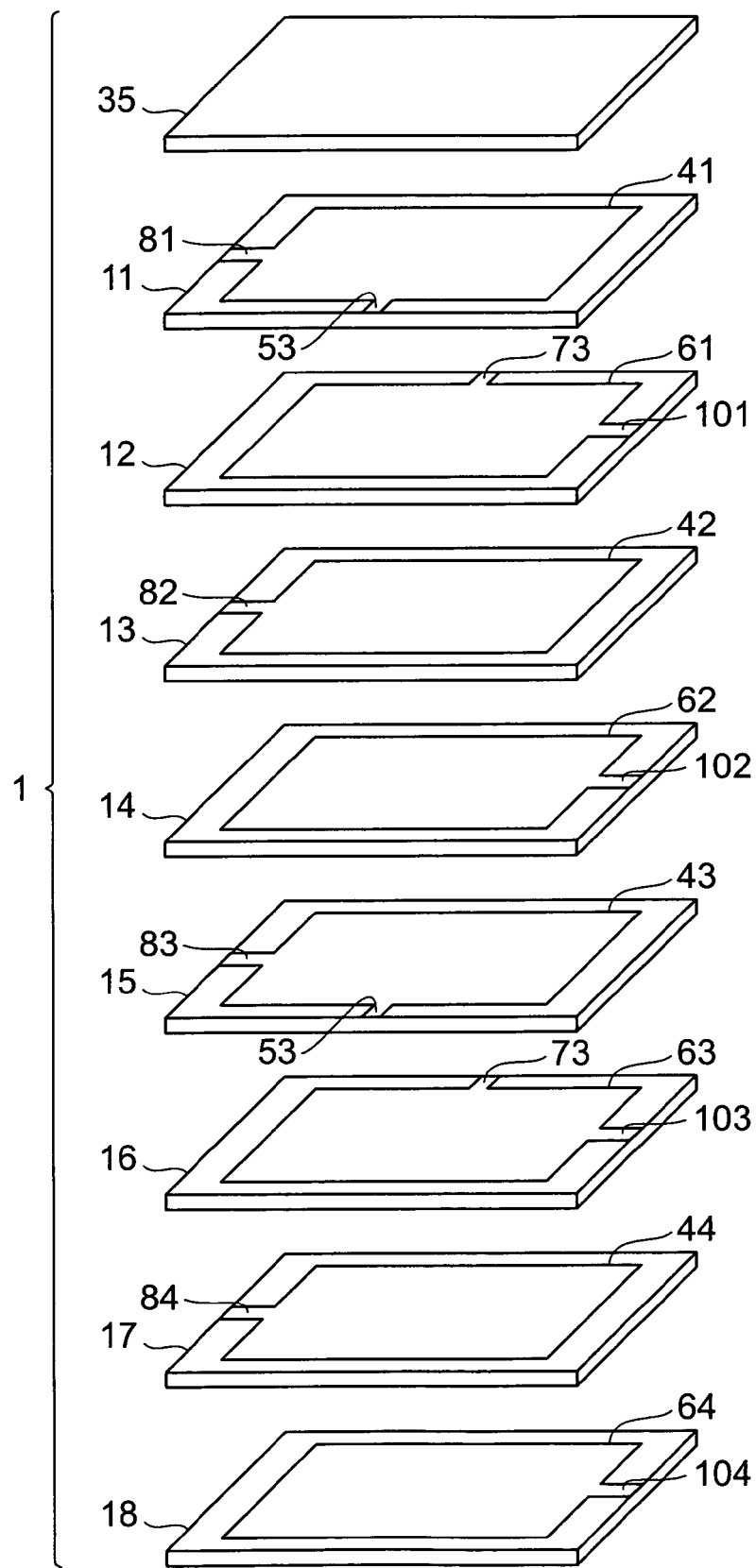
FIG. 7 is an exploded perspective view of the multilayer body included in the multilayer capacitor in accordance with a sixth embodiment.

With reference to FIG. 7, the structure of the multilayer capacitor in accordance with a sixth embodiment will be explained. The multilayer capacitor in accordance with the sixth embodiment differs from the multilayer capacitor in accordance with the second embodiment in terms of the number of first and second inner electrodes 41, 43, 61, 63 connected to terminal electrodes 3, 5 through lead conductors 53, 73. FIG. 7 is an exploded perspective view of the multilayer body included in the multilayer capacitor in accordance with the sixth embodiment.

As with the multilayer capacitor C1 in accordance with the first embodiment, the multilayer capacitor in accordance with the sixth embodiment comprises a multilayer body 1, the first terminal electrode 3 formed on the multilayer body 1, the second terminal electrode 5 similarly formed on the multilayer body 1, and first and second connecting conductors 7, 9, which are not depicted.

In the multilayer capacitor in accordance with the sixth embodiment, as shown in FIG. 7, two first inner electrodes 41, 43 among four first inner electrodes 41 to 44 are electrically connected to the first terminal electrode 3 through the lead conductors 53. Since the first inner electrodes 41 to 44 are electrically connected to each other through the first connecting conductor 7, the first inner electrodes 42, 44 are also electrically connected to the first terminal electrode 3 through the first connecting conductor 7, whereby the first inner electrodes 41 to 44 are connected in parallel. The lead conductors 53 are integrally formed with their corresponding first inner electrodes 41, 43, and extend therefrom so as to reach a side face 1a of the multilayer body 1.

Two second inner electrodes 61, 63 among four second inner electrodes 61 to 64 are electrically connected to the second terminal electrode 5 through the lead conductors 73.

Since the second inner electrodes 61 to 64 are electrically connected to each other through the second connecting conductor 9, the second inner electrodes 62, 64 are also electrically connected to the second terminal electrode 5 through the second connecting conductor 9, whereby the second inner electrodes 61 to 64 are connected in parallel. The lead conductors 73 are integrally formed with their corresponding second inner electrodes 61, 63, and extend therefrom so as to reach a side face 1b of the multilayer body 1.

In the multilayer capacitor in accordance with the sixth embodiment, the number of first inner electrodes 41, 43 connected to the first terminal electrode 3 through the lead conductors 53 is 2, which is smaller than the total number of first inner electrodes 41 to 44. Also, the number of second inner electrodes 61, 63 connected to the second terminal electrode 5 through the lead conductors 73 is 2, which is smaller than the total number of second inner electrodes 61 to 64. These make the multilayer capacitor in accordance with the sixth embodiment yield an equivalent series resistance greater than that of a conventional multilayer capacitor in which all the inner electrodes are connected to their corresponding terminal electrodes through lead conductors.

In the multilayer body in accordance with the sixth embodiment, the number of first inner electrodes 41, 43 connected to the first terminal electrode 3 through the lead conductors 53 is greater than that in the multilayer capacitor in accordance with the second embodiment, whereas the lead conductors 53 are connected in parallel to the first terminal electrode 3. Also, the number of second inner electrodes 61, 63 connected to the, second terminal electrode 5 through the lead conductors 73 is greater, whereas the lead conductors 73 are connected in parallel to the second terminal electrode 5. These make the multilayer capacitor in accordance with the sixth embodiment yield an equivalent series resistance smaller than that of the multilayer capacitor in accordance with the second embodiment.

By adjusting each of the number of first inner electrodes 41, 43 electrically connected to the first terminal electrode 3 through the lead conductors 53 and the number of second inner electrodes 61, 63 electrically connected to the second terminal electrode 5 through the lead conductors 73 as in the foregoing, the sixth embodiment sets the equivalent series resistance of the multilayer capacitor to a desirable value and thus can regulate the equivalent series resistance easily with a high precision.

Seventh Embodiment

Figure 8:
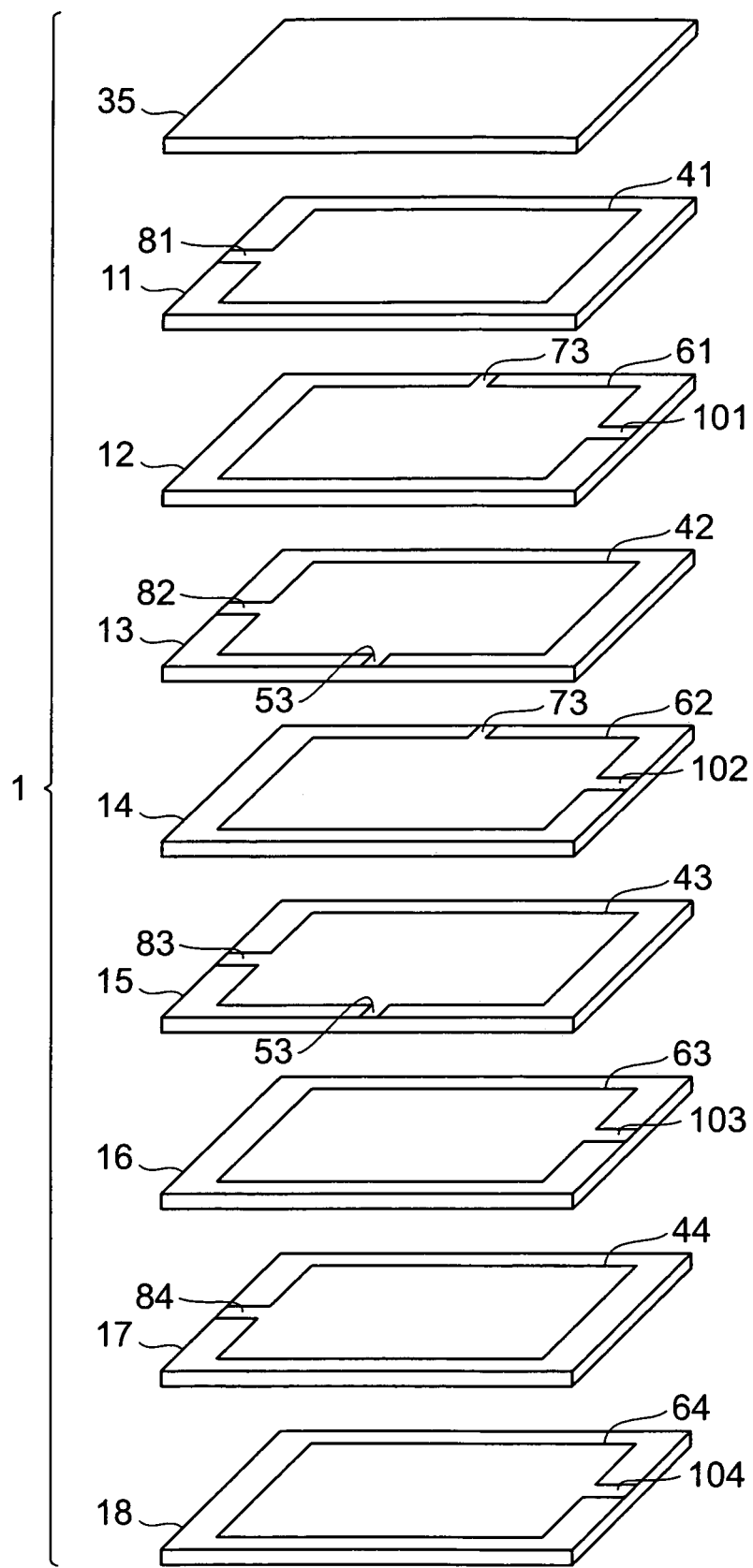
FIG. 8 is an exploded perspective view of the multilayer body included in the multilayer capacitor in accordance with a seventh embodiment.

With reference to FIG. 8, the structure of the multilayer capacitor in accordance with a seventh embodiment will be explained. The multilayer capacitor in accordance with the seventh embodiment differs from the multilayer capacitor in accordance with the third embodiment in terms of the number of first and second inner electrodes 42, 43, 61, 62 connected to terminal electrodes 3, 5 through lead conductors 53, 73. FIG. 8 is an exploded perspective view of the multilayer body included in the multilayer capacitor in accordance with the seventh embodiment.

As with the multilayer capacitor C1 in accordance with the first embodiment, the multilayer capacitor in accordance with the seventh embodiment comprises a multilayer body 1, the first terminal electrode 3 formed on the multilayer body 1, the second terminal electrode 5 similarly formed on the multilayer body 1, and first and second connecting conductors 7, 9, which are not depicted.

In the multilayer capacitor in accordance with the seventh embodiment, as shown in FIG. 8, two first inner electrodes 42, 43 among four first inner electrodes 41 to 44 are electrically connected to the first terminal electrode 3 through the lead conductors 53. Since the first inner electrodes 41 to 44 are electrically connected to each other through the first connecting conductor 7, the first inner electrodes 41, 44 are also electrically connected to the first terminal electrode 3 through the first connecting conductor 7, whereby the first inner electrodes 41 to 44 are connected in parallel. The lead conductors 53 are integrally formed with their corresponding first inner electrodes 42, 43, and extend therefrom so as to reach a side face 1a of the multilayer body 1.

Two second inner electrodes 61, 62 among four second inner electrodes 61 to 64 are electrically connected to the second terminal electrode 5 through the lead conductors 73. Since the second inner electrodes 61 to 64 are electrically connected to each other through the second connecting conductor 9, the second inner electrodes 63, 64 are also electrically connected to the second terminal electrode 5 through the second connecting conductor 9, whereby the second inner electrodes 61 to 64 are connected in parallel. The lead conductors 73 are integrally formed with their corresponding second inner electrodes 61, 62, and extend therefrom so as to reach a side face 1b of the multilayer body 1.

In the multilayer capacitor in accordance with the seventh embodiment, the number of first inner electrodes 42, 43 connected to the first terminal electrode 3 through the lead conductors 53 is 2, which is smaller than the total number of first inner electrodes 41 to 44. Also, the number of second inner electrodes 61, 62 connected to the second terminal electrode 5 through the lead conductors 73 is 2, which is smaller than the total number of second inner electrodes 61 to 64. These make the multilayer capacitor in accordance with the seventh embodiment yield an equivalent series resistance greater than that of a conventional multilayer capacitor in which all the inner electrodes are connected to their corresponding terminal electrodes through lead conductors.

In the multilayer body in accordance with the seventh embodiment, the number of first inner electrodes 42, 43 connected to the first terminal electrode 3 through the lead conductors 53 is greater than that in the multilayer capacitor in accordance with the third embodiment, whereas the lead conductors 53 are connected in parallel to the first terminal electrode 3. Also, the number of second inner electrodes 61, 62 connected to the second terminal electrode 5 through the lead conductors 73 is greater, whereas the lead conductors 73 are connected in parallel to the second terminal electrode 5. These make the multilayer capacitor in accordance with the seventh embodiment yield an equivalent series resistance smaller than that of the multilayer capacitor in accordance with the third embodiment.

By adjusting each of the number of first inner electrodes 42, 43 electrically connected to the first terminal electrode 3 through the lead conductors 53 and the number of second inner electrodes 61, 62 electrically connected to the second terminal electrode 5 through the lead conductors 73 as in the foregoing, the seventh embodiment sets the equivalent series resistance of the multilayer capacitor to a desirable value and thus can regulate the equivalent series resistance easily with a high precision.

Eighth Embodiment

Figure 9:
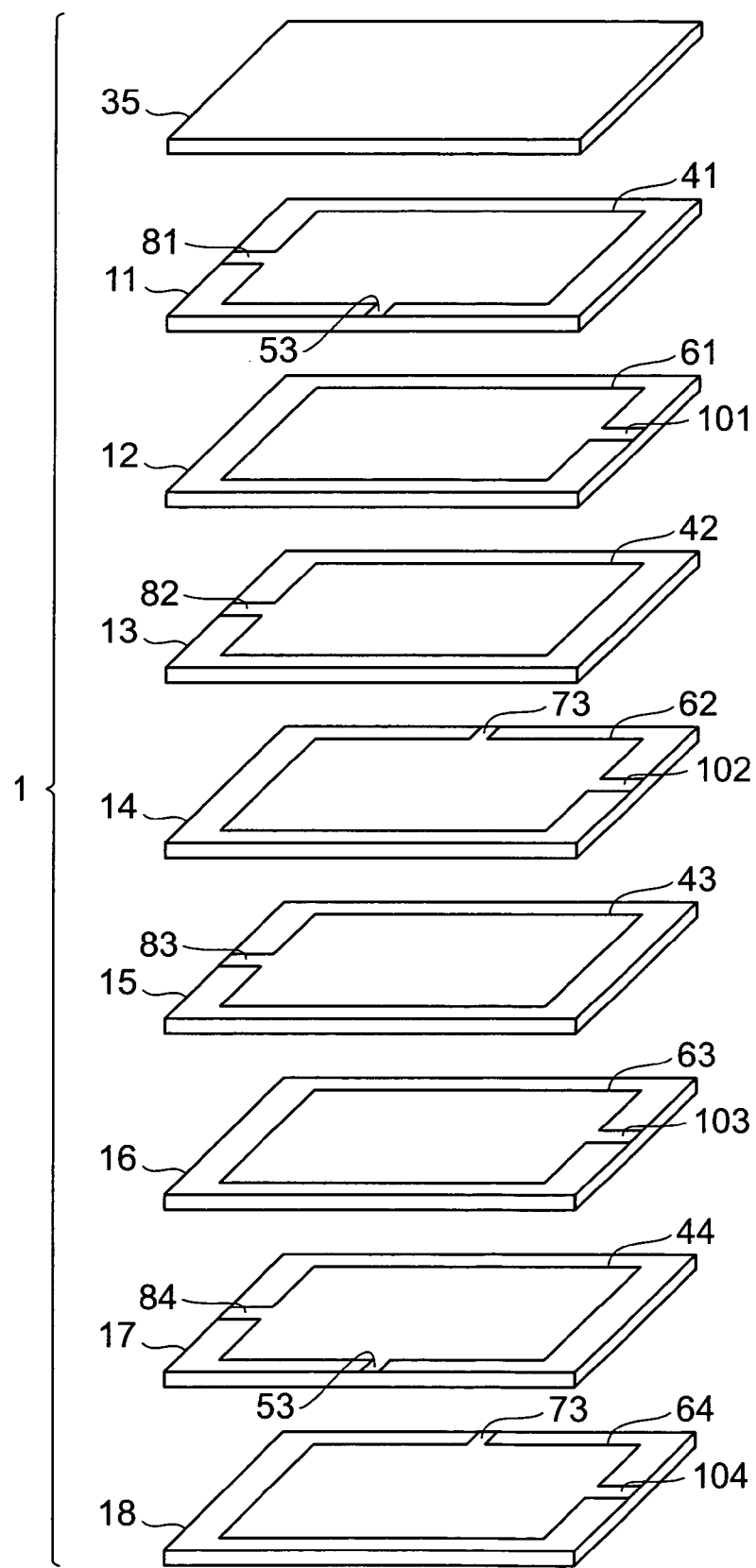
FIG. 9 is an exploded perspective view of the multilayer body included in the multilayer capacitor in accordance with an eighth embodiment.

With reference to FIG. 9, the structure of the multilayer capacitor in accordance with an eighth embodiment will be explained. The multilayer capacitor in accordance with the eighth embodiment differs from the multilayer capacitor in accordance with the fourth embodiment in terms of the number of first and second inner electrodes 41, 44, 62, 64 connected to terminal electrodes 3, 5 through lead conductors 53, 73. FIG. 9 is an exploded perspective view of the multilayer body included in the multilayer capacitor in accordance with the eighth embodiment.

As with the multilayer capacitor C1 in accordance with the first embodiment, the multilayer capacitor in accordance with the eighth embodiment comprises a multilayer body 1, the first terminal electrode 3 formed on the multilayer body 1, the second terminal electrode 5 similarly formed on the multilayer body 1, and first and second connecting conductors 7, 9, which are not depicted.

In the multilayer capacitor in accordance with the eighth embodiment, as shown in FIG. 9, two first inner electrodes 41, 44 among four first inner electrodes 41 to 44 are electrically connected to the first terminal electrode 3 through the lead conductors 53. Since the first inner electrodes 41 to 44 are electrically connected to each other through the first connecting conductor 7, the first inner electrodes 42, 43 are also electrically connected to the first terminal electrode 3 through the first connecting conductor 7, whereby the first inner electrodes 41 to 44 are connected in parallel. The lead conductors 53 are integrally formed with their corresponding first inner electrodes 41, 44, and extend therefrom so as to reach a side face 1a of the multilayer body 1.

Two second inner electrodes 62, 64 among four second inner electrodes 61 to 64 are electrically connected to the second terminal electrode 5 through the lead conductors 73. Since the second inner electrodes 61 to 64 are electrically connected to each other through the second connecting conductor 9, the second inner electrodes 61, 63 are also electrically connected to the second terminal electrode 5 through the second connecting conductor 9, whereby the second inner electrodes 61 to 64 are connected in parallel. The lead conductors 73 are integrally formed with their corresponding second inner electrodes 62, 64, and extend therefrom so as to reach a side face 1b of the multilayer body 1.

In the multilayer capacitor in accordance with the eighth embodiment, the number of first inner electrodes 41, 44 connected to the first terminal electrode 3 through the lead conductors 53 is 2, which is smaller than the total number of first inner electrodes 41 to 44. Also, the number of second inner electrodes 62, 64 connected to the second terminal electrode 5 through the lead conductors 73 is 2, which is smaller than the total number of second inner electrodes 61 to 64. These make the multilayer capacitor in accordance with the eighth embodiment yield an equivalent series resistance greater than that of a conventional multilayer capacitor in which all the inner electrodes are connected to their corresponding terminal electrodes through lead conductors.

In the multilayer body in accordance with the eighth embodiment, the number of first inner electrodes 41, 44 connected to the first terminal electrode 3 through the lead conductors 53 is greater than that in the multilayer capacitor in accordance with the fourth embodiment, whereas the lead conductors 53 are connected in parallel to the first terminal electrode 3. Also, the number of second inner electrodes 62, 64 connected to the second terminal electrode 5 through the lead conductors 73 is greater, whereas the lead conductors 73 are connected in parallel to the second terminal electrode 5. These make the multilayer capacitor in accordance with the eighth embodiment yield an equivalent series resistance smaller than that of the multilayer capacitor in accordance with the fourth embodiment.

By adjusting each of the number of first inner electrodes 41, 44 electrically connected to the first terminal electrode 3 through the lead conductors 53 and the number of second inner electrodes 62, 64 electrically connected to the second terminal electrode 5 through the lead conductors 73 as in the foregoing, the eighth embodiment sets the equivalent series resistance of the multilayer capacitor to a desirable value and thus can regulate the equivalent series resistance easily with a high precision.

Ninth Embodiment

Figure 10:
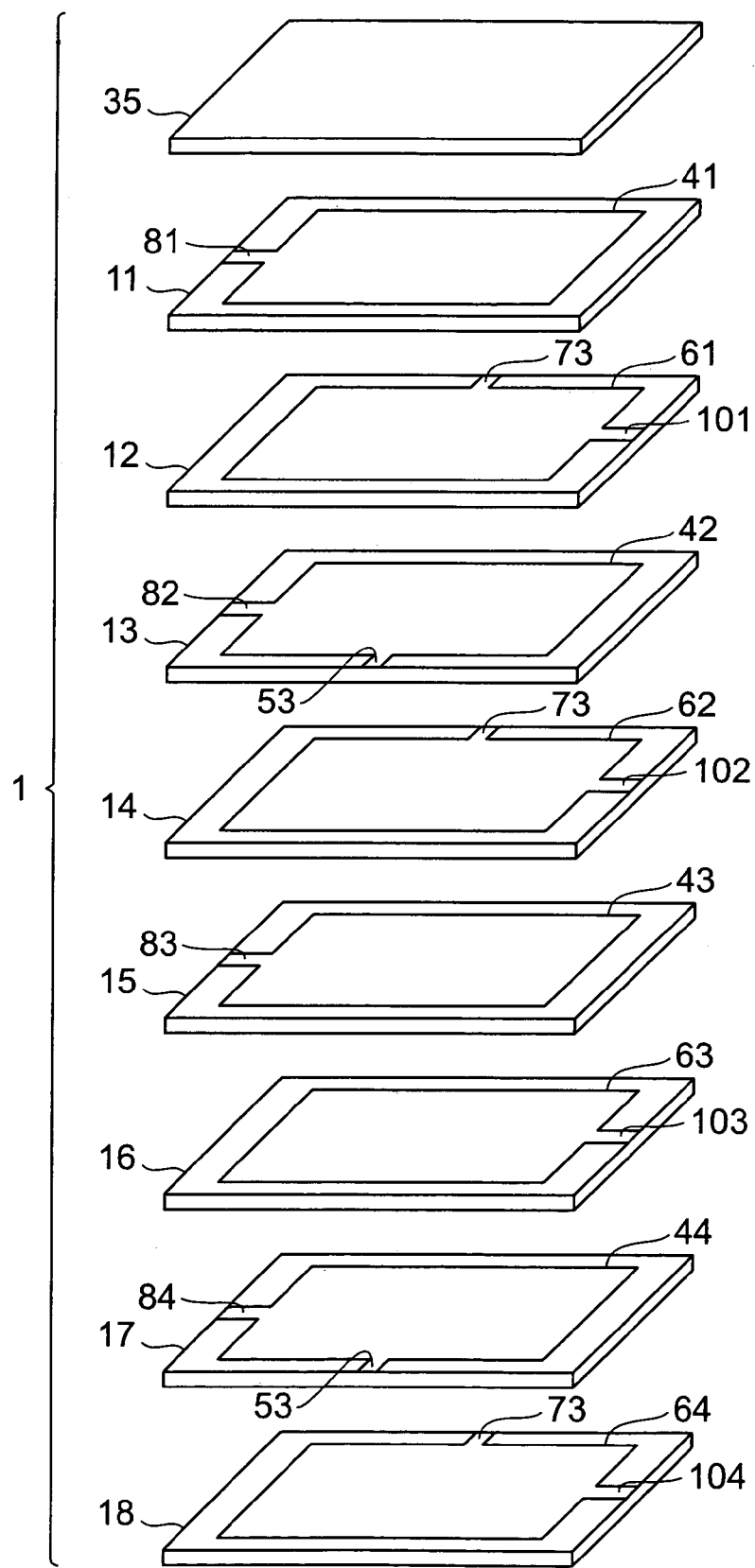
FIG. 10 is an exploded perspective view of the multilayer body included in the multilayer capacitor in accordance with a ninth embodiment.

With reference to FIG. 10, the structure of the multilayer capacitor in accordance with a ninth embodiment will be explained. The multilayer capacitor in accordance with the ninth embodiment differs from the multilayer capacitor in accordance with the fourth embodiment in terms of the number of first and second inner electrodes 42, 44, 61, 62, 64 connected to terminal electrodes 3, 5 through lead conductors 53, 73. FIG. 10 is an exploded perspective view of the multilayer body included in the multilayer capacitor in accordance with the ninth embodiment.

As with the multilayer capacitor C1 in accordance with the first embodiment, the multilayer capacitor in accordance with the ninth embodiment comprises a multilayer body 1, the first terminal electrode 3 formed on the multilayer body 1, the second terminal electrode 5 similarly formed on the multilayer body 1, and first and second connecting conductors 7, 9, which are not depicted.

In the multilayer capacitor in accordance with the ninth embodiment, as shown in FIG. 10, two first inner electrodes 42, 44 among four first inner electrodes 41 to 44 are electrically connected to the first terminal electrode 3 through the lead conductors 53. Since the first inner electrodes 41 to 44 are electrically connected to each other through the first connecting conductor 7, the first inner electrodes 41, 43 are also electrically connected to the first terminal electrode 3 through the first connecting conductor 7, whereby the first inner electrodes 41 to 44 are connected in parallel. The lead conductors 53 are integrally formed with their corresponding first inner electrodes 42, 44, and extend therefrom so as to reach a side face 1a of the multilayer body 1.

Three second inner electrodes 61, 62, 64 among four second inner electrodes 61 to 64 are electrically connected to the second terminal electrode 5 through the lead conductors 73. Since the second inner electrodes 61 to 64 are electrically connected to each other through the second connecting conductor 9, the second inner electrode 63 is also electrically connected to the second terminal electrode 5 through the second connecting conductor 9, whereby the second inner electrodes 61 to 64 are connected in parallel. The lead conductors 73 are integrally formed with their corresponding second inner electrodes 61, 62, 64, and extend therefrom so as to reach a side face 1b of the multilayer body 1.

In the multilayer capacitor in accordance with the ninth embodiment, the number of first inner electrodes 42, 44 connected to the first terminal electrode 3 through the lead conductors 53 is 2, which is smaller than the total number of first inner electrodes 41 to 44. Also, the number of second inner electrodes 61, 62, 64 connected to the second terminal electrode 5 through the lead conductors 73 is 3, which is smaller than the total number of second inner electrodes 61 to 64. These make the multilayer capacitor in accordance with the ninth embodiment yield an equivalent series resistance greater than that of a conventional multilayer capacitor in which all the inner electrodes are connected to their corresponding terminal electrodes through lead conductors.

In the multilayer body in accordance with the ninth embodiment, the number of first inner electrodes 42, 44 connected to the first terminal electrode 3 through the lead conductors 53 is greater than that in the multilayer capacitor in accordance with the fourth embodiment, whereas the lead conductors 53 are connected in parallel to the first terminal electrode 3. Also, the number of second inner electrodes 61, 62, 64 connected to the second terminal electrode 5 through the lead conductors 73 is greater, whereas the lead conductors 73 are connected in parallel to the second terminal electrode 5. These make the multilayer capacitor in accordance with the ninth embodiment yield an equivalent series resistance smaller than that of the multilayer capacitor in accordance with the fourth embodiment.

By adjusting each of the number of first inner electrodes 42, 44 electrically connected to the first terminal electrode 3 through the lead conductors 53 and the number of second inner electrodes 61, 62, 64 electrically connected to the second terminal electrode 5 through the lead conductors 73 as in the foregoing, the ninth embodiment sets the equivalent series resistance of the multilayer capacitor to a desirable value and thus can regulate the equivalent series resistance easily with a high precision.

Tenth Embodiment

Figure 11:
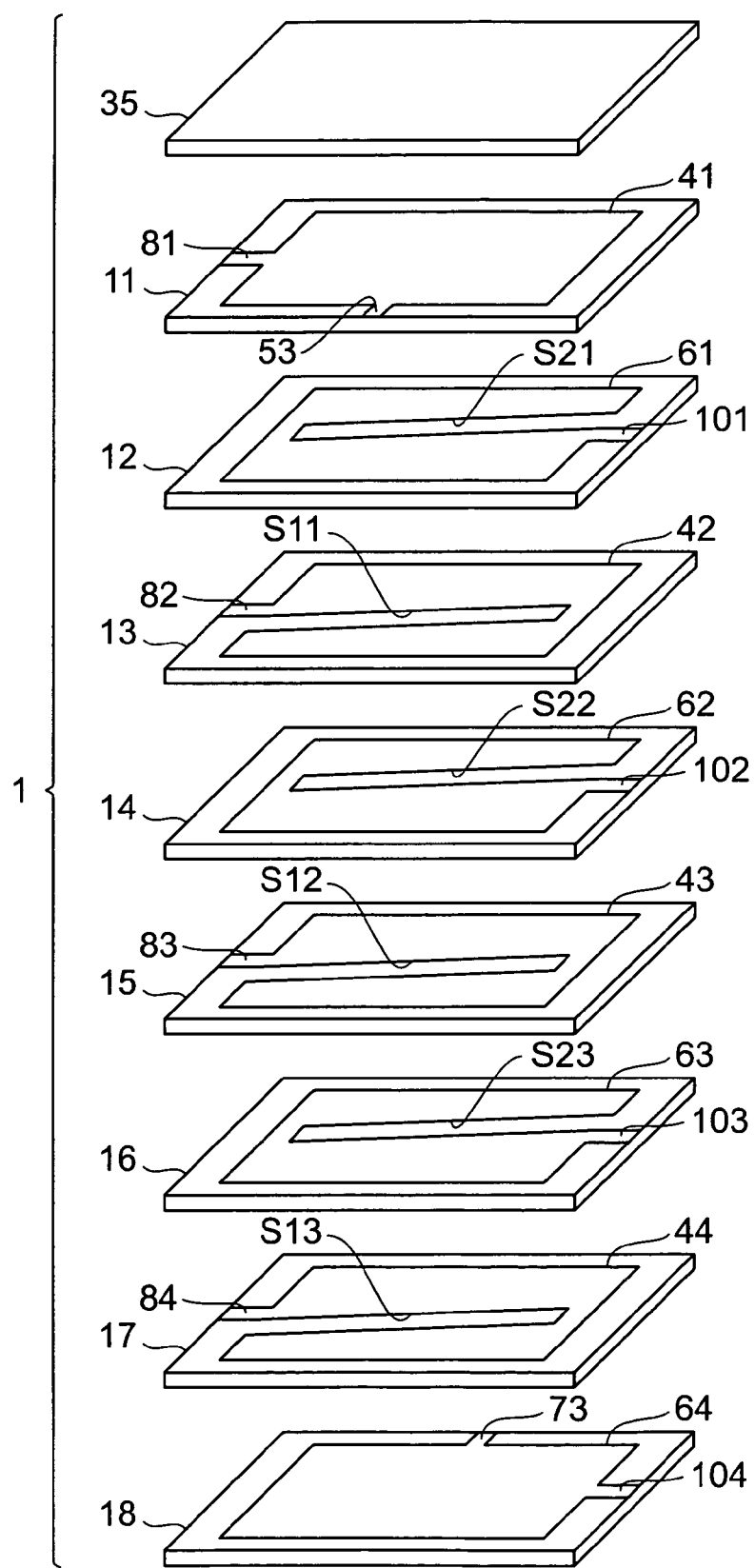
FIG. 11 is an exploded perspective view of the multilayer body included in the multilayer capacitor in accordance with a tenth embodiment.

With reference to FIG. 11, the structure of the multilayer capacitor in accordance with a tenth embodiment will be explained. The multilayer capacitor in accordance with the tenth embodiment differs from the multilayer capacitor C1 in accordance with the first embodiment in that first and second inner electrodes 42 to 44, 61 to 63 are formed with slits. FIG. 11 is an exploded perspective view of the multilayer body included in the multilayer capacitor in accordance with the tenth embodiment.

As with the multilayer capacitor C1 in accordance with the first embodiment, the multilayer capacitor in accordance with the tenth embodiment comprises a multilayer body 1, a first terminal electrode 3 formed on the multilayer body 1, a second terminal electrode 5 similarly formed on the multilayer body 1, and first and second connecting conductors 7, 9, which are not depicted.

The first inner electrodes 42 to 44 are formed with slits S11 to S13 extending in the longitudinal direction of the first inner electrodes 42 to 44 from sides of connecting parts between lead conductors 82 to 84 and the first inner electrodes 42 to 44, respectively. Therefore, the slits S11 to S13 are formed in their corresponding first inner electrodes 42 to 44 such that currents flow in directions opposite from each other in areas opposing each other across the slits S11 to S13.

The second inner electrodes 61 to 63 are formed with slits S21 to S23 extending in the longitudinal direction of the second inner electrodes 61 to 63 from sides of connecting parts between lead conductors 101 to 103 and the second inner electrodes 61 to 63, respectively. Therefore, the slits S21 to S23 are formed in their corresponding second inner electrodes 61 to 63 such that currents flow in directions opposite from each other in areas opposing each other across the slits S21 to S23.

In the first and second inner electrodes 42 to 44, 61 to 63 formed with the slits S11 to S13, S21 to S23, currents flow in directions opposite from each other in areas opposing each other across the slits S11 to S13, S21 to S23, whereby magnetic fields caused by the currents cancel each other out. Also, in the laminating direction, currents flow in respective directions opposite from each other in the first inner electrodes 42 to 44 and second inner electrodes 61 to 63 formed with the slits. Therefore, magnetic fields caused by currents flowing through the first inner electrodes 42 to 44 and magnetic fields caused by currents flowing through the second inner electrodes 61 to 63 cancel each other out. Consequently, the multilayer capacitor in accordance with the tenth embodiment can reduce its equivalent series inductance.

In the multilayer capacitor in accordance with the tenth embodiment, the number of first inner electrode 41 connected to the first terminal electrode 3 through a lead conductor 53 is 1, which is smaller than the total number (4 in this embodiment) of first inner electrodes 41 to 44. The number of second inner electrode 64 connected to the second terminal electrode 5 through a lead conductor 73 is 1, which is smaller than the total number (4 in this embodiment) of second inner electrodes 61 to 64. These make the multilayer capacitor in accordance with the tenth embodiment attain an equivalent series resistance greater than that of a conventional multilayer capacitor in which all the inner electrodes are connected to their corresponding terminal electrodes through lead conductors.

By adjusting each of the number of first inner electrode 41 electrically connected to the first terminal electrode 3 through the lead conductor 53 and the number of second inner electrodes 64 electrically connected to the second terminal electrode 5 through the lead conductor 73 as in the foregoing, the tenth embodiment sets the equivalent series resistance of the multilayer capacitor to a desirable value and thus can regulate the equivalent series resistance easily with a high precision.

Eleventh Embodiment

Figure 12:
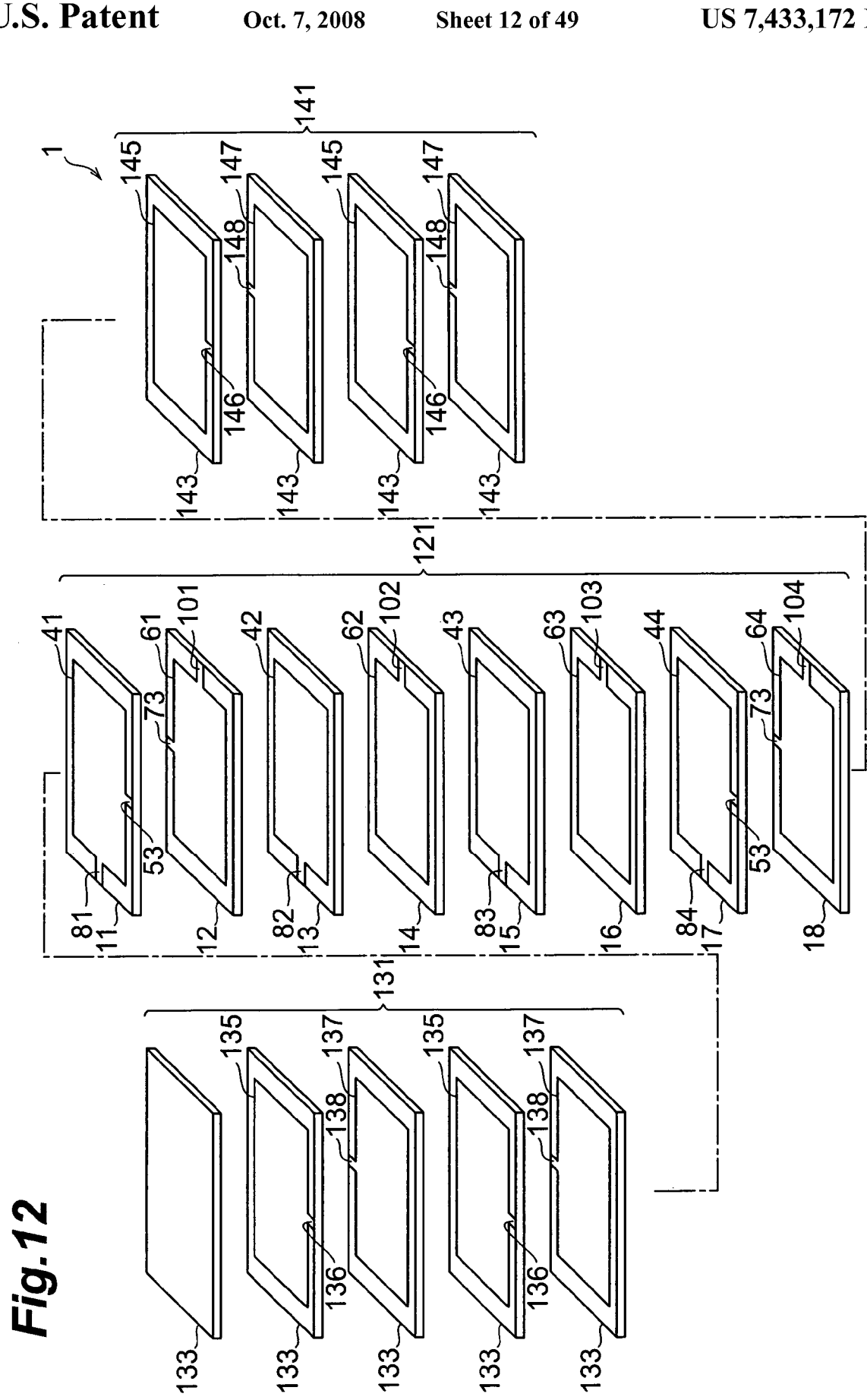
FIG. 12 is an exploded perspective view of the multilayer body included in the multilayer capacitor in accordance with an eleventh embodiment.

With reference to FIG. 12, the structure of the multilayer capacitor in accordance with an eleventh embodiment will be explained. FIG. 12 is an exploded perspective view of the multilayer body included in the multilayer capacitor in accordance with the eleventh embodiment.

As with the multilayer capacitor C1 in accordance with the first embodiment, the multilayer capacitor in accordance with the eleventh embodiment comprises a multilayer body 1, a first terminal electrode 3 formed on the multilayer body 1, a second terminal electrode 5 similarly formed on the multilayer body 1, and first and second connecting conductors 7, 9, which are not depicted.

As shown in FIG. 12, the multilayer body 1 includes first to third capacitor portions 121, 131, 141. The first capacitor portion 121 is positioned between the second capacitor portion 131 and third capacitor portion 141.

To begin with, the structure of the first capacitor portion 121 will be explained. The first capacitor portion 121 has the same configuration as that of the multilayer body 1 in the multilayer capacitor in accordance with the fifth embodiment except for the dielectric layer 35. Namely, the first capacitor portion 121 is constructed by alternately laminating a plurality of (8 in this embodiment) dielectric layers 11 to 18 and a plurality of (4 each in this embodiment) first and second inner electrodes 41 to 44, 61 to 64. In the first capacitor portion 121, two first inner electrodes 41, 44 among the four first inner electrodes 41 to 44 are electrically connected to the first terminal electrode 3 through lead conductors 53. Two inner electrodes 61, 64 among the four second inner electrodes 61 to 64 are electrically connected to the second terminal electrode 5 through lead conductors 73.

The structure of the second capacitor portion 131 will now be explained. The second capacitor portion 131 is constructed by alternately laminating a plurality of (5 in this embodiment) dielectric layers 133 and a plurality of (2 each in this embodiment) first and second inner electrodes 135, 137. The first inner electrodes 135 are electrically connected to the first terminal electrode 3 through their corresponding lead conductors 136. The lead conductors 136 are integrally formed with the respective first inner electrodes 135, and extend therefrom so as to reach a side face 1a of the multilayer body 1. The second inner electrodes 137 are electrically connected to the second terminal electrode 5 through their corresponding lead conductors 138. The lead conductors 138 are integrally formed with the respective second inner electrodes 137, and extend therefrom so as to reach a side face 1b of the multilayer body 1.

The structure of the third capacitor portion 141 will now be explained. The second capacitor portion 141 is constructed by alternately laminating a plurality of (4 in this embodiment) dielectric layers 143 and a plurality of (2 each in this embodiment) first and second inner electrodes 145, 147. The first inner electrodes 145 are electrically connected to the first terminal electrode 3 through their corresponding lead conductors 146. The lead conductors 146 are integrally formed with the respective first inner electrodes 145, and extend therefrom so as to reach the side face 1a of the multilayer body 1. The second inner electrodes 147 are electrically connected to the second terminal electrode 5 through their corresponding lead conductors 148. The lead conductors 148 are integrally formed with the respective second inner electrodes 147, and extend therefrom so as to reach the side face 1b of the multilayer body 1.

In the multilayer capacitor in accordance with the eleventh embodiment, the dielectric layers 11 to 18, 133, 143 are integrated to such an extent that no boundaries are discernible therebetween. The first inner electrode 41 of the first capacitor portion 121 is electrically connected to the first inner electrodes 135 of the second capacitor portion 131 and the second inner electrodes 145 of the third capacitor portion 141 through the terminal electrode 3. The first inner electrode 44 of the first capacitor portion 121 is electrically connected to the first inner electrodes 135 of the second capacitor portion 131 and the second inner electrodes 145 of the third capacitor portion 141 through the terminal electrode 3. The second inner electrode 61 of the first capacitor portion 121 is electrically connected to the second inner electrodes 137 of the second capacitor portion 131 and the second inner electrodes 147 of the third capacitor portion 141 through the terminal electrode 5. The second inner electrode 64 of the first capacitor portion 121 is electrically connected to the second inner electrodes 137 of the second capacitor portion 131 and the second inner electrodes 147 of the third capacitor portion 141 through the terminal electrode 5.

By having the first capacitor portion 121 as in the foregoing, the multilayer capacitor in accordance with the eleventh embodiment sets its equivalent series resistance to a desirable value as described in the fifth embodiment and thus can regulate the equivalent series resistance easily with a high precision.

Twelfth Embodiment

Figure 13:
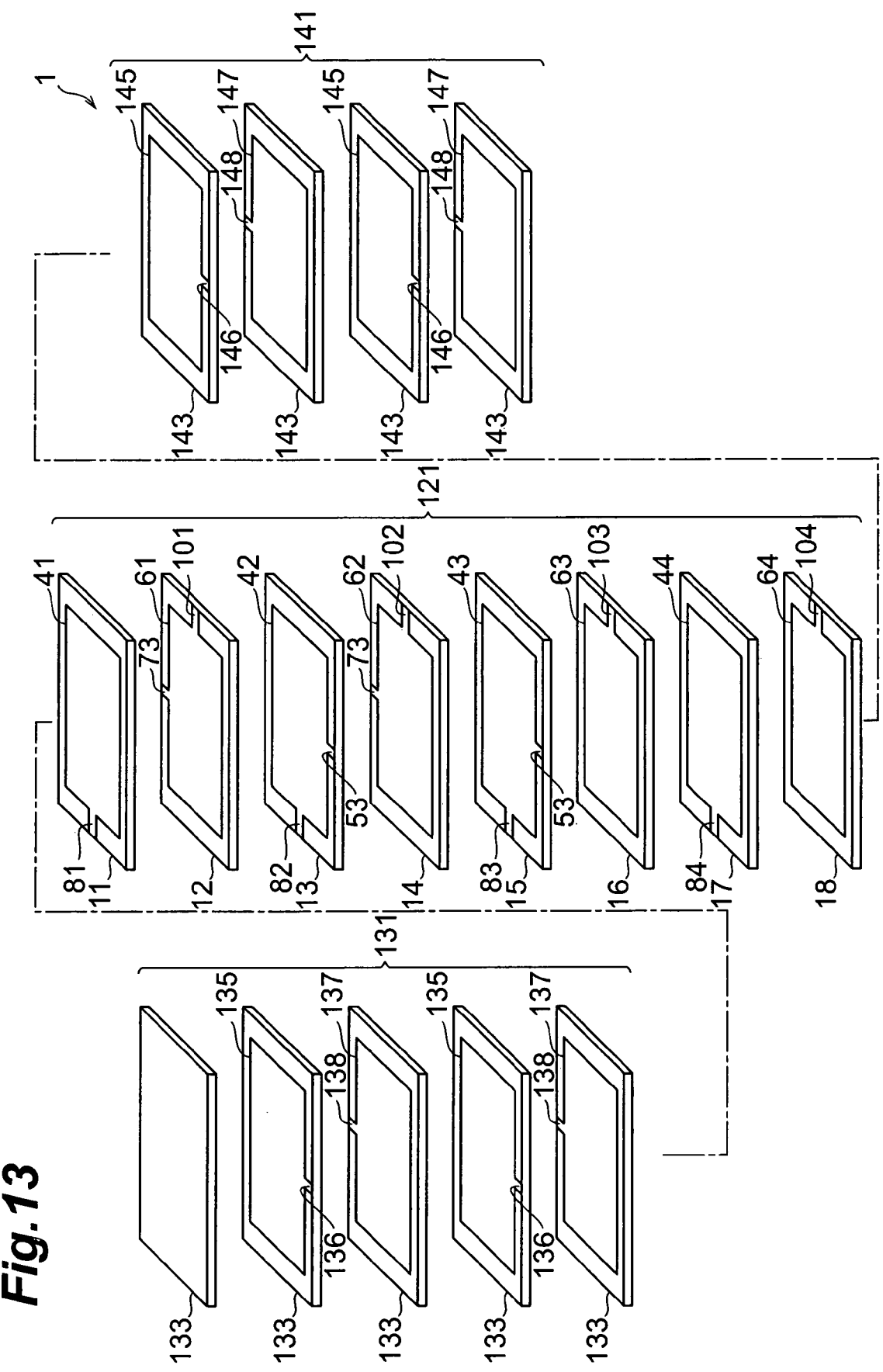
FIG. 13 is an exploded perspective view of the multilayer body included in the multilayer capacitor in accordance with a twelfth embodiment.

With reference to FIG. 13, the structure of the multilayer capacitor in accordance with a twelfth embodiment will be explained. The multilayer capacitor in accordance with the twelfth embodiment differs from the multilayer capacitor in accordance with the eleventh embodiment in terms of the structure of the first capacitor portion 121. FIG. 13 is an exploded perspective view of the multilayer body included in the multilayer capacitor in accordance with the twelfth embodiment.

As with the multilayer capacitor C1 in accordance with the first embodiment, the multilayer capacitor in accordance with the twelfth embodiment comprises a multilayer body 1, a first terminal electrode 3 formed on the multilayer body 1, a second terminal electrode 5 similarly formed on the multilayer body 1, and first and second connecting conductors 7, 9, which are not depicted.

The first capacitor portion 121 has the same configuration as that of the multilayer body 1 in the multilayer capacitor in accordance with the seventh embodiment except for the dielectric layer 35. Namely, the first capacitor portion 121 is constructed by alternately laminating a plurality of (8 in this embodiment) dielectric layers 11 to 18 and a plurality of (4 each in this embodiment) first and second inner electrodes 41 to 44, 61 to 64. In the first capacitor portion 121, two first inner electrodes 42, 43 among the four first inner electrodes 41 to 44 are electrically connected to the first terminal electrode 3 through lead conductors 53. Two inner electrodes 61, 62 among the four second inner electrodes 61 to 64 are electrically connected to the second terminal electrode 5 through lead conductors 73.

By having the first capacitor portion 121 as in the foregoing, the multilayer capacitor in accordance with the twelfth embodiment sets its equivalent series resistance to a desirable value as described in the seventh embodiment and thus can regulate the equivalent series resistance easily with a high precision.

Thirteenth Embodiment

Figure 14:
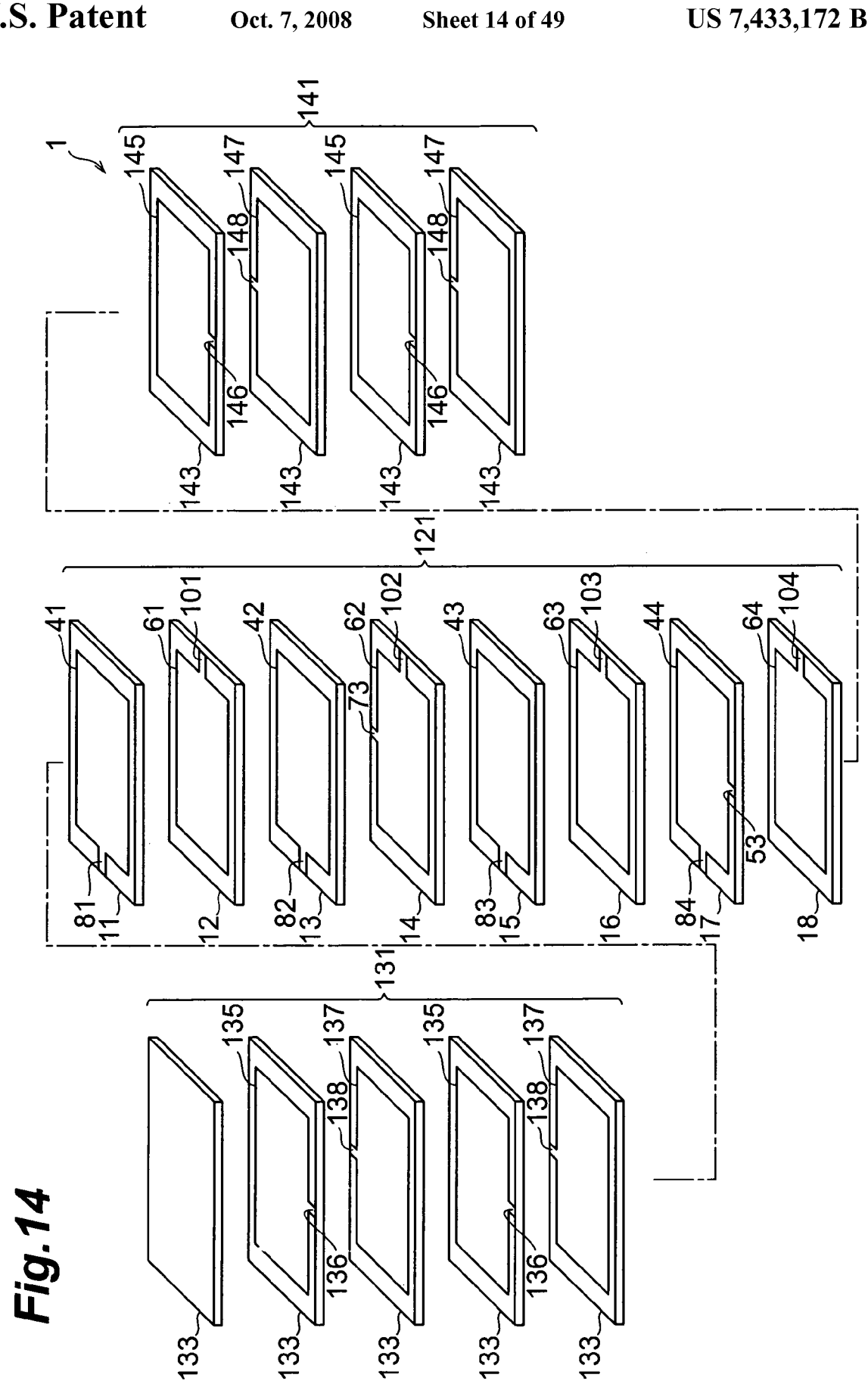
FIG. 14 is an exploded perspective view of the multilayer body included in the multilayer capacitor in accordance with a thirteenth embodiment.

With reference to FIG. 14, the structure of the multilayer capacitor in accordance with a thirteenth embodiment will be explained. The multilayer capacitor in accordance with the thirteenth embodiment differs from the multilayer capacitor in accordance with the eleventh embodiment in terms of the structure of the first capacitor portion 121. FIG. 14 is an exploded perspective view of the multilayer body included in the multilayer capacitor in accordance with the thirteenth embodiment.

As with the multilayer capacitor C1 in accordance with the first embodiment, the multilayer capacitor in accordance with the thirteenth embodiment comprises a multilayer body 1, a first terminal electrode 3 formed on the multilayer body 1, a second terminal electrode 5 similarly formed on the multilayer body 1, and first and second connecting conductors 7, 9, which are not depicted.

The first capacitor portion 121 has the same configuration as that of the multilayer body 1 in the multilayer capacitor in accordance with the fourth embodiment except for the dielectric layer 35. Namely, the first capacitor portion 121 is constructed by alternately laminating a plurality of (8 in this embodiment) dielectric layers 11 to 18 and a plurality of (4 each in this embodiment) first and second inner electrodes 41 to 44, 61 to 64. In the first capacitor portion 121, one first inner electrode 44 among the four first inner electrodes 41 to 44 is electrically connected to the first terminal electrode 3 through a lead conductor 53. One inner electrode 62 among the four second inner electrodes 61 to 64 is electrically connected to the second terminal electrode 5 through a lead conductor 73.

By having the first capacitor portion 121 as in the foregoing, the multilayer capacitor in accordance with the thirteenth embodiment sets its equivalent series resistance to a desirable value as described in the fourth embodiment and thus can regulate the equivalent series resistance easily with a high precision.

The same structure as that of the multilayer body 1 in the multilayer capacitor in accordance with any of the first to third, sixth, and eighth to tenth embodiments (excluding the dielectric layer 35) may also be employed as the structure of the first capacitor portion 121.

Fourteenth Embodiment

Figure 15:
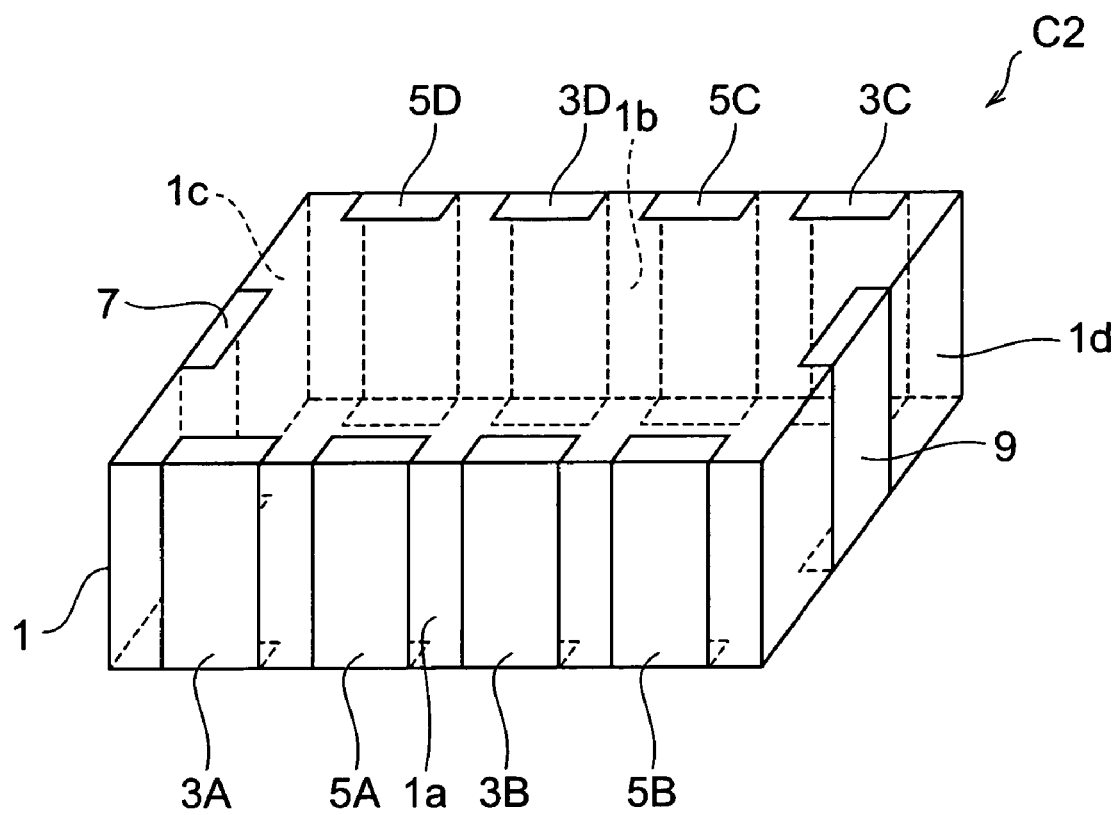
FIG. 15 is a perspective view of the multilayer capacitor in accordance with a fourteenth embodiment.
Figure 16:
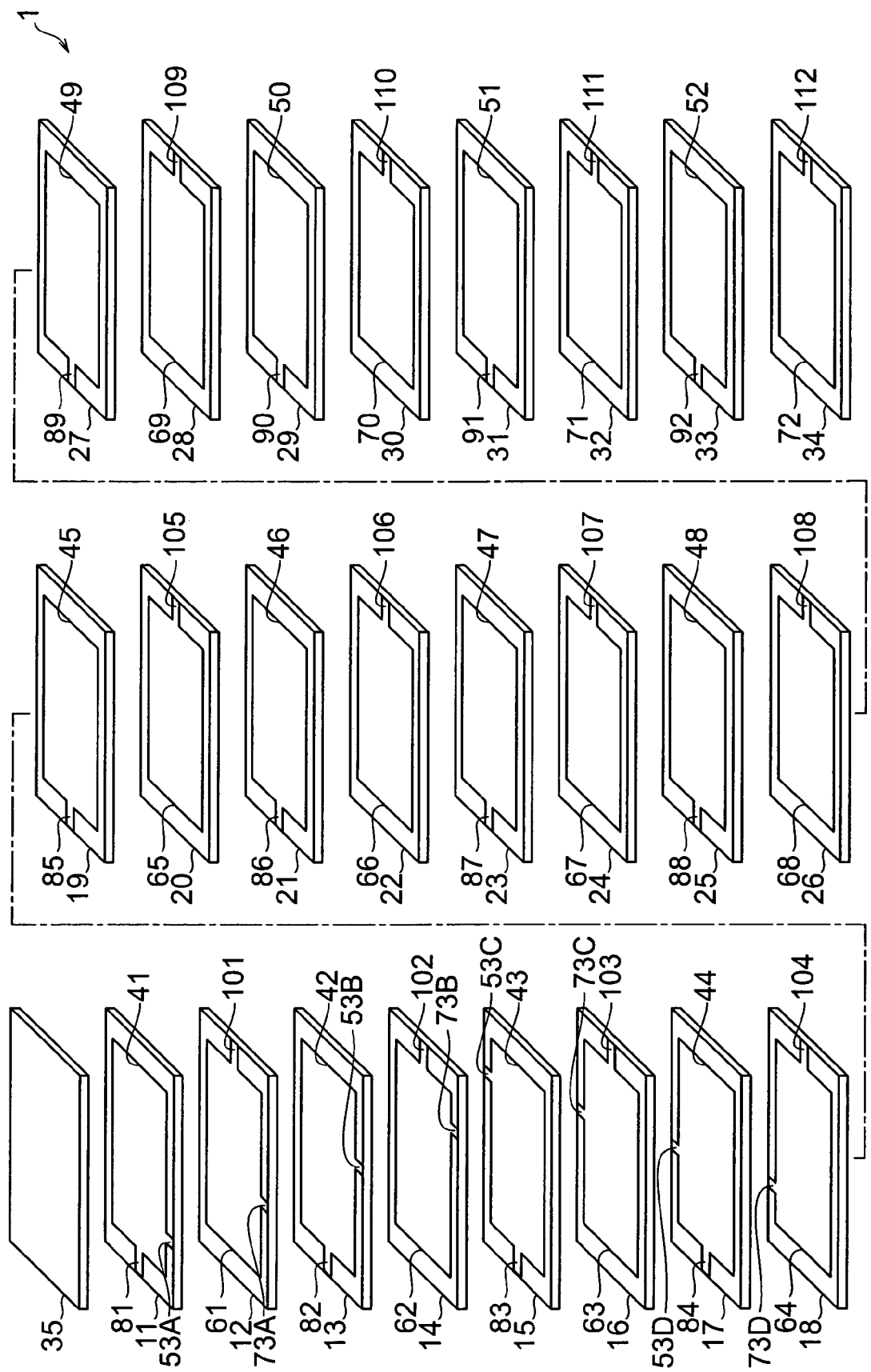
FIG. 16 is an exploded perspective view of the multilayer body included in the multilayer capacitor in accordance with the fourteenth embodiment.

With reference to FIGS. 15 and 16, the structure of the multilayer capacitor C2 in accordance with a fourteenth embodiment will be explained. FIG. 15 is a perspective view of the multilayer capacitor in accordance with the fourteenth embodiment. FIG. 16 is an exploded perspective view of the multilayer body included in the multilayer capacitor in accordance with the fourteenth embodiment.

As shown in FIG. 15, the multilayer capacitor C2 in accordance with the fourteenth embodiment comprises a multilayer body 1, a plurality of (4 each in this embodiment) first and second terminal electrodes (first and second terminal conductors) 3A to 3D, 5A to 5D formed on the multilayer body 1, and first and second connecting conductors 7, 9.

The first terminal electrode 3A is positioned on a side face 1a of the multilayer body 1. The first terminal electrode 3B is positioned on the side face 1a of the multilayer body 1. The first terminal electrode 3C is positioned on a side face 1b of the multilayer body 1. The first terminal electrode 3D is positioned on the side face 1b of the multilayer body 1.

The second terminal electrode 5A is positioned on the side face 1a of the multilayer body 1. The second terminal electrode 5B is positioned on the side face 1a of the multilayer body 1. The second terminal electrode 5C is positioned on the side face 1b of the multilayer body 1. The second terminal electrode 5D is positioned on the side face 1b of the multilayer body 1.

As a consequence, the first terminal electrode 3A, second terminal electrode 5A, first terminal electrode 3B, and second terminal electrode 5B are formed on the side face 1a in succession from a side face 1c toward a side face 1d. On the side face 1b, the first terminal electrode 3C, second terminal electrode 5C, first terminal electrode 3D, and second terminal electrode 5D are formed in succession from the side face 1d toward the side face 1c. The first terminal electrodes 3A to 3D and second terminal electrodes 5A to 5D are electrically insulated from each other.

The first connecting conductor 7 is positioned on the side face 1c of the multilayer body 1. The second connecting conductor 9 is positioned on the side face 1d of the multilayer body 1. The first connecting conductor 7 and second connecting conductor 9 are electrically insulated from each other.

As is also shown in FIG. 16, the multilayer body 1 is constructed by alternately laminating a plurality of (25 in this embodiment) dielectric layers 11 to 35 and a plurality of (12 each in this embodiment) first and second inner electrodes 41 to 52, 61 to 72. In the actual multilayer capacitor C2, the dielectric layers 11 to 35 are integrated to such an extent that no boundaries are discernible therebetween.

Each of the first inner electrodes 41 to 52 has a substantially rectangular form. The first inner electrodes 41 to 52 are formed at respective positions separated by a predetermined distance from a side face parallel to the laminating direction of the dielectric layers 11 to 35 in the multilayer body 1 (hereinafter simply referred to as "laminating direction"). The first inner electrodes 41 to 52 are formed with respective lead conductors 81 to 92 extending so as to reach the side face 1c of the multilayer body 1.

The lead conductor 81 is integrally formed with the first inner electrode 41, and extends therefrom so as to reach the side face 1c of the multilayer body 1. The lead conductor 82 is integrally formed with the first inner electrode 42, and extends therefrom so as to reach the side face 1c of the multilayer body 1. The lead conductor 83 is integrally formed with the first inner electrode 43, and extends therefrom so as to reach the side face 1c of the multilayer body 1. The lead conductor 84 is integrally formed with the first inner electrode 44, and extends therefrom so as to reach the side face 1c of the multilayer body 1. The lead conductor 85 is integrally formed with the first inner electrode 45, and extends therefrom so as to reach the side face 1c of the multilayer body 1. The lead conductor 86 is integrally formed with the first inner electrode 46, and extends therefrom so as to reach the side face 1c of the multilayer body 1. The lead conductor 87 is integrally formed with the first inner electrode 47, and extends therefrom so as to reach the side face 1c of the multilayer body 1. The lead conductor 88 is integrally formed with the first inner electrode 48, and extends therefrom so as to reach the side face 1c of the multilayer body 1. The lead conductor 89 is integrally formed with the first inner electrode 49, and extends therefrom so as to reach the side face 1c of the multilayer body 1. The lead conductor 90 is integrally formed with the first inner electrode 50, and extends therefrom so as to reach the side face 1c of the multilayer body 1. The lead conductor 91 is integrally formed with the first inner electrode 51, and extends therefrom so as to reach the side face 1c of the multilayer body 1. The lead conductor 92 is integrally formed with the first inner electrode 52, and extends therefrom so as to reach the side face 1c of the multilayer body 1.

The first inner electrodes 41 to 52 are electrically connected to the first connecting conductor 7 through their corresponding lead conductors 81 to 92. As a consequence, the first inner electrodes 41 to 52 are electrically connected to each other through the first connecting conductor 7.

The first inner electrode 41 is electrically connected to the first terminal electrode 3A through a lead conductor 53A. The first inner electrode 42 is electrically connected to the first terminal electrode 3B through a lead conductor 53B. The first inner electrode 43 is electrically connected to the first terminal electrode 3C through a lead conductor 53C. The first inner electrode 44 is electrically connected to the first terminal electrode 3D through a lead conductor 53D. As a consequence, the first inner electrodes 45 to 52 are also electrically connected to the first terminal electrodes 3A to 3D, so that the first inner electrodes 41 to 52 are connected in parallel.

The lead conductors 53A, 53B are integrally formed with their corresponding first inner electrodes 41, 42, and extend therefrom so as to reach the side face 1a of the multilayer body 1. The lead conductors 53C, 53D are integrally formed with their corresponding first inner electrodes 43, 44, and extend therefrom so as to reach the side face 1b of the multilayer body 1.

Each of the second inner electrodes 61 to 72 has a substantially rectangular form. The second inner electrodes 61 to 72 are formed at respective positions separated by a predetermined distance from a side face parallel to the laminating direction of the multilayer body 1. The second inner electrodes 61 to 72 are formed with respective lead conductors 101 to 112 extending so as to reach the side face 1d of the multilayer body 1.

The lead conductor 101 is integrally formed with the second inner electrode 61, and extends therefrom so as to reach the side face 1d of the multilayer body 1. The lead conductor 102 is integrally formed with the second inner electrode 62, and extends therefrom so as to reach the side face 1d of the multilayer body 1. The lead conductor 103 is integrally formed with the second inner electrode 63, and extends therefrom so as to reach the side face 1d of the multilayer body 1. The lead conductor 104 is integrally formed with the second inner electrode 64, and extends therefrom so as to reach the side face 1d of the multilayer body 1. The lead conductor 105 is integrally formed with the second inner electrode 65, and extends therefrom so as to reach the side face 1d of the multilayer body 1. The lead conductor 106 is integrally formed with the second inner electrode 66, and extends therefrom so as to reach the side face 1*d* of the multilayer body 1. The lead conductor 107 is integrally formed with the second inner electrode 67, and extends therefrom so as to reach the side face 1*d* of the multilayer body 1. The lead conductor 108 is integrally formed with the second inner electrode 68, and extends therefrom so as to reach the side face 1*d* of the multilayer body 1. The lead conductor 109 is integrally formed with the second inner electrode 69, and extends therefrom so as to reach the side face 1*d* of the multilayer body 1. The lead conductor 110 is integrally formed with the second inner electrode 70, and extends therefrom so as to reach the side face 1*d* of the multilayer body 1. The lead conductor 111 is integrally formed with the second inner electrode 71, and extends therefrom so as to reach the side face 1*d* of the multilayer body 1. The lead conductor 112 is integrally formed with the second inner electrode 72, and extends therefrom so as to reach the side face 1*d* of the multilayer body 1.

The second inner electrodes 61 to 72 are electrically connected to the second connecting conductor 9 through their corresponding lead conductors 101 to 112. As a consequence, the second inner electrodes 61 to 72 are electrically connected to each other through the second connecting conductor 9.

The second inner electrode 61 is electrically connected to the second terminal electrode 5A through a lead conductor 73A. The second inner electrode 62 is electrically connected to the second terminal electrode 5B through a lead conductor 73B. The second inner electrode 63 is electrically connected to the second terminal electrode 5C through a lead conductor 73C. The second inner electrode 64 is electrically connected to the second terminal electrode 5D through a lead conductor 73D. As a consequence, the second inner electrodes 65 to 72 are also electrically connected to the second terminal electrodes 5A to 5D, so that the second inner electrodes 61 to 72 are connected in parallel.

The lead conductors 73A, 73B are integrally formed with their corresponding second inner electrodes 61, 62, and extend therefrom so as to reach the side face 1*a* of the multilayer body 1. The lead conductors 73C, 73D are integrally formed with their corresponding second inner electrodes 63, 64, and extend therefrom so as to reach the side face 1*b* of the multilayer body 1.

In the multilayer capacitor C2, the number of first inner electrodes 41 to 44 connected to the first terminal electrodes 3A to 3D through the lead conductors 53A to 53D is 4, which is smaller than the total number (12 in this embodiment) of the first inner electrodes 41 to 52. The number of second inner electrodes 61 to 64 connected to the second terminal electrodes 5A to 5D through the lead conductors 73A to 73D is 4, which is smaller than the total number (12 in this embodiment) of the second inner electrodes 61 to 72.

When the first terminal electrode 3A is concerned, the resistance component of the first connecting conductor 7 is connected in series to the first terminal electrode 3A.

When the first terminal electrode 3B is concerned, at the first inner electrode 42 as a boundary, the resistance component of the first connecting conductor 7 is divided into the resistance component of the first connecting conductor 7 positioned on one side of the first inner electrode 42 in the laminating direction and the resistance component of the first connecting conductor 7 positioned on the other side of the first inner electrode 42 in the laminating direction. These resistance components are connected in parallel to the first terminal electrode 3B.

When the first terminal electrode 3C is concerned, at the first inner electrode 43 as a boundary, the resistance component of the first connecting conductor 7 is divided into the resistance component of the first connecting conductor 7 positioned on one side of the first inner electrode 43 in the laminating direction and the resistance component of the first connecting conductor 7 positioned on the other side of the first inner electrode 43 in the laminating direction. These resistance components are connected in parallel to the first terminal electrode 3C.

When the first terminal electrode 3D is concerned, at the first inner electrode 44 as a boundary, the resistance component of the first connecting conductor 7 is divided into the resistance component of the first connecting conductor 7 positioned on one side of the first inner electrode 44 in the laminating direction and the resistance component of the first connecting conductor 7 positioned on the other side of the first inner electrode 44 in the laminating direction. These resistance components are connected in parallel to the first terminal electrode 3D.

When the second terminal electrode 5A is concerned, at the second inner electrode 61 as a boundary, the resistance component of the second connecting conductor 9 is divided into the resistance component of the second connecting conductor 9 positioned on one side of the second inner electrode 61 in the laminating direction and the resistance component of the second connecting conductor 9 positioned on the other side of the second inner electrode 61 in the laminating direction. These resistance components are connected in parallel to the second terminal electrode 5A.

When the second terminal electrode 5B is concerned, at the second inner electrode 62 as a boundary, the resistance component of the second connecting conductor 9 is divided into the resistance component of the second connecting conductor 9 positioned on one side of the second inner electrode 62 in the laminating direction and the resistance component of the second connecting conductor 9 positioned on the other side of the second inner electrode 62 in the laminating direction. These resistance components are connected in parallel to the second terminal electrode 5B.

When the second terminal electrode 5C is concerned, at the second inner electrode 63 as a boundary, the resistance component of the second connecting conductor 9 is divided into the resistance component of the second connecting conductor 9 positioned on one side of the second inner electrode 63 in the laminating direction and the resistance component of the second connecting conductor 9 positioned on the other side of the second inner electrode 63 in the laminating direction. These resistance components are connected in parallel to the second terminal electrode 5C.

When the second terminal electrode 5D is concerned, at the second inner electrode 64 as a boundary, the resistance component of the second connecting conductor 9 is divided into the resistance component of the second connecting conductor 9 positioned on one side of the second inner electrode 64 in the laminating direction and the resistance component of the second connecting conductor 9 positioned on the other side of the second inner electrode 64 in the laminating direction. These resistance components are connected in parallel to the second terminal electrode 5D.

These make the multilayer capacitor C2 attain an equivalent series resistance greater than that of a conventional multilayer capacitor in which all the inner electrodes are connected to their corresponding terminal electrodes through lead conductors.

By adjusting each of the number of first inner electrodes 41 to 44 electrically connected to the first terminal electrodes 3A to 3D through the lead conductors 53A to 53D and the number of second inner electrodes 61 to 64 electrically connected to the second terminal electrodes 5A to 5D through the lead conductors 73A to 73D as in the foregoing, this embodiment sets the equivalent series resistance of the multilayer capacitor C2 to a desirable value and thus can regulate the equivalent series resistance easily with a high precision.

In this embodiment, the first inner electrodes 41 to 52 are connected in parallel, and the second inner electrodes 61 to 72 are connected in parallel. As a consequence, even when the resistance value fluctuates among the first inner electrodes 41 to 52 or second inner electrodes 61 to 72, its influence is less in the equivalent series resistance of the multilayer capacitor C2 as a whole, whereby the equivalent series resistance control can be restrained from lowering its precision.

Fifteenth Embodiment

Figure 17:
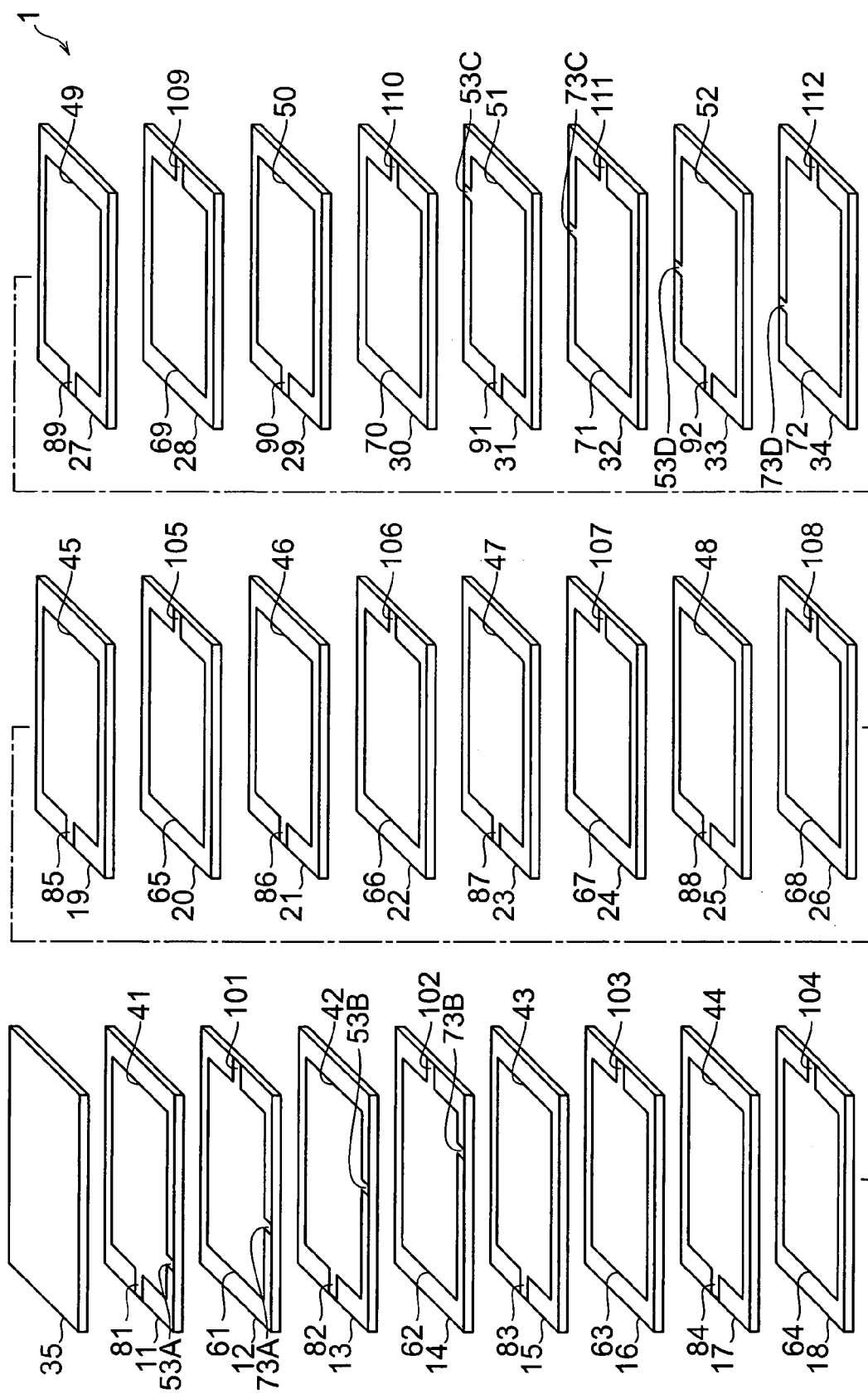
FIG. 17 is an exploded perspective view of the multilayer body included in the multilayer capacitor in accordance with a fifteenth embodiment.

With reference to FIG. 17, the structure of the multilayer capacitor in accordance with a fifteenth embodiment will be explained. The multilayer capacitor in accordance with the fifteenth embodiment differs from the multilayer capacitor C2 in accordance with the fourteenth embodiment in terms of the position of first inner electrodes electrically connected to first terminal electrodes 3A to 3D through lead conductors 53A to 53D in the laminating direction and the position of second inner electrodes electrically connected to second terminal electrodes 5A to 5D through lead conductors 73A to 73D in the laminating direction. FIG. 17 is an exploded perspective view of the multilayer body included in the multilayer capacitor in accordance with the fifteenth embodiment.

As with the multilayer capacitor C2 in accordance with the fourteenth embodiment, the multilayer capacitor in accordance with the fifteenth embodiment comprises a multilayer body 1, the first terminal electrodes 3A to 3D formed on the multilayer body 1, the second terminal electrodes 5A to 5D similarly formed on the multilayer body 1, and first and second connecting conductors 7, 9, which are not depicted.

In the multilayer capacitor in accordance with the fifteenth embodiment, as shown in FIG. 17, a first inner electrode 51 is electrically connected to the first terminal electrode 3C through a lead conductor 53C. A first inner electrode 52 is electrically connected to the first terminal electrode 3D through a lead conductor 53D. As a consequence, first inner electrodes 43 to 50 are also electrically connected to the first terminal electrodes 3A to 3D, whereby first inner electrodes 41 to 52 are connected in parallel. The lead conductors 53C, 53D are integrally formed with their corresponding first inner electrodes 51, 52, and extend therefrom so as to reach a side face 1b of the multilayer body 1.

A second inner electrode 71 is electrically connected to the second terminal electrode 5C through a lead conductor 73C. A second inner electrode 72 is electrically connected to the second terminal electrode 5D through a lead conductor 73D. As a consequence, second inner electrodes 63 to 70 are also electrically connected to the second terminal electrodes 5A to 5D, whereby second inner electrodes 61 to 72 are connected in parallel. The lead conductors 73C, 73D are integrally formed with their corresponding second inner electrodes 71, 72, and extend therefrom so as to reach the side face 1b of the multilayer body 1.

In the multilayer capacitor in accordance with the fifteenth embodiment, the number of first inner electrodes 41, 42, 51, 52 connected to the first terminal electrodes 3A to 3D through the lead conductors 53A to 53D is 4, which is smaller than the total number (12 in this embodiment) of the first inner electrodes 41 to 52. The number of second inner electrodes 61, 62, 71, 72 connected to the second terminal electrodes 5A to 5D through the lead conductors 73A to 73D is 4, which is smaller than the total number (12 in this embodiment) of the second inner electrodes 61 to 72. These make the multilayer capacitor in accordance with the fifteenth embodiment attain an equivalent series resistance greater than that of a conventional multilayer capacitor in which all the inner electrodes are connected to their corresponding terminal electrodes through lead conductors.

When the first terminal electrode 3A is concerned, the resistance component of the first connecting conductor 7 is connected in series to the first terminal electrode 3A.

When the first terminal electrode 3B is concerned, at the first inner electrode 42 as a boundary, the resistance component of the first connecting conductor 7 is divided into the resistance component of the first connecting conductor 7 positioned on one side of the first inner electrode 42 in the laminating direction and the resistance component of the first connecting conductor 7 positioned on the other side of the first inner electrode 42 in the laminating direction. These resistance components are connected in parallel to the first terminal electrode 3B.

When the first terminal electrode 3C is concerned, at the first inner electrode 51 as a boundary, the resistance component of the first connecting conductor 7 is divided into the resistance component of the first connecting conductor 7 positioned on one side of the first inner electrode 51 in the laminating direction and the resistance component of the first connecting conductor 7 positioned on the other side of the first inner electrode 51 in the laminating direction. These resistance components are connected in parallel to the first terminal electrode 3C.

When the first terminal electrode 3D is concerned, at the first inner electrode 52 as a boundary, the resistance component of the first connecting conductor 7 is divided into the resistance component of the first connecting conductor 7 positioned on one side of the first inner electrode 52 in the laminating direction and the resistance component of the first connecting conductor 7 positioned on the other side of the first inner electrode 52 in the laminating direction. These resistance components are connected in parallel to the first terminal electrode 3D.

When the second terminal electrode 5A is concerned, at the second inner electrode 61 as a boundary, the resistance component of the second connecting conductor 9 is divided into the resistance component of the second connecting conductor 9 positioned on one side of the second inner electrode 61 in the laminating direction and the resistance component of the second connecting conductor 9 positioned on the other side of the second inner electrode 61 in the laminating direction. These resistance components are connected in parallel to the second terminal electrode 5A.

When the second terminal electrode 5B is concerned, at the second inner electrode 62 as a boundary, the resistance component of the second connecting conductor 9 is divided into the resistance component of the second connecting conductor 9 positioned on one side of the second inner electrode 62 in the laminating direction and the resistance component of the second connecting conductor 9 positioned on the other side of the second inner electrode 62 in the laminating direction. These resistance components are connected in parallel to the second terminal electrode 5B.

When the second terminal electrode 5C is concerned, at the second inner electrode 71 as a boundary, the resistance component of the second connecting conductor 9 is divided into the resistance component of the second connecting conductor 9 positioned on one side of the second inner electrode 71 in the laminating direction and the resistance component of the second connecting conductor 9 positioned on the other side of the second inner electrode 71 in the laminating direction. These resistance components are connected in parallel to the second terminal electrode 5C.

When the second terminal electrode 5D is concerned, the composite resistance component of the second connecting conductor 9 is connected in series to the second terminal electrode 5D.

Because of the difference in resistance components between the first and second connecting conductors 7, 9 mentioned above, the multilayer capacitor in accordance with the fifteenth embodiment yields an equivalent series resistance greater than that in the multilayer capacitor C2 in accordance with the fourteenth embodiment.

By adjusting each of the position of first inner electrodes 41, 42, 51, 52 electrically connected to the first terminal electrodes 3A to 3D through the lead conductors 53A to 53D in the laminating direction and the position of second inner electrodes 61, 62, 71, 72 electrically connected to the second terminal electrodes 5A to 5D through the lead conductors 73A to 73D in the laminating direction as in the foregoing, this embodiment sets the equivalent series resistance of the multilayer capacitor to a desirable value and thus can regulate the equivalent series resistance easily with a high precision.

Sixteenth Embodiment

Figure 18:
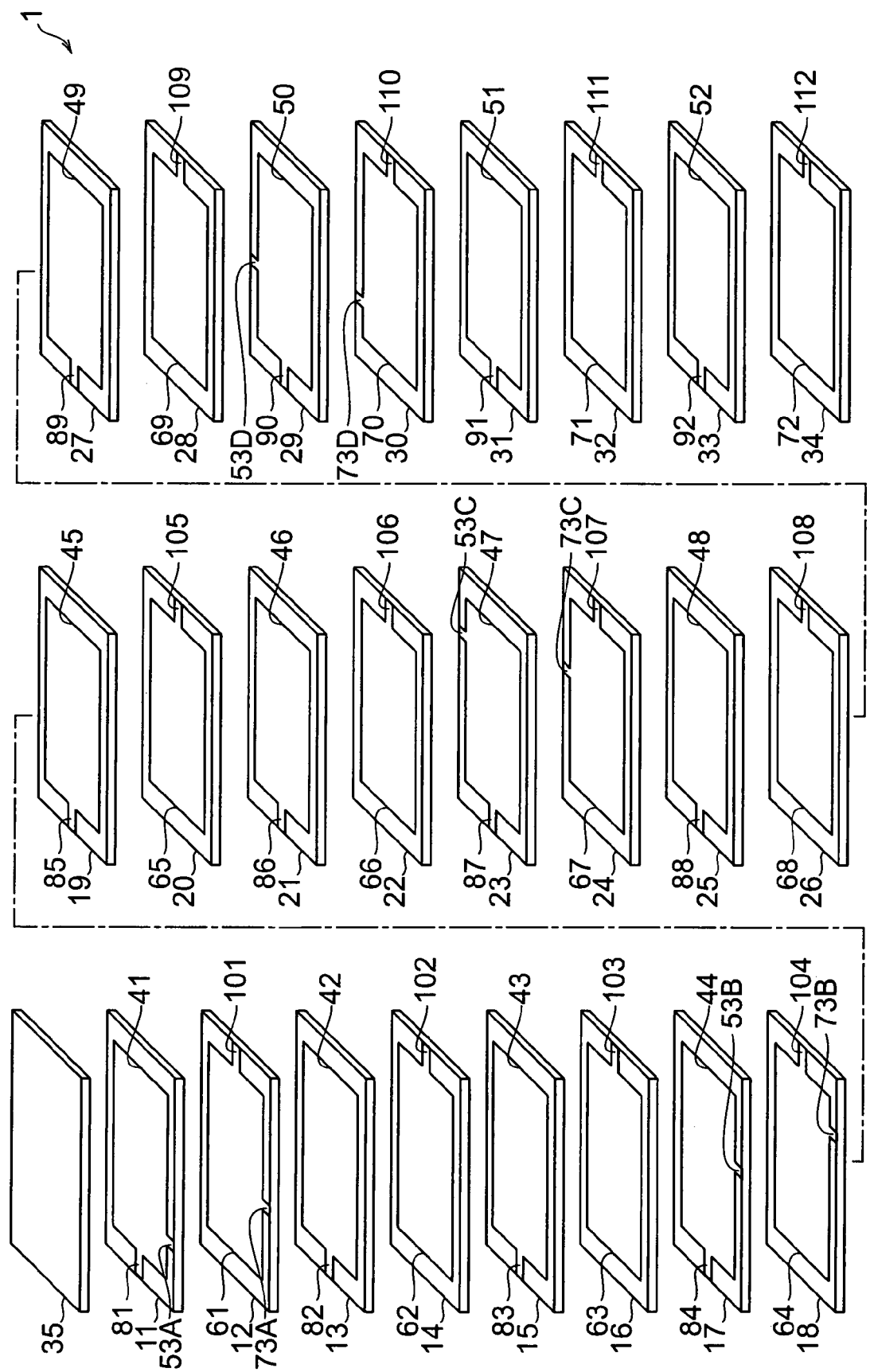
FIG. 18 is an exploded perspective view of the multilayer body included in the multilayer capacitor in accordance with a sixteenth embodiment.

With reference to FIG. 18, the structure of the multilayer capacitor in accordance with a sixteenth embodiment will be explained. The multilayer capacitor in accordance with the sixteenth embodiment differs from the multilayer capacitor C2 in accordance with the fourteenth embodiment in terms of the position of first inner electrodes electrically connected to first terminal electrodes 3A to 3D through lead conductors 53A to 53D in the laminating direction and the position of second inner electrodes electrically connected to second terminal electrodes 5A to 5D through lead conductors 73A to 73D in the laminating direction. FIG. 18 is an exploded perspective view of the multilayer body included in the multilayer capacitor in accordance with the sixteenth embodiment.

As with the multilayer capacitor C2 in accordance with the fourteenth embodiment, the multilayer capacitor in accordance with the sixteenth embodiment comprises a multilayer body 1, the first terminal electrodes 3A to 3D formed on the multilayer body 1, the second terminal electrodes 5A to 5D similarly formed on the multilayer body 1, and first and second connecting conductors 7, 9, which are not depicted.

In the multilayer capacitor in accordance with the sixteenth embodiment, as shown in FIG. 18, a first inner electrode 44 is electrically connected to the first terminal electrode 3B through a lead conductor 53B. A first inner electrode 47 is electrically connected to the first terminal electrode 3C through a lead conductor 53C. A first inner electrode 50 is electrically connected to the first terminal electrode 3D through a lead conductor 53D. As a consequence, first inner electrodes 42, 43, 45, 46, 48, 49, 51, 52 are also electrically connected to the first terminal electrodes 3A to 3D, whereby first inner electrodes 41 to 52 are connected in parallel. The lead conductor 53B is integrally formed with the first inner electrode 44, and extends therefrom so as to reach a side face 1a of the multilayer body 1. The lead conductors 53C, 53D are integrally formed with their corresponding first inner electrodes 47, 50, and extend therefrom so as to reach a side face 1b of the multilayer body 1.

A second inner electrode 64 is electrically connected to the second terminal electrode 5B through a lead conductor 73B. A second inner electrode 67 is electrically connected to the second terminal electrode 5C through a lead conductor 73C. A second inner electrode 70 is electrically connected to the second terminal electrode 5D through a lead conductor 73D. As a consequence, second inner electrodes 62, 63, 65, 66, 68, 69, 71, 72 are also electrically connected to the second terminal electrodes 5A to 5D, whereby second inner electrodes 61 to 72 are connected in parallel. The lead conductor 73B is integrally formed with the second inner electrode 64, and extends therefrom so as to reach the side face 1a of the multilayer body 1. The lead conductors 73C, 73D are integrally formed with their corresponding second inner electrodes 67, 70, and extend therefrom so as to reach the side face 1b of the multilayer body 1.

In the multilayer capacitor in accordance with the sixteenth embodiment, the number of first inner electrodes 41, 44, 47, 50 connected to the first terminal electrodes 3A to 3D through the lead conductors 53A to 53D is 4, which is smaller than the total number (12 in this embodiment) of the first inner electrodes 41 to 52. The number of second inner electrodes 61, 64, 67, 70 connected to the second terminal electrodes 5A to 5D through the lead conductors 73A to 73D is 4, which is smaller than the total number (12 in this embodiment) of the second inner electrodes 61 to 72. These make the multilayer capacitor in accordance with the sixteenth embodiment attain an equivalent series resistance greater than that of a conventional multilayer capacitor in which all the inner electrodes are connected to their corresponding terminal electrodes through lead conductors.

When the first terminal electrode 3A is concerned, the resistance component of the first connecting conductor 7 is connected in series to the first terminal electrode 3A.

When the first terminal electrode 3B is concerned, at the first inner electrode 44 as a boundary, the resistance component of the first connecting conductor 7 is divided into the resistance component of the first connecting conductor 7 positioned on one side of the first inner electrode 44 in the laminating direction and the resistance component of the first connecting conductor 7 positioned on the other side of the first inner electrode 44 in the laminating direction. These resistance components are connected in parallel to the first terminal electrode 3B.

When the first terminal electrode 3C is concerned, at the first inner electrode 47 as a boundary, the resistance component of the first connecting conductor 7 is divided into the resistance component of the first connecting conductor 7 positioned on one side of the first inner electrode 47 in the laminating direction and the resistance component of the first connecting conductor 7 positioned on the other side of the first inner electrode 47 in the laminating direction. These resistance components are connected in parallel to the first terminal electrode 3C.

When the first terminal electrode 3D is concerned, at the first inner electrode 50 as a boundary, the resistance component of the first connecting conductor 7 is divided into the resistance component of the first connecting conductor 7 positioned on one side of the first inner electrode 50 in the laminating direction and the resistance component of the first connecting conductor 7 positioned on the other side of the first inner electrode 50 in the laminating direction. These resistance components are connected in parallel to the first terminal electrode 3D.

When the second terminal electrode 5A is concerned, at the second inner electrode 61 as a boundary, the resistance component of the second connecting conductor 9 is divided into the resistance component of the second connecting conductor 9 positioned on one side of the second inner electrode 61 in the laminating direction and the resistance component of the second connecting conductor 9 positioned on the other side of the second inner electrode 61 in the laminating direction. These resistance components are connected in parallel to the second terminal electrode 5A.

When the second terminal electrode 5B is concerned, at the second inner electrode 64 as a boundary, the resistance component of the second connecting conductor 9 is divided into the resistance component of the second connecting conductor 9 positioned on one side of the second inner electrode 64 in the laminating direction and the resistance component of the second connecting conductor 9 positioned on the other side of the second inner electrode 64 in the laminating direction. These resistance components are connected in parallel to the second terminal electrode 5B.

When the second terminal electrode 5C is concerned, at the second inner electrode 67 as a boundary, the resistance component of the second connecting conductor 9 is divided into the resistance component of the second connecting conductor 9 positioned on one side of the second inner electrode 67 in the laminating direction and the resistance component of the second connecting conductor 9 positioned on the other side of the second inner electrode 67 in the laminating direction. These resistance components are connected in parallel to the second terminal electrode 5C.

When the second terminal electrode 5D is concerned, at the second inner electrode 70 as a boundary, the resistance component of the second connecting conductor 9 is divided into the resistance component of the second connecting conductor 9 positioned on one side of the second inner electrode 70 in the laminating direction and the resistance component of the second connecting conductor 9 positioned on the other side of the second inner electrode 70 in the laminating direction. These resistance components are connected in parallel to the second terminal electrode 5D.

Because of the difference in resistance components between the first and second connecting conductors 7, 9 mentioned above, the multilayer capacitor in accordance with the sixteenth embodiment yields an equivalent series resistance smaller than that in the multilayer capacitor C2 in accordance with the fourteenth embodiment.

By adjusting each of the position of first inner electrodes 41, 44, 47, 50 electrically connected to the first terminal electrodes 3A to 3D through the lead conductors 53A to 53D in the laminating direction and the position of second inner electrodes 61, 64, 67, 70 electrically connected to the second terminal electrodes 5A to 5D through the lead conductors 73A to 73D in the laminating direction as in the foregoing, this embodiment sets the equivalent series resistance of the multilayer capacitor to a desirable value and thus can regulate the equivalent series resistance easily with a high precision.

Seventeenth Embodiment

Figure 19:
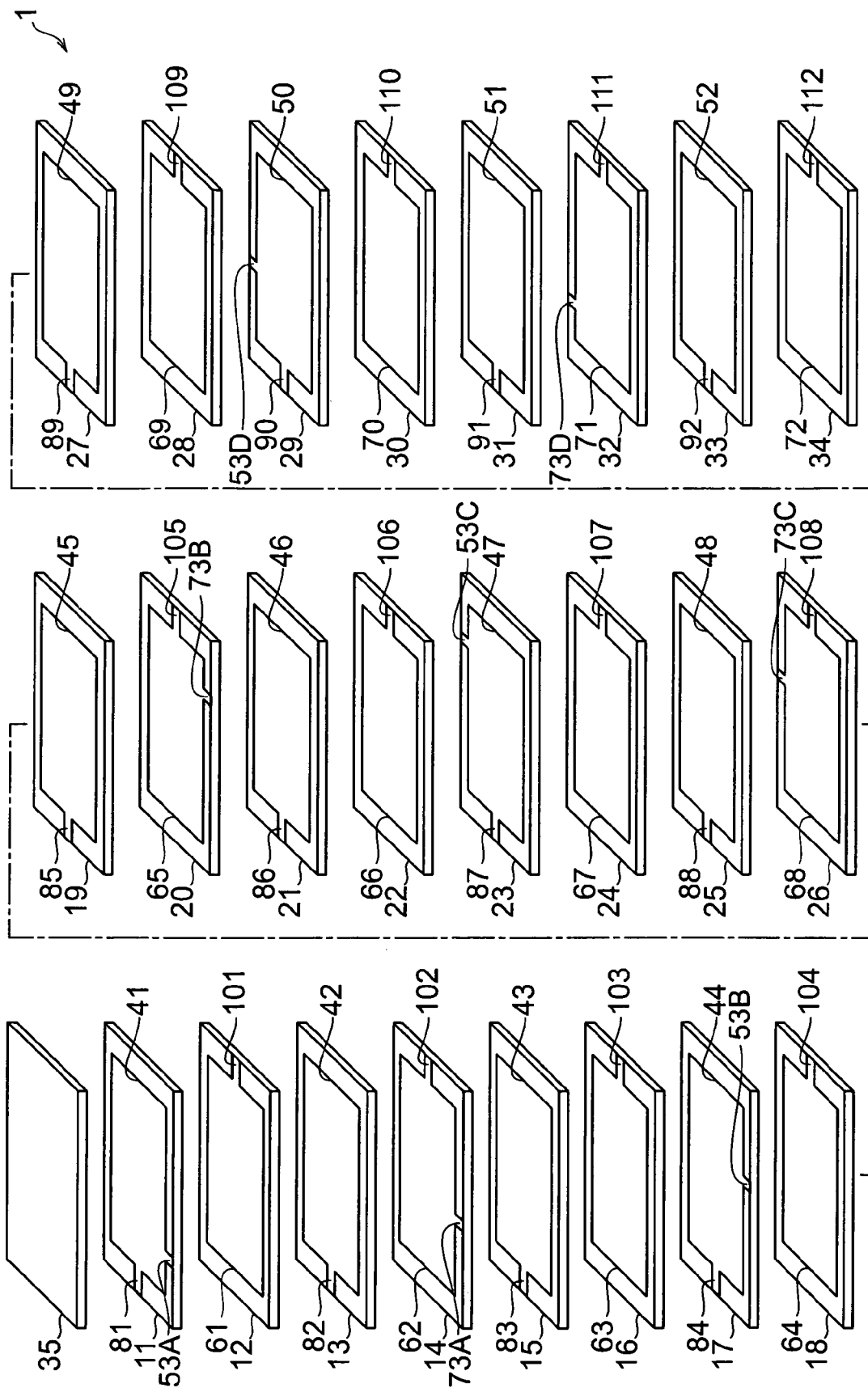
FIG. 19 is an exploded perspective view of the multilayer body included in the multilayer capacitor in accordance with a seventeenth embodiment.

With reference to FIG. 19, the structure of the multilayer capacitor in accordance with a seventeenth embodiment will be explained. The multilayer capacitor in accordance with the seventeenth embodiment differs from the multilayer capacitor in accordance with the sixteenth embodiment in terms of the position of second inner electrodes electrically connected to second terminal electrodes 5A to 5D through lead conductors 73A to 73D in the laminating direction. FIG. 19 is an exploded perspective view of the multilayer body included in the multilayer capacitor in accordance with the seventeenth embodiment.

As with the multilayer capacitor C2 in accordance with the fourteenth embodiment, the multilayer capacitor in accordance with the seventeenth embodiment comprises a multilayer body 1, first terminal electrodes 3A to 3D formed on the multilayer body 1, the second terminal electrodes 5A to 5D similarly formed on the multilayer body 1, and first and second connecting conductors 7, 9, which are not depicted.

In the multilayer capacitor in accordance with the seventeenth embodiment, as shown in FIG. 19, a second inner electrode 62 is electrically connected to the second terminal electrode 5A through a lead conductor 73A. A second inner electrode 65 is electrically connected to the second terminal electrode 5B through a lead conductor 73B. A second inner electrode 68 is electrically connected to the second terminal electrode 5C through a lead conductor 73C. A second inner electrode 71 is electrically connected to the second terminal electrode 5D through a lead conductor 73D. As a consequence, second inner electrodes 61, 63, 64, 66, 67, 69, 70, 72 are also electrically connected to the second terminal electrodes 5A to 5D, whereby second inner electrodes 61 to 72 are connected in parallel. The lead conductors 73A, 73B are integrally formed with their corresponding second inner electrodes 62, 64, and extend therefrom so as to reach a side face 1a of the multilayer body 1. The lead conductors 73C, 73D are integrally formed with their corresponding second inner electrodes 67, 70, and extend therefrom so as to reach the side face 1b of the multilayer body 1.

In the multilayer capacitor in accordance with the seventeenth embodiment, the number of first inner electrodes 41, 44, 47, 50 connected to the first terminal electrodes 3A to 3D through lead conductors 53A to 53D is 4, which is smaller than the total number (12 in this embodiment) of the first inner electrodes 41 to 52. The number of second inner electrodes 62, 65, 68, 71 connected to the second terminal electrodes 5A to 5D through the lead conductors 73A to 73D is 4, which is smaller than the total number (12 in this embodiment) of the second inner electrodes 61 to 72. These make the multilayer capacitor in accordance with the seventeenth embodiment attain an equivalent series resistance greater than that of a conventional multilayer capacitor in which all the inner electrodes are connected to their corresponding terminal electrodes through lead conductors.

When the second terminal electrode 5A is concerned, at the second inner electrode 62 as a boundary, the resistance component of the second connecting conductor 9 is divided into the resistance component of the second connecting conductor 9 positioned on one side of the second inner electrode 62 in the laminating direction and the resistance component of the second connecting conductor 9 positioned on the other side of the second inner electrode 62 in the laminating direction. These resistance components are connected in parallel to the second terminal electrode 5A.

When the second terminal electrode 5B is concerned, at the second inner electrode 65 as a boundary, the resistance component of the second connecting conductor 9 is divided into the resistance component of the second connecting conductor 9 positioned on one side of the second inner electrode 65 in the laminating direction and the resistance component of the second connecting conductor 9 positioned on the other side of the second inner electrode 65 in the laminating direction. These resistance components are connected in parallel to the second terminal electrode 5B.

When the second terminal electrode 5C is concerned, at the second inner electrode 68 as a boundary, the resistance component of the second connecting conductor 9 is divided into the resistance component of the second connecting conductor 9 positioned on one side of the second inner electrode 68 in the laminating direction and the resistance component of the second connecting conductor 9 positioned on the other side of the second inner electrode 68 in the laminating direction. These resistance components are connected in parallel to the second terminal electrode 5C.

When the second terminal electrode 5D is concerned, at the second inner electrode 71 as a boundary, the resistance component of the second connecting conductor 9 is divided into the resistance component of the second connecting conductor 9 positioned on one side of the second inner electrode 71 in the laminating direction and the resistance component of the second connecting conductor 9 positioned on the other side of the second inner electrode 71 in the laminating direction. These resistance components are connected in parallel to the second terminal electrode 5D.

Because of the difference in resistance components between the first and second connecting conductors 7, 9 mentioned above, the multilayer capacitor in accordance with the seventeenth embodiment yields an equivalent series resistance smaller than that in the multilayer capacitor C2 in accordance with the fourteenth embodiment.

By adjusting each of the number of first inner electrodes 41, 44, 47, 50 electrically connected to the first terminal electrodes 3A to 3D through the lead conductors 53A to 53D and the number of second inner electrodes 62, 65, 68, 71 electrically connected to the second terminal electrodes 5A to 5D through the lead conductors 73A to 73D as in the foregoing, this embodiment sets the equivalent series resistance of the multilayer capacitor to a desirable value and thus can regulate the equivalent series resistance easily with a high precision.

Eighteenth Embodiment

Figure 20:
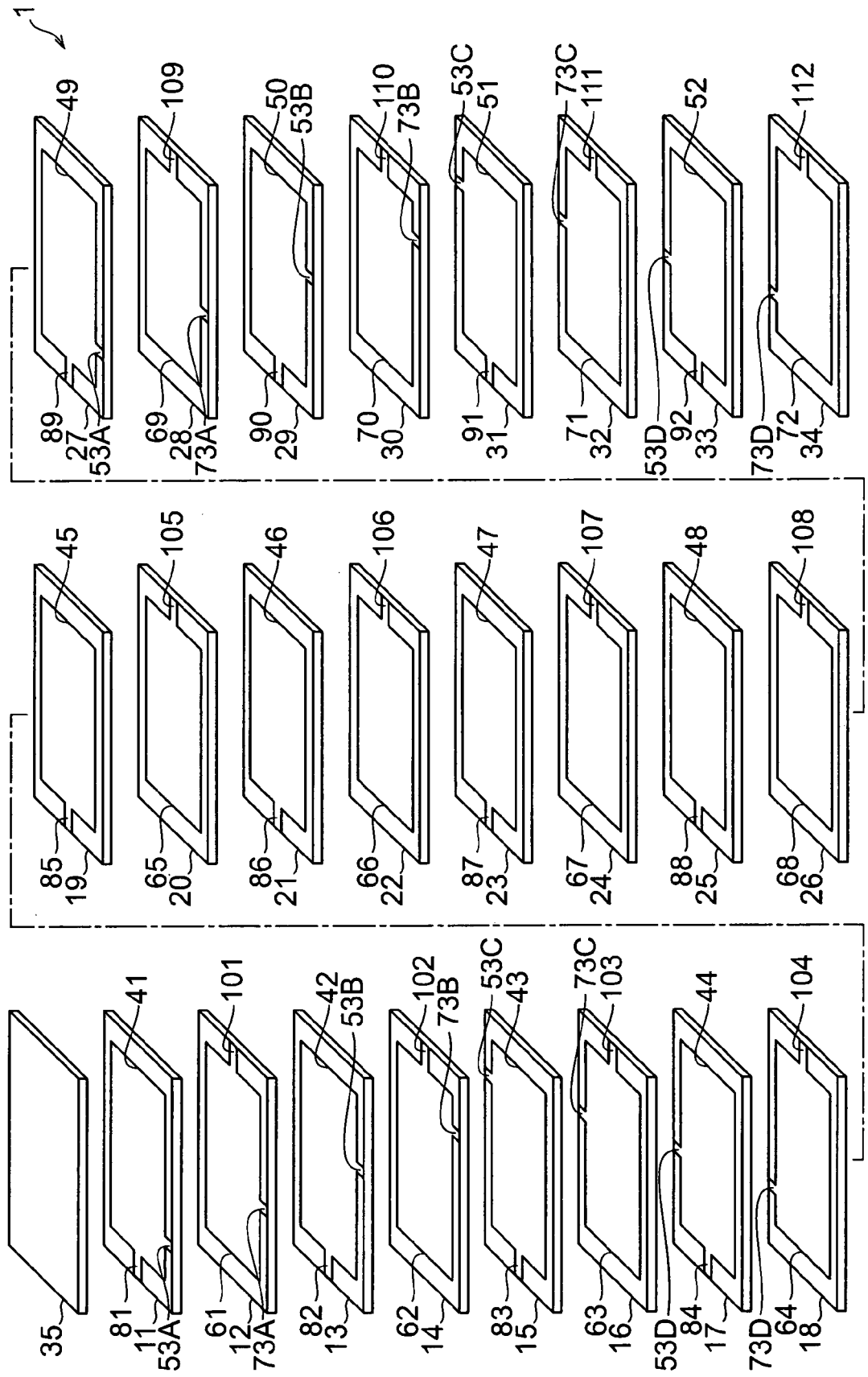
FIG. 20 is an exploded perspective view of the multilayer body included in the multilayer capacitor in accordance with an eighteenth embodiment.

With reference to FIG. 20, the structure of the multilayer capacitor in accordance with an eighteenth embodiment will be explained. The multilayer capacitor in accordance with the eighteenth embodiment differs from the multilayer capacitor C2 in accordance with the fourteenth embodiment in terms of the number of first inner electrodes electrically connected to first terminal electrodes 3A to 3D through lead conductors 53A to 53D and the number of second inner electrodes electrically connected to second terminal electrodes 5A to 5D through lead conductors 73A to 73D. FIG. 20 is an exploded perspective view of the multilayer body included in the multilayer capacitor in accordance with the eighteenth embodiment.

As with the multilayer capacitor C2 in accordance with the fourteenth embodiment, the multilayer capacitor in accordance with the eighteenth embodiment comprises a multilayer body 1, the first terminal electrodes 3A to 3D formed on the multilayer body 1, the second terminal electrodes 5A to 5D similarly formed on the multilayer body 1, and first and second connecting conductors 7, 9, which are not depicted.

In the multilayer capacitor in accordance with the eighteenth embodiment, as shown in FIG. 20, a first inner electrode 49 is electrically connected to the first terminal electrode 3A through a lead conductor 53A. A first inner electrode 50 is electrically connected to the first terminal electrode 3B through a lead conductor 53B. A first inner electrode 51 is electrically connected to the first terminal electrode 3C through a lead conductor 53C. A first inner electrode 52 is electrically connected to the first terminal electrode 3D through a lead conductor 53D. As a consequence, first inner electrodes 45 to 48 are also electrically connected to the first terminal electrodes 3A to 3D, whereby first inner electrodes 41 to 52 are connected in parallel. The lead conductors 53A, 53B are integrally formed with their corresponding first inner electrodes 49, 50, and extend therefrom so as to reach a side face 1a of the multilayer body 1. The lead conductors 53C, 53D are integrally formed with their corresponding first inner electrodes 51, 52, and extend therefrom so as to reach a side face 1b of the multilayer body 1.

A second inner electrode 69 is electrically connected to the second terminal electrode 5A through a lead conductor 73A. A second inner electrode 70 is electrically connected to the second terminal electrode 5B through a lead conductor 73B. A second inner electrode 71 is electrically connected to the second terminal electrode 5C through a lead conductor 73C. A second inner electrode 72 is electrically connected to the second terminal electrode 5D through a lead conductor 73D. As a consequence, second inner electrodes 65 to 68 are also electrically connected to the second terminal electrodes 5A to 5D, whereby second inner electrodes 61 to 72 are connected in parallel. The lead conductors 73A, 73B are integrally formed with their corresponding second inner electrodes 69, 70, and extend therefrom so as to reach the side face 1a of the multilayer body 1. The lead conductors 73C, 73D are integrally formed with their corresponding second inner electrodes 71, 72, and extend therefrom so as to reach the side face 1b of the multilayer body 1.

In the multilayer capacitor in accordance with the eighteenth embodiment, the number of first inner electrodes 41 to 44, 49 to 52 connected to the first terminal electrodes 3A to 3D through the lead conductors 53A to 53D is 8, which is smaller than the total number of the first inner electrodes 41 to 52. The number of second inner electrodes 61 to 64, 69 to 72 connected to the second terminal electrodes 5A to 5D through the lead conductors 73A to 73D is 8, which is smaller than the total number of the second inner electrodes 61 to 72. These make the multilayer capacitor in accordance with the eighteenth embodiment attain an equivalent series resistance greater than that of a conventional multilayer capacitor in which all the inner electrodes are connected to their corresponding terminal electrodes through lead conductors.

In the multilayer capacitor in accordance with the eighteenth embodiment, the number of first inner electrodes 41 to 44, 49 to 52 connected to the first terminal electrodes 3A to 3D through the lead conductors 53A to 53D is greater than that in the multilayer capacitor C2, whereas the lead conductors 53A to 53D are connected in parallel to their corresponding first terminal electrodes 3A to 3D. Also, the number of second inner electrodes 61 to 64, 69 to 72 connected to the second terminal electrodes 5A to 5D through the lead conductors 73A to 73D is greater, whereas the lead conductors 73A to 73D are connected in parallel to their corresponding second terminal electrodes 5A to 5D. These make the multilayer capacitor in accordance with the eighteenth embodiment yield an equivalent series resistance smaller than that of the multilayer capacitor C2.

By adjusting each of the number of first inner electrodes 41 to 44, 49 to 52 electrically connected to the first terminal electrodes 3A to 3D through the lead conductors 53A to 53D and the number of second inner electrodes 61 to 64, 69 to 72 electrically connected to the second terminal electrodes 5A to 5D through the lead conductors 73A to 73D in the laminating direction as in the foregoing, this embodiment sets the equivalent series resistance of the multilayer capacitor to a desirable value and thus can regulate the equivalent series resistance easily with a high precision.

Nineteenth Embodiment

Figure 21:
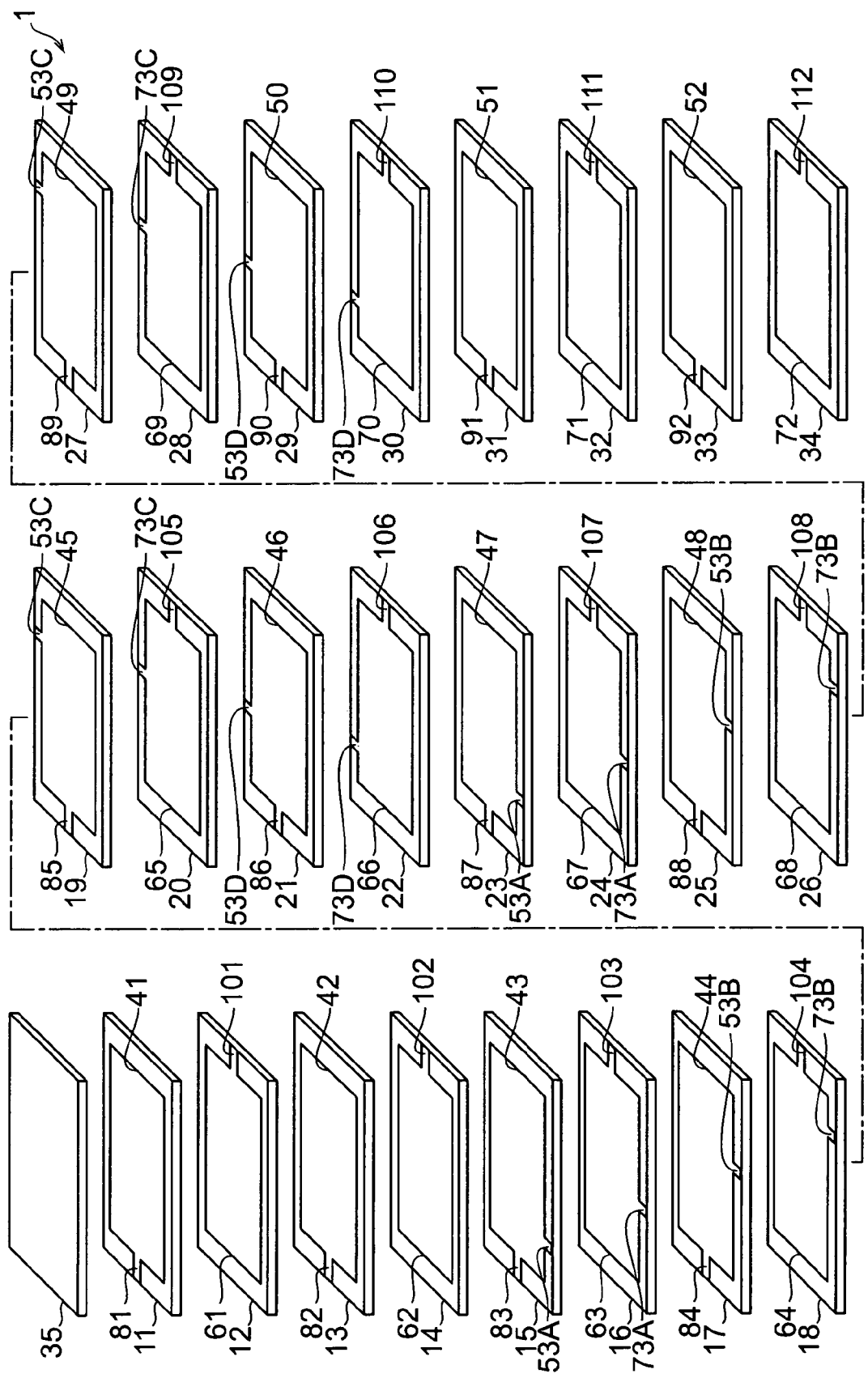
FIG. 21 is an exploded perspective view of the multilayer body included in the multilayer capacitor in accordance with a nineteenth embodiment.

With reference to FIG. 21, the structure of the multilayer capacitor in accordance with a nineteenth embodiment will be explained. The multilayer capacitor in accordance with the nineteenth embodiment differs from the multilayer capacitor C2 in accordance with the fourteenth embodiment in terms of the number of first inner electrodes electrically connected to first terminal electrodes 3A to 3D through lead conductors 53A to 53D and the number of second inner electrodes electrically connected to second terminal electrodes 5A to 5D through lead conductors 73A to 73D. The multilayer capacitor in accordance with the nineteenth embodiment also differs from the multilayer capacitor in accordance with the eighteenth embodiment in terms of the position of first inner electrodes electrically connected to the first terminal electrodes 3A to 3D through the lead conductors 53A to 53D in the laminating direction and the position of second inner electrodes electrically connected to the second terminal electrodes 5A to SD through the lead conductors 73A to 73D in the laminating direction. FIG. 21 is an exploded perspective view of the multilayer body included in the multilayer capacitor in accordance with the nineteenth embodiment.

As with the multilayer capacitor C2 in accordance with the fourteenth embodiment, the multilayer capacitor in accordance with the nineteenth embodiment comprises a multilayer body 1, the first terminal electrodes 3A to 3D formed on the multilayer body 1, the second terminal electrodes 5A to 5D similarly formed on the multilayer body 1, and first and second connecting conductors 7, 9, which are not depicted.

In the multilayer capacitor in accordance with the nineteenth embodiment, as shown in FIG. 21, first inner electrodes 43, 47 are electrically connected to the first terminal electrode 3A through their corresponding lead conductors 53A. First inner electrodes 44, 48 are electrically connected to the first terminal electrode 3C through their corresponding lead conductors 53B. First inner electrodes 45, 49 are electrically connected to the first terminal electrode 3C through their corresponding lead conductors 53C. First inner electrodes 46, 50 are electrically connected to the first terminal electrode 3D through their corresponding lead conductors 53D. As a consequence, first inner electrodes 41, 42, 51, 52 are also electrically connected to the first terminal electrodes 3A to 3D, whereby first inner electrodes 41 to 52 are connected in parallel. The lead conductors 53A, 53B are integrally formed with their corresponding first inner electrodes 43, 44, 47, 48, and extend therefrom so as to reach a side face 1a of the multilayer body 1. The lead conductors 53C, 53D are integrally formed with their corresponding first inner electrodes 45, 46, 49, 50, and extend therefrom so as to reach a side face 1b of the multilayer body 1.

Second inner electrodes 63, 67 are electrically connected to the second terminal electrode 5A through their corresponding lead conductors 73A. Second inner electrodes 64, 68 are electrically connected to the second terminal electrode 5B through their corresponding lead conductors 73B. Second inner electrodes 65, 69 are electrically connected to the second terminal electrode 5C through their corresponding lead conductors 73C. Second inner electrodes 66, 70 are electrically connected to the second terminal electrode SD through their corresponding lead conductors 73D. As a consequence, second inner electrodes 61, 62, 71, 72 are also electrically connected to the second terminal electrodes 5A to 5D, whereby second inner electrodes 61 to 72 are connected in parallel. The lead conductors 73A, 73B are integrally formed with their corresponding second inner electrodes 63, 64, 67, 68, and extend therefrom so as to reach the side face 1a of the multilayer body 1. The lead conductors 73C, 73D are integrally formed with their corresponding second inner electrodes 65, 66, 69, 70, and extend therefrom so as to reach the side face 1b of the multilayer body 1.

In the multilayer capacitor in accordance with the nineteenth embodiment, the number of first inner electrodes 43 to 50 connected to the first terminal electrodes 3A to 3D through the lead conductors 53A to 53D is 8, which is smaller than the total number of the first inner electrodes 41 to 52. The number of second inner electrodes 63 to 70 connected to the second terminal electrodes 5A to 5D through the lead conductors 73A to 73D is 8, which is smaller than the total number of the second inner electrodes 61 to 72. These make the multilayer capacitor in accordance with the nineteenth embodiment attain an equivalent series resistance greater than that of a conventional multilayer capacitor in which all the inner electrodes are connected to their corresponding terminal electrodes through lead conductors.

In the multilayer capacitor in accordance with the nineteenth embodiment, the number of first inner electrodes 43 to 50 connected to the first terminal electrodes 3A to 3D through the lead conductors 53A to 53D is greater than that in the multilayer capacitor C2, whereas the lead conductors 53A to 53D are connected in parallel to their corresponding first terminal electrodes 3A to 3D. Also, the number of second inner electrodes 63 to 70 connected to the second terminal electrodes 5A to 5D through the lead conductors 73A to 73D is greater, whereas the lead conductors 73A to 73D are connected in parallel to their corresponding second terminal electrodes 5A to 5D. These make the multilayer capacitor in accordance with the nineteenth embodiment yield an equivalent series resistance smaller than that of the multilayer capacitor C2.

As in the fifteenth to seventeenth embodiments, because of the difference in resistance components between the first and second connecting conductors 7, 9, the multilayer capacitor in accordance with the nineteenth embodiment yields an equivalent series resistance smaller than that in the multilayer capacitor in accordance with the eighteenth embodiment.

By adjusting each of the number and position in the laminating direction of first inner electrodes 43 to 50 connected to the first terminal electrodes 3A to 3D through the lead conductors 53A to 53D and the number and position in the laminating direction of second inner electrodes 63 to 70 connected to the second terminal electrodes 5A to 5D through the lead conductors 73A to 73D as in the foregoing, this embodiment sets the equivalent series resistance of the multilayer capacitor to a desirable value and thus can regulate the equivalent series resistance easily with a high precision.

Twentieth Embodiment

Figure 22:
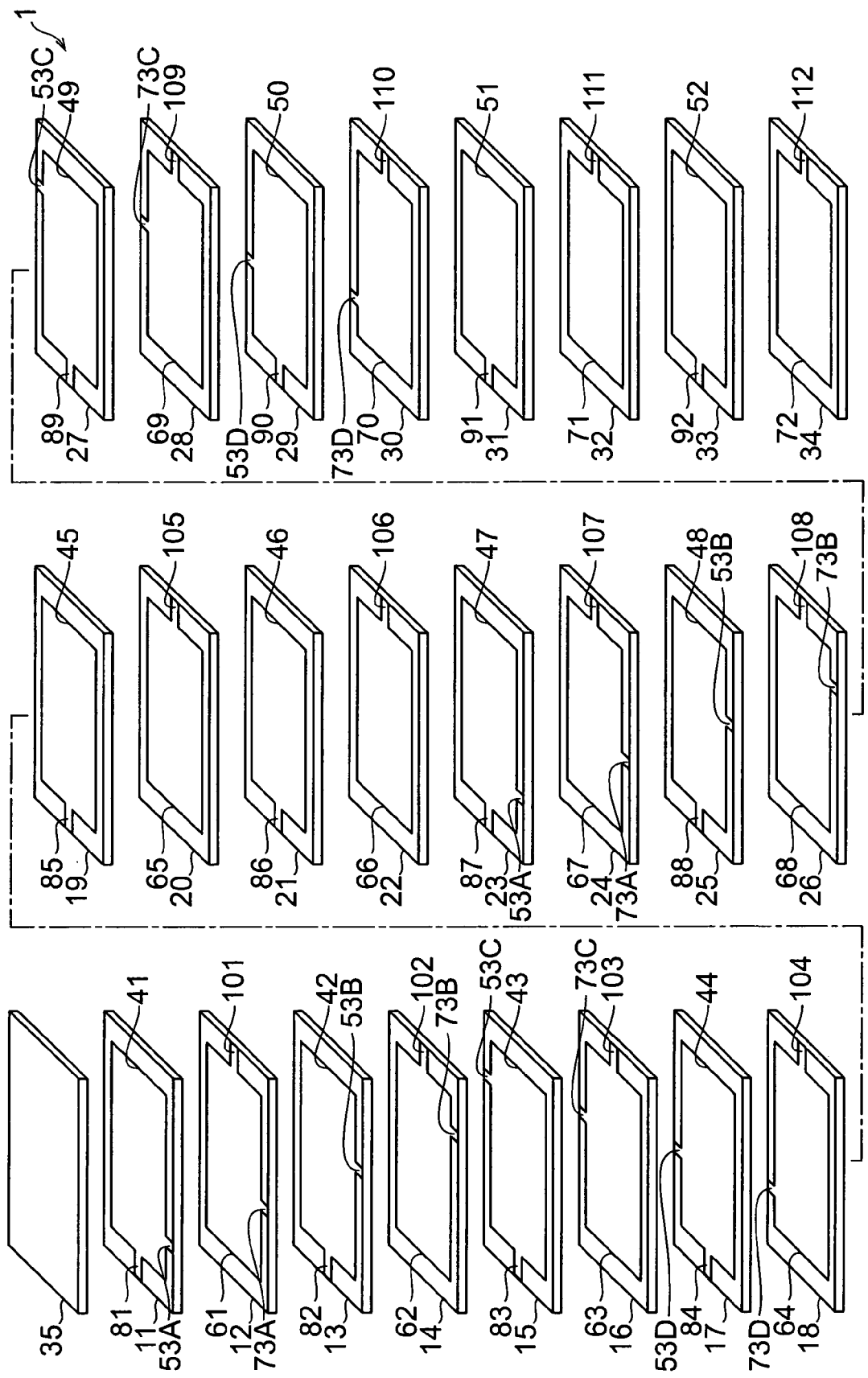
FIG. 22 is an exploded perspective view of the multilayer body included in the multilayer capacitor in accordance with a twentieth embodiment.

With reference to FIG. 22, the structure of the multilayer capacitor in accordance with a twentieth embodiment will be explained. The multilayer capacitor in accordance with the twentieth embodiment differs from the multilayer capacitor C2 in accordance with the fourteenth embodiment in terms of the number of first inner electrodes electrically connected to first terminal electrodes 3A to 3D through lead conductors 53A to 53D and the number of second inner electrodes electrically connected to second terminal electrodes 5A to 5D through lead conductors 73A to 73D. The multilayer capacitor in accordance with the twentieth embodiment also differs from the multilayer capacitor in accordance with the eighteenth embodiment in terms of the position of first inner electrodes electrically connected to the first terminal electrodes 3A to 3D through the lead conductors 53A to 53D in the laminating direction and the position of second inner electrodes electrically connected to the second terminal electrodes 5A to 5D through the lead conductors 73A to 73D in the laminating direction. FIG. 22 is an exploded perspective view of the multilayer body included in the multilayer capacitor in accordance with the twentieth embodiment.

As with the multilayer capacitor C2 in accordance with the fourteenth embodiment, the multilayer capacitor in accordance with the twentieth embodiment comprises a multilayer body 1, the first terminal electrodes 3A to 3D formed on the multilayer body 1, the second terminal electrodes 5A to 5D similarly formed on the multilayer body 1 and first and second connecting conductors 7, 9, which are not depicted.

In the multilayer capacitor in accordance with the twentieth embodiment, the number of first inner electrodes 41 to 44, 47 to 50 connected to the first terminal electrodes 3A to 3D through the lead conductors 53A to 53D is 8, which is smaller than the total number of the first inner electrodes 41 to 52. The number of second inner electrodes 61 to 64, 67 to 70 connected to the second terminal electrodes 5A to 5D through the lead conductors 73A to 73D is 8, which is smaller than the total number of the second inner electrodes 61 to 72. These make the multilayer capacitor in accordance with the twentieth embodiment attain an equivalent series resistance greater than that of a conventional multilayer capacitor in which all the inner electrodes are connected to their corresponding terminal electrodes through lead conductors.

In the multilayer capacitor in accordance with the twentieth embodiment, the number of first inner electrodes 41 to 44, 47 to 50 connected to the first terminal electrodes 3A to 3D through the lead conductors 53A to 53D is greater than that in the multilayer capacitor C2, whereas the lead conductors 53A to 53D are connected in parallel to their corresponding first terminal electrodes 3A to 3D. Also, the number of second inner electrodes 61 to 64, 67 to 70 connected to the second terminal electrodes 5A to 5D through the lead conductors 73A to 73D is greater, whereas the lead conductors 73A to 73D are connected in parallel to their corresponding second terminal electrodes 5A to 5D. These make the multilayer capacitor in accordance with the twentieth embodiment yield an equivalent series resistance smaller than that of the multilayer capacitor C2.

As in the fifteenth to seventeenth embodiments, because of the difference in resistance components between the first and second connecting conductors 7, 9, the multilayer capacitor in accordance with the twentieth embodiment yields an equivalent series resistance smaller than that in the multilayer capacitor in accordance with the eighteenth embodiment.

By adjusting each of the number and position in the laminating direction of first inner electrodes 41 to 44, 47 to 50 connected to the first terminal electrodes 3A to 3D through the lead conductors 53A to 53D and the number and position in the laminating direction of second inner electrodes 61 to 64, 67 to 70 connected to the second terminal electrodes 5A to 5D through the lead conductors 73A to 73D as in the foregoing, this embodiment sets the equivalent series resistance of the multilayer capacitor to a desirable value and thus can regulate the equivalent series resistance easily with a high precision.

Twenty-first Embodiment

Figure 23:
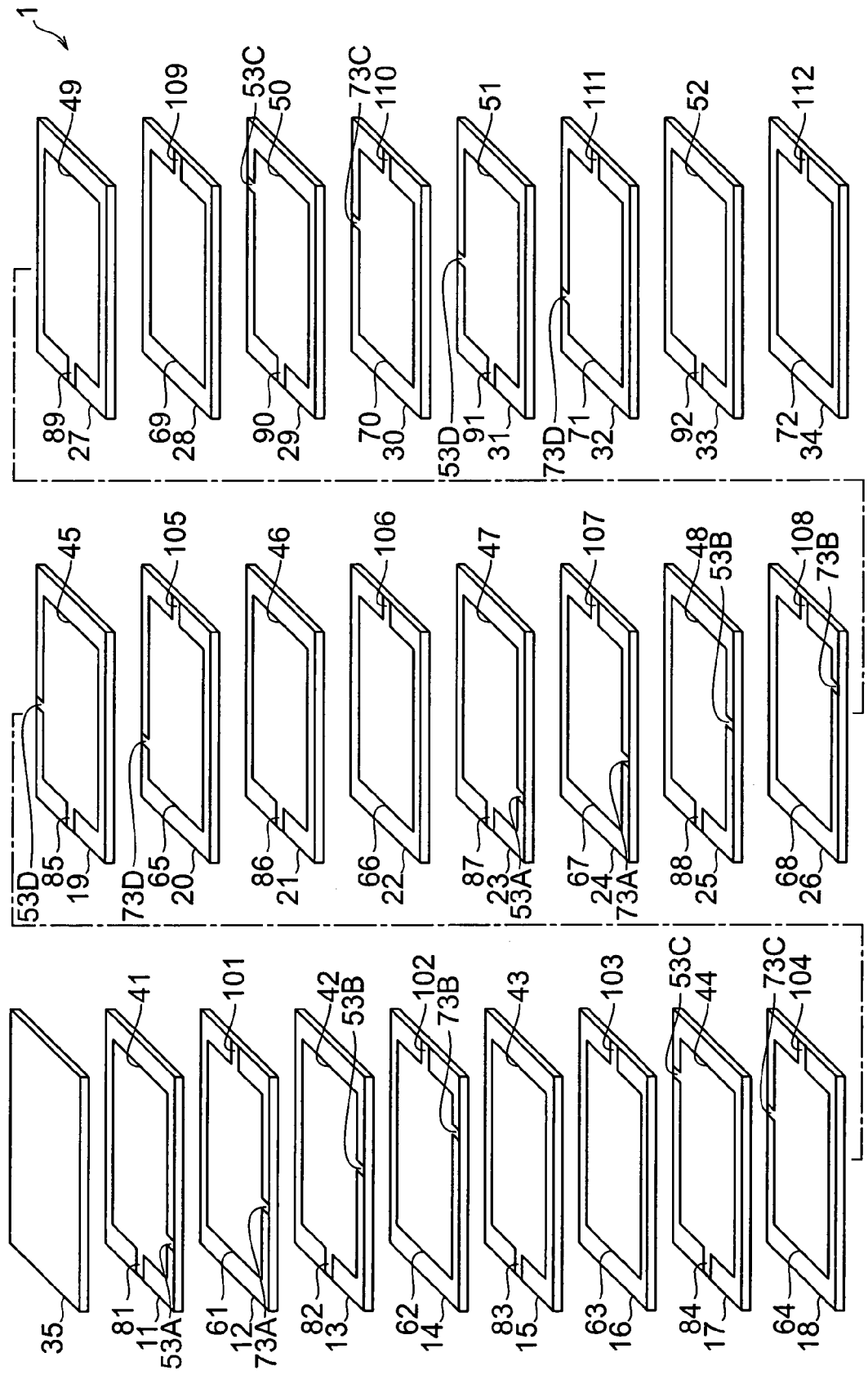
FIG. 23 is an exploded perspective view of the multilayer body included in the multilayer capacitor in accordance with a twenty-first embodiment.

With reference to FIG. 23, the structure of the multilayer capacitor in accordance with a twenty-first embodiment will be explained. The multilayer capacitor in accordance with the twenty-first embodiment differs from the multilayer capacitor C2 in accordance with the fourteenth embodiment in terms of the number of first inner electrodes electrically connected to first terminal electrodes 3A to 3D through lead conductors 53A to 53D and the number of second inner electrodes electrically connected to second terminal electrodes 5A to 5D through lead conductors 73A to 73D. The multilayer capacitor in accordance with the twentieth embodiment also differs from the multilayer capacitor in accordance with the eighteenth embodiment in terms of the position of first inner electrodes electrically connected to the first terminal electrodes 3A to 3D through the lead conductors 53A to 53D in the laminating direction and the position of second inner electrodes electrically connected to the second terminal electrodes 5A to 5D through the lead conductors 73A to 73D in the laminating direction. FIG. 23 is an exploded perspective view of the multilayer body included in the multilayer capacitor in accordance with the twenty-first embodiment.

As with the multilayer capacitor C2 in accordance with the fourteenth embodiment, the multilayer capacitor in accordance with the twenty-first embodiment comprises a multilayer body 1, the first terminal electrodes 3A to 3D formed on the multilayer body 1, the second terminal electrodes 5A to 5D similarly formed on the multilayer body 1, and first and second connecting conductors 7, 9, which are not depicted.

In the multilayer capacitor in accordance with the twenty-first embodiment, the number of first inner electrodes 41, 42, 44, 45, 47, 48, 50, 51 connected to the first terminal electrodes 3A to 3D through the lead conductors 53A to 53D is 8, which is smaller than the total number of the first inner electrodes 41 to 52. The number of second inner electrodes 61, 62, 64, 65, 67, 68, 70, 71 connected to the second terminal electrodes 5A to 5D through the lead conductors 73A to 73D is 8, which is smaller than the total number of the second inner electrodes 61 to 72. These make the multilayer capacitor in accordance with the twenty-first embodiment attain an equivalent series resistance greater than that of a conventional multilayer capacitor in which all the inner electrodes are connected to their corresponding terminal electrodes through lead conductors.

In the multilayer capacitor in accordance with the twenty-first embodiment, the number of first inner electrodes 41, 42, 44, 45, 47, 48, 50, 51 connected to the first terminal electrodes 3A to 3D through the lead conductors 53A to 53D is greater than that in the multilayer capacitor C2, whereas the lead conductors 53A to 53D are connected in parallel to their corresponding first terminal electrodes 3A to 3D. Also, the number of second inner electrodes 61, 62, 64, 65, 67, 68, 70, 71 connected to the second terminal electrodes 5A to 5D through the lead conductors 73A to 73D is greater, whereas the lead conductors 73A to 73D are connected in parallel to their corresponding second terminal electrodes 5A to 5D. These make the multilayer capacitor in accordance with the twenty-first embodiment yield an equivalent series resistance smaller than that of the multilayer capacitor C2.

As in the fifteenth to seventeenth embodiments, because of the difference in resistance components between the first and second connecting conductors 7, 9, the multilayer capacitor in accordance with the twenty-first embodiment yields an equivalent series resistance smaller than that in the multilayer capacitor in accordance with the eighteenth embodiment.

By adjusting each of the number and position in the laminating direction of first inner electrodes 41, 42, 44, 45, 47, 48, 50, 51 connected to the first terminal electrodes 3A to 3D through the lead conductors 53A to 53D and the number and position in the laminating direction of second inner electrodes 61, 62, 64, 65, 67, 68, 70, 71 connected to the second terminal electrodes 5A to 5D through the lead conductors 73A to 73D as in the foregoing, this embodiment sets the equivalent series resistance of the multilayer capacitor to a desirable value and thus can regulate the equivalent series resistance easily with a high precision.

Twenty-second Embodiment

Figure 24:
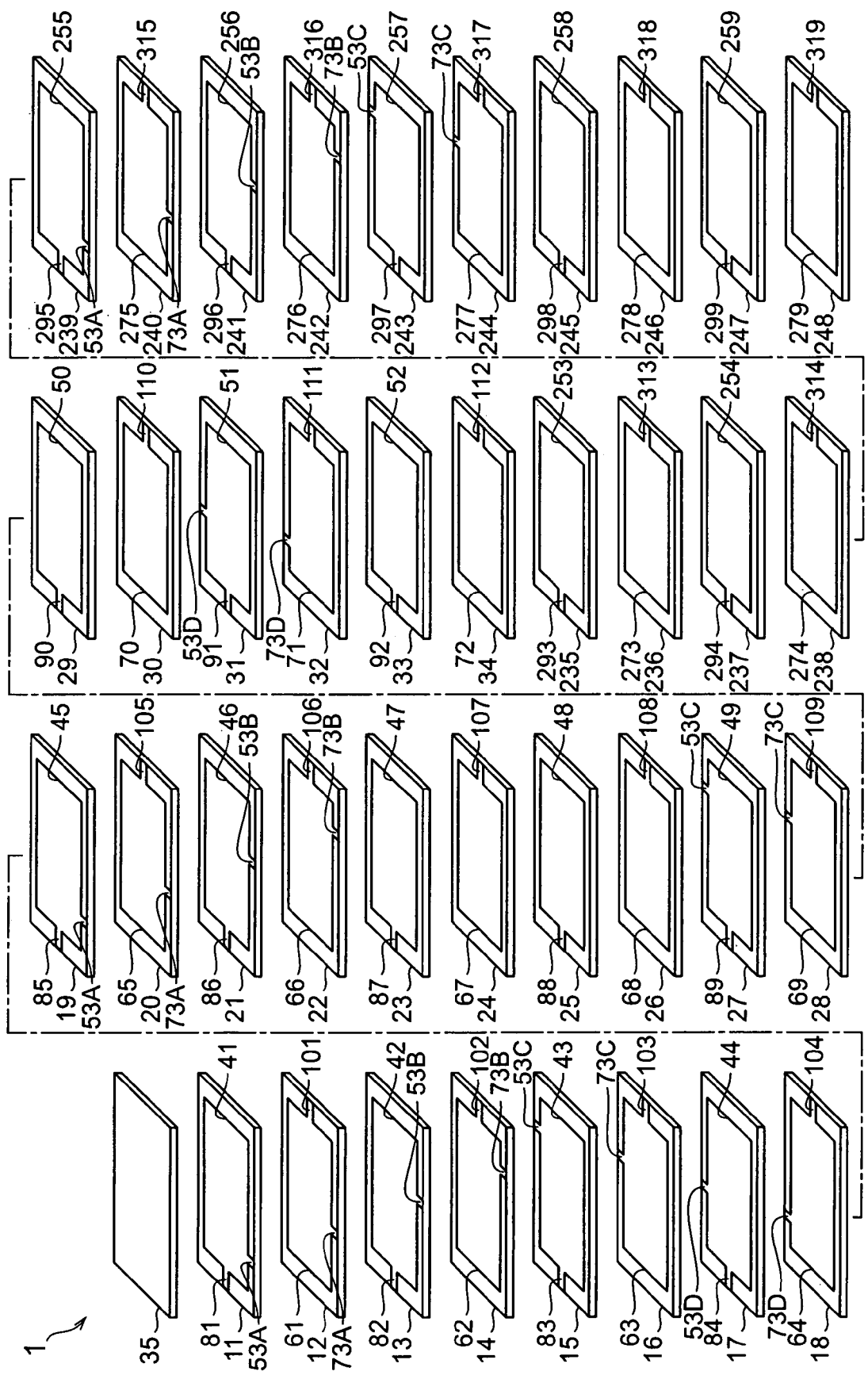
FIG. 24 is an exploded perspective view of the multilayer body included in the multilayer capacitor in accordance with a twenty-second embodiment.

With reference to FIG. 24, the structure of the multilayer capacitor in accordance with a twenty-second embodiment will be i explained. FIG. 24 is an exploded perspective view of the multilayer body included in the multilayer capacitor in accordance with the twenty-second embodiment.

As with the multilayer capacitor C2 in accordance with the fourteenth embodiment, the multilayer capacitor in accordance with the twenty-second embodiment comprises a multilayer body 1, first terminal electrodes 3A to 3D formed on the multilayer body 1, second terminal electrodes 5A to 5D similarly formed on the multilayer body 1, and first and second connecting conductors 7, 9, which are not depicted.

As shown in FIG. 24, the multilayer body 1 is constructed by alternately laminating a plurality of (39 in this embodiment) dielectric layers 11 to 35, 235 to 248 and a plurality of (19 each in this embodiment) first and second inner electrodes 41 to 52, 253 to 259, 61 to 72, 273 to 279. In the actual multilayer capacitor, the dielectric layers 11 to 35, 235 to 248 are integrated to such an extent that no boundaries are discernible therebetween.

Each of the first inner electrodes 41 to 52, 253 to 259 has a substantially rectangular form. The first inner electrodes 41 to 52, 253 to 259 are formed at respective positions separated by a predetermined distance from a side face parallel to the laminating direction of the dielectric layers 11 to 35, 235 to 248 in the multilayer body 1 (hereinafter simply referred to as "laminating direction"). The first inner electrodes 41 to 52, 253 to 259 are formed with respective lead conductors 81 to 92, 293 to 299 extending so as to reach a side face 1c of the multilayer body 1.

The lead conductor 81 is integrally formed with the first inner electrode 41, and extends therefrom so as to reach the side face 1c of the multilayer body 1. The lead conductor 82 is integrally formed with the first inner electrode 42, and extends therefrom so as to reach the side face 1c of the multilayer body 1. The lead conductor 83 is integrally formed with the first inner electrode 43, and extends therefrom so as to reach the side face 1c of the multilayer body 1. The lead conductor 84 is integrally formed with the first inner electrode 44, and extends therefrom so as to reach the side face 1c of the multilayer body 1. The lead conductor 85 is integrally formed with the first inner electrode 45, and extends therefrom so as to reach the side face 1c of the multilayer body 1. The lead conductor 86 is integrally formed with the first inner electrode 46, and extends therefrom so as to reach the side face 1c of the multilayer body 1. The lead conductor 87 is integrally formed with the first inner electrode 47, and extends therefrom so as to reach the side face 1c of the multilayer body 1. The lead conductor 88 is integrally formed with the first inner electrode 48, and extends therefrom so as to reach the side face 1c of the multilayer body 1. The lead conductor 89 is integrally formed with the first inner electrode 49, and extends therefrom so as to reach the side face 1c of the multilayer body 1. The lead conductor 90 is integrally formed with the first inner electrode 50, and extends therefrom so as to reach the side face 1c of the multilayer body 1. The lead conductor 91 is integrally formed with the first inner electrode 51, and extends therefrom so as to reach the side face 1c of the multilayer body 1. The lead conductor 92 is integrally formed with the first inner electrode 52, and extends therefrom so as to reach the side face 1c of the multilayer body 1. The lead conductor 293 is integrally formed with the first inner electrode 253, and extends therefrom so as to reach the side face 1c of the multilayer body 1. The lead conductor 294 is integrally formed with the first inner electrode 254, and extends therefrom so as to reach the side face 1c of the multilayer body 1. The lead conductor 295 is integrally formed with the first inner electrode 255, and extends therefrom so as to reach the side face 1c of the multilayer body 1. The lead conductor 296 is integrally formed with the first inner electrode 256, and extends therefrom so as to reach the side face 1c of the multilayer body 1. The lead conductor 297 is integrally formed with the first inner electrode 257, and extends therefrom so as to reach the side face 1c of the multilayer body 1. The lead conductor 298 is integrally formed with the first inner electrode 258, and extends therefrom so as to reach the side face 1c of the multilayer body 1. The lead conductor 299 is integrally formed with the first inner electrode 259, and extends therefrom so as to reach the side face 1c of the multilayer body 1.

The first inner electrodes 41 to 52, 253 to 259 are electrically connected to the first connecting conductor 7 through their corresponding lead conductors 81 to 92, 293 to 299. As a consequence, the first inner electrodes 41 to 52, 253 to 259 are electrically connected to each other through the first connecting conductor 7.

The first inner electrode 41 is electrically connected to the first terminal electrode 3A through a lead conductor 53A. The first inner electrode 42 is electrically connected to the first terminal electrode 3B through a lead conductor 53B. The first inner electrode 43 is electrically connected to the first terminal electrode 3C through a lead conductor 53C. The first inner electrode 44 is electrically connected to the first terminal electrode 3D through a lead conductor 53D. The first inner electrode 45 is electrically connected to the first terminal electrode 3A through a lead conductor 53A. The first inner electrode 46 is electrically connected to the first terminal electrode 3B through a lead conductor 53B. The first inner electrode 49 is electrically connected to the first terminal electrode 3C through a lead conductor 53C. The first inner electrode 51 is electrically connected to the first terminal electrode 3D through a lead conductor 53D. The first inner electrode 255 is electrically connected to the first terminal electrode 3A through a lead conductor 53A. The first inner electrode 256 is electrically connected to the first terminal electrode 3B through a lead conductor 53B. The first inner electrode 257 is electrically connected to the first terminal electrode 3C through a lead conductor 53C. As a consequence, the first inner electrodes 47, 48, 50, 52, 253, 254, 258, 259 are also electrically connected to the first terminal electrodes 3A to 3D, whereby the first inner electrodes 41 to 52, 253 to 259 are connected in parallel.

The lead conductors 53A, 53B are integrally formed with their corresponding first inner electrodes 41, 42, 45, 46, 255, 256, and extend therefrom so as to reach a side face 1a of the multilayer body 1. The lead conductors 53C, 53D are integrally formed with their corresponding first inner electrodes 43, 44, 49, 51, 257, and extend therefrom so as to reach a side face 1b of the multilayer body 1.

Each of the second inner electrodes 61 to 72, 273 to 279 has a substantially rectangular form. The second inner electrodes 61 to 72, 273 to 279 are formed at respective positions separated by a predetermined distance from a side face parallel to the laminating direction of the multilayer body 1. The second inner electrodes 61 to 72, 273 to 279 are formed with respective lead conductors 101 to 112, 313 to 319 extending so as to reach a side face 1d of the multilayer body 1.

The lead conductor 101 is integrally formed with the second inner electrode 61, and extends therefrom so as to reach the side face 1d of the multilayer body 1. The lead conductor 102 is integrally formed with the second inner electrode 62, and extends therefrom so as to reach the side face 1d of the multilayer body 1. The lead conductor 103 is integrally formed with the second inner electrode 63, and extends therefrom so as to reach the side face 1d of the multilayer body 1. The lead conductor 104 is integrally formed with the second inner electrode 64, and extends therefrom so as to reach the side face 1d of the multilayer body 1. The lead conductor 105 is integrally formed with the second inner electrode 65, and extends therefrom so as to reach the side face 1d of the multilayer body 1. The lead conductor 106 is integrally formed with the second inner electrode 66, and extends therefrom so as to reach the side face 1d of the multilayer body 1. The lead conductor 107 is integrally formed with the second inner electrode 67, and extends therefrom so as to reach the side face 1d of the multilayer body 1. The lead conductor 108 is integrally formed with the second inner electrode 68, and extends therefrom so as to reach the side face 1d of the multilayer body 1. The lead conductor 109 is integrally formed with the second inner electrode 69, and extends therefrom so as to reach the side face 1d of the multilayer body 1. The lead conductor 110 is integrally formed with the second inner electrode 70, and extends therefrom so as to reach the side face 1d of the multilayer body 1. The lead conductor 111 is integrally formed with the second inner electrode 71, and extends therefrom so as to reach the side face 1d of the multilayer body 1. The lead conductor 112 is integrally formed with the second inner electrode 72, and extends therefrom so as to reach the side face 1d of the multilayer body 1. The lead conductor 313 is integrally formed with the second inner electrode 273, and extends therefrom so as to reach the side face 1d of the multilayer body 1. The lead conductor 314 is integrally formed with the second inner electrode 274, and extends therefrom so as to reach the side face 1d of the multilayer body 1. The lead conductor 315 is integrally formed with the second inner electrode 275, and extends therefrom so as to reach the side face 1d of the multilayer body 1. The lead conductor 316 is integrally formed with the second inner electrode 276, and extends therefrom so as to reach the side face 1d of the multilayer body 1. The lead conductor 317 is integrally formed with the second inner electrode 277, and extends therefrom so as to reach the side face 1d of the multilayer body 1. The lead conductor 318 is integrally formed with the second inner electrode 278, and extends therefrom so as to reach the side face 1d of the multilayer body 1. The lead conductor 319 is integrally formed with the second inner electrode 279, and extends therefrom so as to reach the side face 1d of the multilayer body 1.

The second inner electrodes 61 to 72, 273 to 279 are electrically connected to the second connecting conductor 9 through their corresponding lead conductors 101 to 112, 313 to 319. As a consequence, the second inner electrodes 61 to 72, 273 to 279 are electrically connected to each other through the second connecting conductor 7.

The second inner electrode 61 is electrically connected to the second terminal electrode 5A through a lead conductor 73A. The second inner electrode 62 is electrically connected to the second terminal electrode 5B through a lead conductor 73B. The second inner electrode 63 is electrically connected to the second terminal electrode 5C through a lead conductor 73C. The second inner electrode 64 is electrically connected to the second terminal electrode 5D through a lead conductor 73D. The second inner electrode 65 is electrically connected to the second terminal electrode 5A through a lead conductor 73A. The second inner electrode 66 is electrically connected to the second terminal electrode 5B through a lead conductor 73B. The second inner electrode 69 is electrically connected to the second terminal electrode 5C through a lead conductor 73A. The second inner electrode 71 is electrically connected to the second terminal electrode 5D through a lead conductor 73D. The second inner electrode 275 is electrically connected to the second terminal electrode 5A through a lead conductor 73A. The second inner electrode 276 is electrically connected to the second terminal electrode 5B through a lead conductor 73B. As a consequence, second inner electrodes 67, 68, 70, 72, 273, 274, 278, 279 are also electrically connected to the second terminal electrodes 5A to 5D, whereby the second inner electrodes 61 to 72, 273 to 279 are also connected in parallel.

The lead conductors 73A, 73B are integrally formed with their corresponding second inner electrodes 61, 62, 65, 66, 275, 276, and extend therefrom so as to reach the side face 1a of the multilayer body 1. The lead conductors 73C, 73D are integrally formed with their corresponding second inner electrodes 63, 64, 69, 71, 277, and extend therefrom so as to reach the side face 1b of the multilayer body 1.

In the multilayer capacitor in accordance with the twenty-second embodiment, the number of first inner electrodes 41 to 46, 49, 51, 255 to 257 connected to the first terminal electrodes 3A to 3D through the lead conductors 53A to 53D is 11, which is smaller than the total number (19 in this embodiment) of the first inner electrodes 41 to 52, 253 to 259. The number of second inner electrodes 61 to 66, 69, 71, 275 to 277 connected to the second terminal electrodes 5A to 5D through the lead conductors 73A to 73D is 11, which is smaller than the total number (19 in this embodiment) of the second inner electrodes 61 to 72, 273 to 279. These make the multilayer capacitor in accordance with the twenty-second embodiment attain an equivalent series resistance greater than that of a conventional multilayer capacitor in which all the inner electrodes are connected to their corresponding terminal electrodes through lead conductors.

As in the fifteenth to seventeenth embodiments, because of the difference in resistance components between the first and second connecting conductors 7, 9, the multilayer capacitor in accordance with the twenty-second embodiment yields an equivalent series resistance smaller than that in a multilayer capacitor in which the inner electrodes 41 to 46, 49, 51, 255 to 257, 61 to 66, 69, 71, 275 to 277 connected to the terminal electrodes 3A to 3D, 5A to 5D through the lead conductors 53A to 53D, 73A to 73D are alternately arranged in the laminating direction.

By adjusting each of the number and position in the laminating direction of first inner electrodes 41 to 46, 49, 51, 255 to 257 connected to the first terminal electrodes 3A to 3D through the lead conductors 53A to 53D and the number and position in the laminating direction of second inner electrodes 61 to 66, 69, 71, 275 to 277 connected to the second terminal electrodes 5A to 5D through the lead conductors 73A to 73D as in the foregoing, this embodiment sets the equivalent series resistance of the multilayer capacitor to a desirable value and thus can regulate the equivalent series resistance easily with a high precision.

Twenty-third Embodiment

Figure 25:
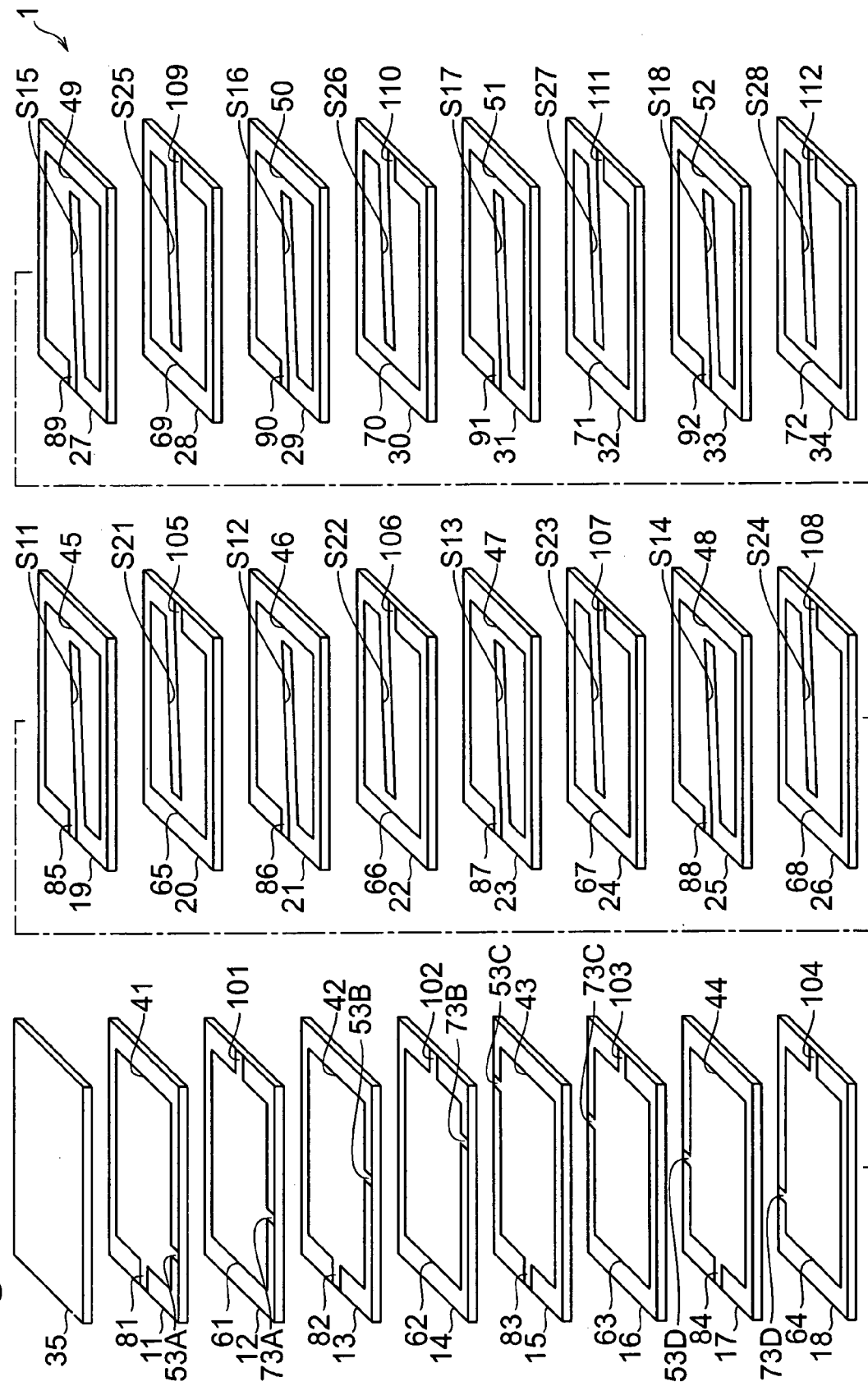
FIG. 25 is an exploded perspective view of the multilayer body included in the multilayer capacitor in accordance with a twenty-third embodiment.

With reference to FIG. 25, the structure of the multilayer capacitor in accordance with a twenty-third embodiment will be explained. The multilayer capacitor in accordance with the twenty-third embodiment differs from the multilayer capacitor C2 in accordance with the fourteenth embodiment in that first and second inner electrodes 45 to 52, 65 to 72 are formed with slits. FIG. 25 is an exploded perspective view of the multilayer body included in the multilayer capacitor in accordance with the twenty-third embodiment.

As with the multilayer capacitor C2 in accordance with the fourteenth embodiment, the multilayer capacitor in accordance with the twenty-third embodiment comprises a multilayer body 1, first terminal electrodes 3A to 3D formed on the multilayer body 1, second terminal electrodes 5A to 5D similarly formed on the multilayer body 1, and first and second connecting conductors 7, 9, which are not depicted.

The first inner electrodes 45 to 52 are formed with slits S11 to S18 extending in the longitudinal direction of the first inner electrodes 45 to 52 from sides of connecting parts between lead conductors 85 to 92 and the first inner electrodes 45 to 52, respectively. Therefore, the slits S11 to S18 are formed in their corresponding first inner electrodes 45 to 52 such that currents flow in directions opposite from each other in areas opposing each other across the slits S11 to S18.

The second inner electrodes 65 to 72 are formed with slits S21 to S28 extending in the longitudinal direction of the second inner electrodes 65 to 72 from sides of connecting parts between lead conductors 105 to 112 and the second inner electrodes 65 to 72, respectively. Therefore, the slits S21 to S28 are formed in their corresponding second inner electrodes 65 to 72 such that currents flow in directions opposite from each other in areas opposing each other across the slits S21 to S28.

In the first and second inner electrodes 45 to 52, 65 to 72 formed with the slits S11 to S18, S21 to S28, currents flow in directions opposite from each other in areas opposing each other across the slits S11 to S18, S21 to S28, whereby magnetic fields caused by the currents cancel each other out. Also, in the laminating direction, currents flow in respective directions opposite from each other in the first inner electrodes 45 to 52 and second inner electrodes 65 to 72 formed with the slits. Therefore, magnetic fields caused by currents flowing through the first inner electrodes 45 to 52 and magnetic fields caused by currents flowing through the second inner electrodes 65 to 72 cancel each other out. Consequently, the multilayer capacitor in accordance with the twenty-third embodiment can reduce its equivalent series inductance.

In the multilayer capacitor in accordance with the twenty-third embodiment, the number of first inner electrodes 41 to 44 connected to the first terminal electrodes 3A to 3D through the lead conductors 53A to 53D is 4, which is smaller than the total number (12 in this embodiment) of first inner electrodes 41 to 52. The number of second inner electrodes 61 to 64 connected to the second terminal electrodes 5A to 5D through lead conductors 73A to 73D is 4, which is smaller than the total number (12 in this embodiment) of second inner electrodes 61 to 72. These make the multilayer capacitor in accordance with the twenty-third embodiment attain an equivalent series resistance greater than that of a conventional multilayer capacitor in which all the inner electrodes are connected to their corresponding terminal electrodes through lead conductors.

By adjusting each of the number of first inner electrodes 41 to 44 connected to the first terminal electrodes 3A to 3D through the lead conductors 53A to 53D and the number of second inner electrodes 61 to 64 connected to the second terminal electrodes 5A to 5D through the lead conductors 73A to 73D as in the foregoing, the twenty-third embodiment sets the equivalent series resistance of the multilayer capacitor to a desirable value and thus can regulate the equivalent series resistance easily with a high precision.

Twenty-fourth Embodiment

Figure 26:
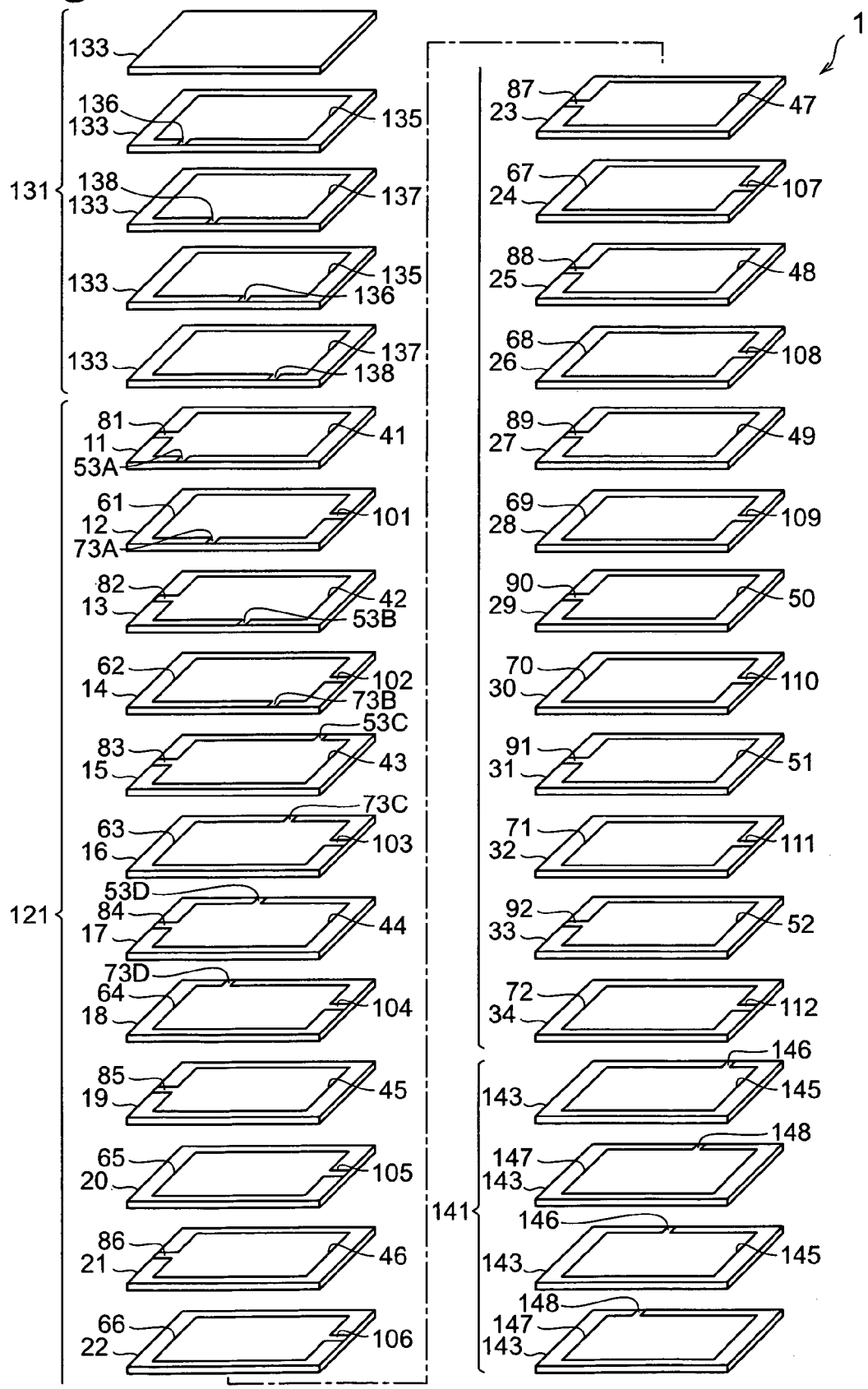
FIG. 26 is an exploded perspective view of the multilayer body included in the multilayer capacitor in accordance with a twenty-fourth embodiment.

With reference to FIG. 26, the structure of the multilayer capacitor in accordance with a twenty-fourth embodiment will be explained. FIG. 26 is an exploded perspective view of the multilayer body included in the multilayer capacitor in accordance with the twenty-fourth embodiment.

As with the multilayer capacitor C2 in accordance with the fourteenth embodiment, the multilayer capacitor in accordance with the twenty-fourth embodiment comprises a multilayer body 1, first terminal electrodes 3A to 3D formed on the multilayer body 1, second terminal electrodes 5A to 5D similarly formed on the multilayer body 1, and first and second connecting conductors 7, 9, which are not depicted.

As shown in FIG. 26, the multilayer body 1 includes first to third capacitor portions 121, 131, 141. The first capacitor portion 121 is positioned between the second capacitor portion 131 and third capacitor portion 141.

To begin with, the structure of the first capacitor portion 121 will be explained. The first capacitor portion 121 has the same configuration as that of the multilayer body 1 in the multilayer capacitor C2 in accordance with the fourteenth embodiment except for the dielectric layer 35. Namely, the first capacitor portion 121 is constructed by alternately laminating a plurality of (24 in this embodiment) dielectric layers 11 to 34 and a plurality of (12 each in this embodiment) first and second inner electrodes 41 to 52, 61 to 72. In the first capacitor portion 121, 4 first inner electrodes 41 to 44 among the 12 first inner electrodes 41 to 52 are electrically connected to their corresponding first terminal electrode 3A to 3D through lead conductors 53A to 53D. Among the 12 second inner electrodes 61 to 72, 4 second inner electrodes 61 to 64 are electrically connected to their corresponding second terminal electrodes 5A to 5D through lead conductors 73A to 73D.

The structure of the second capacitor portion 131 will now be explained. The second capacitor portion 131 is constructed by alternately laminating a plurality of (5 in this embodiment) dielectric layers 133 and a plurality of (2 each in this embodiment) first and second inner electrodes 135, 137. The first inner electrodes 135 are electrically connected to the first terminal electrodes 3A, 3B through their corresponding lead conductors 136. The lead conductors 136 are integrally formed with the respective first inner electrodes 135, and extend therefrom so as to reach a side face 1a of the multilayer body 1. The second inner electrodes 137 are electrically connected to the second terminal electrodes 5A, 5B through their corresponding lead conductors 138. The lead conductors 138 are integrally formed with the respective second inner electrodes 137, and extend therefrom so as to reach the side face 1a of the multilayer body 1.

The structure of the third capacitor portion 141 will now be explained. The second capacitor portion 141 is constructed by alternately laminating a plurality of (4 in this embodiment) dielectric layers 143 and a plurality of (2 each in this embodiment) first and second inner electrodes 145, 147. The first inner electrodes 145 are electrically connected to the first terminal electrodes 3C, 3D through their corresponding lead conductors 146. The lead conductors 146 are integrally formed with the respective first inner electrodes 145, and extend therefrom so as to reach a side face 1b of the multilayer body 1. The second inner electrodes 147 are electrically connected to the second terminal electrodes 5C, 5D through their corresponding lead conductors 148. The lead conductors 148 are integrally formed with the respective second inner electrodes 147, and extend therefrom so as to reach the side face 1b of the multilayer body 1.

In the actual multilayer capacitor in accordance with the twenty-fourth embodiments, the dielectric layers 11 to 35, 133, 143 are integrated to such an extent that no boundaries are discernible therebetween. The first inner electrode 41 of the first capacitor portion 121 is electrically connected to the first inner electrode 135 of the second capacitor portion 131 through the terminal electrode 3A. The first inner electrode 42 of the first capacitor portion 121 is electrically connected to the first inner electrode 135 of the second capacitor portion 131 through the terminal electrode 3B. The first inner electrode 43 of the first capacitor portion 121 is electrically connected to the first inner electrode 145 of the third capacitor portion 141 through the terminal electrode 3C. The first inner electrode 44 of the first capacitor portion 121 is electrically connected to the first inner electrode 145 of the third capacitor portion 141 through the terminal electrode 3D. The second inner electrode 61 of the first capacitor portion 121 is electrically connected to the second inner electrode 137 of the second capacitor portion 131 through the terminal electrode 5A. The second inner electrode 62 of the first capacitor portion 121 is electrically connected to the second inner electrode 137 of the second capacitor portion 131 through the terminal electrode 5B. The second inner electrode 63 of the first capacitor portion 121 is electrically connected to the second inner electrode 147 of the third capacitor portion 141 through the terminal electrode 5C. The second inner electrode 64 of the first capacitor portion 121 is electrically connected to the second inner electrode 147 of the third capacitor portion 141 through the terminal electrode 5D.

By having the first capacitor portion 121 as in the foregoing, the multilayer capacitor in accordance with this embodiment sets its equivalent series resistance to a desirable value as described in the fourteenth embodiment and thus can regulate the equivalent series resistance easily with a high precision.

Twenty-fifth Embodiment

Figure 27:
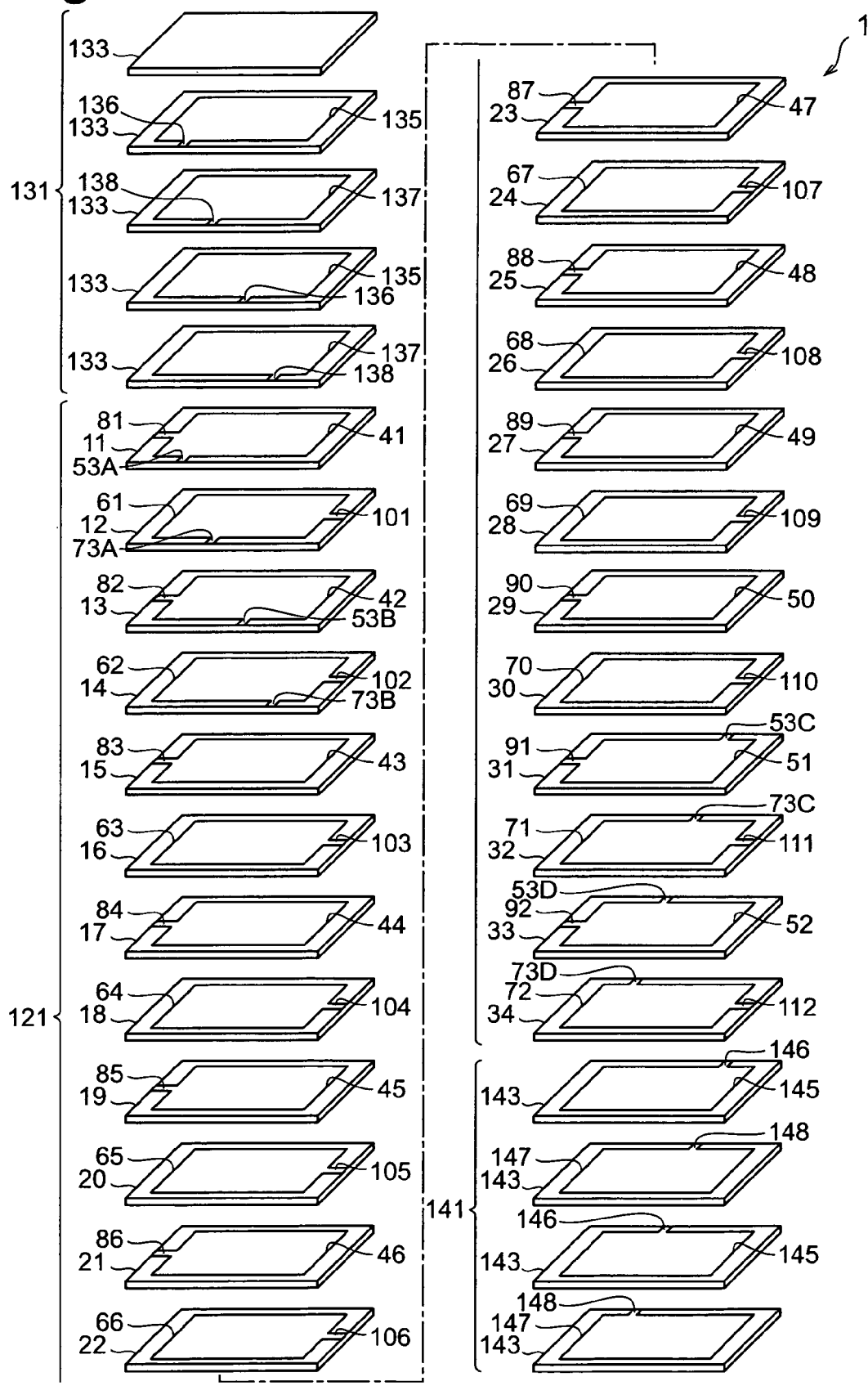
FIG. 27 is an exploded perspective view of the multilayer body included in the multilayer capacitor in accordance with a twenty-fifth embodiment.

With reference to FIG. 27, the structure of the multilayer capacitor in accordance with a twenty-fifth embodiment will be explained. The multilayer capacitor in accordance with the twenty-fifth embodiment differs from the multilayer capacitor in accordance with the twenty-fourth embodiment in terms of the structure of the first capacitor portion 121. FIG. 27 is an exploded perspective view of the multilayer body included in the multilayer capacitor in accordance with the twenty-fifth embodiment.

As with the multilayer capacitor C2 in accordance with the fourteenth embodiment, the multilayer capacitor in accordance with the twenty-fifth embodiment comprises a multilayer body 1, first terminal electrodes 3A to 3D formed on the multilayer body 1, second terminal electrodes 5A to 5D similarly formed on the multilayer body 1, and first and second connecting conductors 7, 9, which are not depicted.

The first capacitor portion 121 has the same configuration as that of the multilayer body 1 in the multilayer capacitor in accordance with the fifteenth embodiment except for the dielectric layer 35. Namely, the first capacitor portion 121 is constructed by alternately laminating a plurality of (24 in this embodiment) dielectric layers 11 to 34 and a plurality of (12 each in this embodiment) first and second inner electrodes 41 to 52, 61 to 72. In the first capacitor portion 121, 4 first inner electrodes 41, 42, 51, 52 among the 12 first inner electrodes 41 to 52 are electrically connected to their corresponding first terminal electrode 3A to 3D through lead conductors 53A to 53D. Among the 12 second inner electrodes 61 to 72, 4 second inner electrodes 61, 62, 71, 72 are electrically connected to their corresponding second terminal electrodes 5A to 5D through lead conductors 73A to 73D.

By having the first capacitor portion 121 as in the foregoing, the multilayer capacitor in accordance with this embodiment sets its equivalent series resistance to a desirable value as described in the fifteenth embodiment and thus can regulate the equivalent series resistance easily with a high precision.

Twenty-sixth Embodiment

Figure 28:
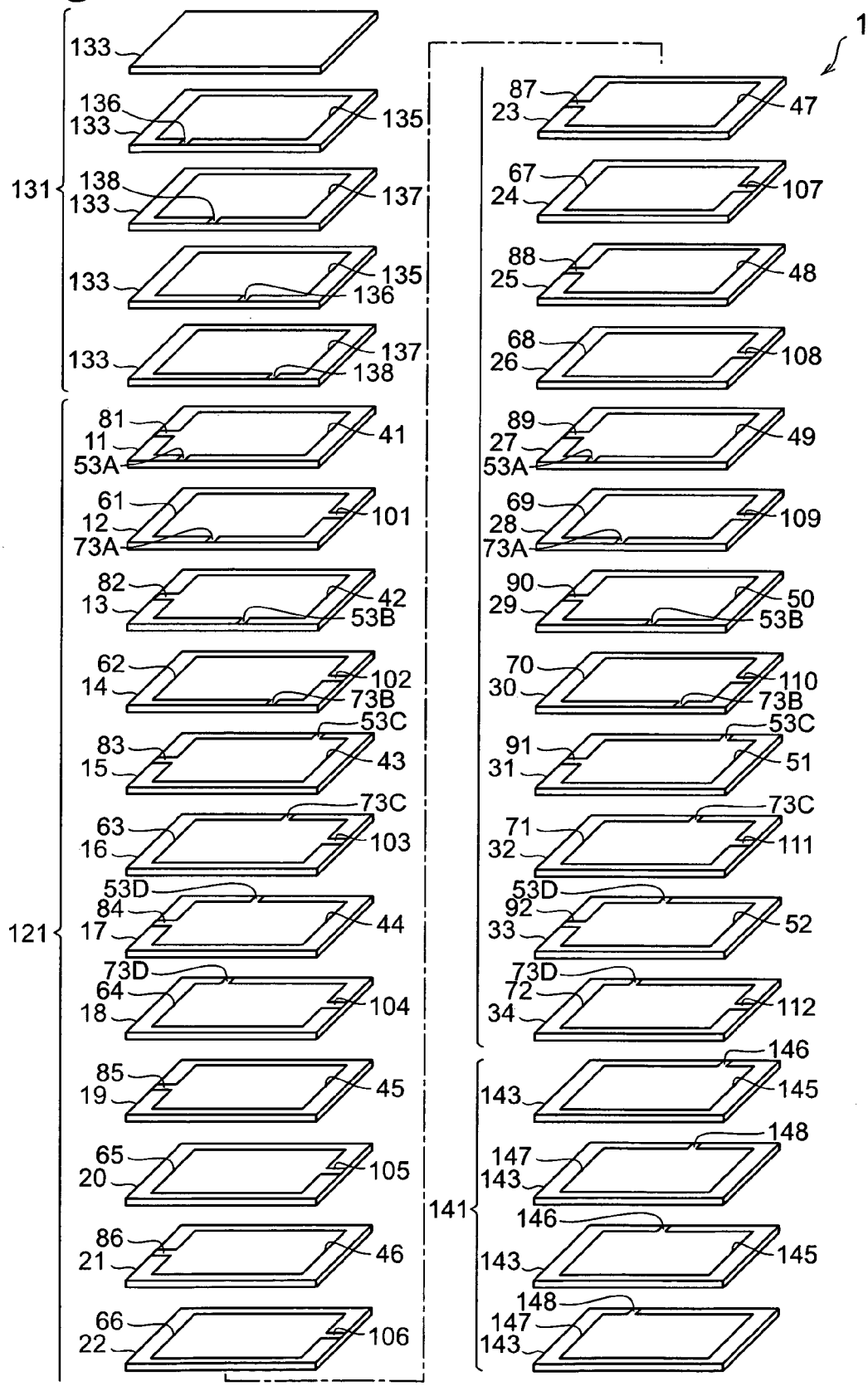
FIG. 28 is an exploded perspective view of the multilayer body included in the multilayer capacitor in accordance with a twenty-sixth embodiment.

With reference to FIG. 28, the structure of the multilayer capacitor in accordance with a twenty-sixth embodiment will be explained. The multilayer capacitor in accordance with the twenty-sixth embodiment differs from the multilayer capacitor in accordance with the twenty-fourth embodiment in terms of the structure of the first capacitor portion 121. FIG. 28 is an exploded perspective view of the multilayer body included in the multilayer capacitor in accordance with the twenty-sixth embodiment.

As with the multilayer capacitor C2 in accordance with the fourteenth embodiment, the multilayer capacitor in accordance with the twenty-sixth embodiment comprises a multilayer body 1, first terminal electrodes 3A to 3D formed on the multilayer body 1, second terminal electrodes 5A to 5D similarly formed on the multilayer body 1, and first and second connecting conductors 7, 9, which are not depicted.

The first capacitor portion 121 has the same configuration as that of the multilayer body 1 in the multilayer capacitor in accordance with the eighteenth embodiment except for the dielectric layer 35. Namely, the first capacitor portion 121 is constructed by alternately laminating a plurality of (24 in this embodiment) dielectric layers 11 to 34 and a plurality of (12 each in this embodiment) first and second inner electrodes 41 to 52, 61 to 72. In the first capacitor portion 121, 8 first inner electrodes 41 to 44, 49 to 52 among the 12 first inner electrodes 41 to 52 are electrically connected to their corresponding first terminal electrode 3A to 3D through lead conductors 53A to 53D. Among the 12 second inner electrodes 61 to 72, 8 second inner electrodes 61 to 64, 69 to 72 are electrically connected to their corresponding second terminal electrodes 5A to 5D through lead conductors 73A to 73D.

By having the first capacitor portion 121 as in the foregoing, the multilayer capacitor in accordance with this embodiment sets its equivalent series resistance to a desirable value as described in the eighteenth embodiment and thus can regulate the equivalent series resistance easily with a high precision.

Twenty-seventh Embodiment

Figure 29:
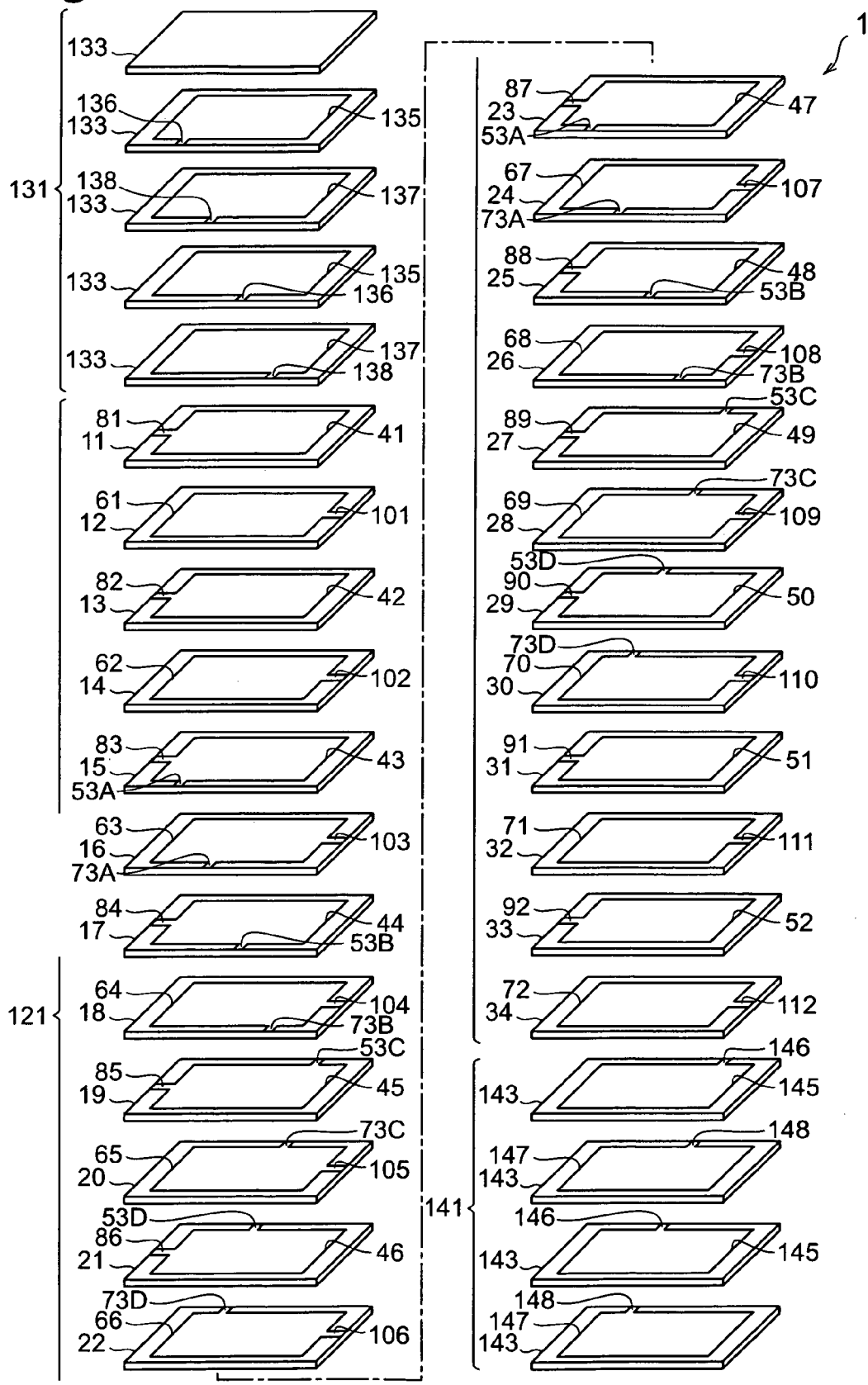
FIG. 29 is an exploded perspective view of the multilayer body included in the multilayer capacitor in accordance with a twenty-seventh embodiment.

With reference to FIG. 29, the structure of the multilayer capacitor in accordance with a twenty-seventh embodiment will be explained. The multilayer capacitor in accordance with the twenty-seventh embodiment differs from the multilayer capacitor in accordance with the twenty-fifth embodiment in terms of the structure of the first capacitor portion 121. FIG. 29 is an exploded perspective view of the multilayer body included in the multilayer capacitor in accordance with the twenty-seventh embodiment.

As with the multilayer capacitor C2 in accordance with the fourteenth embodiment, the multilayer capacitor in accordance with the twenty-seventh embodiment comprises a multilayer body 1, first terminal electrodes 3A to 3D formed on the multilayer body 1, second terminal electrodes 5A to 5D similarly formed on the multilayer body 1, and first and second connecting conductors 7, 9, which are not depicted.

The first capacitor portion 121 has the same configuration as that of the multilayer body 1 in the multilayer capacitor in accordance with the nineteenth embodiment except for the dielectric layer 35. Namely, the first capacitor portion 121 is constructed by alternately laminating a plurality of (24 in this embodiment) dielectric layers 11 to 34 and a plurality of (12 each in this embodiment) first and second inner electrodes 41 to 52, 61 to 72. In the first capacitor portion 121, 8 first inner electrodes 43 to 50 among the 12 first inner electrodes 41 to 52 are electrically connected to their corresponding first terminal electrode 3A to 3D through lead conductors 53A to 53D. Among the 12 second inner electrodes 61 to 72, 8 second inner electrodes 63 to 70 are electrically connected to their corresponding second terminal electrodes 5A to 5D through lead conductors 73A to 73D.

By having the first capacitor portion 121 as in the foregoing, the multilayer capacitor in accordance with this embodiment sets its equivalent series resistance to a desirable value as described in the nineteenth embodiment and thus can regulate the equivalent series resistance easily with a high precision.

The first capacitor portion 121 may employ the same structure as that of the multilayer body 1 in any of the multilayer capacitors in accordance with the sixteenth, seventeenth, and twenty to twenty-third embodiments (excluding the dielectric layer 35).

Twenty-eighth Embodiment

Figure 30:
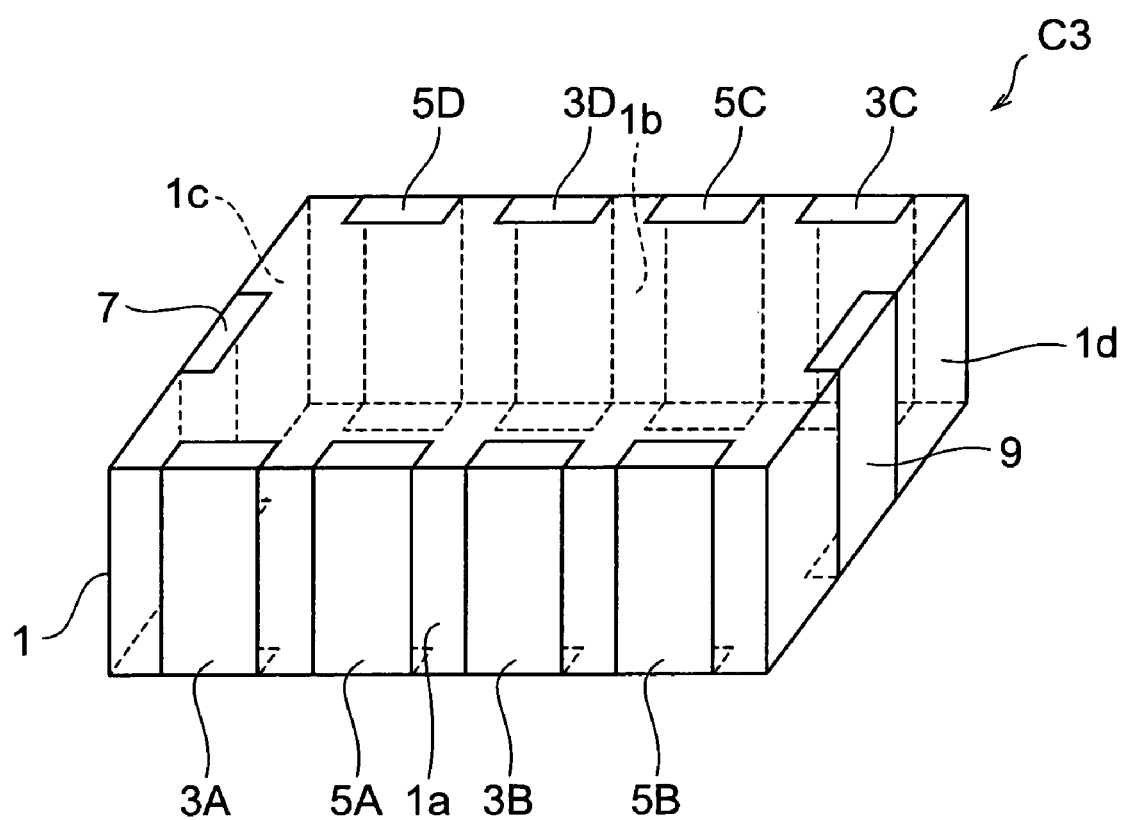
FIG. 30 is a perspective view of the multilayer capacitor in accordance with a twenty-eighth embodiment.
Figure 31:
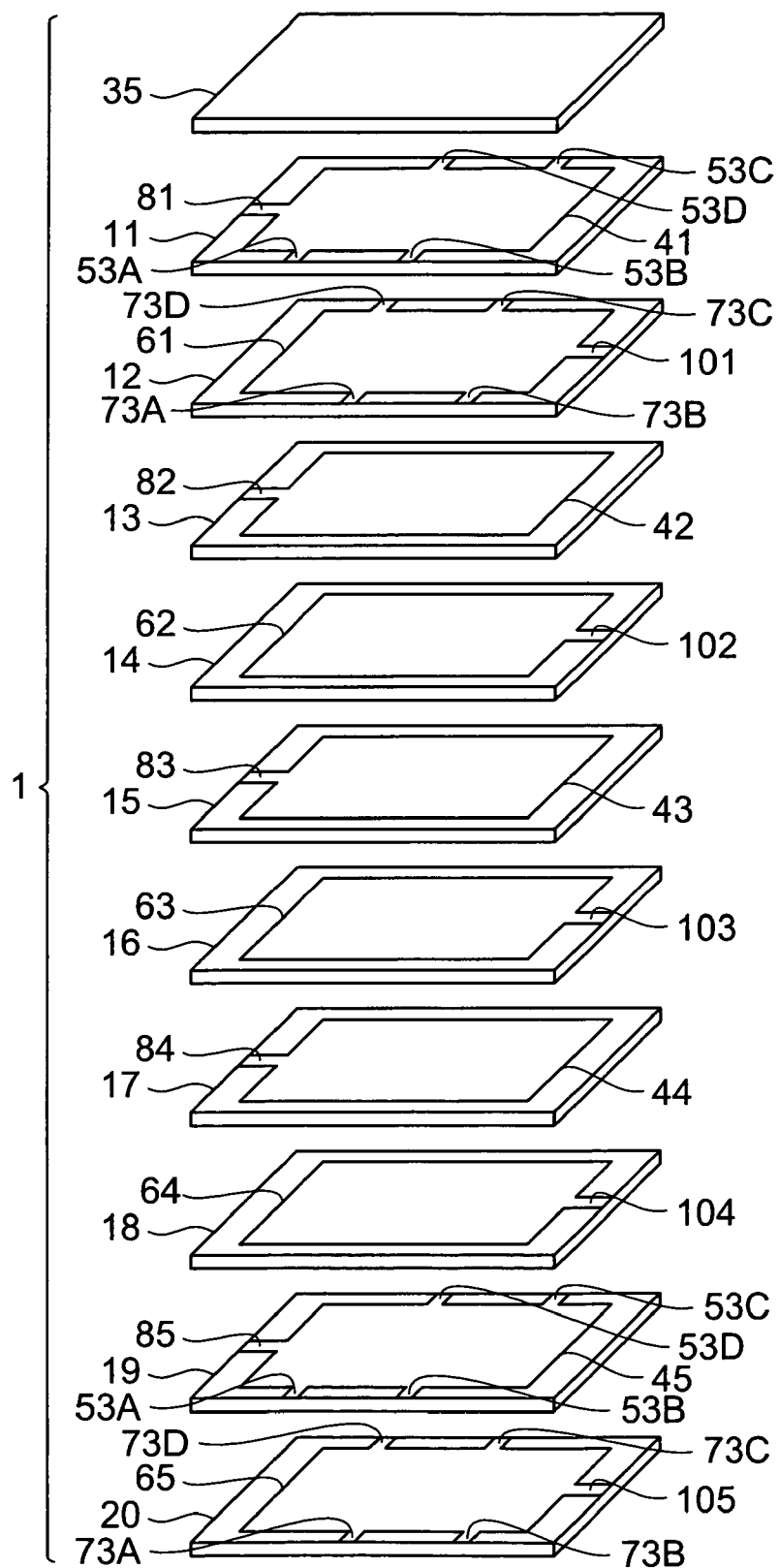
FIG. 31 is an exploded perspective view of the multilayer body included in the multilayer capacitor in accordance with the twenty-eighth embodiment.

With reference to FIGS. 30 and 31, the structure of the multilayer capacitor C3 in accordance with a twenty-eighth embodiment will be explained. FIG. 30 is a perspective view of the multilayer capacitor in accordance with the twenty-eighth embodiment. FIG. 31 is an exploded perspective view of the multilayer body included in the multilayer capacitor in accordance with the twenty-eighth embodiment.

As shown in FIG. 30, the multilayer capacitor C3 in accordance with the twenty-eighth embodiment comprises a multilayer body 1, first and second terminal electrodes 3A to 3D, 5A to 5D formed on the multilayer body 1, and first and second connecting conductors 7, 9.

The first terminal electrode 3A is formed on a side face 1a of the multilayer body 1. The first terminal electrode 3B is formed on the side face 1a of the multilayer body 1. The first terminal electrode 3C is formed on a side face 1b of the multilayer body 1. The first terminal electrode 3D is formed on the side face 1b of the multilayer body 1.

The second terminal electrode 5A is formed on the side face 1a of the multilayer body 1. The second terminal electrode 5B is formed on the side face 1a of the multilayer body 1. The second terminal electrode 5C is formed on the side face 1b of the multilayer body 1. The second terminal electrode 5D is formed on the side face 1b of the multilayer body 1.

As a consequence, the first terminal electrode 3A, second terminal electrode 5A, first terminal electrode 3B, and second terminal electrode 5B are formed on the side face 1a in succession from a side face 1c toward a side face 1d. On the side face It, the first terminal electrode 3C, second terminal electrode SC, first terminal electrode 3D, and second terminal electrode 5D are formed in succession from the side face id toward the side face 1c. The first terminal electrodes 3A to 3D and second terminal electrodes 5A to 5D are electrically insulated from each other.

The first connecting conductor 7 is positioned on the side face 1c of the multilayer body 1. The second connecting conductor 9 is positioned on the side face 1d of the multilayer body 1. The first connecting conductor 7 and second connecting conductor 9 are electrically insulated from each other.

As is also shown in FIG. 31, the multilayer body 1 is constructed by alternately laminating a plurality of (11 in this embodiment) dielectric layers 11 to 20, 35 and a plurality of (5 each in this embodiment) first and second inner electrodes 41 to 45, 61 to 65. In the actual multilayer capacitor C3, the dielectric layers 11 to 20, 35 are integrated to such an extent that no boundaries are discernible therebetween.

Each of the first inner electrodes 41 to 45 has a substantially rectangular form. The first inner electrodes 41 to 45 are formed at respective positions separated by a predetermined distance from a side face parallel to the laminating direction of the dielectric layers 11 to 20, 35 in the multilayer body 1 (hereinafter simply referred to as "laminating direction"). The first inner electrodes 41 to 45 are formed with respective lead conductors 81 to 85 extending so as to reach the side face 1c of the multilayer body 1.

The lead conductor 81 is integrally formed with the first inner electrode 41, and extends therefrom so as to reach the side face 1c of the multilayer body 1. The lead conductor 82 is integrally formed with the first inner electrode 42, and extends therefrom so as to reach the side face 1c of the multilayer body 1. The lead conductor 83 is integrally formed with the first inner electrode 43, and extends therefrom so as to reach the side face 1c of the multilayer body 1. The lead conductor 84 is integrally formed with the first inner electrode 44, and extends therefrom so as to reach the side face 1c of the multilayer body 1. The lead conductor 85 is integrally formed with the first inner electrode 45, and extends therefrom so as to reach the side face 1c of the multilayer body 1.

The first inner electrodes 41 to 45 are electrically connected to the first connecting conductor 7 through their corresponding lead conductors 81 to 85. As a consequence, the, first inner electrodes 41 to 45 are electrically connected to each other through the first connecting conductor 7.

The first inner electrodes 41, 45 are electrically connected to the first terminal electrodes 3A to 3D through lead conductors 53A to 53D. As a consequence, the first inner electrodes 42 to 44 are also electrically connected to the first terminal electrodes 3A to 3D, whereby the first inner electrodes 41 to 45 are connected in parallel. The lead conductors 53A, 53B are integrally formed with the first inner electrodes 41, 45, and extend therefrom so as to reach the side face 1a of the multilayer body 1. The lead conductors 53C, 53D are also integrally formed with the first inner electrodes 41, 45, and extend therefrom so as to reach the side face 1b of the multilayer body 1.

The second inner electrodes 61, 65 are electrically connected to the second terminal electrodes 5A to 5D through lead conductors 73A to 73D. As a consequence, the second inner electrodes 62 to 64 are also electrically connected to the second terminal electrodes 5A to 5D, whereby the second inner electrodes 61 to 65 are connected in parallel. The lead conductors 73A, 73B are integrally formed with the second inner electrodes 61, 65, and extend therefrom so as to reach the side face 1a of the multilayer body 1. The lead conductors 73C, 73D are also integrally formed with the second inner electrodes 61, 65, and extend therefrom so as to reach the side face 1b of the multilayer body 1.

In the multilayer capacitor in accordance with the twenty-eighth embodiment, the number of first inner electrodes 41, 45 connected to the first terminal electrodes 3A to 3D through the lead conductors.53A to 53D is 2, which is smaller than the total number (5 in this embodiment) of the first inner electrodes 41 to 45. The number of second inner electrodes 61, 65 connected to the second terminal electrodes 5A to 5D through the lead conductors 73A to 73D is 2, which is smaller than the total number (5 in this embodiment) of the second inner electrodes 61 to 65. These make the multilayer capacitor in accordance with the twenty-eighth embodiment attain an equivalent series resistance greater than that of a conventional multilayer capacitor in which all the inner electrodes are connected to their corresponding terminal electrodes through lead conductors.

By adjusting each of the number of first inner electrodes 41, 45 electrically connected to the first terminal electrodes 3A to 3D through the lead conductors 53A to 53D and the number of second inner electrodes 61, 65 electrically connected to the second terminal electrodes 5A to 5D through the lead conductors 73A to 73D as in the foregoing, this embodiment sets the equivalent series resistance of the multilayer capacitor to a desirable value and thus can regulate the equivalent series resistance easily with a high precision.

In this embodiment, the first inner electrodes 41 to 45 are connected in parallel, and the second inner electrodes 61 to 65 are connected in parallel. As a consequence, even when the resistance value fluctuates among the first inner electrodes 41 to 45 or second inner electrodes 61 to 65, its influence is less in the equivalent series resistance of the multilayer capacitor as a whole, whereby the equivalent series resistance control can be restrained from lowering its precision.

Twenty-ninth Embodiment

Figure 32:
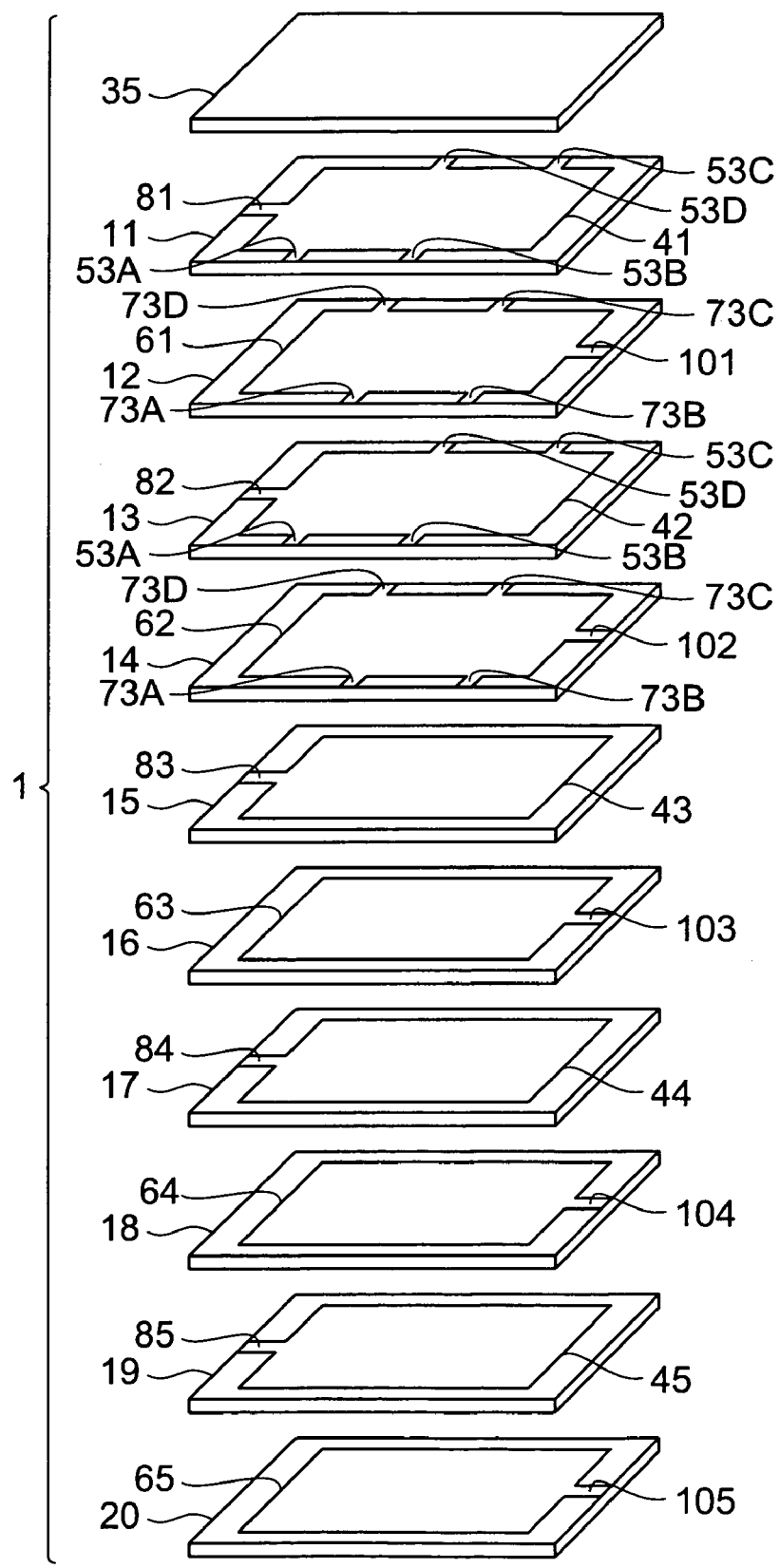
FIG. 32 is an exploded perspective view of the multilayer body included in the multilayer capacitor in accordance with a twenty-ninth embodiment.

With reference to FIG. 32, the structure of the multilayer capacitor in accordance with a twenty-ninth embodiment will be explained. The multilayer capacitor in accordance with the twenty-ninth embodiment differs from the multilayer capacitor in accordance with the twenty-eighth embodiment in terms of the position of first inner electrodes electrically connected to first terminal electrodes 3A to 3D through lead conductors 53A to 53D in the laminating direction and the position of second inner electrodes electrically connected to second terminal electrodes 5A to 5D through lead conductors 73A to 73D in the laminating direction. FIG. 32 is an exploded perspective view of the multilayer body included in the multilayer capacitor in accordance with the twenty-ninth embodiment.

As with the multilayer capacitor C3 in accordance with the twenty-eighth embodiment, the multilayer capacitor in accordance with the twenty-ninth embodiment comprises a multilayer body 1, the first terminal electrodes 3A to 3D formed on the multilayer body 1, the second terminal electrodes 5A to 5D similarly formed on the multilayer body 1, and first and second connecting conductors 7, 9, which are not depicted.

A first inner electrode 42 is electrically connected to the first terminal electrodes 3A to 3D through lead conductors 53A to 53D. As a consequence, first inner electrodes 43 to 45 are also electrically connected to the first terminal electrodes 3A to 3D, whereby first inner electrodes 41 to 45 are connected in parallel. The lead conductors 53A, 53B are integrally formed with the first inner electrode 42, and extend therefrom so as to reach a side face 1a of the multilayer body 1. The lead conductors 53C, 53D are also integrally formed with the first inner electrode 42, and extend therefrom so as to reach a side face 1b of the multilayer body 1.

A second inner electrode 62 is electrically connected to the second terminal electrodes 5A to 5D through lead conductors 73A to 73D. As a consequence, second inner electrodes 63 to 65 are also electrically connected to the second terminal electrodes 5A to 5D, whereby second inner electrodes 61 to 65 are connected in parallel. The lead conductors 73A, 73B are integrally formed with the second inner electrode 62, and extend therefrom so as to reach the side face 1a of the multilayer body 1. The lead conductors 73C, 73D are also integrally formed with the second inner electrode 62, and extend therefrom so as to reach the side face 1b of the multilayer body 1.

In the multilayer capacitor in accordance with the twenty-ninth embodiment, the number of first inner electrodes 41, 42 connected to the first terminal electrodes 3A to 3D through the lead conductors 53A to 53D is 2, which is smaller than the total number (5 in this embodiment) of the first inner electrodes 41 to 45. The number of second inner electrodes 61, 62 connected to the second terminal electrodes 5A to 5D through the lead conductors 73A to 73D is 2, which is smaller than the total number (5 in this embodiment) of the second inner electrodes 61 to 65. These make the multilayer capacitor in accordance with the twenty-ninth embodiment attain an equivalent series resistance greater than that of a conventional multilayer capacitor in which all the inner electrodes are connected to their corresponding terminal electrodes through lead conductors.

By adjusting each of the number of first inner electrodes 41, 42 electrically connected to the first terminal electrodes 3A to 3D through the lead conductors 53A to 53D and the number of second inner electrodes 61, 62 electrically connected to the second terminal electrodes 5A to 5D through the lead conductors 73A to 73D as in the foregoing, this embodiment sets the equivalent series resistance of the multilayer capacitor to a desirable value and thus can regulate the equivalent series resistance easily with a high precision.

Thirtieth Embodiment

Figure 33:
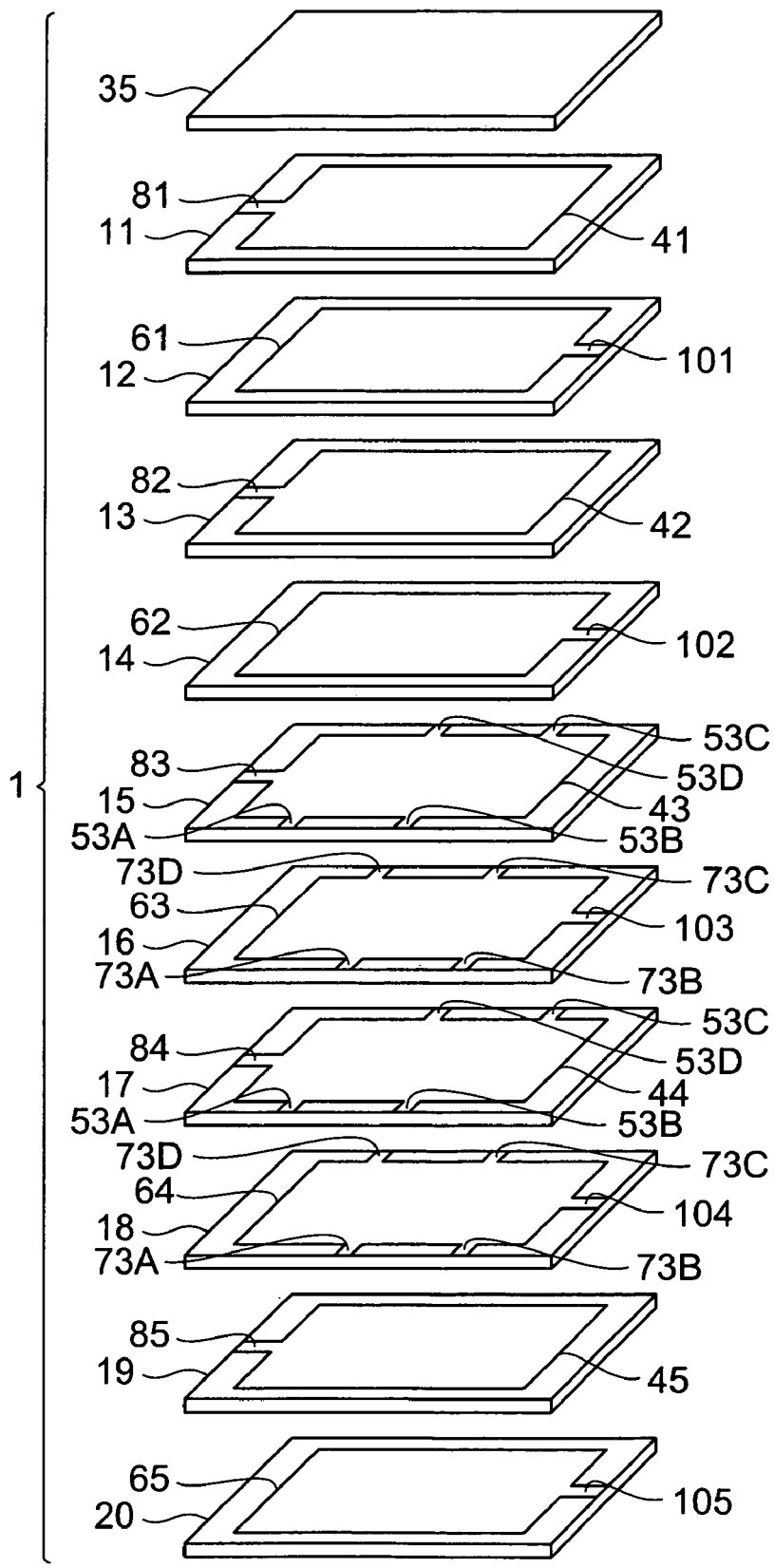
FIG. 33 is an exploded perspective view of the multilayer body included in the multilayer capacitor in accordance with a thirtieth embodiment.

With reference to FIG. 33, the structure of the multilayer capacitor in accordance with a thirtieth embodiment will be explained. The multilayer capacitor in accordance with the thirtieth embodiment differs from the multilayer capacitor in accordance with the twenty-eighth embodiment in terms of the position of first inner electrodes electrically connected to first terminal electrodes 3A to 3D through lead conductors 53A to 53D in the laminating direction and the position of second inner electrodes electrically connected to second terminal electrodes 5A to 5D through lead conductors 73A to 73D in the laminating direction. FIG. 33 is an exploded perspective view of the multilayer body included in the multilayer capacitor in accordance with the thirtieth embodiment.

As with the multilayer capacitor C3 in accordance with the twenty-eighth embodiment, the multilayer capacitor in accordance with the thirtieth embodiment comprises a multilayer body 1, the first terminal electrodes 3A to 3D formed on the multilayer body 1, the second terminal electrodes 5A to 5D similarly formed on the multilayer body 1, and first and second connecting conductors 7, 9, which are not depicted.

First inner electrodes 43, 44 are electrically connected to the first terminal electrodes 3A to 3D through lead conductors 53A to 53D. As a consequence, first inner electrodes 41, 42, 45 are also electrically connected to the first terminal electrodes 3A to 3D, whereby first inner electrodes 41 to 45 are connected in parallel. The lead conductors 53A, 53B are integrally formed with the first inner electrodes 43, 44, and extend therefrom so as to reach a side face 1a of the multilayer body 1. The lead conductors 53C, 53D are also integrally formed with the first inner electrodes 43, 44, and extend therefrom so as to reach a side face 1b of the multilayer body 1.

Second inner electrodes 63, 64 are electrically connected to the second terminal electrodes 5A to 5D through lead conductors 73A to 73D. As a consequence, second inner electrodes 61, 62, 65 are also electrically connected to the second terminal electrodes 5A to 5D, whereby second inner electrodes 61 to 65 are connected in parallel. The lead conductors 73A, 73B are integrally formed with the second inner electrodes 63, 64, and extend therefrom so as to reach the side face 1a of the multilayer body 1. The lead conductors 73C, 73D are also integrally formed with the second inner electrodes 63, 64, and extend therefrom so as to reach the side face 1b of the multilayer body 1.

In the multilayer capacitor in accordance with the thirtieth embodiment, the number of first inner electrodes 43, 44 connected to the first terminal electrodes 3A to 3D through the lead conductors 53A to 53D is 2, which is smaller than the total number (5 in this embodiment) of the first inner electrodes 41 to 45. The number of second inner electrodes 63, 64 connected to the second terminal electrodes 5A to 5D through the lead conductors 73A to 73D is 2, which is smaller than the total number (5 in this embodiment) of the second inner electrodes 61 to 65. These make the multilayer capacitor in accordance with the thirtieth embodiment attain an equivalent series resistance greater than that of a conventional multilayer capacitor in which all the inner electrodes are connected to their corresponding terminal electrodes through lead conductors.

By adjusting each of the number of first inner electrodes 43, 44 electrically connected to the first terminal electrodes 3A to 3D through the lead conductors 53A to 53D and the number of second inner electrodes 63, 64 electrically connected to the second terminal electrodes 5A to 5D through the lead conductors 73A to 73D as in the foregoing, this embodiment sets the equivalent series resistance of the multilayer capacitor to a desirable value and thus can regulate the equivalent series resistance easily with a high precision.

Thirty-first Embodiment

Figure 34:
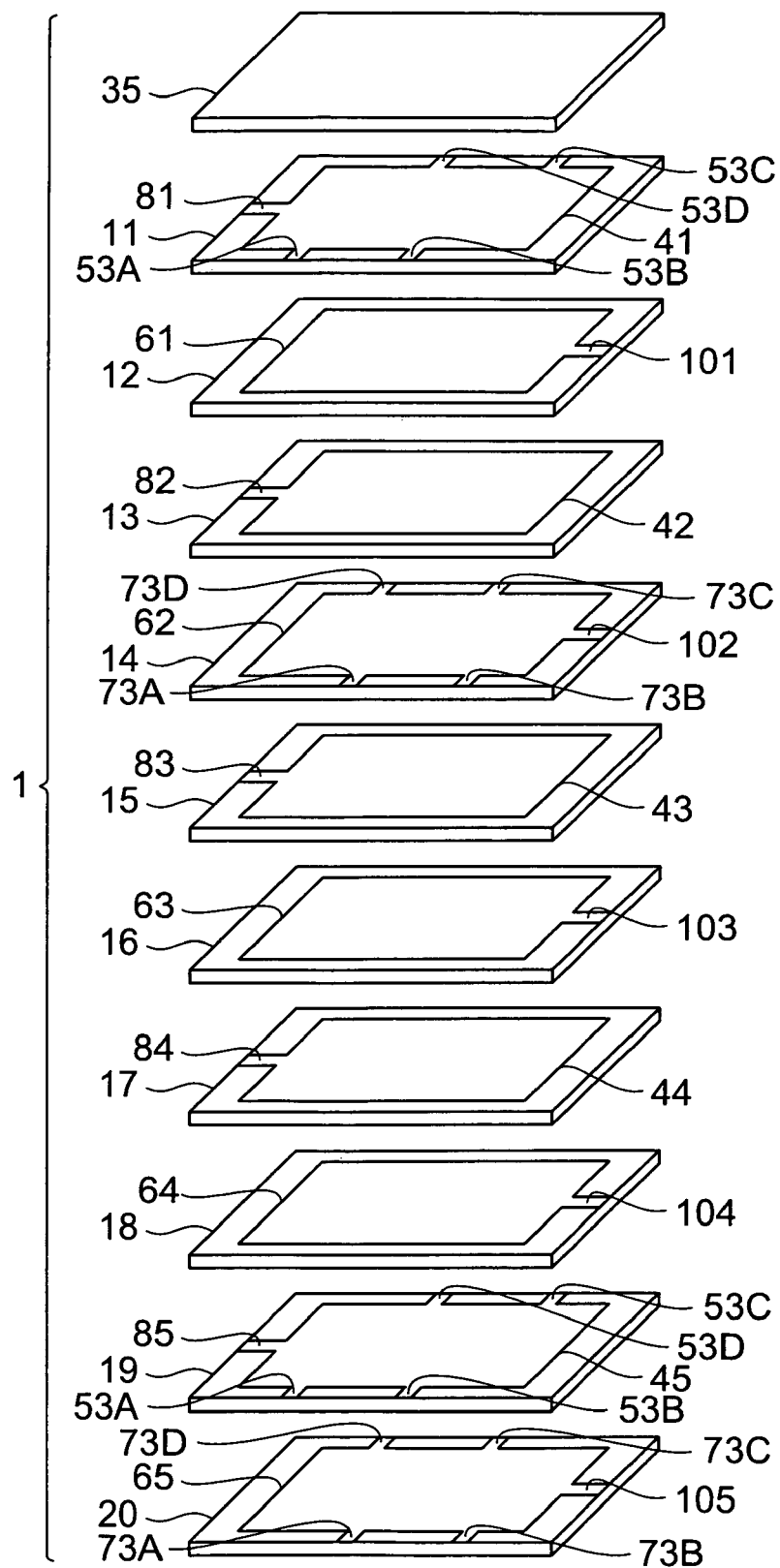
FIG. 34 is an exploded perspective view of the multilayer body included in the multilayer capacitor in accordance with a thirty-first embodiment.

With reference to FIG. 34, the structure of the multilayer capacitor in accordance with a thirty-first embodiment will be explained. The multilayer capacitor in accordance with the thirty-first embodiment differs from the multilayer capacitor in accordance with the twenty-eighth embodiment in terms of the position of second inner electrodes electrically connected to second terminal electrodes 5A to 5D through lead conductors 73A to 73D in the laminating direction. FIG. 34 is an exploded perspective view of the multilayer body included in the multilayer capacitor in accordance with the thirty-first embodiment.

As with the multilayer capacitor C3 in accordance with the twenty-eighth embodiment, the multilayer capacitor in accordance with the thirty-first embodiment comprises a multilayer body 1, first terminal electrodes 3A to 3D formed on the multilayer body 1, the second terminal electrodes 5A to 5D similarly formed on the multilayer body 1, and first and second connecting conductors 7, 9, which are not depicted.

A second inner electrode 62 is electrically connected to the second terminal electrodes 5A to 5D through lead conductors 73A to 73D. As a consequence, second inner electrodes 61, 63, 64 are also electrically connected to the second terminal electrodes 5A to 5D, whereby second inner electrodes 61 to 65 are connected in parallel. The lead conductors 73A, 73B are integrally formed with the second inner electrode 62, and extend therefrom so as to reach a side face 1a of the multilayer body 1. The lead conductors 73C, 73D are also integrally formed with the second inner electrodes 63, 64, and extend therefrom so as to reach a side face 1b of the multilayer body 1.

In the multilayer capacitor in accordance with the thirty-first embodiment, the number of first inner electrodes 41, 45 connected to the first terminal electrodes 3A to 3D through the lead conductors 53A to 53D is 2, which is smaller than the total number (5 in this embodiment) of the first inner electrodes 41 to 45. The number of second inner electrodes 62, 65 connected to the second terminal electrodes 5A to 5D through the lead conductors 73A to 73D is 2, which is smaller than the total number (5 in this embodiment) of the second inner electrodes 61 to 65. These make the multilayer capacitor in accordance with the thirty-first embodiment attain an equivalent series resistance greater than that of a conventional multilayer capacitor in which all the inner electrodes are connected to their corresponding terminal electrodes through lead conductors.

By adjusting each of the number of first inner electrodes 41, 45 electrically connected to the first terminal electrodes 3A to 3D through the lead conductors 53A to 53D and the number of second inner electrodes 62, 65 electrically connected to the second terminal electrodes 5A to 5D through the lead conductors 73A to 73D as in the foregoing, this embodiment sets the equivalent series resistance of the multilayer capacitor to a desirable value and thus can regulate the equivalent series resistance easily with a high precision.

Thirty-second Embodiment

Figure 35:
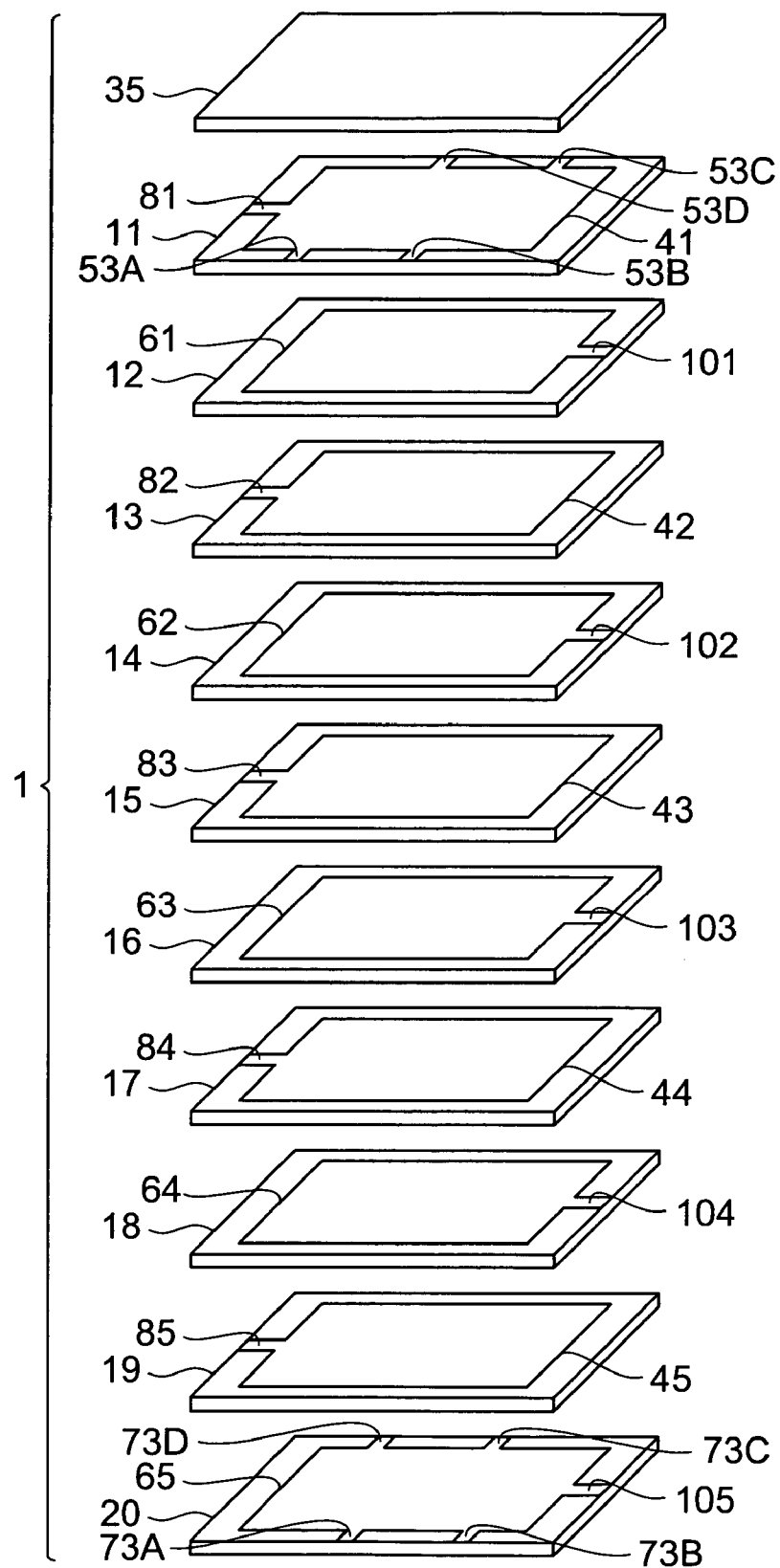
FIG. 35 is an exploded perspective view of the multilayer body included in the multilayer capacitor in accordance with a thirty-second embodiment.

With reference to FIG. 35, the structure of the multilayer capacitor in accordance with a thirty-second embodiment will be explained. The multilayer capacitor in accordance with the thirty-second embodiment differs from the multilayer capacitor in accordance with the twenty-eighth embodiment in terms of the number of first inner electrodes electrically connected to first terminal electrodes 3A to 3D through lead conductors 53A to 53D and the number of second inner electrodes electrically connected to second terminal electrodes 5A to 5D through lead conductors 73A to 73D. FIG. 35 is an exploded perspective view of the multilayer body included in the multilayer capacitor in accordance with the thirty-second embodiment.

As with the multilayer capacitor C3 in accordance with the twenty-eighth embodiment, the multilayer capacitor in accordance with the thirty-second embodiment comprises a multilayer body 1, the first terminal electrodes 3A to 3D formed on the multilayer body 1, the second terminal electrodes 5A to 5D similarly formed on the multilayer body 1, and first and second connecting conductors 7, 9, which are not depicted.

In the multilayer capacitor in accordance with the thirty-second embodiment, the number of first inner electrode 41 connected to the first terminal electrodes 3A to 3D through the lead conductors 53A to 53D is 1, which is smaller than the total number (5 in this embodiment) of the first inner electrodes 41 to 45. The number of second inner electrode 65 connected to the second terminal electrodes 5A to SD through the lead conductors 73A to 73D is 1, which is smaller than the total number (5 in this embodiment) of the second inner electrodes 61 to 65. These make the multilayer capacitor in accordance with the thirty-second embodiment attain an equivalent series resistance greater than that of a conventional multilayer capacitor in which all the inner electrodes are connected to their corresponding terminal electrodes through lead conductors.

By adjusting each of the number of first inner electrode 41 electrically connected to the first terminal electrodes 3A to 3D through the lead conductors 53A to 53D and the number of second inner electrode 65 electrically connected to the second terminal electrodes SA to 5D through the lead conductors 73A to 73D as in the foregoing, this embodiment sets the equivalent series resistance of the multilayer capacitor to a desirable value and thus can regulate the equivalent series resistance easily with a high precision.

Thirty-third Embodiment

Figure 36:
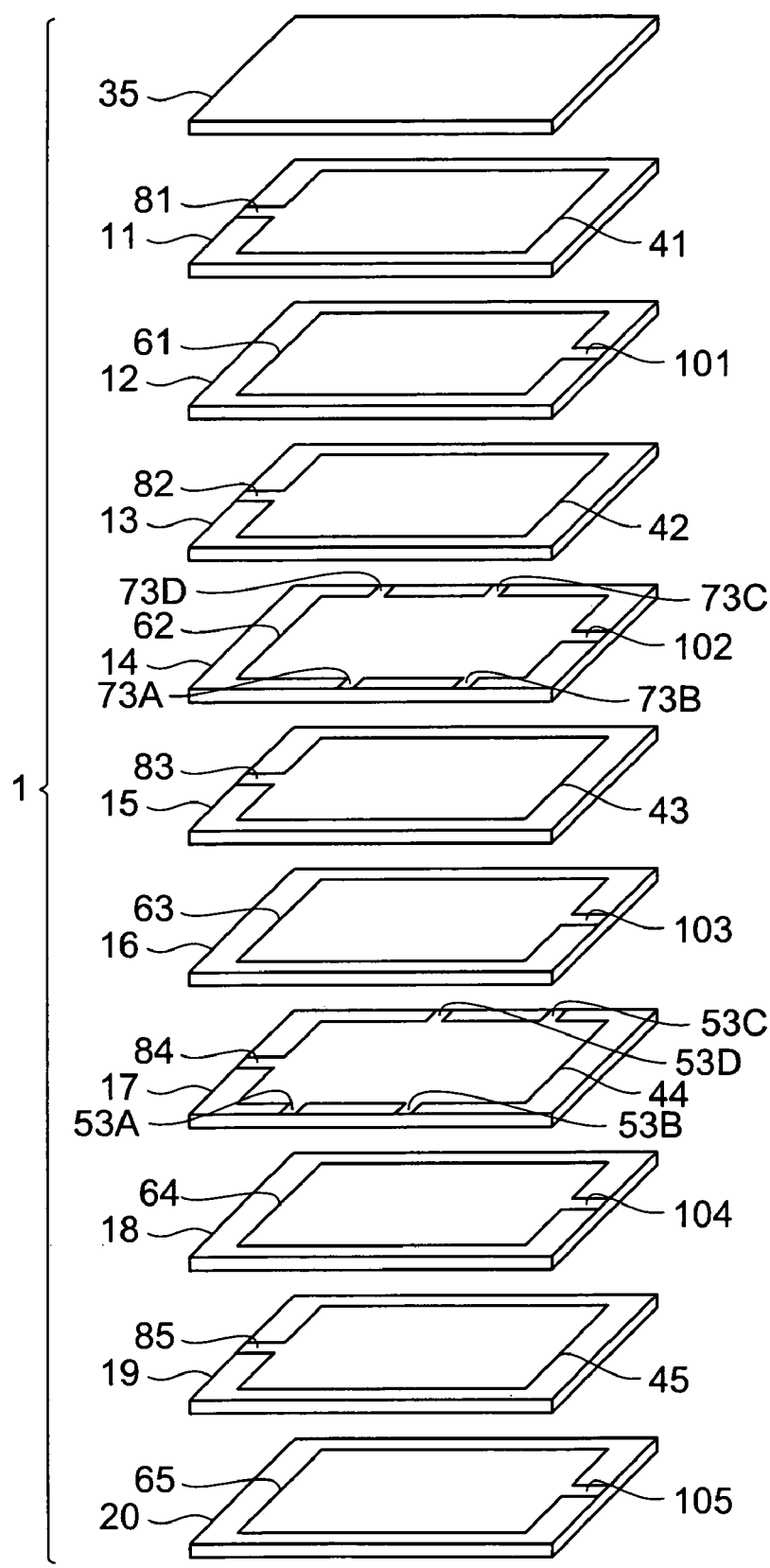
FIG. 36 is an exploded perspective view of the multilayer body included in the multilayer capacitor in accordance with a thirty-third embodiment.

With reference to FIG. 36, the structure of the multilayer capacitor in accordance with a thirty-third embodiment will be explained. The multilayer capacitor in accordance with the thirty-third embodiment differs from the multilayer capacitor in accordance with the twenty-eighth embodiment in terms of the number and position in the laminating direction of first inner electrodes electrically connected to first terminal electrodes 3A to 3D through lead conductors 53A to 53D and the number and position in the laminating direction of second inner electrodes electrically connected to second terminal electrodes 5A to 5D through lead conductors 73A to 73D. FIG. 36 is an exploded perspective view of the multilayer body included in the multilayer capacitor in accordance with the thirty-third embodiment.

As with the multilayer capacitor C3 in accordance with the twenty-eighth embodiment, the multilayer capacitor in accordance with the thirty-third embodiment comprises a multilayer body 1, the first terminal electrodes 3A to 3D formed on the multilayer body 1, the second terminal electrodes 5A to 5D similarly formed on the multilayer body 1, and first and second connecting conductors 7, 9, which are not depicted.

In the multilayer capacitor in accordance with the thirty-third embodiment, the number of first inner electrode 44 connected to the first terminal electrodes 3A to 3D through the lead conductors 53A to 53D is 1, which is smaller than the total number (5 in this embodiment) of the first inner electrodes 41 to 45. The number of second inner electrode 62 connected to the second terminal electrodes 5A to 5D through the lead conductors 73A to 73D is 1, which is smaller than the total number (5 in this embodiment) of the second inner electrodes 61 to 65. These make the multilayer capacitor in accordance with the thirty-third embodiment attain an equivalent series resistance greater than that of a conventional multilayer capacitor in which all the inner electrodes are connected to their corresponding terminal electrodes through lead conductors.

By adjusting each of the number of first inner electrode 44 electrically connected to the first terminal electrodes 3A to 3D through the lead conductors 53A to 53D and the number of second inner electrode 62 electrically connected to the second terminal electrodes 5A to 5D through the lead conductors 73A to 73D as in the foregoing, this embodiment sets the equivalent series resistance of the multilayer capacitor to a desirable value and thus can regulate the equivalent series resistance easily with a high precision.

Thirty-fourth Embodiment

Figure 37:
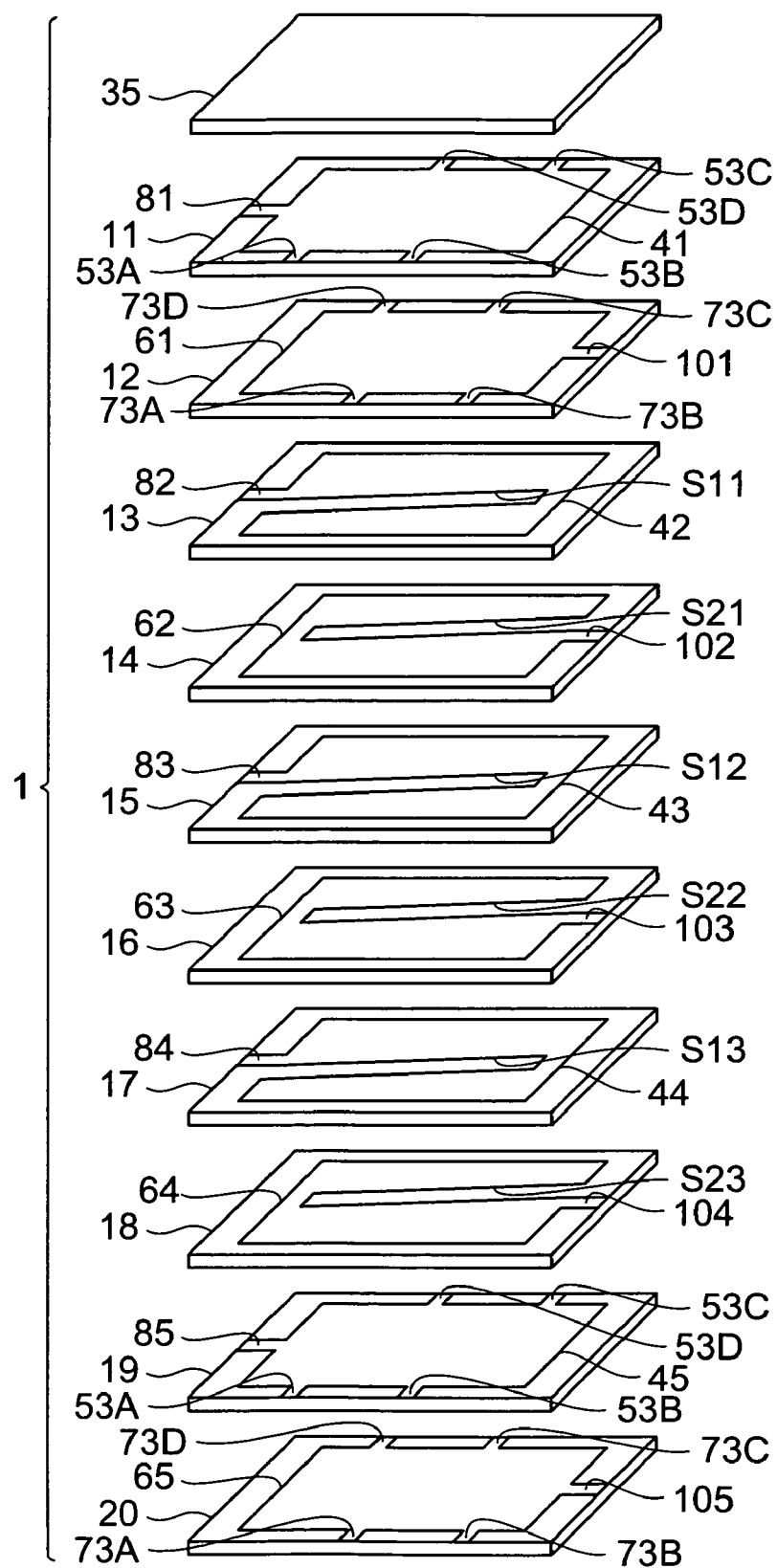
FIG. 37 is an exploded perspective view of the multilayer body included in the multilayer capacitor in accordance with a thirty-fourth embodiment.

With reference to FIG. 37, the structure of the multilayer capacitor in accordance with a thirty-fourth embodiment will be explained. The multilayer capacitor in accordance with the thirty-fourth embodiment differs from the multilayer capacitor in accordance with the twenty-eighth embodiment in that first and second inner electrodes 42 to 44, 62 to 64 are formed with slits. FIG. 36 is an exploded perspective view of the multilayer body included in the multilayer capacitor in accordance with the thirty-fourth embodiment.

As with the multilayer capacitor C3 in accordance with the twenty-eighth embodiment, the multilayer capacitor in accordance with the thirty-fourth embodiment comprises a multilayer body 1, first terminal electrodes 3A to 3D formed on the multilayer body 1, second terminal electrodes 5A to 5D similarly formed on the multilayer body 1, and first and second connecting conductors 7, 9, which are not depicted.

The first inner electrodes 42 to 44 are formed with slits S11 to S13 extending in the longitudinal direction of the first inner electrodes 42 to 44 from sides of connecting parts between lead conductors 82 to 84 and the first inner electrodes 42 to 44, respectively. Therefore, the slits S11 to S13 are formed in their corresponding first inner electrodes 42 to 44 such that currents flow in directions opposite from each other in areas opposing each other across the slits S11 to S13.

The second inner electrodes 62 to 64 are formed with slits S21 to S23 extending in the longitudinal direction of the second inner electrodes 62 to 64 from sides of connecting parts between lead conductors 102 to 104 and the second inner electrodes 62 to 64, respectively. Therefore, the slits S21 to S23 are formed in their corresponding second inner electrodes 62 to 64 such that currents flow in directions opposite from each other in areas opposing each other across the slits S21 to S23.

In the first and second inner electrodes 42 to 44, 62 to 64 formed with the slits S11 to S13, S21 to S23, currents flow in directions opposite from each other in areas opposing each other across the slits S11 to S13, S21 to S23, whereby magnetic fields caused by the currents cancel each other out. Also, in the laminating direction, currents flow in respective directions opposite from each other in the first inner electrodes 42 to 44 and second inner electrodes 62 to 64 formed with the slits. Therefore, magnetic fields caused by currents flowing through the first inner electrodes 42 to 44 and magnetic fields caused by currents flowing through the second inner electrodes 62 to 64 cancel each other out. Consequently, the multilayer capacitor in accordance with the thirty-fourth embodiment can reduce its equivalent series inductance.

In the multilayer capacitor in accordance with the thirty-fourth embodiment, the number of first inner electrodes 41, 45 connected to the first terminal electrodes 3A to 3D through the lead conductors 53A to 53D is 2, which is smaller than the total number (5 in this embodiment) of first inner electrodes 41 to 45. The number of second inner electrodes 61, 65 connected to the second terminal electrodes 5A to 5D through lead conductors 73A to 73D is 2, which is smaller than the total number (5 in this embodiment) of second inner electrodes 61 to 65. These make the multilayer capacitor in accordance with the thirty-fourth embodiment attain an equivalent series resistance greater than that of a conventional multilayer capacitor in which all the inner electrodes are connected to their corresponding terminal electrodes through lead conductors.

By adjusting each of the number of first inner electrodes 41, 45 connected to the first terminal electrodes 3A to 3D through the lead conductors 53A to 53D and the number of second inner electrodes 61, 65 connected to the second terminal electrodes 5A to 5D through the lead conductors 73A to 73D as in the foregoing, the thirty-fourth embodiment sets the equivalent series resistance of the multilayer capacitor to a desirable value and thus can regulate the equivalent series resistance easily with a high precision.

Thirty-fifth Embodiment

Figure 38:
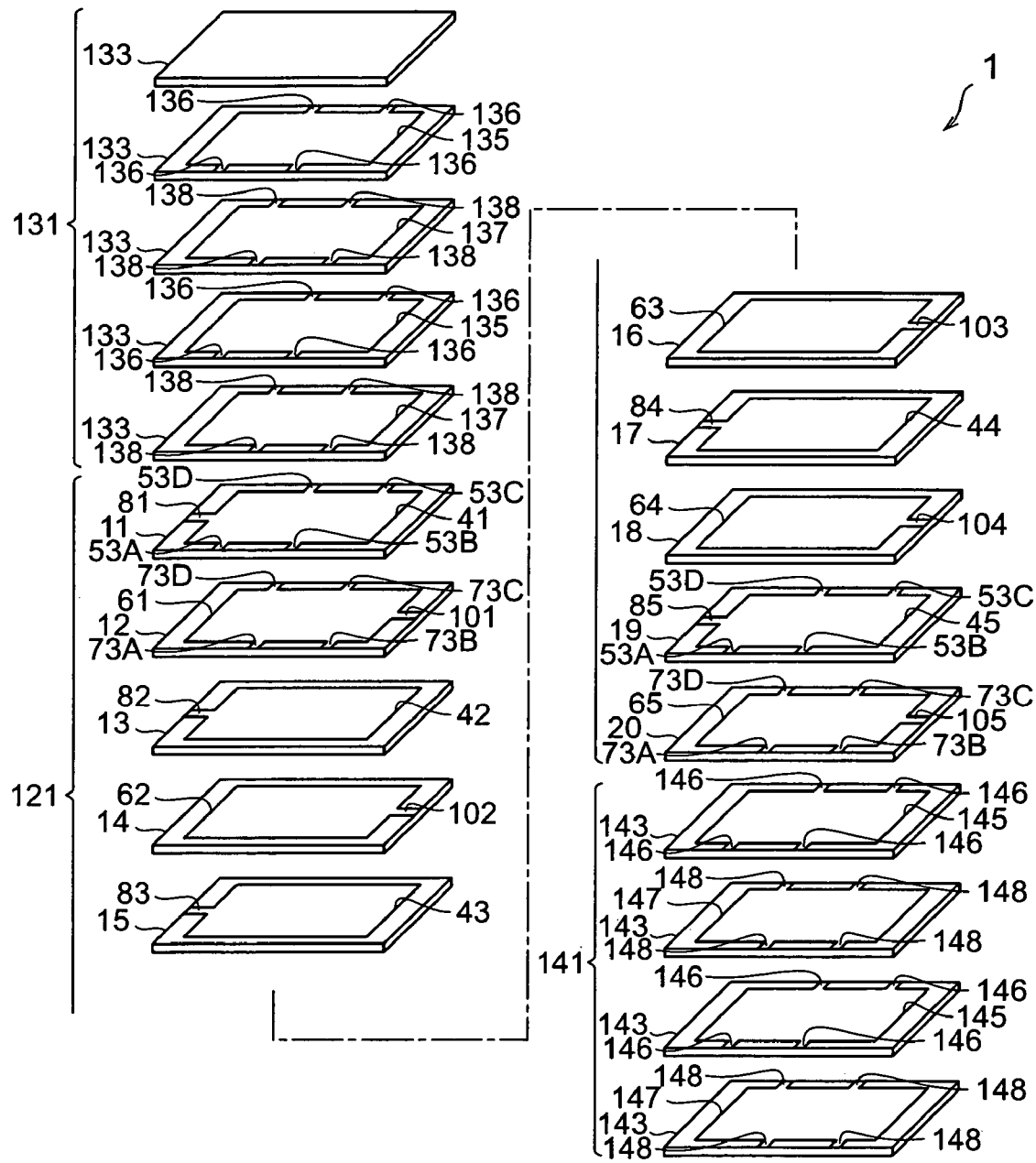
FIG. 38 is an exploded perspective view of the multilayer body included in the multilayer capacitor in accordance with a thirty-fifth embodiment.

With reference to FIG. 38, the structure of the multilayer capacitor in accordance with a thirty-fifth embodiment will be explained. The multilayer capacitor in accordance with the thirty-fifth embodiment differs from the multilayer capacitor C3 in accordance with the twenty-eighth embodiment in terms of the structure of the multilayer body 1. FIG. 38 is an exploded perspective view of the multilayer body included in the multilayer capacitor in accordance with the thirty-fifth embodiment.

As with the multilayer capacitor C3 in accordance with the twenty-eighth embodiment, the multilayer capacitor in accordance with the thirty-fifth embodiment comprises a multilayer body 1, first terminal electrodes 3A to 3D formed on the multilayer body 1, second terminal electrodes 5A to 5D similarly formed on the multilayer body 1, and first and second connecting conductors 7, 9, which are not depicted.

As shown in FIG. 38, the multilayer body 1 includes first to third capacitor portions 121, 131, 141. The first capacitor portion 121 is positioned between the second capacitor portion 131 and third capacitor portion 141.

To begin with, the structure of the first capacitor portion 121 will be explained. The first capacitor portion 121 has the same configuration as that of the multilayer body 1 in the multilayer capacitor in accordance with the twenty-eighth embodiment except for the dielectric layer 35. Namely, the first capacitor portion 121 is constructed by alternately laminating a plurality of (10 in this embodiment) dielectric layers 11 to 20 and a plurality of (5 each in this embodiment) first and second inner electrodes 41 to 45, 61 to 65. In the first capacitor portion 121, two first inner electrodes 41, 45 among the five first inner electrodes 41 to 45 are electrically connected to their corresponding first terminal electrode 3A to 3D through lead conductors 53A to 53D. Among the five second inner electrodes 61 to 65, two second inner electrodes 61, 65 are electrically connected to their corresponding second terminal electrodes 5A to 5D through lead conductors 73A to 73D.

The structure of the second capacitor portion 131 will now be explained. The second capacitor portion 131 is constructed by alternately laminating a plurality of (5 in this embodiment) dielectric layers 133 and a plurality of (2 each in this embodiment) first and second inner electrodes 135, 137. The first inner electrodes 135 are electrically connected to the first terminal electrodes 3A to 3D through lead conductors 136. The lead conductors 136 are integrally formed with the first inner electrodes 135, and extend therefrom so as to reach side faces 1a, 1b of the multilayer body 1. The second inner electrodes 137 are electrically connected to the second terminal electrodes 5A to 5D through lead conductors 138. The lead conductors 138 are integrally formed with the second inner electrodes 137, and extend therefrom so as to reach the side faces 1a, 1b of the multilayer body 1.

The structure of the third capacitor portion 141 will now be explained. The second capacitor portion 141 is constructed by alternately laminating a plurality of (4 in this embodiment) dielectric layers 143 and a plurality of (2 each in this embodiment) first and second inner electrodes 145, 147. The first inner electrodes 145 are electrically connected to the first terminal electrodes 3A to 3D through their corresponding lead conductors 146. The lead conductors 146 are integrally formed with the first inner electrodes 145, and extend therefrom so as to reach the side faces 1a, 1b of the multilayer body 1. The second inner electrodes 147 are electrically connected to the second terminal electrodes 5A to 5D through their corresponding lead conductors 148. The lead conductors 148 are integrally formed with the second inner electrodes 147, and extend therefrom so as to reach the side faces 1a, 1b of the multilayer body 1.

The inner electrodes 41, 45 in the first capacitor portion 121 are electrically connected to the first inner electrodes 135 of the second capacitor portion 131 and the first inner electrodes 145 of the third capacitor portion 141 through the terminal electrodes 3A to 3D. The second inner electrodes 61, 65 in the first capacitor portion 121 are electrically connected to the second inner electrodes 137 of the second capacitor portion 131 and the second inner electrodes 147 of the third capacitor portion 141 through the terminal electrodes 5A to 5D.

By having the first capacitor portion 121 as in the foregoing, the multilayer capacitor in accordance with this embodiment sets its equivalent series resistance to a desirable value as described in the twenty-eighth embodiment and thus can regulate the equivalent series resistance easily with a high precision.

Thirty-sixth Embodiment

Figure 39:
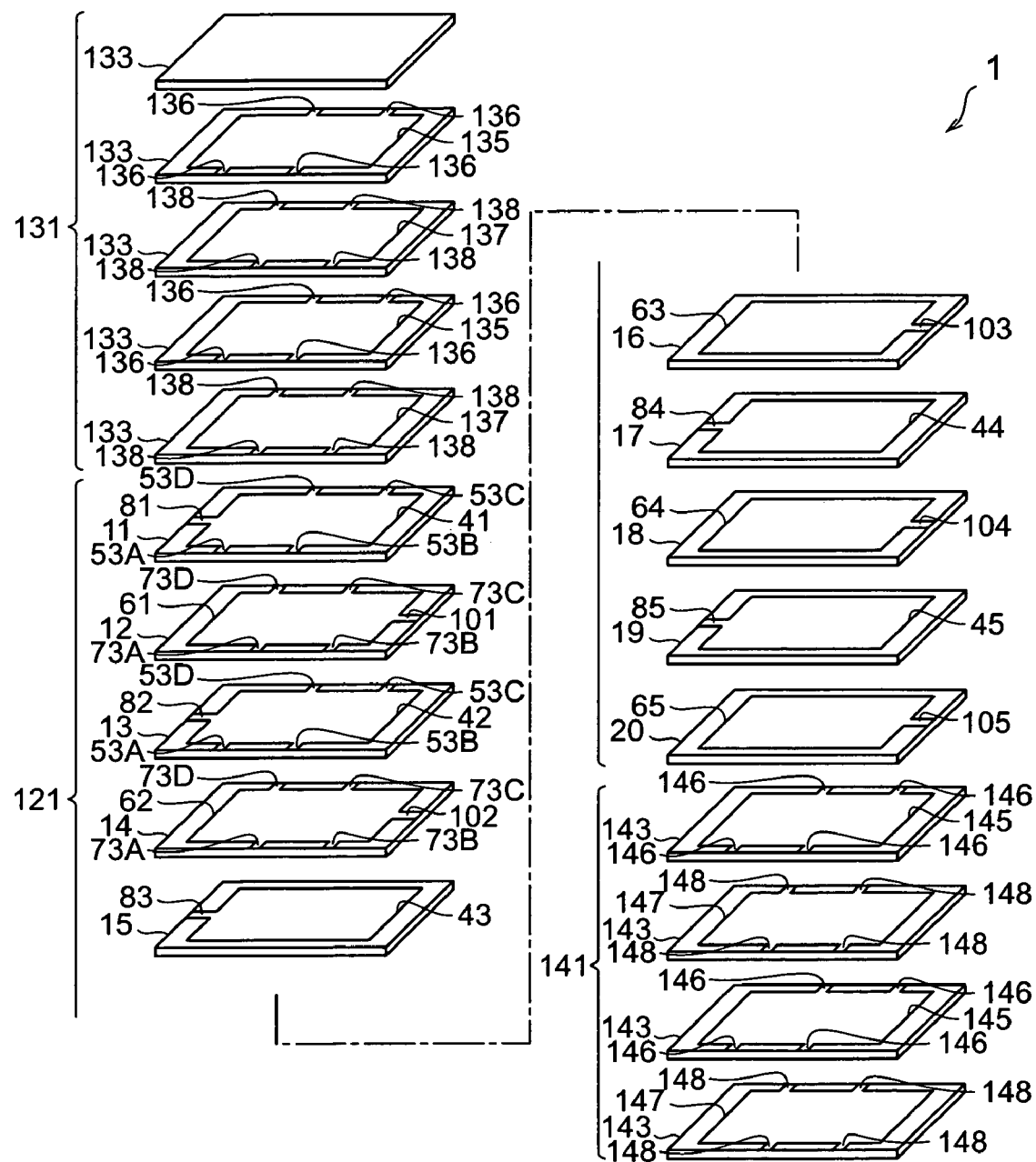
FIG. 39 is an exploded perspective view of the multilayer body included in the multilayer capacitor in accordance with a thirty-sixth embodiment.

With reference to FIG. 39, the structure of the multilayer capacitor in accordance with a thirty-sixth embodiment will be explained. The multilayer capacitor in accordance with the thirty-sixth embodiment differs from the multilayer capacitor in accordance with the thirty-fifth embodiment in terms of the structure of the first capacitor portion 121. FIG. 39 is an exploded perspective view of the multilayer body included in the multilayer capacitor in accordance with the thirty-sixth embodiment.

As with the multilayer capacitor C3 in accordance with the twenty-eighth embodiment, the multilayer capacitor in accordance with the thirty-fifth embodiment comprises a multilayer body 1, first terminal electrodes 3A to 3D formed on the multilayer body 1, second terminal electrodes 5A to 5D similarly formed on the multilayer body 1, and first and second connecting conductors 7, 9, which are not depicted.

The first capacitor portion 121 has the same configuration as that of the multilayer body 1 in the multilayer capacitor in accordance with the twenty-ninth embodiment except for the dielectric layer 35. Namely, the first capacitor portion 121 is constructed by alternately laminating a plurality of (10 in this embodiment) dielectric layers 11 to 20 and a plurality of (5 each in this embodiment) first and second inner electrodes 41 to 45, 61 to 65. In the first capacitor portion 121, two first inner electrodes 41, 42 among the five first inner electrodes 41 to 45 are electrically connected to their corresponding first terminal electrode 3A to 3D through lead conductors 53A to 53D. Among the five second inner electrodes 61 to 65, two second inner electrodes 61, 62 are electrically connected to their corresponding second terminal electrodes 5A to 5D through lead conductors 73A to 73D.

By having the first capacitor portion 121 as in the foregoing, the multilayer capacitor in accordance with this embodiment sets its equivalent series resistance to a desirable value as described in the twenty-ninth embodiment and thus can regulate the equivalent series resistance easily with a high precision.

Thirty-seventh Embodiment

Figure 40:
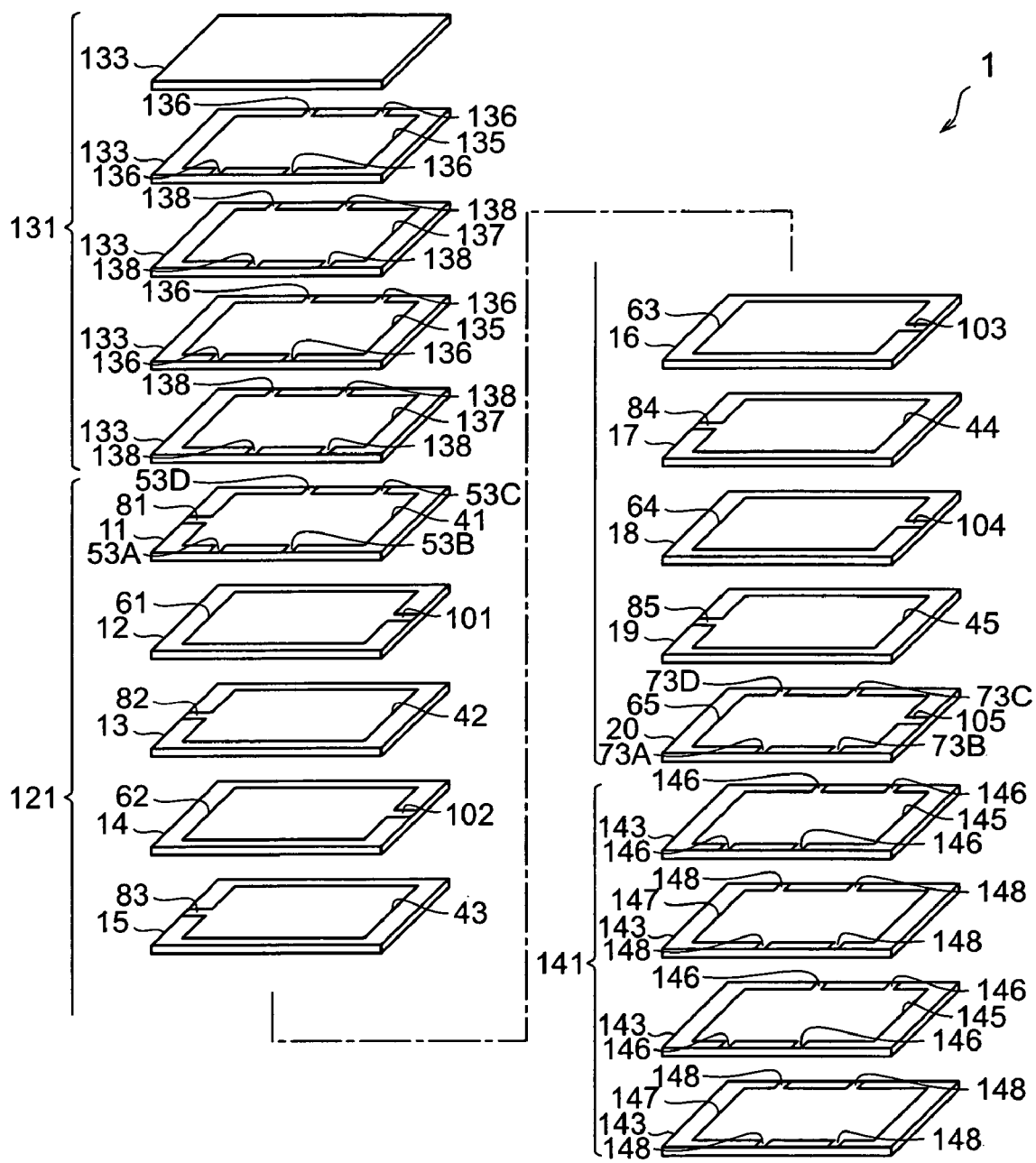
FIG. 40 is an exploded perspective view of the multilayer body included in the multilayer capacitor in accordance with a thirty-seventh embodiment.

With reference to FIG. 40, the structure of the multilayer capacitor in accordance with a thirty-seventh embodiment will be explained. The multilayer capacitor in accordance with the thirty-seventh embodiment differs from the multilayer capacitor in accordance with the thirty-fifth embodiment in terms of the structure of the first capacitor portion 121. FIG. 40 is an exploded perspective view of the multilayer body included in the multilayer capacitor in accordance with the thirty-seventh embodiment.

As with the multilayer capacitor C3 in accordance with the twenty-eighth embodiment, the multilayer capacitor in accordance with the thirty-seventh embodiment comprises a multilayer body 1, first terminal electrodes 3A to 3D formed on the multilayer body 1, second terminal electrodes 5A to 5D similarly formed on the multilayer body 1, and first and second connecting conductors 7, 9, which are not depicted.

The first capacitor portion 121 has the same configuration as that of the multilayer body 1 in the multilayer capacitor in accordance with the thirty-second embodiment except for the dielectric layer 35. Namely, the first capacitor portion 121 is constructed by alternately laminating a plurality of (10 in this embodiment) dielectric layers 11 to 20 and a plurality of (5 each in this embodiment) first and second inner electrodes 41 to 45, 61 to 65. In the first capacitor portion 121, one inner electrode 41 among the five first inner electrodes 41 to 45 is electrically connected to the first terminal electrode 3A to 3D through lead conductors 53A to 53D. Among the five second inner electrodes 61 to 65, one second inner electrode 65 is electrically connected to the second terminal electrodes 5A to 5D through lead conductors 73A to 73D.

By having the first capacitor portion 121 as in the foregoing, the multilayer capacitor in accordance with this embodiment sets its equivalent series resistance to a desirable value as described in the thirty-second embodiment and thus can regulate the equivalent series resistance easily with a high precision.

The same structure as that of the multilayer body 1 in the multilayer capacitor in accordance with any of the thirtieth, thirty-first, thirty-third, and thirty-fourth embodiments (excluding the dielectric layer 35) may also be employed as the structure of the first capacitor portion 121. While increasing the number of terminal electrodes, the same structure as that of the multilayer body 1 in the multilayer capacitor in accordance with any of the twenty-second to twenty-fourth embodiments (excluding the dielectric layer 35) may also be employed as the structure of the first capacitor portion 121.

By adjusting at least one of the number and position in the laminating direction of inner electrodes connected to the terminal electrodes 3, 3A to 3D, 5, 5A to 5D through the lead conductors 53, 53A to 53D, 73, 73A to 73D, the first to thirty-seventh embodiments set the equivalent series resistance of their multilayer capacitors to a desirable value. As a result, the equivalent series resistance of each multilayer capacitor can be regulated easily with a high precision.

The number of the first inner electrodes 41 to 52, 253 to 259 can be adjusted within the range from at least 1 to the number smaller than the total number of the first inner electrodes 41 to 52, 253 to 259 by 1. The number of the second inner electrodes 61 to 72, 273 to 279 can be adjusted within the range from at least 1 to the number smaller than the total number of the second inner electrodes 61 to 72, 273 to 279 by 1. The number of first inner electrodes connected to the terminal electrodes 3, 3A to 3D through the lead conductors 53, 53A to 53D and the number of second inner electrodes connected to the terminal electrodes 5, 5A to 5D through the lead conductors 73, 73A to 73D may differ from each other.

The number of connecting conductors may further be adjusted, such that the equivalent series resistance of each multilayer capacitor is set to a desirable value. This can regulate the equivalent series resistance of each multilayer capacitor with a higher precision.

Figure 41:
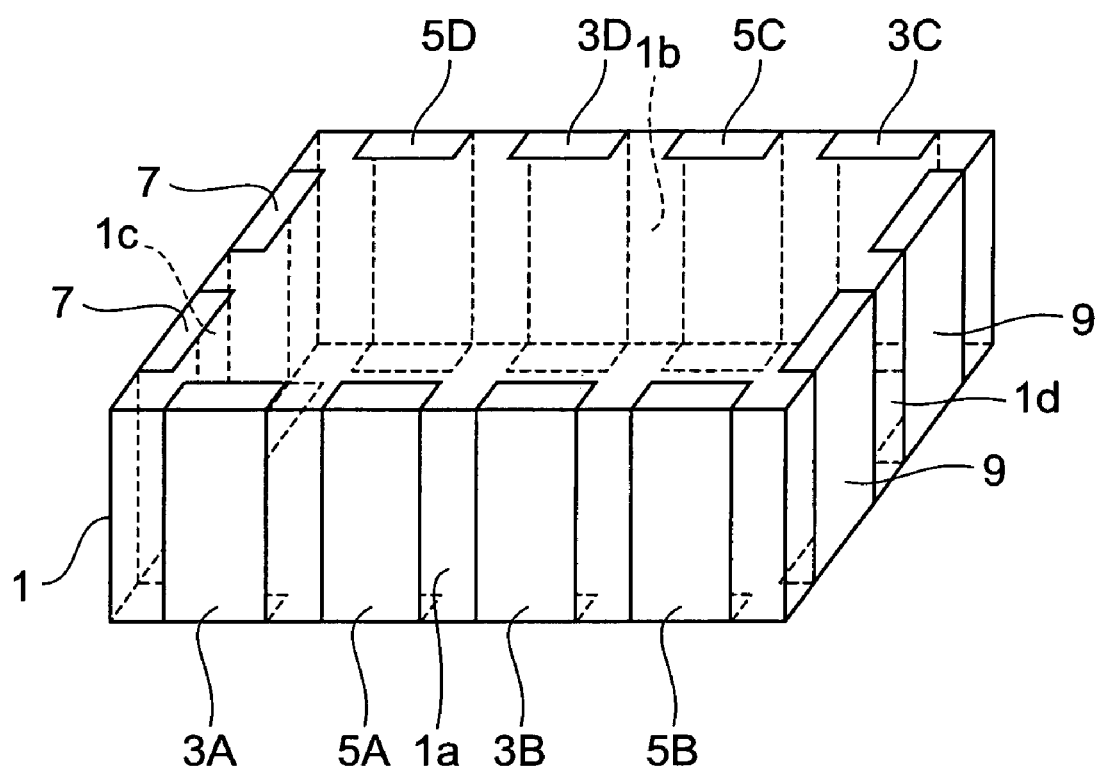
FIG. 41 is a perspective view of a modified example of the multilayer capacitor in accordance with the fifteenth embodiment.
Figure 42:
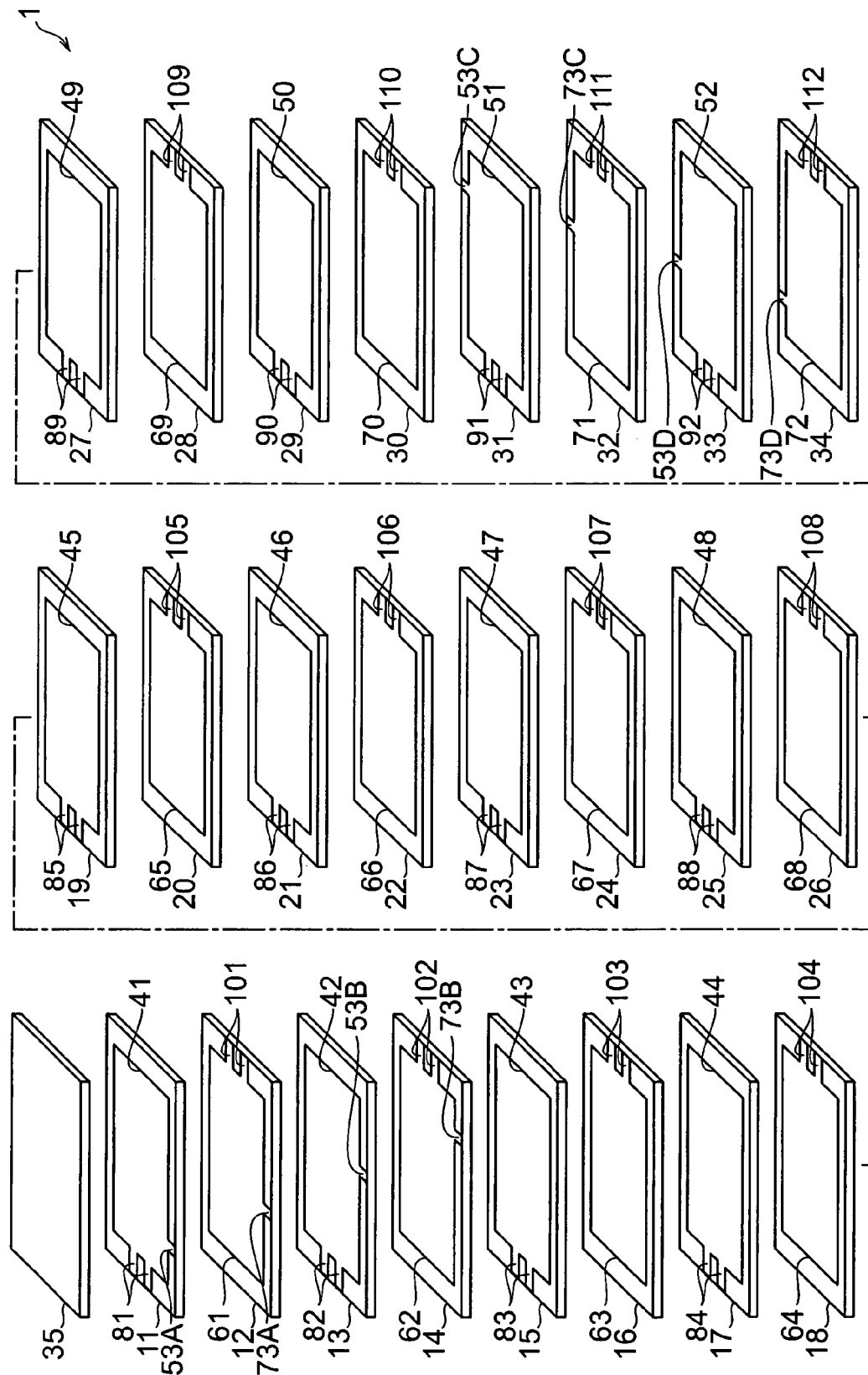
FIG. 42 is an exploded perspective view of the multilayer body included in the modified example of the multilayer capacitor in accordance with the fifteenth embodiment.

An example of adjusting the number of connecting conductors is shown in FIGS. 41 and 42. By setting the number of first and second connecting conductors in the multilayer capacitor in accordance with the fifteenth embodiment to 2 each, the multilayer capacitor shown in FIGS. 41 and 42 sets the equivalent series resistance to a desirable value. FIG. 41 is a perspective view of a modified example of the multilayer capacitor in accordance with the fifteenth embodiment. FIG. 42 is an exploded perspective view of the multilayer body included in the multilayer capacitor in accordance with the modified example of the multilayer capacitor in accordance with the fifteenth embodiment. As shown in FIG. 41, the modified example of the multilayer capacitor in accordance with the fifteenth embodiment comprises two each of first and second connecting conductors 7, 9. As shown in FIG. 42, the first inner electrodes 41 to 62 include two each of lead conductors 81 to 92, 101 to 112. Therefore, the first inner electrodes 41 to 62 are electrically connected to each other through two conductive paths, and the second inner electrodes 61 to 82 are electrically connected to each other through two conductive paths. Each of the connecting conductors 7, 9 in any of the multilayer capacitors in accordance with the first to fourteenth embodiments and sixteenth to thirty-seventh embodiments other than the multilayer capacitor in accordance with the fifteenth embodiment may be set to a plurality of numbers.

Thirty-eighth Embodiment

Figure 43:
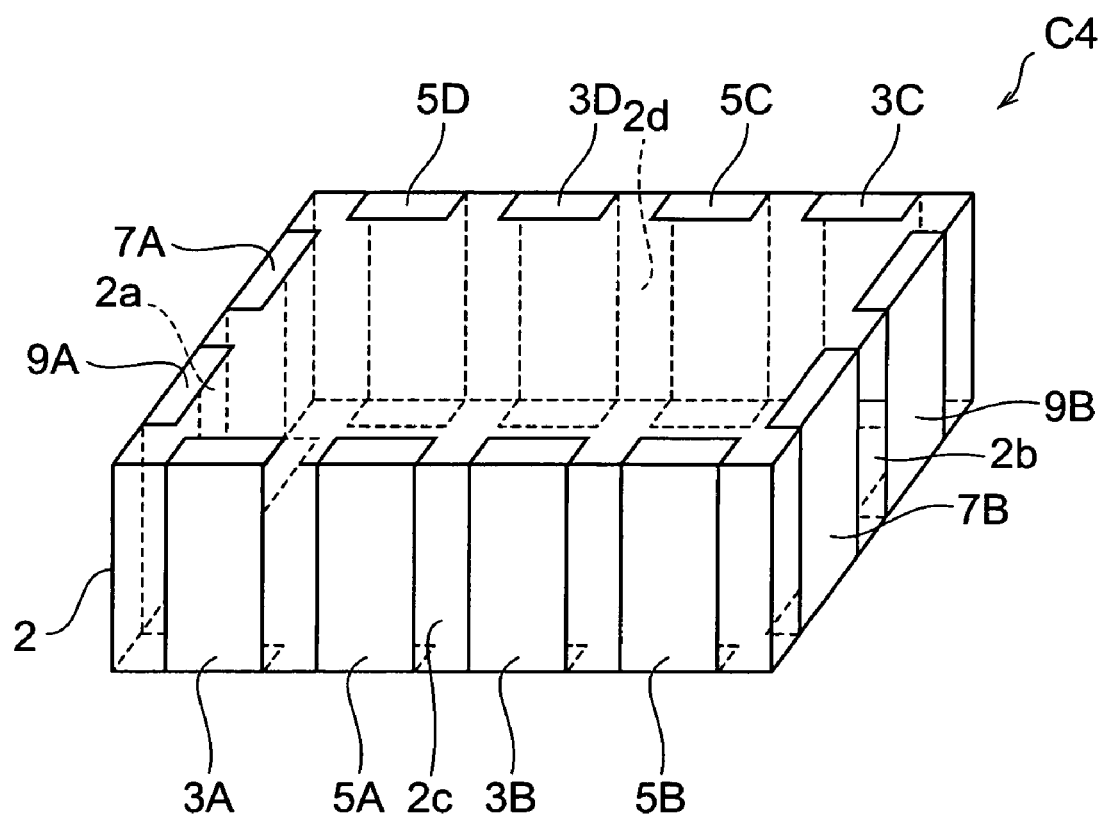
FIG. 43 is a perspective view of the multilayer capacitor in accordance with a thirty-eighth embodiment.
Figure 44:
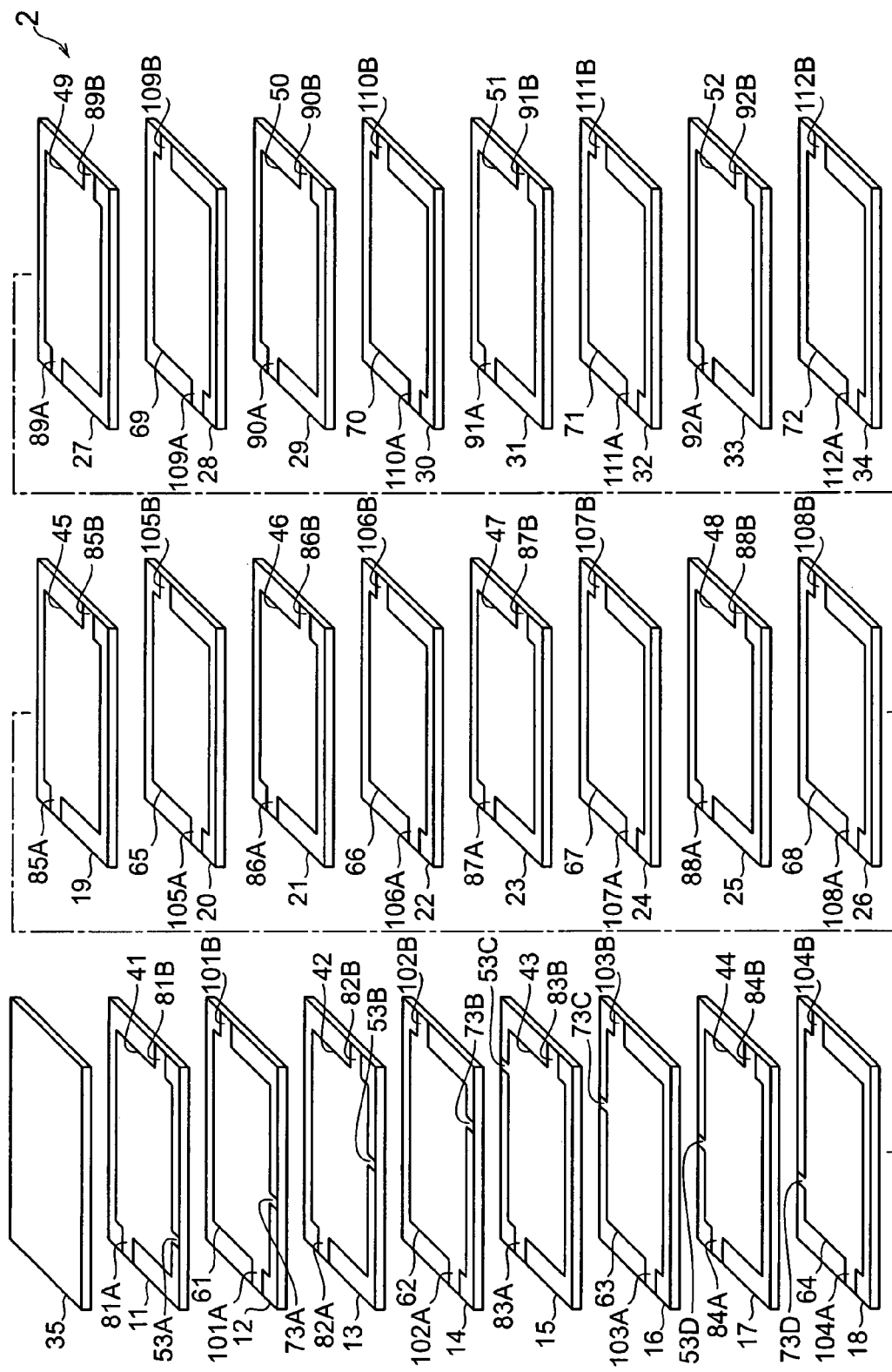
FIG. 44 is an exploded perspective view of the multilayer body included in the multilayer capacitor in accordance with the thirty-eighth embodiment.

With reference to FIGS. 43 and 44, the structure of the multilayer capacitor C4 in accordance with a thirty-eighth embodiment will be explained. FIG. 43 is a perspective view of the multilayer capacitor in accordance with the thirty-eighth embodiment. FIG. 44 is an exploded perspective view of the multilayer body included in the multilayer capacitor in accordance with the thirty-eighth embodiment.

As shown in FIG. 43, the multilayer capacitor C4 in accordance with the thirty-eighth embodiment comprises a multilayer body 2 having a substantially rectangular parallelepiped form, and a plurality of outer conductors formed on the multilayer body 2. The plurality of outer conductors have a first outer conductor group and a second outer conductor group. The first outer conductor group includes a plurality of (4 in this embodiment) first terminal electrodes (first terminal conductors) 3A to 3D and an even number of (2 in this embodiment) first connecting conductors 7A, 7B. The second outer conductor group includes a plurality of (4 in this embodiment) second terminal electrodes (second terminal conductors) 5A to 5D and an even number of (2 in this embodiment) second connecting conductors 9A, 9B.

The first connecting conductor 7A and second connecting conductor 9A are positioned on a first side face 2a among first to fourth side faces 2a to 2d parallel to the laminating direction in the multilayer body 2 to be explained later, and are formed in the order of the first connecting conductor 7A and second connecting conductor 9A from the fourth side face 2d toward the third side face 2c. Thus, the first connecting conductor 7A, which is a part (one in this embodiment) of the two first connecting conductors 7A, 7B, and the second connecting conductor 9A, which is a part (one in this embodiment) of the two second connecting conductors 9A, 9B, are formed on the first side face 2a whereby their sum is an even number (2).

The first connecting conductor 7B and second connecting conductor 9B are positioned on the second side face 2b opposing the first side face 2a among the first to fourth side faces 2a to 2d parallel to the laminating direction in the multilayer body 2, and are formed in the order of the first connecting conductor 7B and second connecting conductor 9B from the third side face 2c toward the fourth side face 2d. Thus, the first connecting conductor 7B, which is the rest (one in this embodiment) other than the first connecting conductor 7A formed on the first side face 2a and the second connecting conductor 9B, which is the rest (one in this embodiment) other than the second connecting conductor 9A formed on the first side face 2a are formed on the second side face 2b, whereby their sum is an even number (2).

The first connecting conductors 7A and 7B are formed at respective positions symmetrical to each other about the center axis in the laminating direction of the multilayer body 2. The second connecting conductors 9A and 9B are formed at respective positions symmetrical to each other about the center axis in the laminating direction of the multilayer body 2. The first connecting conductors 7A, 7B and the second connecting conductors 9A, 9B are electrically insulated from each other.

The first terminal electrodes 3A, 3B and second terminal electrodes SA, 5B are positioned on the third side face 2c of the multilayer body 2, and are formed in the order of the first terminal electrode 3A, second terminal electrode 5A, first terminal electrode 3B, and second terminal electrode 5B from the first side face 2a toward the second side face 2b.

The first terminal electrodes 3C, 3D and second terminal electrodes 5C, 5D are positioned on the fourth side face 2d of the multilayer body 2, and are formed in the order of the first terminal electrode 3C, second terminal electrode 5C, first terminal electrode 3D, and second terminal electrode 5D from the second side face 2b toward the first side face 2a.

Thus, on the first to fourth side faces 2a to 2d of the multilayer body 2, the conductors included in the first outer conductor group (the first terminal electrodes 3A to 3D and first connecting conductors 7A, 7B) and the conductors included in the second outer conductor group (the second terminal electrodes 5A to 5D and second connecting conductors 9A, 9B) are alternately arranged in a direction circulating so as to intersect the laminating direction of the multilayer body 2 along the side faces (first, third, second, and fourth side faces 2a 2c, 2b, 2d) of the multilayer body 2 parallel to the laminating direction.

When only the first and second terminal electrodes 3A to 3D, 5A to 5D are concerned while excluding the first and second connecting conductors 7A, 7B, 9A, 9B, the first and second terminal electrodes 3A to 3D, 5A to 5D are arranged such that the first and second terminal electrodes alternate with each other in the direction circulating so as to intersect the laminating direction of the multilayer body 2 along the side faces (first, third, second, and fourth side faces 2a, 2c, 2b, 2d) of the multilayer body 2 parallel to the laminating direction.

The first and second terminal electrodes 3A to 3D, 5A to 5D are formed on the third and fourth side faces 2c, 2d, which are different from the first and second side faces 2a, 2b formed with the first connecting conductors 7A, 7B or second connecting conductors 9A, 9B, among the side faces parallel to the laminating direction of the multilayer body 2. The sum of the first terminal electrodes 3A, 3B and second terminal electrodes 5A, 5B formed on the third side face 2c is 4, which is an even number. The sum of the first terminal electrodes 3C, 3D and second terminal electrodes 5C, 5D formed on the fourth side face 2d is 4, which is an even number.

The first terminal electrodes 3A to 3D and the second terminal electrodes 5A to 5D are electrically insulated from each other.

As is also shown in FIG. 44, the multilayer body 2 is constructed by alternately laminating a plurality of (25 in this embodiment) dielectric layers 11 to 35 and a plurality of (12 each in this embodiment) first and second inner electrodes 41 to 52, 61 to 72. In the actual multilayer capacitor C4, the dielectric layers 11 to 35 are integrated to such an extent that no boundaries are discernible therebetween.

Each of the first inner electrodes 41 to 52 has a substantially rectangular form. The first inner electrodes 41 to 52 are formed at respective positions separated by a predetermined distance from a side face parallel to the laminating direction of the dielectric layers 11 to 35 in the multilayer body 1 (hereinafter simply referred to as "laminating direction"). The first inner electrodes 41 to 52 are formed with respective lead conductors 81A to 92A extending so as to reach the first side face 2a of the multilayer body 2 and respective lead conductors 81B to 92B extending so as to reach the second side face 2b of the multilayer body 2.

The lead conductors 81A to 92A are integrally formed with their corresponding first inner electrodes 41 to 52, and extend therefrom so as to reach the first side face 2a of the multilayer body 2. The lead conductors 81B to 92B are integrally formed with their corresponding first inner electrodes 41 to 52, and extend therefrom so as to reach the second side face 2b of the multilayer body 2.

The first inner electrodes 41 to 52 are electrically connected to the first connecting conductor 7A through their corresponding lead conductors 81A to 92A. The first inner electrodes 41 to 52 are electrically connected to the first connecting conductor 7B through their corresponding lead conductors 81B to 92B. As a consequence, the first inner electrodes 41 to 52 are electrically connected to each other through the first connecting conductors 7A, 7B.

The first inner electrodes 41, 42 are formed with their corresponding lead conductors 53A, 53B extending so as to reach the third side face 2c of the multilayer body 2. The first inner electrodes 43, 44 are formed with their corresponding lead conductors 53C, 53D extending so as to reach the fourth side face 2d of the multilayer body 2.

The lead conductor 53A is integrally formed with the first inner electrode 41, and extends therefrom so as to reach the third side face 2c of the multilayer body 2. The lead conductor 53B is integrally formed with the first inner electrode 42, and extends therefrom so as to reach the third side face 2c of the multilayer body 2. The lead conductor 53C is integrally formed with the first inner electrode 43, and extends therefrom so as to reach the fourth side face 2d of the multilayer body 2. The lead conductor 53D is integrally formed with the first inner electrode 44, and extends therefrom so as to reach the fourth side face 2d of the multilayer body 2.

The first inner electrode 41 is electrically connected to the first terminal electrode 3A through the lead conductor 53A. The first inner electrode 42 is electrically connected to the first terminal electrode 3B through the lead conductor 53B. The first inner electrode 43 is electrically connected to the first terminal electrode 3C through the lead conductor 53C. The first inner electrode 44 is electrically connected to the first terminal electrode 3D through the lead conductor 53D.

Since the first inner electrodes 41 to 52 are electrically connected to each other through the first connecting conductors 7A, 7B, the first inner electrodes 45 to 52 are also electrically connected to the first terminal electrodes 3A to 3D, whereby the first inner electrodes 41 to 52 are connected in parallel.

Each of the second inner electrodes 61 to 72 has a substantially rectangular form. The second inner electrodes 61 to 72 are formed at respective positions separated by a predetermined distance from a side face parallel to the laminating direction of the multilayer body 2. The second inner electrodes 61 to 72 are formed with respective lead conductors 101A to 112A extending so as to reach the first side face 2a of the multilayer body 2 and respective lead conductors 101B to 112B extending so as to reach the second side face 2b of the multilayer body 2.

The lead conductors 101A to 112A are integrally formed with their corresponding second inner electrodes 61 to 72, and extend therefrom so as to reach the first side face 2a of the multilayer body 2. The lead conductors 100B to 112B are integrally formed with their corresponding second inner electrodes 61 to 72, and extend therefrom so as to reach the second side face 2b of the multilayer body 2.

The second inner electrodes 61 to 72 are electrically connected to the second connecting conductor 9A through their corresponding connecting conductors 101A to 112A. The second inner electrodes 61 to 72 are electrically connected to the second connecting conductor 9B through their corresponding lead conductors 100B to 112B. As a consequence, the second inner electrodes 61 to 72 are electrically connected to each other through the second connecting conductors 9A, 9B.

The second inner electrodes 61, 62 are formed with their corresponding lead conductors 73A, 73B extending so as to reach the third side face 2c of the multilayer body 2. The second inner electrodes 63, 64 are formed with their corresponding lead conductors 73C, 73D extending so as to reach the fourth side face 2d of the multilayer body 2.

The lead conductor 73A is integrally formed with the second inner electrode 61, and extends therefrom so as to reach the third side face 2c of the multilayer body 2. The lead conductor 73B is integrally formed with the second inner electrode 62, and extends therefrom so as to reach the third side face 2c of the multilayer body 2. The lead conductor 73C is integrally formed with the second inner electrode 63, and extends therefrom so as to reach the fourth side face 2d of the multilayer body 2. The lead conductor 73D is integrally formed with the second inner electrode 64, and extends therefrom so as to reach the fourth side face 2d of the multilayer body 2.

The second inner electrode 61 is electrically connected to the second terminal electrode 5A through the lead conductor 73A. The second inner electrode 62 is electrically connected to the second terminal electrode 5B through the lead conductor 73B. The second inner electrode 63 is electrically connected to the second terminal electrode 5C through the lead conductor 73C. The second inner electrode 64 is electrically connected to the second terminal electrode 5D through the lead conductor 73D.

Since the second inner electrodes 61 to 72 are electrically connected to each other through the second connecting conductors 9A, 9B, the second inner electrodes 65 to 72 are also electrically connected to the second terminal electrodes 5A to 5D, whereby the second inner electrodes 61 to 72 are connected in parallel.

In the multilayer capacitor C4, the number of first inner electrodes 41 to 44 connected to the first terminal electrodes 3A to 3D through the lead conductors 53A to 53D is 4, which is smaller than the total number (12 in this embodiment) of the first inner electrodes 41 to 52. The number of second inner electrodes 61 to 64 connected to the second terminal electrodes 5A to 5D through the lead conductors 73A to 73D is 4, which is smaller than the total number (12 in this embodiment) of the second inner electrodes 61 to 72.

When the first terminal electrode 3A is concerned, the resistance component of each of the first connecting conductors 7A, 7B is connected in series to the first terminal electrode 3A.

When the first terminal electrode 3B is concerned, at the first inner electrode 42 as a boundary, the resistance components of the first connecting conductors 7A, 7B are divided into the resistance components of the first connecting conductors 7A, 7B positioned on one side of the first inner electrode 42 in the laminating direction and the resistance components of the first connecting conductors 7A, 7B positioned on the other side of the first inner electrode 42 in the laminating direction. These resistance components are connected in parallel to the first terminal electrode 3B.

When the first terminal electrode 3C is concerned, at the first inner electrode 43 as a boundary, the resistance components of the first connecting conductors 7A, 7B are divided into the resistance components of the first connecting conductors 7A, 7B positioned on one side of the first inner electrode 43 in the laminating direction and the resistance components of the first connecting conductors 7A, 7B positioned on the other side of the first inner electrode 43 in the laminating direction. These resistance components are connected in parallel to the first terminal electrode 3C.

When the first terminal electrode 3D is concerned, at the first inner electrode 44 as a boundary, the resistance components of the first connecting conductors 7A, 7B are divided into the resistance components of the first connecting conductors 7A, 7B positioned on one side of the first inner electrode 44 in the laminating direction and the resistance components of the first connecting conductors 7A, 7B positioned on the other side of the first inner electrode 44 in the laminating direction. These resistance components are connected in parallel to the first terminal electrode 3D.

When the second terminal electrode 5A is concerned, at the second inner electrode 61 as a boundary, the resistance components of the second connecting conductors 9A, 9B are divided into the resistance components of the second connecting conductors 9A, 9B positioned on one side of the second inner electrode 61 in the laminating direction and the resistance components of the second connecting conductors 9A, 9B positioned on the other side of the second inner electrode 61 in the laminating direction. These resistance components are connected in parallel to the second terminal electrode 5A.

When the second terminal electrode 5B is concerned, at the second inner electrode 62 as a boundary, the resistance components of the second connecting conductors 9A, 9B are divided into the resistance components of the second connecting conductors 9A, 9B positioned on one side of the second inner electrode 62 in the laminating direction and the resistance components of the second connecting conductors 9A, 9B positioned on the other side of the second inner electrode 62 in the laminating direction. These resistance components are connected in parallel to the second terminal electrode 5B.

When the second terminal electrode 5C is concerned, at the second inner electrode 63 as a boundary, the resistance components of the second connecting conductors 9A, 9B are divided into the resistance components of the second connecting conductors 9A, 9B positioned on one side of the second inner electrode 63 in the laminating direction and the resistance components of the second connecting conductors 9A, 9B positioned on the other side of the second inner electrode 63 in the laminating direction. These resistance components are connected in parallel to the second terminal electrode 5C.

When the second terminal electrode 5D is concerned, at the second inner electrode 64 as a boundary, the resistance components of the second connecting conductors 9A, 9B are divided into the resistance components of the second connecting conductors 9A, 9B positioned on one side of the second inner electrode 64 in the laminating direction and the resistance components of the second connecting conductors 9A, 9B positioned on the other side of the second inner electrode 64 in the laminating direction. These resistance components are connected in parallel to the second terminal electrode 5D.

These make the multilayer capacitor C4 attain an equivalent series resistance greater than that of a conventional multilayer capacitor in which all the inner electrodes are connected to their corresponding terminal electrodes through lead conductors.

By adjusting each of the number of first inner electrodes 41 to 44 electrically connected to the first terminal electrodes 3A to 3D through the lead conductors 53A to 53D and the number of second inner electrode 61 to 64 electrically connected to the second terminal electrodes 5A to 5D through the lead conductors 73A to 73D as in the foregoing, this embodiment sets the equivalent series resistance of the multilayer capacitor C4 to a desirable value and thus can regulate the equivalent series resistance easily with a high precision.

On the first to fourth side faces 2a to 2d of the multilayer body 2, the conductors included in the first outer conductor group (the first terminal electrodes 3A to 3D and first connecting conductors 7A, 7B) and the conductors included in the second outer conductor group (the second terminal electrodes 5A to 5D and second connecting conductors 9A, 9B) are alternately arranged in a direction circulating so as to intersect the laminating direction of the multilayer body 2 along the side faces parallel to the laminating direction.

Namely, on the first side face 2a the first connecting conductor 7A and second connecting conductor 9A are successively arranged in the direction from the fourth side face 2a toward the third side face 2c. On the second side face 2a the first connecting conductor 7B and second connecting conductor 9B are successively arranged in the direction from the third side face 2c toward the fourth side face 2d. On the third side face 2c, the first terminal electrode 3A, second terminal electrode 5A, first terminal electrode 3B, and second terminal electrode 5B are successively arranged in the direction from the first side face 2a toward the second side face 2b. On the fourth side face 2d, the first terminal electrode 3C, second terminal electrode 5C, first terminal electrode 3D, and second terminal electrode 5D are successively arranged in the direction from the second side face 2b toward the first side face 2a.

Therefore, when the first outer conductor group (constituted by the first terminal electrodes 3A to 3D and first connecting conductors 7A, 7B) and the second outer conductor group (constituted by the second terminal electrodes 5A to 5D and second connecting conductors 9A, 9B) are connected to respective polarities opposite from each other, terminal electrodes or connecting conductors connected to respective polarities opposite from each other are located adjacent to each other in a direction circulating along the side faces of the multilayer body 2. Consequently, currents flow in directions opposite from each other in the lead conductors 53A to 53D, 81A to 92A, 81B to 92B, 73A to 73D, 101A to 112A, 101B to 112B located adjacent to each other in the circulating direction along the side faces of the multilayer body 2. As a result, magnetic fields caused by these currents cancel each other out, whereby the multilayer capacitor C4 lowers its equivalent series inductance.

When only the first and second terminal electrodes 3A to 3D, 5A to 5D are concerned while excluding the first and second connecting conductors 7A, 7B, 9A, 9B, the first and second terminal electrodes 3A to 3D, 5A to 5D are arranged such that the first and second terminal electrodes alternate with each other in the direction circulating so as to intersect the laminating direction of the multilayer body 2 along the side faces (first, third, second, and fourth side faces 2a, 2c, 2b, 2d) of the multilayer body 2 parallel to the laminating direction. Thus, the first and second terminal electrodes 3A to 3D, 5A to 5D are arranged such that magnetic fields caused by currents flowing through the lead conductors connected to the terminal electrodes cancel each other out, so as to lower the equivalent series inductance. Since the number of each species of the first and second connecting conductors 7A, 7B, 9A, 9B is an even number, the equivalent series inductance will also decrease if connecting conductors are further added to the multilayer capacitor C4 in which the first and second terminal electrodes 3A to 3D, 5A to 5D are arranged such as to reduce the equivalent series inductance.

The first and second terminal electrodes 3A to 3D, 5A to 5D are formed on the third and fourth side faces 2c, 2d that are different from the first and second side faces 2a, 2b formed with the first connecting conductors 7A, 7B or second connecting conductors 9A, 9B. Since the terminal electrodes 3A to 3D, 5A to 5D and the connecting conductors 7A, 7B, 9A, 9B are formed on the respective side faces different from each other, the multilayer capacitor C4 restrains a short-circuit from occurring between the first terminal electrodes 3A to 3D and second connecting conductors 9A, 9B and between the second terminal electrodes 5A to 5D and first connecting conductors 7A, 7B.

In this embodiment, the first inner electrodes 41 to 52 are connected in parallel, and the second inner electrodes 61 to 72 are connected in parallel. As a consequence, even when the resistance value fluctuates among the first inner electrodes 41 to 52 or second inner electrodes 61 to 72, its influence is less in the equivalent series resistance of the multilayer capacitor C4 as a whole, whereby the equivalent series resistance control can be restrained from lowering its precision.

Thirty-ninth Embodiment

Figure 45:
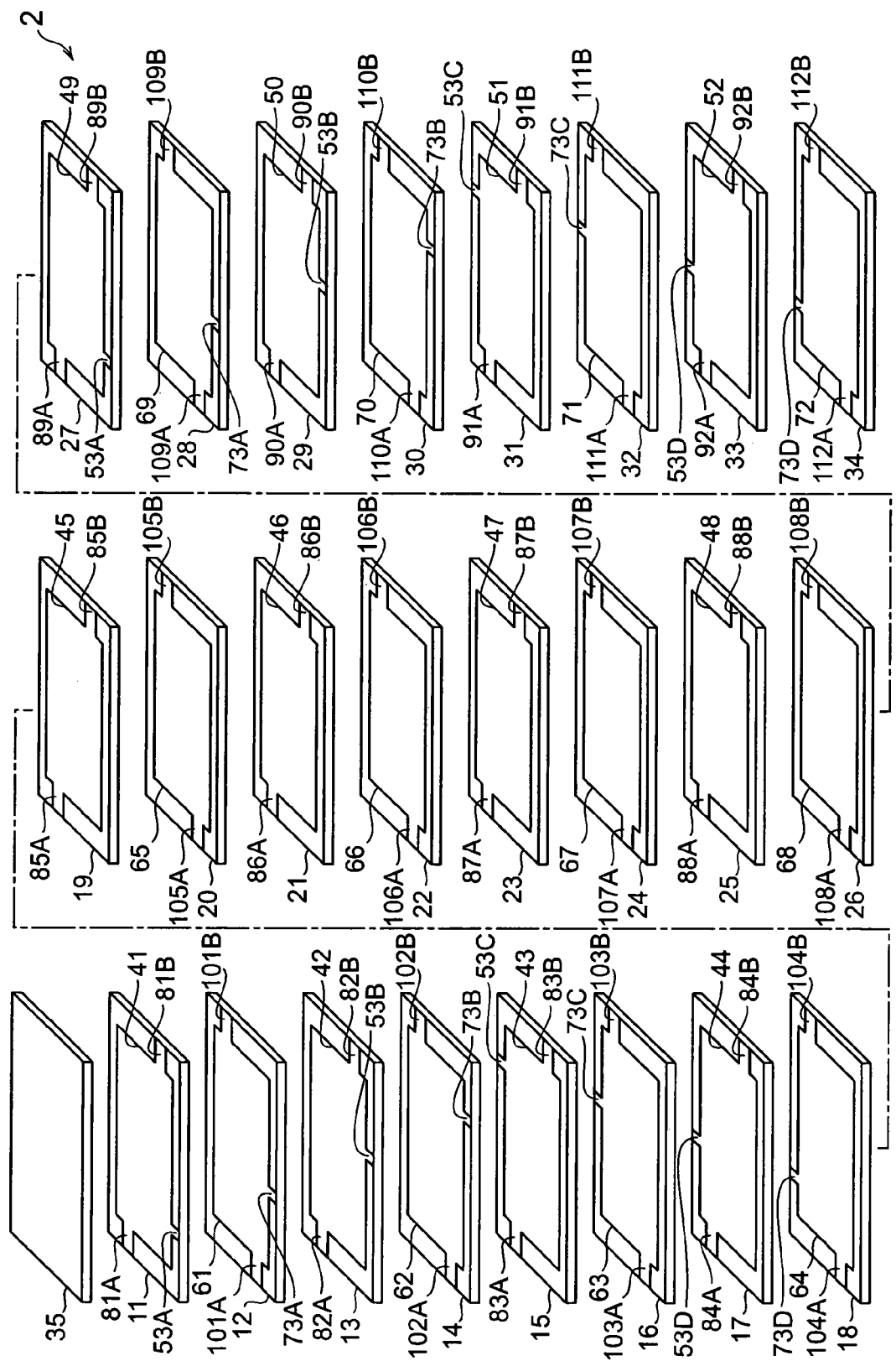
FIG. 45 is an exploded perspective view of the multilayer body included in the multilayer capacitor in accordance with a thirty-ninth embodiment.

With reference to FIG. 45, the structure of the multilayer capacitor in accordance with a thirty-ninth embodiment will be explained. The multilayer capacitor in accordance with the thirty-ninth embodiment differs from the multilayer capacitor C4 in accordance with the thirty-eighth embodiment in terms of the number of first inner electrodes electrically connected to first terminal electrodes 3A to 3D through lead conductors 53A to 53D and the number of second inner electrodes electrically connected to second terminal electrodes 5A to SD through lead conductors 73A to 73D. FIG. 45 is an exploded perspective view of the multilayer body included in the multilayer capacitor in accordance with the thirty-ninth embodiment.

As with the multilayer capacitor C4 in accordance with the thirty-eighth embodiment, the multilayer capacitor in accordance with the thirty-ninth embodiment comprises a multilayer body 2, the first terminal electrodes 3A to 3D formed on the multilayer body 2, the second terminal electrodes 5A to 5D similarly formed on the multilayer body 2, and first and second connecting conductors 7A, 7B, 9A, 9B similarly formed on the multilayer body 2, which are not depicted.

In the multilayer capacitor in accordance with the thirty-ninth embodiment, as shown in FIG. 45, first inner electrodes 49, 50 are formed with the respective lead conductors 53A, 53B extending so as to reach a third side face 2c of the multilayer body 2. First inner electrodes 51, 52 are formed with the respective lead conductors 53C, 53D extending so as to reach a fourth side face 2d of the multilayer body 2.

The lead conductor 53A is integrally formed with the first inner electrode 49, and extends therefrom so as to reach the third side face 2c of the multilayer body 2. The lead conductor 53B is integrally formed with the first inner electrode 50, and extends therefrom so as to reach the third side face 2c of the multilayer body 2. The lead conductor 53C is integrally formed with the first inner electrode 51, and extends therefrom so as to reach the fourth side face 2d of the multilayer body 2. The lead conductor 53D is integrally formed with the first inner electrode 52, and extends therefrom so as to reach the fourth side face 2d of the multilayer body 2.

The first inner electrode 49 is electrically connected to the first terminal electrode 3A through the lead conductor 53A.

The first inner electrode 50 is electrically connected to the first terminal electrode 3B through the lead conductor 53B. The first inner electrode 51 is electrically connected to the first terminal electrode 3C through the lead conductor 53C. The first inner electrode 52 is electrically connected to the first terminal electrode 3D through the lead conductor 53D.

Second inner electrodes 69, 70 are formed with the respective lead conductors 73A, 73B extending so as to reach the third side face 2c of the multilayer body 2. Second inner electrodes 71, 72 are formed with the respective lead conductors 73C, 73D extending so as to reach the fourth side face 2d of the multilayer body 2.

The lead conductor 73A is integrally formed with the second inner electrode 69, and extends therefrom so as to reach the third side face 2c of the multilayer body 2. The lead conductor 73B is integrally formed with the second inner electrode 70, and extends therefrom so as to reach the third side face 2c of the multilayer body 2. The lead conductor 73C is integrally formed with the second inner electrode 71, and extends therefrom so as to reach the fourth side face 2d of the multilayer body 2. The lead conductor 73D is integrally formed with the second inner electrode 72, and extends therefrom so as to reach the fourth side face 2d of the multilayer body 2.

The second inner electrode 69 is electrically connected to the second terminal electrode 5A through the lead conductor 73A. The second inner electrode 70 is electrically connected to the second terminal electrode 5B through the lead conductor 73B. The second inner electrode 71 is electrically connected to the second terminal electrode 5C through the lead conductor 73C. The second inner electrode 72 is electrically connected to the second terminal electrode 5D through the lead conductor 73D.

In the multilayer capacitor in accordance with the thirty-ninth embodiment, the number of first inner electrodes 41 to 44, 49 to 52 connected to the first terminal electrodes 3A to 3D through the lead conductors 53A to 53D is 8, which is smaller than the total number of the first inner electrodes 41 to 52. The number of second inner electrodes 61 to 64, 69 to 72 connected to the second terminal electrodes 5A to 5D through the lead conductors 73A to 73D is 8, which is smaller than the total number of the second inner electrodes 61 to 72. These make the multilayer capacitor in accordance with the thirty-ninth embodiment attain an equivalent series resistance greater than that of a conventional multilayer capacitor in which all the inner electrodes are connected to their corresponding terminal electrodes through lead conductors.

In the multilayer capacitor in accordance with the thirty-ninth embodiment, the number of first inner electrodes 41 to 44, 49 to 52 connected to the first terminal electrodes 3A to 33D through the lead conductors 53A to 53D is greater than that in the multilayer capacitor C4, whereas the lead conductors 53A to 53D are connected in parallel to their corresponding first terminal electrodes 3A to 3D. Also, the number of second inner electrodes 61 to 64, 69 to 72 connected to the second terminal electrodes 5A to 5D through the lead conductors 73A to 73D is greater, whereas the lead conductors 73A to 73D are connected in parallel to their corresponding second terminal electrodes 5A to 5D. These make the multilayer capacitor in accordance with the thirty-ninth embodiment yield an equivalent series resistance smaller than that of the multilayer capacitor C4.

By adjusting each of the number of first inner electrodes 41 to 44, 49 to 52 electrically connected to the first terminal electrodes 3A to 3D through the lead conductors 53A to 53D and the number of second inner electrodes 61 to 64, 69 to 72 electrically connected to the second terminal electrodes 5A to 5D through the lead conductors 73A to 73D as in the foregoing, this embodiment sets the equivalent series resistance of the multilayer capacitor to a desirable value and thus can regulate the equivalent series resistance easily with a high precision.

On the first to fourth side faces 2a to 2d of the multilayer body 2, the conductors included in the first outer conductor group (the first terminal electrodes 3A to 3D and first connecting conductors 7A, 7B) and the conductors included in the second outer conductor group (the second terminal electrodes 5A to 5D and second connecting conductors 9A, 9B) are alternately arranged in a direction circulating so as to intersect the laminating direction of the multilayer body 2 along the side faces parallel to the laminating direction. Therefore, when the first outer conductor group (constituted by the first terminal electrodes 3A to 3D and first connecting conductors 7A, 7B) and the second outer conductor group (constituted by the second terminal electrodes 5A to 5D and second connecting conductors 9A, 9B) are connected to respective polarities opposite from each other, terminal electrodes or connecting conductors connected to respective polarities opposite from each other are located adjacent to each other in a direction circulating along the side faces of the multilayer body 2. Consequently, currents flow in directions opposite from each other in the lead conductors located adjacent to each other in the circulating direction along the side faces of the multilayer body 2. As a result, magnetic fields caused by these currents cancel each other out, whereby the multilayer capacitor in accordance with the thirty-ninth embodiment lowers its equivalent series inductance.

Since the terminal electrodes 3A to 3D, 5A to 5D and the connecting conductors 7A, 7B, 9A, 9B are formed on the respective side faces different from each other, the multilayer capacitor in accordance with the thirty-ninth embodiment restrains a short-circuit from occurring between the first terminal electrodes 3A to 3D and second connecting conductors 9A, 9B and between the second terminal electrodes 5A to 5D and first connecting conductors 7A, 7B.

Fortieth Embodiment

Figure 46:
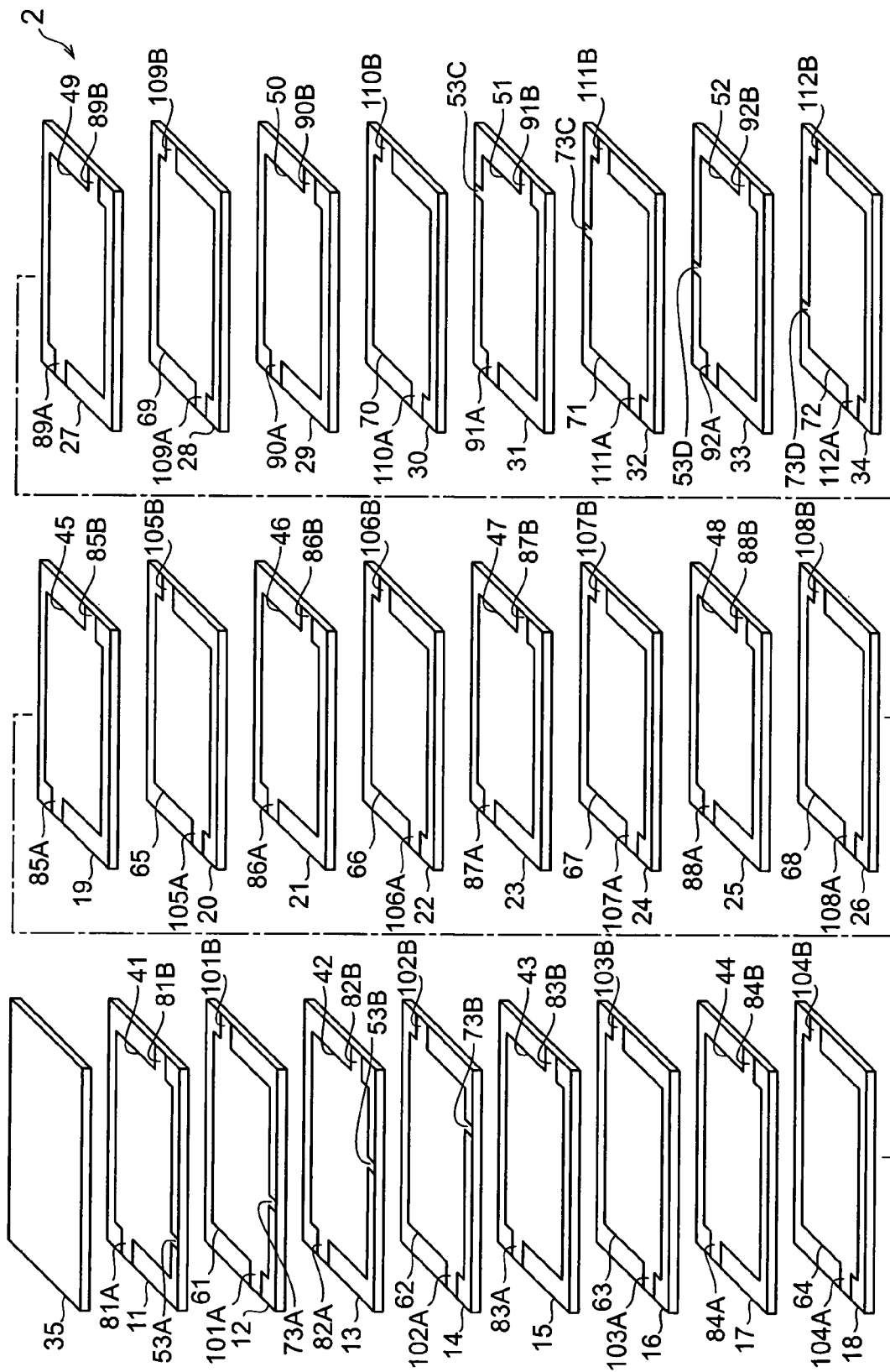
FIG. 46 is an exploded perspective view of the multilayer body included in the multilayer capacitor in accordance with a fortieth embodiment.

With reference to FIG. 46, the structure of the multilayer capacitor in accordance with a fortieth embodiment will be explained. The multilayer capacitor in accordance with the fortieth embodiment differs from the multilayer capacitor C4 in accordance with the thirty-eighth embodiment in terms of the position of first inner electrodes electrically connected to first terminal electrodes 3A to 3D through lead conductors 53A to 53D in the laminating direction and the position of second inner electrodes electrically connected to second terminal electrodes 5A to 5D through lead conductors 73A to 73D in the laminating direction. FIG. 46 is an exploded perspective view of the multilayer body included in the multilayer capacitor in accordance with the fortieth embodiment.

As with the multilayer capacitor C4 in accordance with the thirty-eighth embodiment, the multilayer capacitor in accordance with the fortieth embodiment comprises a multilayer body 2, the first terminal electrodes 3A to 3D formed on the multilayer body 2, the second terminal electrodes 5A to 5D similarly formed on the multilayer body 2, and first and second connecting conductors 7A, 7B, 9A, 9B, which are not depicted.

In the multilayer capacitor in accordance with the fortieth embodiment, as shown in FIG. 46, first inner electrodes 43, 44 are not connected to the first terminal electrodes through lead conductors. In the multilayer capacitor in accordance with the fortieth embodiment, first inner electrodes 51, 52 are formed with lead conductors 53C, 53D extending so as to reach a fourth side face 2d of the multilayer body 2.

The lead conductor 53C is integrally formed with the first inner electrode 51, and extends therefrom so as to reach the fourth side face 2d of the multilayer body 2. The lead conductor 53D is integrally formed with the first inner electrode 52, and extends therefrom so as to reach the fourth side face 2d of the multilayer body 2.

The first inner electrode 51 is electrically connected to the first terminal electrode 3C through the lead conductor 53C. The first inner electrode 52 is electrically connected to the first terminal electrode 3D through the lead conductor 53D.

In the multilayer capacitor in accordance with the fortieth embodiment, second inner electrodes 63, 64 are not connected to the second terminal electrodes through lead conductors. In the multilayer capacitor in accordance with the fortieth embodiment, second inner electrodes 71, 72 are formed with lead conductors 73C, 73D extending so as to reach the fourth side face 2d of the multilayer body 2.

The lead conductor 73C is integrally formed with the first inner electrode 71, and extends therefrom so as to reach the fourth side face 2d of the multilayer body 2. The lead conductor 73D is integrally formed with the second inner electrode 72, and extends therefrom so as to reach the fourth side face 2d of the multilayer body 2.

The second inner electrode 71 is electrically connected to the second terminal electrode 5C through the lead conductor 73C. The second inner electrode 72 is electrically connected to the second terminal electrode 5D through the lead conductor 73D.

In the multilayer capacitor in accordance with the fortieth embodiment, the number of first inner electrodes 41, 42, 51, 52 connected to the first terminal electrodes 3A to 3D through the lead conductors 53A to 53D is 4, which is smaller than the total number (12 in this embodiment) of the first inner electrodes 41 to 52. The number of second inner electrodes 61, 62, 71, 72 connected to the second terminal electrodes 5A to 5D through the lead conductors 73A to 73D is 4, which is smaller than the total number (12 in this embodiment) of the second inner electrodes 61 to 72. These make the multilayer capacitor in accordance with the fortieth embodiment attain an equivalent series resistance greater than that of a conventional multilayer capacitor in which all the inner electrodes are connected to their corresponding terminal electrodes through lead conductors.

When the first terminal electrode 3A is concerned, the resistance component of each of the first connecting conductors 7A, 7B is connected in series to the first terminal electrode 3A.

When the first terminal electrode 3B is concerned, at the first inner electrode 42 as a boundary, the resistance components of the first connecting conductors 7A, 7B are divided into the resistance components of the first connecting conductors 7A, 7B positioned on one side of the first inner electrode 42 in the laminating direction and the resistance components of the first connecting conductors 7A, 7B positioned on the other side of the first inner electrode 42 in the laminating direction. These resistance components are connected in parallel to the first terminal electrode 3B.

When the first terminal electrode 3C is concerned, at the first inner electrode 51 as a boundary, the resistance components of the first connecting conductors 7A, 7B are divided into the resistance components of the first connecting conductors 7A, 7B positioned on one side of the first inner electrode 51 in the laminating direction and the resistance components of the first connecting conductors 7A, 7B positioned on the other side of the first inner electrode 51 in the laminating direction. These resistance components are connected in parallel to the first terminal electrode 3C.

When the first terminal electrode 3D is concerned, at the first inner electrode 52 as a boundary, the resistance components of the first connecting conductors 7A, 7B are divided into the resistance components of the first connecting conductors 7A, 7B positioned on one side of the first inner electrode 52 in the laminating direction and the resistance components of the first connecting conductors 7A, 7B positioned on the other side of the first inner electrode 52 in the laminating direction. These resistance components are connected in parallel to the first terminal electrode 3D.

When the second terminal electrode 5A is concerned, at the second inner electrode 61 as a boundary, the resistance components of the second connecting conductors 9A, 9B are divided into the resistance components of the second connecting conductors 9A, 9B positioned on one side of the second inner electrode 61 in the laminating direction and the resistance components of the second connecting conductors 9A, 9B positioned on the other side of the second inner electrode 61 in the laminating direction. These resistance components are connected in parallel to the second terminal electrode 5A.

When the second terminal electrode 5B is concerned, at the second inner electrode 62 as a boundary, the resistance components of the second connecting conductors 9A, 9B are divided into the resistance components of the second connecting conductors 9A, 9B positioned on one side of the second inner electrode 62 in the laminating direction and the resistance components of the second connecting conductors 9A, 9B positioned on the other side of the second inner electrode 62 in the laminating direction. These resistance components are connected in parallel to the second terminal electrode 5B.

When the second terminal electrode 5C is concerned, at the second inner electrode 71 as a boundary, the resistance components of the second connecting conductors 9A, 9B are divided into the resistance components of the second connecting conductors 9A, 9B positioned on one side of the second inner electrode 71 in the laminating direction and the resistance components of the second connecting conductors 9A, 9B positioned on the other side of the second inner electrode 71 in the laminating direction. These resistance components are connected in parallel to the second terminal electrode 5C.

When the second terminal electrode 5D is concerned, the resistance component of each of the second connecting conductors 9A, 9B is connected in series to the second terminal electrode 5D.

Because of the difference in resistance components between the first and second connecting conductors 7A, 7B, 9A, 9B mentioned above, the multilayer capacitor in accordance with the fortieth embodiment yields an equivalent series resistance greater than that in the multilayer capacitor C4 in accordance with the thirty-eighth embodiment.

By adjusting each of the position of first inner electrodes 41, 42, 51, 52 electrically connected to the first terminal electrodes 3A to 3D through the lead conductors 53A to 53D in the laminating direction and the position of second inner electrode 61, 62, 71, 72 electrically connected to the second terminal electrodes 5A to 5D through the lead conductors 73A to 73D in the laminating direction as in the foregoing, this embodiment sets the equivalent series resistance of the multilayer capacitor to a desirable value and thus can regulate the equivalent series resistance easily with a high precision.

On the first to fourth side faces 2a to 2d of the multilayer body 2, the conductors included in the first outer conductor group (the first terminal electrodes 3A to 3D and first connecting conductors 7A, 7B) and the conductors included in the second outer conductor group (the second terminal electrodes 5A to 5D and second connecting conductors 9A, 9B) are alternately arranged in a direction circulating so as to intersect the laminating direction of the multilayer body 2 along the side faces parallel to the laminating direction. Therefore, when the first outer conductor group (constituted by the first terminal electrodes 3A to 3D and first connecting conductors 7A, 7B) and the second outer conductor group (constituted by the second terminal electrodes 5A to 5D and second connecting conductors 9A, 9B) are connected to respective polarities opposite from each other, terminal electrodes or connecting conductors connected to respective polarities opposite from each other are located adjacent to each other in a direction circulating along the side faces of the multilayer body 2. Consequently, currents flow in directions opposite from each other in the lead conductors located adjacent to each other in the circulating direction along the side faces of the multilayer body 2. As a result, magnetic fields caused by these currents cancel each other out, whereby the multilayer capacitor in accordance with the fortieth embodiment lowers its equivalent series inductance.

Since the terminal electrodes 3A to 3D, 5A to 5D and the connecting conductors 7A, 7B, 9A, 9B are formed on the respective side faces different from each other, the multilayer capacitor in accordance with the fortieth embodiment restrains a short-circuit from occurring between the first terminal electrodes 3A to 3D and second connecting conductors 9A, 9B and between the second terminal electrodes 5A to 5D and first connecting conductors 7A, 7B.

Forty-first Embodiment

Figure 47:
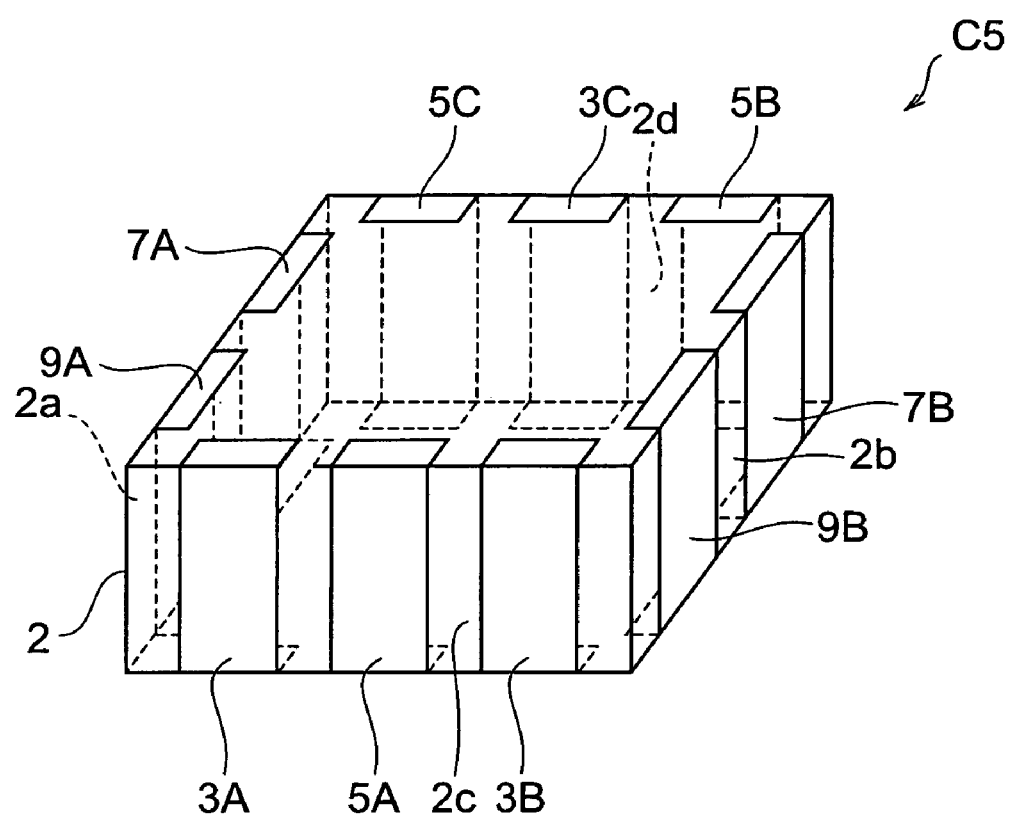
FIG. 47 is a perspective view of the multilayer capacitor in accordance with a forty-first embodiment.
Figure 48:
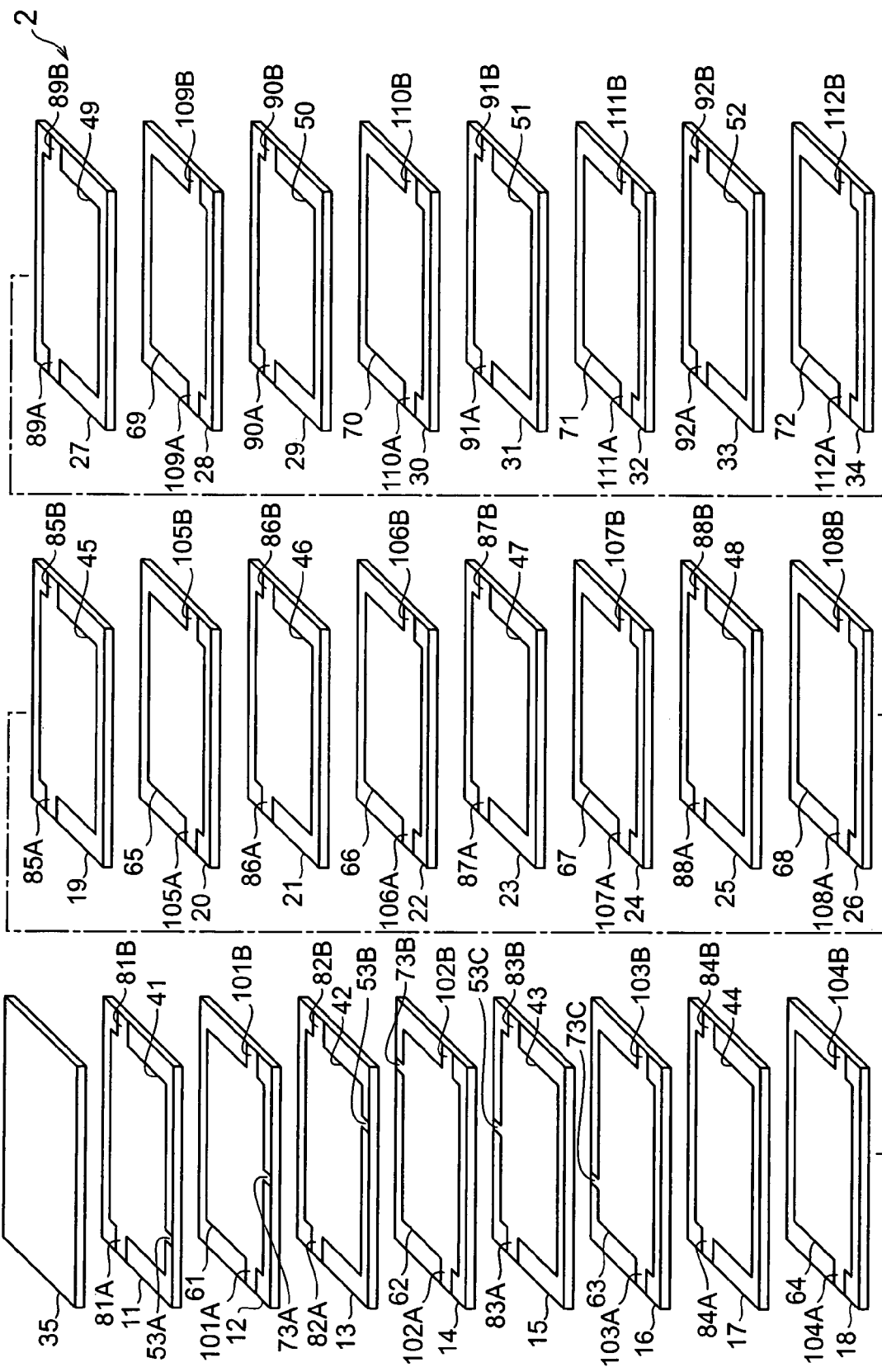
FIG. 48 is an exploded perspective view of the multilayer body included in the multilayer capacitor in accordance with the forty-first embodiment.

With reference to FIGS. 47 and 48, the structure of the multilayer capacitor C5 in accordance with a forty-first embodiment will be explained. The multilayer capacitor in accordance with the forty-first embodiment differs from the multilayer capacitor C4 in accordance with the thirty-eighth embodiment in terms of the number of first and second terminal electrodes. FIG. 47 is a perspective view of the multilayer capacitor in accordance with the forty-first embodiment. FIG. 48 is an exploded perspective view of the multilayer body included in the multilayer capacitor in accordance with the forty-first embodiment.

As with the multilayer capacitor C4 in accordance with the thirty-eighth embodiment, the multilayer capacitor in accordance with the forty-first embodiment comprises a multilayer body 2 and first and second connecting conductors 7A, 7B, 9A, 9B as shown in FIG. 47. However, the first connecting conductor 7B and second connecting conductor 9B are formed on a second side face 2b in succession from a fourth side face 2d to a third side face 2c.

As shown in FIG. 47, the multilayer capacitor in accordance with the forty-first embodiment comprises first terminal electrodes 3A to 3C and second terminal electrodes 5A to 5C formed on the multilayer body 2. The first terminal electrodes 3A, 3B and second terminal electrode 5A are positioned on the third side face 2c of the multilayer body 2 such that the first terminal electrode 3A, second terminal electrode 5A, and first terminal electrode 3B are formed in succession from a first side face 2a toward the second side face 2b.

The first terminal electrode 3C and second terminal electrodes 5B, 5C are positioned on the fourth side face 2d of the multilayer body 2 such that the second terminal electrode 5B, first terminal electrode 3C, and second terminal electrode 5C are formed in succession from the second side face 2b toward the first side face 2a.

Therefore, on the first to fourth side faces 2a to 2d of the multilayer body 2, the conductors included in the first outer conductor group (the first terminal electrodes 3A to 3C and first connecting conductors 7A, 7B) and the conductors included in the second outer conductor group (the second terminal electrodes 5A to 5C and second connecting conductors 9A, 9B) are alternately arranged in a direction circulating so as to intersect the laminating direction of the multilayer body 2 along the side faces parallel to the laminating direction.

The first and second terminal electrodes 3A to 3C, 5A to 5C are formed on the third and fourth side faces 2c, 2d, which are different from the first and second side faces 2a, 2b formed with the first connecting conductors 7A, 7B or second connecting conductors 9A, 9B, among the side faces parallel to the laminating direction of the multilayer body 2. The first terminal electrodes 3A to 3C and the second terminal electrodes 5A to 5C are electrically insulated from each other.

When only the first and second terminal electrodes 3A to 3C, 5A to 5C are concerned while excluding the first and second connecting conductors 7A, 7B, 9A, 9B, the first and second terminal electrodes 3A to 3C, 5A to 5C are arranged such that the first and second terminal electrodes alternate with each other in the direction circulating so as to intersect the laminating direction of the multilayer body 2 along the side faces (first, third, second, and fourth side faces 2a, 2c, 2b, 2d) of the multilayer body 2 parallel to the laminating direction.

In the multilayer capacitor in accordance with the forty-first embodiment, as shown in FIG. 48, first inner electrodes 41, 42 are formed with lead conductors 53A, 53B extending so as to reach the third side face 2c of the multilayer body 2. The first inner electrode 43 is formed with a lead conductor 53C extending so as to reach the fourth side face 2d of the multilayer body 2.

The lead conductor 53A is integrally formed with the first inner electrode 41, and extends therefrom so as to reach the third side face 2c of the multilayer body 2. The lead conductor 53B is integrally formed with the first inner electrode 42, and extends therefrom so as to reach the third side face 2c of the multilayer body 2. The lead conductor 53C is integrally formed with the first inner electrode 43, and extends therefrom so as to reach the fourth side face 2d of the multilayer body 2.

The first inner electrode 41 is electrically connected to the first terminal electrode 3A through the lead conductor 53A. The first inner electrode 42 is electrically connected to the first terminal electrode 3B through the lead conductor 53B. The first inner electrode 43 is electrically connected to the first terminal electrode 3C through the lead conductor 53C.

Since first inner electrodes 41 to 52 are electrically connected to each other through the first connecting conductors 7A, 7B, the first inner electrodes 45 to 52 are electrically connected to the first terminal electrodes 3A to 3C, whereby the first inner electrodes 41 to 52 are connected in parallel.

A second inner electrode 61 is formed with a lead conductor 73A extending so as to reach the third side face 2c of the multilayer body 2. Second inner electrodes 62, 63 are formed with respective lead conductors 73B, 73C extending so as to reach the fourth side face 2d of the multilayer body 2.

The lead conductor 73A is integrally formed with the second inner electrode 61, and extends therefrom so as to reach the third side face 2c of the multilayer body 2. The lead conductor 73B is integrally formed with the second inner electrode 62, and extends therefrom so as to reach the fourth side face 2d of the multilayer body 2. The lead conductor 73C is integrally formed with the second inner electrode 63, and extends therefrom so as to reach the fourth side face 2d of the multilayer body 2.

The second inner electrode 61 is electrically connected to the second terminal electrode 5A through the lead conductor 73A. The second inner electrode 62 is electrically connected to the second terminal electrode 5B through the lead conductor 73B. The second inner electrode 63 is electrically connected to the second terminal electrode 5C through the lead conductor 73C.

Since second inner electrodes 61 to 72 are electrically connected to each other through the second connecting conductors 9A, 9B, the second inner electrodes 65 to 72 are electrically connected to the second terminal electrodes 5A to 5C, whereby the second inner electrodes 61 to 72 are connected in parallel.

In the multilayer capacitor in accordance with the forty-first embodiment, the number of first inner electrodes 41 to 43 connected to the first terminal electrodes 3A to 3C through the lead conductors 53A to 53C is 3, which is smaller than the total number of the first inner electrodes 41 to 52. The number of second inner electrodes 61 to 63 connected to the second terminal electrodes 5A to 5C through the lead conductors 73A to 73C is 3, which is smaller than the total number of the second inner electrodes 61 to 72. These make the multilayer capacitor in accordance with the forty-first embodiment attain an equivalent series resistance greater than that of a conventional multilayer capacitor in which all the inner electrodes are connected to their corresponding terminal electrodes through lead conductors.

By adjusting each of the number of first inner electrodes 41 to 43 electrically connected to the first terminal electrodes 3A to 3C through the lead conductors 53A to 53C and the number of second inner electrode 61 to 63 electrically connected to the second terminal electrodes 5A to 5C through the lead conductors 73A to 73C as in the foregoing, this embodiment sets the equivalent series resistance of the multilayer capacitor to a desirable value and thus can regulate the equivalent series resistance easily with a high precision.

On the first to fourth side faces 2a to 2d of the multilayer body 2, the conductors included in the first outer conductor group (the first terminal electrodes 3A to 3C and first connecting conductors 7A, 7B) and the conductors included in the second outer conductor group (the second terminal electrodes 5A to 5C and second connecting conductors 9A, 9B) are alternately arranged in a direction circulating so as to intersect the laminating direction of the multilayer body 2 along the side faces parallel to the laminating direction. Therefore, when the first outer conductor group (constituted by the first terminal electrodes 3A to 3C and first connecting conductors 7A, 7B) and the second outer conductor group (constituted by the second terminal electrodes 5A to 5C and second connecting conductors 9A, 9B) are connected to respective polarities opposite from each other, terminal electrodes or connecting conductors connected to respective polarities opposite from each other are located adjacent to each other in a direction circulating along the side faces of the multilayer body 2. Consequently, currents flow in directions opposite from each other in the lead conductors located adjacent to each other in the circulating direction along the side faces of the multilayer body 2. As a result, magnetic fields caused by these currents cancel each other out, whereby the multilayer capacitor in accordance with the forty-first embodiment lowers its equivalent series inductance.

When only the first and second terminal electrodes 3A to 3C, SA to 5C are concerned while excluding the first and second connecting conductors 7A, 7B, 9A, 9B, the first and second terminal electrodes 3A to 3C, 5A to 5C are arranged such that the first and second terminal electrodes alternate with each other in the direction circulating so as to intersect the laminating direction of the multilayer body 2 along the side faces (first, third, second, and fourth side faces 2a, 2c, 2b, 2d) of the multilayer body 2 parallel to the laminating direction. Thus, the first and second terminal electrodes 3A to 3C, 5A to 5C are arranged such that magnetic fields caused by currents flowing through the lead conductors connected to the terminal electrodes cancel each other out, so as to lower the equivalent series inductance. Since the number of each species of the first and second connecting conductors 7A, 7B, 9A, 9B is an even number, the equivalent series inductance will also decrease if connecting conductors are further added to the multilayer capacitor C5 in which the configuration in which the first and second terminal electrodes 3A to 3C, 5A to 5C are arranged such as to reduce the equivalent series inductance.

Since the terminal electrodes 3A to 3C, 5A to 5C and the connecting conductors 7A, 7B, 9A, 9B are formed on the respective side faces different from each other, the multilayer capacitor in accordance with the forty-first embodiment restrains a short-circuit from occurring between the first terminal electrodes 3A to 3C and second connecting conductors 9A, 9B and between the second terminal electrodes 5A to 5C and first connecting conductors 7A, 7B.

By adjusting at least one of the number and position in the laminating direction of inner electrodes connected to the terminal electrodes 3A to 3C, 5A to 5C through the lead conductors 53A to 53C, 73A to 73C, the multilayer capacitor in accordance with the forty-first embodiment can set the equivalent series resistance of the multilayer capacitor to a desirable value.

By adjusting at least one of the number and position in the laminating direction of inner electrodes connected to the terminal electrodes 3A to 3D, 5A to 5D through the lead conductors 53A to 53D, 73A to 73D, the thirty-eighth to forty-first embodiments set the equivalent series resistance of their multilayer capacitors to a desirable value. As a result, the equivalent series resistance of each multilayer capacitor can be regulated easily with a high precision.

The number of the first inner electrodes 41 to 52 can be adjusted within the range from at least 1 to the number smaller than the total number of the first inner electrodes 41 to 52 by 1. The number of the second inner electrodes 61 to 72 can be adjusted within the range from at least 1 to the number smaller than the total number of the second inner electrodes 61 to 72 by 1. The number of first inner electrodes connected to the terminal electrodes 3A to 3D through the lead conductors 53A to 53D and the number of second inner electrodes connected to the terminal electrodes 5A to 5D through the lead conductors 73A to 73D may differ from each other.

Though preferred embodiments of the present invention are explained in detail in the foregoing, the present invention is not limited to the above-mentioned embodiments and modified example. For example, the number of laminated dielectric layers 11 to 35, 235 to 248, 133, 143 and the number of laminated first and second inner electrodes 41 to 52, 253 to 259, 135, 145, 61 to 72, 273 to 279, 137, and 147 are not limited to those described in the above-mentioned embodiments. The number of terminal electrodes 3, 3A to 3D, 5A to 5D are not limited to those described in the above-mentioned embodiments. The number of connecting conductors 7, 7A, 7B, 9, 9A, 9B are not limited to those described in the above-mentioned embodiments. The number and position in the laminating direction of inner electrodes connected to the terminal electrodes 3A to 3D, 5A to 5D through the lead conductors 53, 53A to 53D, 73, 73A to 73D are not limited to those described in the above-mentioned embodiments. The number and position in the laminating direction of first capacitor portions 121 are not limited to those described in the above-mentioned embodiments. The first and second inner electrodes may directly be connected to the first and second connecting conductors without the aid of lead conductors.

Figure 49:
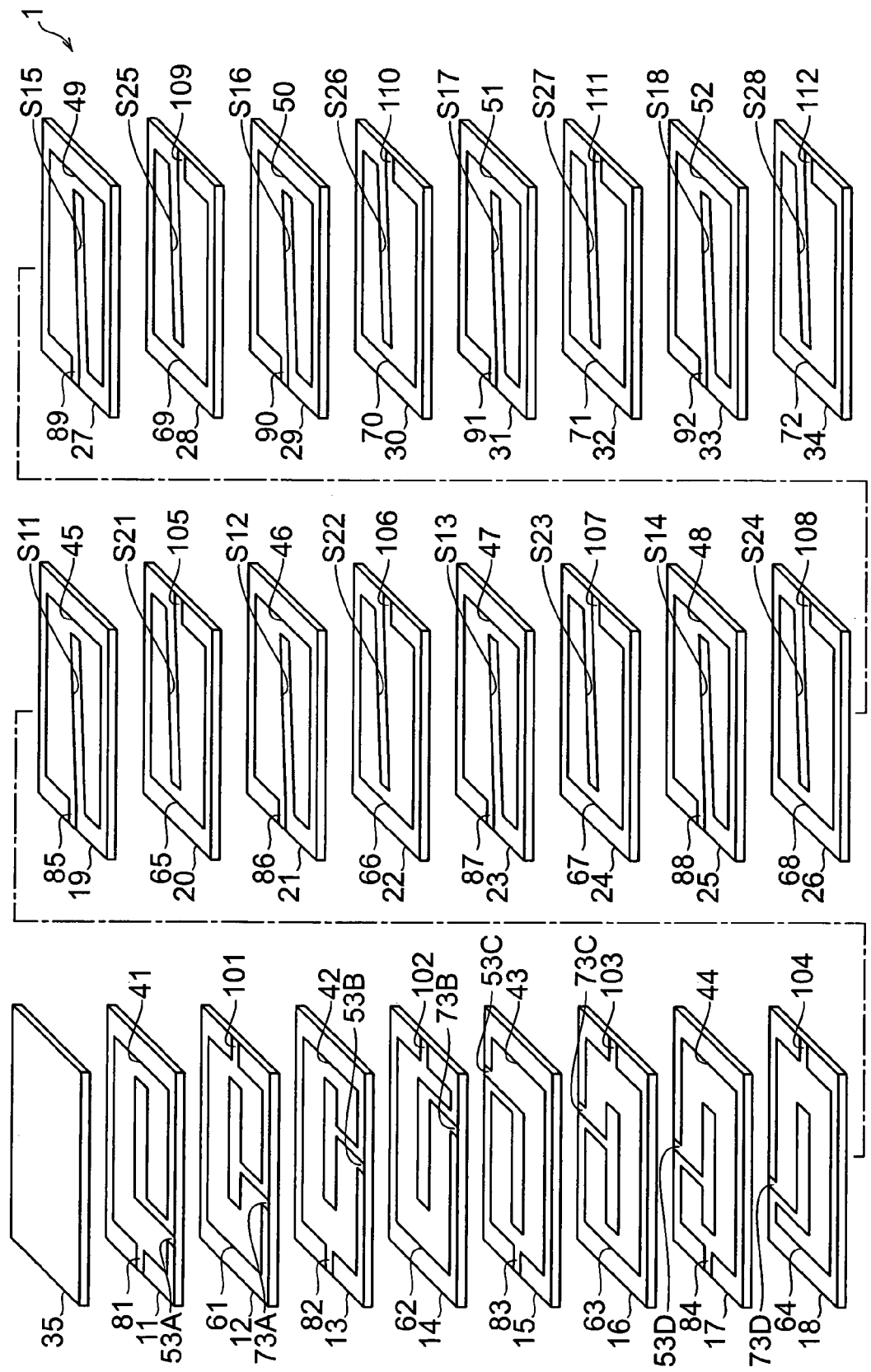
FIG. 49 is an exploded perspective view of the multilayer body included in a modified example of the multilayer capacitor in accordance with the twenty-third embodiment.

First and second inner electrodes electrically connected to first and second terminal electrodes through lead conductors may be formed with slits. As an example of this case, a modified example of the twenty-third embodiment is shown in FIG. 49. Since first and second inner electrodes 41 to 44, 61 to 64 electrically connected to first and second terminal electrodes 3A to 3D, 5A to 5D through lead conductors 53A to 53D, 73A to 73D are formed with slits, magnetic fields caused by currents cancel each other out in the inner electrodes 41 to 44, 61 to 64 as well. Therefore, the equivalent series inductance can further be reduced in the multilayer capacitor.

The sum of the first and second connecting conductors formed on each of the side faces 2a, 2b is not required to be an even number. It is not always necessary for the terminal electrodes 3A to 3C, 5A to 5C and the connecting conductors 7A, 7B, 9A, 9B to be formed on side faces different from each other.

The multilayer body of the multilayer capacitor in accordance with the present invention may further be laminated with dielectric layers or dielectric layers and inner electrodes alternating with each other.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising a multilayer body in which a plurality of dielectric layers and a plurality of inner electrodes are alternately laminated, and a plurality of terminal conductors formed on the multilayer body;
    wherein the plurality of inner electrodes include a plurality of first inner electrodes and a plurality of second inner electrodes alternately arranged;
    wherein the plurality of terminal conductors include first and second terminal conductors electrically insulated from each other;
    wherein the plurality of first inner electrodes are electrically connected to each other through a connecting conductor formed on a surface of the multilayer body;
    wherein the plurality of second inner electrodes are electrically connected to each other through a connecting conductor formed on the surface of the multilayer body;
    wherein, in the plurality of first inner electrodes, at least one first inner electrode whose number is smaller than the total number of first inner electrodes by at least 1 is electrically connected to the first terminal conductor through a lead conductor;
    wherein, in the plurality of second inner electrodes, at least one second inner electrode whose number is smaller than the total number of second inner electrodes by at least 1 is electrically connected to the second terminal conductor through a lead conductor; and
    wherein an equivalent series resistance is set to a desirable value by adjusting at least one of the number of first inner electrode electrically connected to the first terminal conductor through the lead conductor and the number of second inner electrode electrically connected to the second terminal conductor through the lead conductor.

2. A multilayer capacitor according to claim 1, wherein the equivalent series resistance is set to a desirable value by further adjusting the number of connecting conductors electrically connecting the plurality of first inner electrodes to each other and the number of connecting conductors electrically connecting the plurality of second inner electrodes to each other.

3. A multilayer capacitor according to claim 1, wherein the plurality of first inner electrodes are connected in parallel; and
    wherein the plurality of second inner electrodes are connected in parallel.

4. A multilayer capacitor according to claim 1, wherein at least a part of the plurality of first and second inner electrodes is formed with a slit; and
    wherein the slit is formed such that a current flows in respective directions opposite from each other in regions opposing each other across the slit in each of the first and second inner electrodes formed with the slit.

5. A multilayer capacitor comprising a multilayer body in which a plurality of dielectric layers and a plurality of inner electrodes are alternately laminated, and a plurality of terminal conductors formed on the multilayer body;
    wherein the plurality of inner electrodes include a plurality of first inner electrodes and a plurality of second inner electrodes alternately arranged;
    wherein the plurality of terminal conductors include first and second terminal conductors electrically insulated from each other;
    wherein the plurality of first inner electrodes are electrically connected to each other through a connecting conductor formed on a surface of the multilayer body;
    wherein the plurality of second inner electrodes are electrically connected to each other through a connecting conductor formed on the surface of the multilayer body;
    wherein, in the plurality of first inner electrodes, at least one first inner electrode whose number is smaller than the total number of first inner electrodes by at least 1 is electrically connected to the first terminal conductor through a lead conductor;
    wherein, in the plurality of second inner electrodes, at least one second inner electrode whose number is smaller than the total number of second inner electrodes by at least 1 is electrically connected to the second terminal conductor through a lead conductor; and
    wherein an equivalent series resistance is set to a desirable value by adjusting at least one of a position of the first inner electrode electrically connected to the first terminal conductor through the lead conductor in the laminating direction of the multilayer body and a position of the second inner electrode electrically connected to the second terminal conductor through the lead conductor in the laminating direction of the multilayer body.

6. A multilayer capacitor according to claim 5, wherein the equivalent series resistance is set to a desirable value by further adjusting the number of connecting conductors electrically connecting the plurality of first inner electrodes to each other and the number of connecting conductors electrically connecting the plurality of second inner electrodes to each other.

7. A multilayer capacitor according to claim 5, wherein the plurality of first inner electrodes are connected in parallel; and
    wherein the plurality of second inner electrodes are connected in parallel.

8. A multilayer capacitor according to claim 5, wherein at least a part of the plurality of first and second inner electrodes is formed with a slit; and wherein the slit is formed such that a current flows in respective directions opposite from each other in regions opposing each other across the slit in each of the first and second inner electrodes formed with the slit.

9. A multilayer capacitor comprising a multilayer body in which a plurality of dielectric layers and a plurality of inner electrodes are alternately laminated, and a plurality of terminal conductors formed on the multilayer body;
   wherein the plurality of inner electrodes include a plurality of first inner electrodes and a plurality of second inner electrodes alternately arranged;
   wherein the plurality of terminal conductors include at least three terminal conductors;
   wherein the plurality of first inner electrodes are electrically connected to each other through a connecting conductor formed on a surface of the multilayer body;
   wherein the plurality of second inner electrodes are electrically connected to each other through a connecting conductor formed on the surface of the multilayer body;
   wherein at least two first inner electrodes in the plurality of first inner electrodes are electrically connected through a lead conductor to at least two respective terminal conductors whose number is smaller than the total number of terminal conductors by at least 1 in the at least three terminal conductors;
   wherein at least one second inner electrode in the plurality of second inner electrodes is electrically connected through a lead conductor to the rest of terminal conductors other than the terminal conductors electrically connected to the first inner electrodes through the lead conductor; and
   wherein an equivalent series resistance is set to a desirable value by adjusting the number of at least one species of the first and second inner electrodes electrically connected to the terminal conductors through the lead conductor.

10. A multilayer capacitor according to claim 9, wherein the plurality of terminal conductors include at least two first terminal conductors and at least two second terminal conductors;
    wherein the plurality of first inner electrodes are electrically connected to at least two first terminal conductors through the lead and connecting conductors; and
    wherein the plurality of the second inner electrodes are electrically connected to at least two second terminal conductors through the lead and connecting conductors.

11. A multilayer capacitor according to claim 9, wherein the equivalent series resistance is set to a desirable value by further adjusting the number of connecting conductors electrically connecting the plurality of first inner electrodes to each other and the number of connecting conductors electrically connecting the plurality of second inner electrodes to each other.

12. A multilayer capacitor according to claim 9, wherein the plurality of first inner electrodes are connected in parallel; and
    wherein the plurality of second inner electrodes are connected in parallel.

13. A multilayer capacitor according to claim 9, wherein at least a part of the plurality of first and second inner electrodes is formed with a slit; and
    wherein the slit is formed such that a current flows in respective directions opposite from each other in regions opposing each other across the slit in each of the first and second inner electrodes formed with the slit.

14. A multilayer capacitor comprising a multilayer body in which a plurality of dielectric layers and a plurality of inner electrodes are alternately laminated, and a plurality of terminal conductors formed on the multilayer body;
    wherein the plurality of inner electrodes include a plurality of first inner electrodes and a plurality of second inner electrodes alternately arranged;
    wherein the plurality of terminal conductors include at least three terminal conductors;
    wherein the plurality of first inner electrodes are electrically connected to each other through a connecting conductor formed on a surface of the multilayer body;
    wherein the plurality of second inner electrodes are electrically connected to each other through a connecting conductor formed on the surface of the multilayer body;
    wherein at least two first inner electrodes in the plurality of first inner electrodes are electrically connected through a lead conductor to at least two respective terminal conductors whose number is smaller than the total number of terminal conductors by at least 1 in the at least three terminal conductors;
    wherein at least one second inner electrode in the plurality of second inner electrodes is electrically connected through a lead conductor to the rest of terminal conductors other than the terminal conductors electrically connected to the first inner electrodes through the lead conductor; and
    wherein an equivalent series resistance is set to a desirable value by adjusting a position of at least one species of the first and second inner electrodes electrically connected to the terminal conductors through the lead conductor in the laminating direction of the multilayer body.

15. A multilayer capacitor according to claim 14, wherein the plurality of terminal conductors include at least two first terminal conductors and at least two second terminal conductors;
    wherein the plurality of first inner electrodes are electrically. connected to at least two first terminal conductors through the lead and connecting conductors; and
    wherein the plurality of the second inner electrodes are electrically connected to at least two second terminal conductors through the lead and connecting conductors.

16. A multilayer capacitor according to claim 14, wherein the equivalent series resistance is set to a desirable value by further adjusting the number of connecting conductors electrically connecting the plurality of first inner electrodes to each other and the number of connecting conductors electrically connecting the plurality of second inner electrodes to each other.

17. A multilayer capacitor according to claim 14, wherein the plurality of first inner electrodes are connected in parallel; and
    wherein the plurality of second inner electrodes are connected in parallel.

18. A multilayer capacitor according to claim 14, wherein at least a part of the plurality of first and second inner electrodes is formed with a slit; and
    wherein the slit is formed such that a current flows in respective directions opposite from each other in regions opposing each other across the slit in each of the first and second inner electrodes formed with the slit.

19. A multilayer capacitor comprising a multilayer body in which a plurality of dielectric layers and a plurality of inner electrodes are alternately laminated, and a plurality of terminal conductors formed on the multilayer body;
    wherein the plurality of inner electrodes include a plurality of first inner electrodes and a plurality of second inner electrodes alternately arranged;

wherein the plurality of terminal conductors include at least three terminal conductors;

wherein the plurality of first inner electrodes are electrically connected to each other through a connecting conductor formed on a surface of the multilayer body;

wherein the plurality of second inner electrodes are electrically connected to each other through a connecting conductor formed on the surface of the multilayer body;

wherein at least one first inner electrode in the plurality of first inner electrodes is electrically connected through respective lead conductors to at least two terminal conductors whose number is smaller than the total number of terminal conductors by at least 1 in the at least three terminal conductors;

wherein at least one second inner electrode in the plurality of second inner electrodes is electrically connected through a lead conductor to the rest of terminal conductors other than the terminal conductors electrically connected to the first inner electrodes through the lead conductors; and wherein an equivalent series resistance is set to a desirable value by adjusting the number of at least one species of the first and second inner electrodes electrically connected to the terminal conductors through the lead conductors.

20. A multilayer capacitor according to claim 19, wherein the plurality of terminal conductors include at least two first terminal conductors and at least two second terminal conductors;

wherein the plurality of first inner electrodes are electrically connected to at least two first terminal conductors through the lead and connecting conductors; and wherein the plurality of the second inner electrodes are electrically connected to at least two second terminal conductors through the lead and connecting conductors.

21. A multilayer capacitor according to claim 19, wherein the equivalent series resistance is set to a desirable value by further adjusting the number of connecting conductors electrically connecting the plurality of first inner electrodes to each other and the number of connecting conductors electrically connecting the plurality of second inner electrodes to each other.

22. A multilayer capacitor according to claim 19, wherein the plurality of first inner electrodes are connected in parallel; and wherein the plurality of second inner electrodes are connected in parallel.

23. A multilayer capacitor according to claim 19, wherein at least a part of the plurality of first and second inner electrodes is formed with a slit; and wherein the slit is formed such that a current flows in respective directions opposite from each other in regions opposing each other across the slit in each of the first and second inner electrodes formed with the slit.

24. A multilayer capacitor comprising a multilayer body in which a plurality of dielectric layers and a plurality of inner electrodes are alternately laminated, and a plurality of terminal conductors formed on the multilayer body;

wherein the plurality of inner electrodes include a plurality of first inner electrodes and a plurality of second inner electrodes alternately arranged;

wherein the plurality of terminal conductors include at least three terminal conductors;

wherein the plurality of first inner electrodes are electrically connected to each other through a connecting conductor formed on a surface of the multilayer body;

wherein the plurality of second inner electrodes are electrically connected to each other through a connecting conductor formed on the surface of the multilayer body;

wherein at least one first inner electrode in the plurality of first inner electrodes is electrically connected through respective lead conductors to at least two terminal conductors whose number is smaller than the total number of terminal conductors by at least 1 in the at least three terminal conductors;

wherein at least one second inner electrode in the plurality of second inner electrodes is electrically connected through a lead conductor to the rest of terminal conductors other than the terminal conductors electrically connected to the first inner electrodes through the lead conductors; and wherein an equivalent series resistance is set to a desirable value by adjusting a position of at least one species of the first and second inner electrodes electrically connected to the terminal conductors through the lead conductors in the laminating direction of the multilayer body.

25. A multilayer capacitor according to claim 24, wherein the plurality of terminal conductors include at least two first terminal conductors and at least two second terminal conductors;

wherein the plurality of first inner electrodes are electrically connected to at least two first terminal conductors through the lead and connecting conductors; and wherein the plurality of the second inner electrodes are electrically connected to at least two second terminal conductors through the lead and connecting conductors.

26. A multilayer capacitor according to claim 24, wherein the equivalent series resistance is set to a desirable value by further adjusting the number of connecting conductors electrically connecting the plurality of first inner electrodes to each other and the number of connecting conductors electrically connecting the plurality of second inner electrodes to each other.

27. A multilayer capacitor according to claim 24, wherein the plurality of first inner electrodes are connected in parallel; and wherein the plurality of second inner electrodes are connected in parallel.

28. A multilayer capacitor according to claim 24, wherein at least a part of the plurality of first and second inner electrodes is formed with a slit; and wherein the slit is formed such that a current flows in respective directions opposite from each other in regions opposing each other across the slit in each of the first and second inner electrodes formed with the slit.

29. A multilayer capacitor comprising a multilayer body in which a plurality of dielectric layers and a plurality of inner electrodes are alternately laminated, and a plurality of terminal conductors formed on the multilayer body;

the multilayer capacitor having a capacitor portion including a first number of first inner electrodes and a second number of second inner electrodes alternately arranged as the plurality of inner electrodes;

wherein the plurality of terminal conductors include first and second terminal conductors electrically insulated from each other;

wherein the first number of first inner electrodes are electrically connected to each other through a connecting conductor formed on a surface of the multilayer body;

wherein the second number of second inner electrodes are electrically connected to each other through a connecting conductor formed on the surface of the multilayer body;

wherein at least one first inner electrode whose number is smaller than the first number by at least 1 in the first number of first inner electrodes is electrically connected to the first terminal conductor through a lead conductor;

wherein at least one second inner electrode whose number is smaller than the second number by at least 1 in the second number of second inner electrodes is electrically connected to the second terminal conductor through a lead conductor; and wherein an equivalent series resistance is set to a desirable value by adjusting at least one of the number of first inner electrodes electrically connected to the first terminal conductor through the lead conductor and the number of second inner electrodes electrically connected to the second terminal conductor through the lead conductor.

30. A multilayer capacitor according to claim 29, wherein the equivalent series resistance is set to a desirable value by further adjusting the number of connecting conductors electrically connecting the plurality of first inner electrodes to each other and the number of connecting conductors electrically connecting the plurality of second inner electrodes to each other.

31. A multilayer capacitor according to claim 29, wherein the plurality of first inner electrodes are connected in parallel; and wherein the plurality of second inner electrodes are connected in parallel.

32. A multilayer capacitor according to claim 29, wherein at least a part of the plurality of first and second inner electrodes is formed with a slit;

wherein the slit is formed such that a current flows in respective directions opposite from each other in regions opposing each other across the slit in each of the first and second inner electrodes formed with the slit.

33. A multilayer capacitor comprising a multilayer body in which a plurality of dielectric layers and a plurality of inner electrodes are alternately laminated, and a plurality of terminal conductors formed on the multilayer body;

the multilayer capacitor having a capacitor portion including a first number of first inner electrodes and a second number of second inner electrodes alternately arranged as the plurality of inner electrodes;

wherein the plurality of terminal conductors include first and second terminal conductors electrically insulated from each other;

wherein the first number of first inner electrodes are electrically connected to each other through a connecting conductor formed on a surface of the multilayer body;

wherein the second number of second inner electrodes are electrically connected to each other through a connecting conductor formed on the surface of the multilayer body;

wherein at least one first inner electrode whose number is smaller than the first number by at least 1 in the first number of first inner electrodes is electrically connected to the first terminal conductor through a lead conductor;

wherein at least one second inner electrode whose number is smaller than the second number by at least 1 in the second number of second inner electrodes is electrically connected to the second terminal conductor through a lead conductor; and wherein an equivalent series resistance is set to a desirable value by adjusting at least one of a position of the first inner electrode electrically connected to the first terminal conductor through the lead conductor in the laminating direction of the multilayer body and a position of the second inner electrode electrically connected to the second terminal conductor through the lead conductor in the laminating direction of the multilayer body.

34. A multilayer capacitor according to claim 33, wherein the equivalent series resistance is set to a desirable value by further adjusting the number of connecting conductors electrically connecting the plurality of first inner electrodes to each other and the number of connecting conductors electrically connecting the plurality of second inner electrodes to each other.

35. A multilayer capacitor according to claim 33, wherein the plurality of first inner electrodes are connected in parallel; and wherein the plurality of second inner electrodes are connected in parallel.

36. A multilayer capacitor according to claim 33, wherein at least a part of the plurality of first and second inner electrodes is formed with a slit;

wherein the slit is formed such that a current flows in respective directions opposite from each other in regions opposing each other across the slit in each of the first and second inner electrodes formed with the slit.

37. A multilayer capacitor comprising a multilayer body in which a plurality of dielectric layers and a plurality of inner electrodes are alternately laminated, and a plurality of terminal conductors formed on the multilayer body;

the multilayer capacitor having a capacitor portion including a first number of first inner electrodes and a second number of second inner electrodes alternately arranged as the plurality of inner electrodes;

wherein the first number of first inner electrodes are electrically connected to each other through a connecting conductor formed on a surface of the multilayer body;

wherein the second number of second inner electrodes are electrically connected to each other through a connecting conductor formed on the surface of the multilayer body;

wherein at least one first inner electrode whose number is smaller than the first number by at least 1 in the first number of first inner electrodes is electrically connected through a lead conductor to the respective terminal conductor;

wherein at least one second inner electrode whose number is smaller than the second number by at least 1 in the second number of second inner electrodes is electrically connected through a lead conductor to the respective terminal conductor in the rest of terminal conductors other than the terminal conductor electrically connected to the first inner electrode through the lead conductor; and wherein an equivalent series resistance is set to a desirable value by adjusting the number of at least one species of the first and second inner electrodes electrically connected to the terminal conductors through the lead conductors.

38. A multilayer capacitor according to claim 37, wherein the equivalent series resistance is set to a desirable value by further adjusting the number of connecting conductors electrically connecting the plurality of first inner electrodes to each other and the number of connecting conductors electrically connecting the plurality of second inner electrodes to each other.

39. A multilayer capacitor according to claim 37, wherein the plurality of first inner electrodes are connected in parallel; and wherein the plurality of second inner electrodes are connected in parallel.

40. A multilayer capacitor according to claim 37, wherein at least a part of the plurality of first and second inner electrodes is formed with a slit;
wherein the slit is formed such that a current flows in respective directions opposite from each other in regions opposing each other across the slit in each of the first and second inner electrodes formed with the slit.

41. A multilayer capacitor comprising a multilayer body in which a plurality of dielectric layers and a plurality of inner electrodes are alternately laminated, and a plurality of terminal conductors formed on the multilayer body;
the multilayer capacitor having a capacitor portion including a first number of first inner electrodes and a second number of second inner electrodes alternately arranged as the plurality of inner electrodes;
wherein the first number of first inner electrodes are electrically connected to each other through a connecting conductor formed on a surface of the multilayer body;
wherein the second number of second inner electrodes are electrically connected to each other through a connecting conductor formed on the surface of the multilayer body;
wherein at least one first inner electrode whose number is smaller than the first number by at least 1 in the first number of first inner electrodes is electrically connected through a lead conductor to the respective terminal conductor;
wherein at least one second inner electrode whose number is smaller than the second number by at least 1 in the second number of second inner electrodes is electrically connected through a lead conductor to the respective terminal conductor in the rest of terminal conductors other than the terminal conductor electrically connected to the first inner electrode through the lead conductor; and
wherein an equivalent series resistance is set to a desirable value by adjusting a position of at least one species of the first and second inner electrodes electrically connected to the terminal conductors through the lead conductors in the laminating direction of the multilayer body.

42. A multilayer capacitor according to claim 41, wherein the equivalent series resistance is set to a desirable value by further adjusting the number of connecting conductors electrically connecting the plurality of first inner electrodes to each other and the number of connecting conductors electrically connecting the plurality of second inner electrodes to each other.

43. A multilayer capacitor according to claim 41, wherein the plurality of first inner electrodes are connected in parallel; and
wherein the plurality of second inner electrodes are connected in parallel.

44. A multilayer capacitor according to claim 41, wherein at least a part of the plurality of first and second inner electrodes is formed with a slit;
wherein the slit is formed such that a current flows in respective directions opposite from each other in regions opposing each other across the slit in each of the first and second inner electrodes formed with the slit.

45. A multilayer capacitor comprising a multilayer body in which a plurality of dielectric layers and a plurality of inner electrodes are alternately laminated, and a plurality of terminal conductors formed on the multilayer body;
the multilayer capacitor having a capacitor portion including a first number of first inner electrodes and a second number of second inner electrodes alternately arranged as the plurality of inner electrodes;
wherein the first number of first inner electrodes are electrically connected to each other through a connecting conductor formed on a surface of the multilayer body;
wherein the second number of second inner electrodes are electrically connected to each other through a connecting conductor formed on the surface of the multilayer body;
wherein at least one first inner electrode whose number is smaller than the first number by at least 1 in the first number of first inner electrodes is electrically connected through a respective lead conductor to at least one terminal conductor in the plurality of terminal conductors;
wherein at least one second inner electrode whose number is smaller than the second number by at least 1 is electrically connected to at least one terminal conductor through a respective terminal conductor in the rest of terminal conductors other than the terminal conductor electrically connected to the first inner electrode through the lead conductor; and
wherein an equivalent series resistance is set to a desirable value by adjusting the number of at least one species of the first and second inner electrodes electrically connected to the terminal conductors through the lead conductors.

46. A multilayer capacitor according to claim 45, wherein the equivalent series resistance is set to a desirable value by further adjusting the number of connecting conductors electrically connecting the plurality of first inner electrodes to each other and the number of connecting conductors electrically connecting the plurality of second inner electrodes to each other.

47. A multilayer capacitor according to claim 45, wherein the plurality of first inner electrodes are connected in parallel; and
wherein the plurality of second inner electrodes are connected in parallel.

48. A multilayer capacitor according to claim 45, wherein at least a part of the plurality of first and second inner electrodes is formed with a slit;
wherein the slit is formed such that a current flows in respective directions opposite from each other in regions opposing each other across the slit in each of the first and second inner electrodes formed with the slit.

49. A multilayer capacitor comprising a multilayer body in which a plurality of dielectric layers and a plurality of inner electrodes are alternately laminated, and a plurality of terminal conductors formed on the multilayer body;
the multilayer capacitor having a capacitor portion including a first number of first inner electrodes and a second number of second inner electrodes alternately arranged as the plurality of inner electrodes;
wherein the first number of first inner electrodes are electrically connected to each other through a connecting conductor formed on a surface of the multilayer body;
wherein the second number of second inner electrodes are electrically connected to each other through a connecting conductor formed on the surface of the multilayer body;
wherein at least one first inner electrode whose number is smaller than the first number by at least 1 in the first number of first inner electrodes is electrically connected through a respective lead conductor to at least one terminal conductor in the plurality of terminal conductors;
wherein at least one second inner electrode whose number is smaller than the second number by at least 1 is electrically connected through a respective terminal conductor to at least one terminal conductor in the rest of terminal conductors other than the terminal conductor electrically connected to the first inner electrode through the lead conductor; and wherein an equivalent series resistance is set to a desirable value by adjusting a position of at least one species of the first and second inner electrodes electrically connected to the terminal conductors through the lead conductors in the laminating direction of the multilayer body.

50. A multilayer capacitor according to claim 49, wherein the equivalent series resistance is set to a desirable value by further adjusting the number of connecting conductors electrically connecting the plurality of first inner electrodes to each other and the number of connecting conductors electrically connecting the plurality of second inner electrodes to each other.

51. A multilayer capacitor according to claim 49, wherein the plurality of first inner electrodes are connected in parallel; and wherein the plurality of second inner electrodes are connected in parallel.

52. A multilayer capacitor according to claim 49, wherein at least a part of the plurality of first and second inner electrodes is formed with a slit;

wherein the slit is formed such that a current flows in respective directions opposite from each other in regions opposing each other across the slit in each of the first and second inner electrodes formed with the slit.

53. A multilayer capacitor comprising a multilayer body in which a plurality of dielectric layers and a plurality of inner electrodes are alternately laminated, and a plurality of outer conductors formed on a side face of the multilayer body;

wherein the plurality of inner electrodes include a plurality of first inner electrodes and a plurality of second inner electrodes alternately arranged;

wherein the plurality of outer conductors have a first outer conductor group including a plurality of first terminal conductors and an even number of first connecting conductors, and a second outer conductor group including a plurality of second terminal conductors and an even number of second connecting conductors;

wherein the plurality of first and second terminal conductors are electrically insulated from each other;

wherein the even number of first and second connecting conductors are electrically insulated from each other;

wherein the plurality of first inner electrodes are electrically connected to each other through the even number of first connecting conductors formed on the side face of-the multilayer body;

wherein the plurality of second electrodes are electrically connected to each other through the even number of second connecting conductors formed on the side face of the multilayer body;

wherein, in the plurality of first inner electrodes, the first inner electrodes whose number is at least the total number of the plurality of first terminal conductors but smaller than the total number of first inner electrodes by at least 1 are electrically connected respectively through lead conductors to the plurality of first terminal conductors, while the plurality of first terminal conductors are electrically connected respectively to at least one of the first inner electrodes electrically connected to the first terminal conductors through lead conductors;

wherein, in the plurality of second inner electrodes, the second inner electrodes whose number is at least the total number of the plurality of second terminal conductors but smaller than the total number of second inner electrodes by at least 1 are electrically connected respectively through lead conductors to the plurality of second terminal conductors, while the plurality of second terminal conductors are electrically connected respectively through lead conductors to at least one of the second inner electrodes electrically connected to the second terminal conductors;

wherein the conductors included in the first outer conductor group and the conductors included in the second outer conductor group are arranged adjacent to each other in a direction circulating along a side face of the multilayer body; and wherein an equivalent series resistance is set to a desirable value by adjusting at least one of the number of first inner electrodes electrically connected to the first terminal conductors through the lead conductors and the number of second inner electrodes electrically connected to the second terminal conductors through the lead conductors.

54. A multilayer capacitor according to claim 53, wherein a part of the even number of first connecting conductors and a part of the even number of second connecting conductors are formed on a first side face in side faces parallel to the laminating direction of the multilayer body;

wherein the rest of first connecting conductors other than the first connecting conductors formed on the first side face and the rest of second connecting conductors other than the second connecting conductors formed on the first side face are formed on a second side face, parallel to the laminating direction of the multilayer body, opposing the first side face; and wherein each of the sum of the first and second connecting conductors formed on the first side face and the sum of the first and second connecting conductors formed on the second side face is an even number.

55. A multilayer capacitor according to claim 54, wherein the even number of first connecting conductors is 2, one being formed on the first side face, the other being formed on the second side face, the two first connecting conductors being formed at respective positions symmetrical to each other about a center axis of the multilayer body in the laminating direction thereof; and wherein the even number of second connecting conductors is 2, one being formed on the first side face, the other being formed on the second side face, the two second connecting conductors being formed at respective positions symmetrical to each other about the center axis of the multilayer body in the laminating direction thereof.

56. A multilayer capacitor according to claim 53, wherein the plurality of first and second terminal conductors are formed on a side face different from a side face formed with the first or second connecting conductors in side faces parallel to the laminating direction of the multilayer body.

57. A multilayer capacitor according to claim 56, wherein the sum of the plurality of first and second terminal conductors formed on a side face different from the side face formed with the first or second connecting conductors in the side faces parallel to the laminating direction of the multilayer body is an even number.

58. A multilayer capacitor comprising a multilayer body in which a plurality of dielectric layers and a plurality of inner electrodes are alternately laminated, and a plurality of outer conductors formed on the multilayer body;

wherein the plurality of inner electrodes include a plurality of first inner electrodes and a plurality of second inner electrodes alternately arranged;

wherein the plurality of outer conductors have a first outer conductor group including a plurality of first terminal conductors and an even number of first connecting conductors, and a second outer conductor group including a plurality of second terminal conductors and an even number of second connecting conductors;

wherein the plurality of first and second terminal conductors are electrically insulated from each other;

wherein the even number of first and second connecting conductors are electrically insulated from each other;

wherein the plurality of first inner electrodes are electrically connected to each other through the even number of first connecting conductors formed on the multilayer body;

wherein the plurality of second electrodes are electrically connected to each other through the even number of second connecting conductors formed on the multilayer body;

wherein, in the plurality of first inner electrodes, the first inner electrodes whose number is at least the total number of the plurality of first terminal conductors but smaller than the total number of first inner electrodes by at least 1 are electrically connected respectively through lead conductors to the plurality of first terminal conductors, while the plurality of first terminal conductors are electrically connected respectively to at least one of the first inner electrodes electrically connected to the first terminal conductors through lead conductors;

wherein, in the plurality of second inner electrodes, the second inner electrodes whose number is at least the total number of the plurality of second terminal conductors but smaller than the total number of second inner electrodes by at least 1 are electrically connected respectively through lead conductors to the plurality of second terminal conductors, while the plurality of second terminal conductors are electrically connected respectively to at least one of the second inner electrodes electrically connected to the second terminal conductors through lead conductors;

wherein the conductors included in the first outer conductor group and the conductors included in the second outer conductor group are arranged adjacent to each other in a direction circulating along a side face of the multilayer body; and wherein an equivalent series resistance is set to a desirable value by adjusting at least one of a position of the first inner electrodes electrically connected to the first terminal conductors through the lead conductors in the laminating direction of the multilayer body and a position of the second inner electrodes electrically connected to the second terminal conductors through the lead conductors in the laminating direction of the multilayer body.

59. A multilayer capacitor according to claim 58, wherein a part of the even number of first connecting conductors and a part of the even number of second connecting conductors are formed on a first side face in side faces parallel to the laminating direction of the multilayer body;

wherein the rest of first connecting conductors other than the first connecting conductors formed on the first side face and the rest of second connecting conductors other than the second connecting conductors formed on the first side face are formed on a second side face, parallel to the laminating direction of the multilayer body, opposing the first side face; and wherein each of the sum of the first and second connecting conductors formed on the first side face and the sum of the first and second connecting conductors formed on the second side face is an even number.

60. A multilayer capacitor according to claim 59, wherein the even number of first connecting conductors is 2, one being formed on the first side face, the other being formed on the second side face, the two first connecting conductors being formed at respective positions symmetrical to each other about a center axis of the multilayer body in the laminating direction thereof; and wherein the even number of second connecting conductors is 2, one being formed on the first side face, the other being formed on the second side face, the two second connecting conductors being formed at respective positions symmetrical to each other about the center axis of the multilayer body in the laminating direction thereof.

61. A multilayer capacitor according to claim 58, wherein the plurality of first and second terminal conductors are formed on a side face different from a side face formed with the first or second connecting conductors in a side faces parallel to the laminating direction of the multilayer body.

62. A multilayer capacitor according to claim 61, wherein the sum of the plurality of first and second terminal conductors formed on a side face different from the side face formed with the first or second connecting conductors in the side faces parallel to the laminating direction of the multilayer body is an even number.

* * * * *